US008166293B2

(12) United States Patent
Masuhiro et al.

(10) Patent No.: US 8,166,293 B2
(45) Date of Patent: Apr. 24, 2012

(54) CLIENT SERVER DISTRIBUTED SYSTEM, CLIENT APPARATUS, SERVER APPARATUS, AND MESSAGE ENCRYPTION METHOD USED THEREFOR

(75) Inventors: Mao Masuhiro, Tokyo (JP); Yasuhiro Watanabe, Tokyo (JP)

(73) Assignee: NEC Infrontia Corporation, Kanagawa (JP)

(*) Notice: Subject to any disclaimer, the term of this patent is extended or adjusted under 35 U.S.C. 154(b) by 1219 days.

(21) Appl. No.: 11/828,956

(22) Filed: Jul. 26, 2007

(65) Prior Publication Data

US 2008/0028204 A1    Jan. 31, 2008

(30) Foreign Application Priority Data

Jul. 28, 2006   (JP) ................. 2006-206687

(51) Int. Cl.
 *H04L 29/06* (2006.01)
(52) U.S. Cl. ................... 713/152; 713/151; 713/150
(58) Field of Classification Search .................. 713/152, 713/151, 150
See application file for complete search history.

(56) References Cited

U.S. PATENT DOCUMENTS

| 2006/0010321 | A1 | 1/2006 | Nakamura et al. | |
| 2006/0095768 | A1 | 5/2006 | Hoshino | |
| 2010/0281162 | A1* | 11/2010 | Venkatraman et al. | 709/224 |
| 2010/0281164 | A1* | 11/2010 | Haff et al. | 709/225 |
| 2011/0314536 | A1* | 12/2011 | Kuckelman et al. | 726/12 |

FOREIGN PATENT DOCUMENTS

| CN | 1541016 A | 10/2004 |
| CN | 1564509 A | 1/2005 |
| JP | 2000-324104 A | 11/2000 |
| JP | 2004-192134 A | 7/2004 |
| JP | 2004-302846 A | 10/2004 |
| JP | 2004-343782 A | 12/2004 |
| JP | 2005-45473 A | 2/2005 |
| JP | 2005-51680 A | 2/2005 |
| JP | 2005-72636 A | 3/2005 |

(Continued)

OTHER PUBLICATIONS

J. Rosenberg et al., SIP: Session Initiation Protocol, RFC 3261, Jun. 2002, pp. 1-269, URL: http://www.faqs.org/ftp/rfc/pdf/rfc3261.txt.pdf.

(Continued)

*Primary Examiner* — David Y Jung
(74) *Attorney, Agent, or Firm* — Sughrue Mion, PLLC

(57) ABSTRACT

When encryption information including an encryption rule, an encryption range, and an encryption key is input to a server apparatus from a local maintenance console in advance, the server apparatus stores the encryption information in an encryption information setting unit, creates an SIP request message including the encryption information, and transmits the SIP request message to a client apparatus. The client apparatus receives the SIP request message including the encryption information. If confirming normality of the encryption information, the client apparatus sets the encryption information therein. After completion of a setting of the encryption information, the client apparatus transmits a notification of the completion of the setting of the encryption information to the server apparatus. Upon receiving the notification of the completion of the setting of the encryption information, the server apparatus acknowledges the completion of the setting of the encryption information, sets the encryption information therein, transmits the notification of the completion of the setting of the encryption information to the local maintenance console, and causes the local maintenance console to display the completion of the setting of the encryption information.

43 Claims, 77 Drawing Sheets

FOREIGN PATENT DOCUMENTS

| | | |
|---|---|---|
| JP | 2005-160005 A | 6/2005 |
| JP | 2005-216188 A | 8/2005 |

OTHER PUBLICATIONS

A. Menezes et al., Handbook of Applied Cryptography, CRC Press, 1996, pp. 497-499.

M. Ranganathan et al., "Performance analysis of secure session initiation protocol based VoIP networks", Computer Communications, 2003, vol. 26, No. 6, pp. 552-565.

Hiroshi Yuki, *Introduction to Cryptographic Technology-Alice in Cryptographic World*, Chapter 14: SSL/TLS, pp. 346-367, Sep. 27, 2003, Softbank Publishing Co., Ltd.

* cited by examiner

FIG.68

ENCRYPTION INFORMATION TABLE 20

| NUMBER OF SIP-PROTOCOL-COPING CLIENT APPARATUS | 1 | 2 | ... | n | ... | x |
|---|---|---|---|---|---|---|
| ENCRYPTION-KEY-CREATION RANDOM PARAMETER | | | | | | |
| INFORMATION AS TO WHETHER OR NOT SIP MESSAGE IS ENCRYPTED | | | | | | |
| ENCRYPTION RULE | | | | | | |
| ENCRYPTION RANGE | | | | | | |
| ENCRYPTION KEY | | | | | | |
| ⋮ | | | | | | |

US 8,166,293 B2

CLIENT SERVER DISTRIBUTED SYSTEM, CLIENT APPARATUS, SERVER APPARATUS, AND MESSAGE ENCRYPTION METHOD USED THEREFOR

This application is based upon and claims the benefit of priority from Japanese patent application No. 2006-206687, filed on Jul. 28, 2006, the disclosure of which is incorporated herein in its entirety by reference.

BACKGROUND OF THE INVENTION

1. Field of the Invention

The present invention relates to a client server distributed system, a client apparatus, a server apparatus, a message encryption method used for the client server distributed system, the client apparatus, and the server apparatus, and programs for the client server distributed system, the client apparatus, and the server apparatus. More specifically, the present invention relates to a method of encrypting an SIP message transmitted or received between a client and a server in a client server distributed system compliant with an SIP (Session Initiation Protocol) protocol.

2. Description of the Related Art

A client server distributed system compliant with SIP protocol needs to ensure security because the system is connected on a LAN (local area network). To meet the need, a method of encrypting an SIP message used for control between a client and a server is defined. Generally, an SSL/TLS (Secure Socket Layer/Transport Layer Security) or the like is defined as the SIP message encryption method.

According to the SSL/TLS, two apparatuses need certificates mutually (see, for example, Hiroshi Yuki, *Introduction to Cryptographic Technology—Alice in Cryptographic World*, Chapter 14: SSL/TLS, pp. 346-367, Sep. 27, 2003, Softbank Publishing Co., Ltd.) Due to this, if the SSL/TLS is applied to the client/server distributed system, it is necessary to distribute a certificate to each of client and server apparatuses in advance. It is also necessary to prepare an authentication server in the client server distributed system and to authenticate the certificate so as to distribute an encryption key to the respective apparatuses.

Moreover, in the client server distributed system, the SIP message is encrypted entirely during encryption of the SIP message. Due to this, in a network in which a network apparatus such as an SIP-NAT (Network Address Translator) is present, a communication cannot be held via the SIP-NAT.

A TCP (Transmission Control Protocol), which is used as a layer 4 protocol, is not optimum for a VoIP (Voice over Internet Protocol) communication that gives importance to real time performance. Normally, therefore, a UDP (User Datagram Protocol) protocol is used for the VoIP communication.

As methods of delivering an encryption key used for authentication or the like in a network, there are proposed methods disclosed in Japanese Patent Application Laid-Open Nos. 2004-302846, 2004-343782, 2005-045473, 2005-051680, and 2005-216188 and Hiroshi Yuki, *Introduction to Cryptographic Technology—Alice in Cryptographic World*, Chapter 14 SSL/TLS, Sep. 27, 2003, pp. 346-367, Softbank Publishing Co., Ltd.

In the above-stated related SIP-protocol-coping client server distributed system, it is necessary to perform authentication using certificates so as to notify each of the client and the server of the encryption key at the time of encrypting the SIP message between the client and the server. Accordingly, it is necessary to distribute certificates to the client and server apparatuses, and to provide a certificate management function in the system. As a result, the number of man-hours disadvantageously increases.

Furthermore, in the related client server distributed system, the SIP message is entirely encrypted at the time of encrypting the SIP message. Due to this, a communication cannot be held via the SIP-NAT in the network in which the network apparatus such as the SIP-NAT is present. The related client server distributed system is, therefore, disadvantageously inferior in network expandability.

Moreover, the related client server distributed system uses the TCP as the layer 4 protocol. Due to this, it is disadvantageously difficult to ensure the real time performance in the VoIP communication.

Namely, the related technique has a disadvantage of high cost so as to realize encryption security functions to satisfy the need of man-hours of maintenance personnel for certificate management and the need of the authentication server for the authentication. Further, with the related technique, translation of a global address into a local address and vice versa using the SIP-NAT function cannot be performed. Due to this, it is disadvantageously difficult to ensure expandability to construct a network by address allocation.

Furthermore, the related technique has the following disadvantages. It is impossible to ensure the real time performance if the system is applied as a security for the VoIP communication. Although the related technique includes a function of updating the encryption key if a communication becomes long, the other encryption information (such as presence or absence of encryption, an encryption rule, and an encryption range) cannot be changed. Due to this, as compared with the technique for transmitting or receiving the SIP message while changing entire encryption information, the level of the encryption security function is low. These disadvantages are difficult to overcome even if the methods for delivery of the encryption key used for the authentication or the like as disclosed in the Japanese Patent Application Laid-Open Nos. 2004-302846, 2004-343782, 2005-045473, 2005-051680, and 2005-216188 and Hiroshi Yuki, *Introduction to Cryptographic Technology—Alice in Cryptographic World*, Chapter 14 SSL/TLS, Sep. 27, 2003, pp. 346-367, Softbank Publishing Co., Ltd. are used.

SUMMARY OF THE INVENTION

It is an object of the present invention to provide a client server distributed system, a client apparatus, a server apparatus, a message encryption method used for the client server distributed system, the client apparatus, and the server apparatus, and programs for the client server distributed system, the client apparatus, and the server apparatus capable of overcoming the related disadvantages, and realizing an encryption security function at low cost without need to provide a certificate authentication function for distributing an encryption key, need to hold or manage a certificate, need to dispose an authentication server in the system, and the like.

According to a first aspect of the present invention, there is provided a client server distributed system configured so that a client apparatus compliant with an SIP protocol and a server apparatus compliant with the SIP protocol are connected to a network, the SIP being an abbreviation of Session Initiation Protocol, the SIP protocol operating on a UDP protocol, the UDP being an abbreviation of User Datagram Protocol, wherein the server apparatus includes means for setting encryption information used to transmit or receive an SIP message to or from the client apparatus;

means for notifying the client apparatus of the encryption information on the SIP message;

means for encrypting the SIP message based on the encryption information and for transmitting the encrypted SIP message to the client apparatus;

means for decrypting the encrypted SIP message based on the encryption information when receiving the encrypted SIP message from the client apparatus; and means for exercising a control according to a content of the decrypted SIP message, the client apparatus includes means for setting the encryption information on the SIP message received from the server apparatus;

means for encrypting the SIP message based on the encryption information when transmitting the SIP message to the server apparatus;

means for decrypting the SIP message based on the encryption information when receiving the encrypted SIP message from the server apparatus; and means for exercising a control according to a content of the decrypted SIP message.

A client apparatus according to the present invention includes the means described in the client server distributed system according to the first aspect of the present invention.

A server apparatus according to the present invention includes the means described in the client server distributed system according to the first aspect of the present invention.

According to a second aspect of the present invention, there is provided a message encryption method used in a client server distributed system configured so that a client apparatus compliant with an SIP protocol and a server apparatus compliant with the SIP protocol are connected to a network, the SIP being an abbreviation of Session Initiation Protocol, the SIP protocol operating on a UDP protocol, the UDP being an abbreviation of User Datagram Protocol, the message encryption method comprising steps of:

causing the server apparatus to perform a processing for setting encryption information used to transmit or receive an SIP message to or from the client apparatus;

a processing for notifying the client apparatus of the encryption information on the SIP message;

a processing for encrypting the SIP message based on the encryption information and for transmitting the encrypted SIP message to the client apparatus;

a processing for decrypting the encrypted SIP message based on the encryption information when receiving the encrypted SIP message from the client apparatus; and a processing for exercising a control according to a content of the decrypted SIP message, and causing the client apparatus to perform a processing for setting the encryption information on the SIP message received from the server apparatus;

a processing for encrypting the SIP message based on the encryption information when transmitting the SIP message to the server apparatus;

a processing for decrypting the SIP message based on the encryption information when receiving the encrypted SIP message from the server apparatus; and a processing for exercising a control according to a content of the decrypted SIP message.

According to a third aspect of the present invention, there is provided a program executed by a server apparatus in a client server distributed system configured so that a client apparatus compliant with an SIP protocol and a server apparatus compliant with the SIP protocol are connected to a network, the SIP being an abbreviation of Session Initiation Protocol, the SIP protocol operating on a UDP protocol, the UDP being an abbreviation of User Datagram Protocol, the program causing a central processing unit of the server apparatus to perform:

a processing for setting encryption information used to transmit or receive an SIP message to or from the client apparatus;

a processing for notifying the client apparatus of the encryption information on the SIP message;

a processing for encrypting the SIP message based on the encryption information and for transmitting the encrypted SIP message to the client apparatus;

a processing for decrypting the encrypted SIP message based on the encryption information when receiving the encrypted SIP message from the client apparatus; and a processing for exercising a control according to a content of the decrypted SIP message.

According to a fourth aspect of the present invention, there is provided another program executed by a client apparatus in a client server distributed system configured so that a client apparatus compliant with an SIP protocol and a server apparatus compliant with the SIP protocol are connected to a network, the SIP being an abbreviation of Session Initiation Protocol, the SIP protocol operating on a UDP protocol, the UDP being an abbreviation of User Datagram Protocol, the program causing a central processing unit of the client apparatus to perform:

a processing for setting the encryption information on the SIP message received from the server apparatus;

a processing for encrypting the SIP message based on the encryption information when transmitting the SIP message to the server apparatus;

a processing for decrypting the SIP message based on the encryption information when receiving the encrypted SIP message from the server apparatus; and a processing for exercising a control according to a content of the decrypted SIP message.

Namely, the client server distributed system according to the present invention is a system compliant with an SIP (Session Initiation Protocol) protocol and connected to the Internet, the Intranet or the LAN (Local Area Network), and holding communication according to a UDP (User Datagram Protocol) as a layer 4 protocol.

The above-stated client server distributed system according to the present invention includes a maintenance interface to which an SIP-protocol-coping server apparatus is connected by the LAN or a serial interface. Encryption information (presence or absence of encryption, an encryption rule, and an encryption range) used when an SIP message encryption function is realized during transmission or reception of the SIP message to or from an SIP-protocol-coping client apparatus is input to the SIP-protocol-coping server apparatus from the maintenance interface, and set to the SIP-protocol-coping server apparatus.

At the time of transmitting or receiving an SIP message to or from the client apparatus, the server apparatus sets the presence or absence of encryption, the encryption rule, the encryption range, and the encryption key for the SIP message using the SIP protocol without executing authentication, e.g., certification of the client apparatus connected to the server apparatus. Further, according to the set presence or absence of encryption, encryption rule, encryption range, and encryption key, the server apparatus encrypts or decrypts the SIP message, updates the presence or absence of encryption, the encryption rule, the encryption range, and the encryption key either arbitrarily or regularly, and operates with encryption information set differently according to the client apparatuses connected to the server apparatus.

When receiving an instruction of the encryption information (the presence or absence of encryption, the encryption rule, the encryption range, and the encryption key) used to realize an SIP message encryption function during transmission or reception of the SIP message from the server apparatus, the client apparatus sets the encryption information thereto. At the time of transmitting or receiving an SIP message to or from the server apparatus, the client apparatus sets the presence or absence of encryption, the encryption rule, the encryption range, and the encryption key for the SIP message using the SIP protocol without executing authentication, e.g., certification of the server apparatus connected to the client apparatus. Further, according to the set presence or absence of encryption, encryption rule, encryption range, and encryption key, the client apparatus encrypts or decrypts the SIP message, and updates the presence or absence of encryption, the encryption rule, the encryption range, and the encryption key.

By doing so, the client server distributed system according to the present invention can realize the encryption security function at low cost without need to include a certificate authentication function for distributing the encryption key, to hold or maintain a certificate, to prepare an authentication server in the system.

Moreover, the client server distributed system according to the present invention can encrypt the SIP message even in a network configuration including the SIP-NAT (Network Address Translator) or the like and strengthen the encryption security function by enabling the encryption range of the SIP message to be variably set.

Furthermore, the client server distributed system according to the present invention can realize the encryption security function without deteriorating real time performance important for VoIP (Voice over Internet Protocol) communication by using the UDP as a layer 4 protocol.

Further, the client server distributed system according to the present invention can prevent an encryption state from being estimated an strengthen the encryption security by making it possible to update the encryption information (presence or absence of encryption, the encryption rule, and the encryption range) other than the encryption key, making it possible to set different encryption information according to the apparatuses, and automatically updating the encryption information either arbitrarily or regularly.

According to the present invention, by configuring the client server distributed system and allowing the client server distributed system to operate as stated above, it is advantageously possible to realize the encryption security function at low cost without need, for example, to include a certificate authentication function for distributing the encryption key, to hold or maintain a certificate, to prepare an authentication server in the system.

BRIEF DESCRIPTION OF THE DRAWINGS

FIG. 68 is a table showing an example of a configuration of an encryption information table shown in FIG. 66;

DESCRIPTION OF THE PREFERRED EMBODIMENTS

Embodiments of the present invention will be described hereinafter with reference to the accompanying drawings.

First Embodiment

Figure 1:
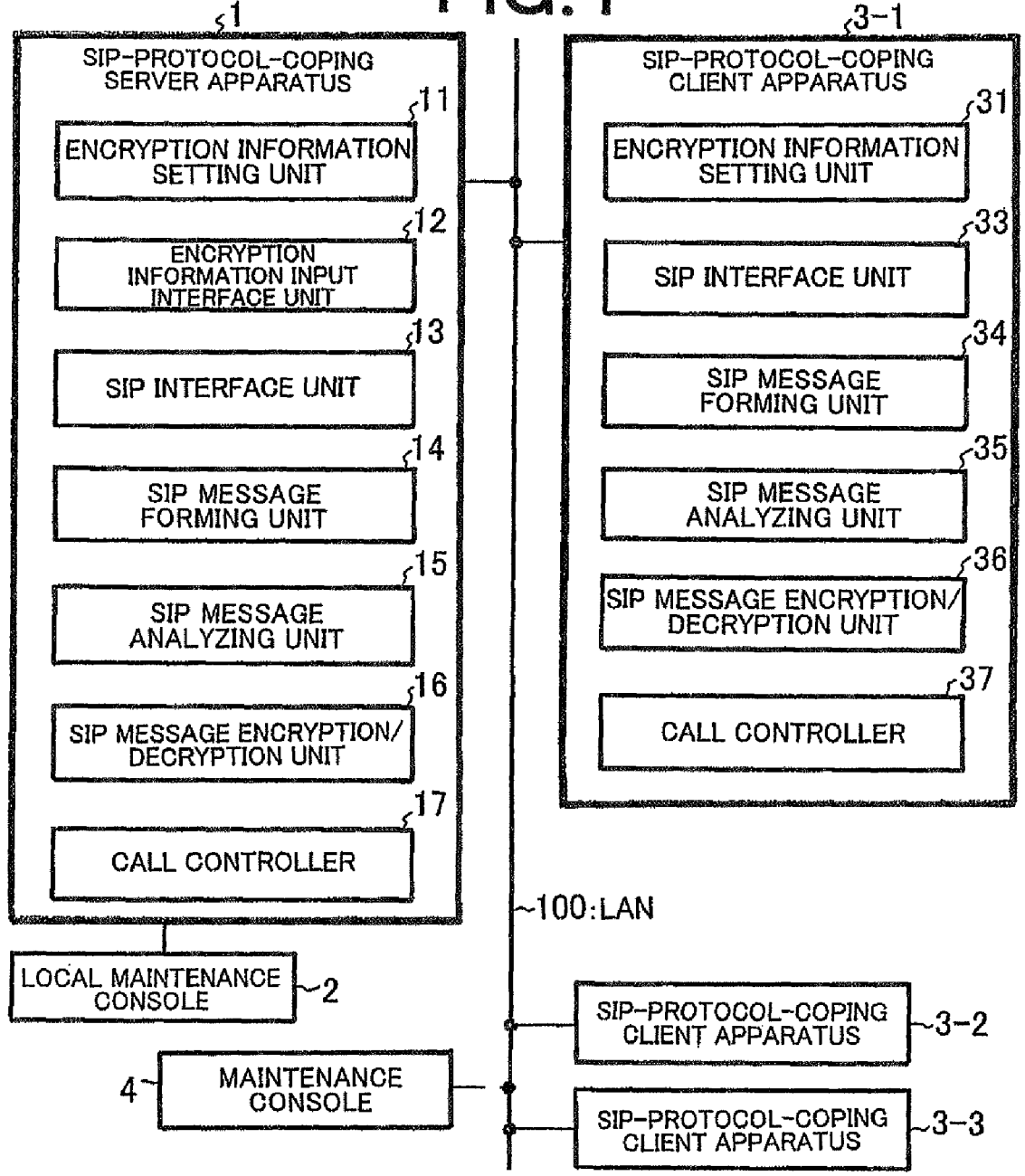
FIG. 1 is a block diagram showing a configuration of a client server distributed system compliant with an SIP protocol according to a first embodiment of the present invention.

FIG. 1 is a block diagram showing a configuration of a client server distributed system compliant with an SIP (Session Initiation Protocol) protocol according to a first embodiment of the present invention. In FIG. 1, the client server distributed system according to the first embodiment of the present invention is configured to include an SIP-protocol-coping server apparatus (hereinafter, "server apparatus") 1, a local maintenance console 2, SIP-protocol-coping client apparatuses (hereinafter, "client apparatuses") 3-1 to 3-3, and a maintenance console 4. The server apparatus 1, the client apparatuses 3-1 to 3-3, and the maintenance console 4 are connected to a LAN (local area network) 100.

The server apparatus 1 is configured to include at least an encryption information setting unit 11, an encryption information input interface unit 12, an SIP interface unit 13, an SIP message forming unit 14, an SIP message analyzing unit 15, an SIP message encryption/decryption unit 16, and a call controller 17. The local maintenance console 2 is connected to the server apparatus 1 by a serial cable or the like. The local maintenance console 2 may be disposed temporarily in a construction period or the like of the server apparatus 1 and may not be connected to the server apparatus 1 during operation of the system.

In the server apparatus 1, the encryption information setting unit 11, the encryption information input interface unit 12, the SIP interface unit 13, the SIP message forming unit 14, the SIP message analyzing unit 15, the SIP message encryption/decryption unit 16, and the call controller 17 can be realized by causing a CPU (central processing unit) (not shown) to execute programs, respectively.

The client apparatus 3-1 is configured to include at least an encryption information setting unit 31, an SIP interface unit 33, an SIP message forming unit 34, an SIP message analyzing unit 35, an SIP message encryption/decryption unit 36, and a call controller 37. Furthermore, in the client apparatus 3-1, the encryption information setting unit 31, the SIP interface unit 33, the SIP message forming unit 34, the SIP message analyzing unit 35, the SIP message encryption/decryption unit 36, and the call controller 37 can be realized by causing a CPU (not shown) to execute programs, respectively. Moreover, the client apparatuses 3-2 and 3-2 are the same in configuration as the client apparatus 3-1.

By configuring the server apparatus 1 and the client apparatuses 3-1 to 3-3 as stated above, it is possible to encrypt the SIP message during the communication between the server apparatus 1 and each of the client apparatuses 3-1 to 3-3, and to strengthen the security for SIP message control on an IP (Internet protocol) network.

Figure 2:
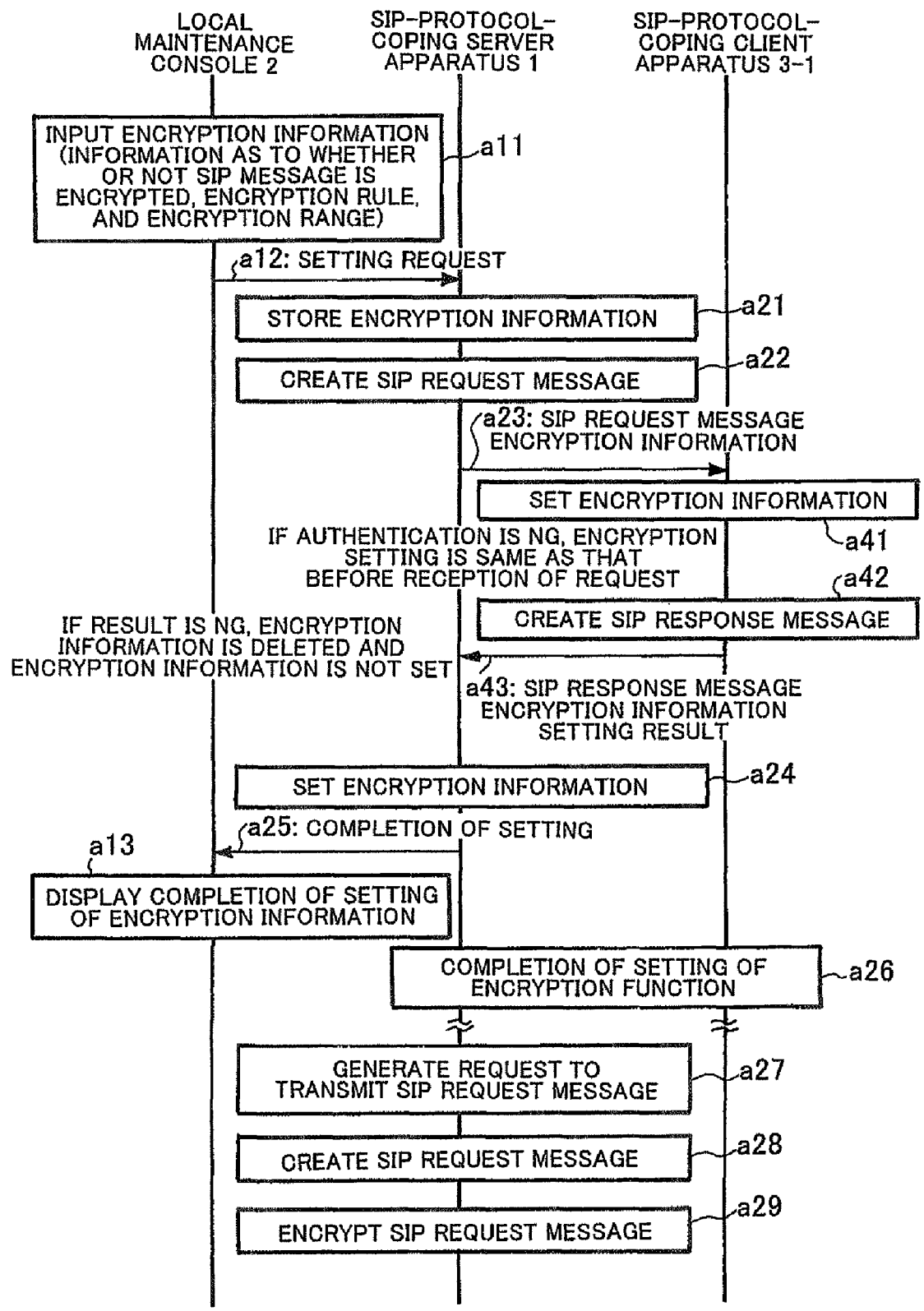
FIG. 2 is a sequence chart showing operation performed by the client server distributed system according to the first embodiment of the present invention.
Figure 3:
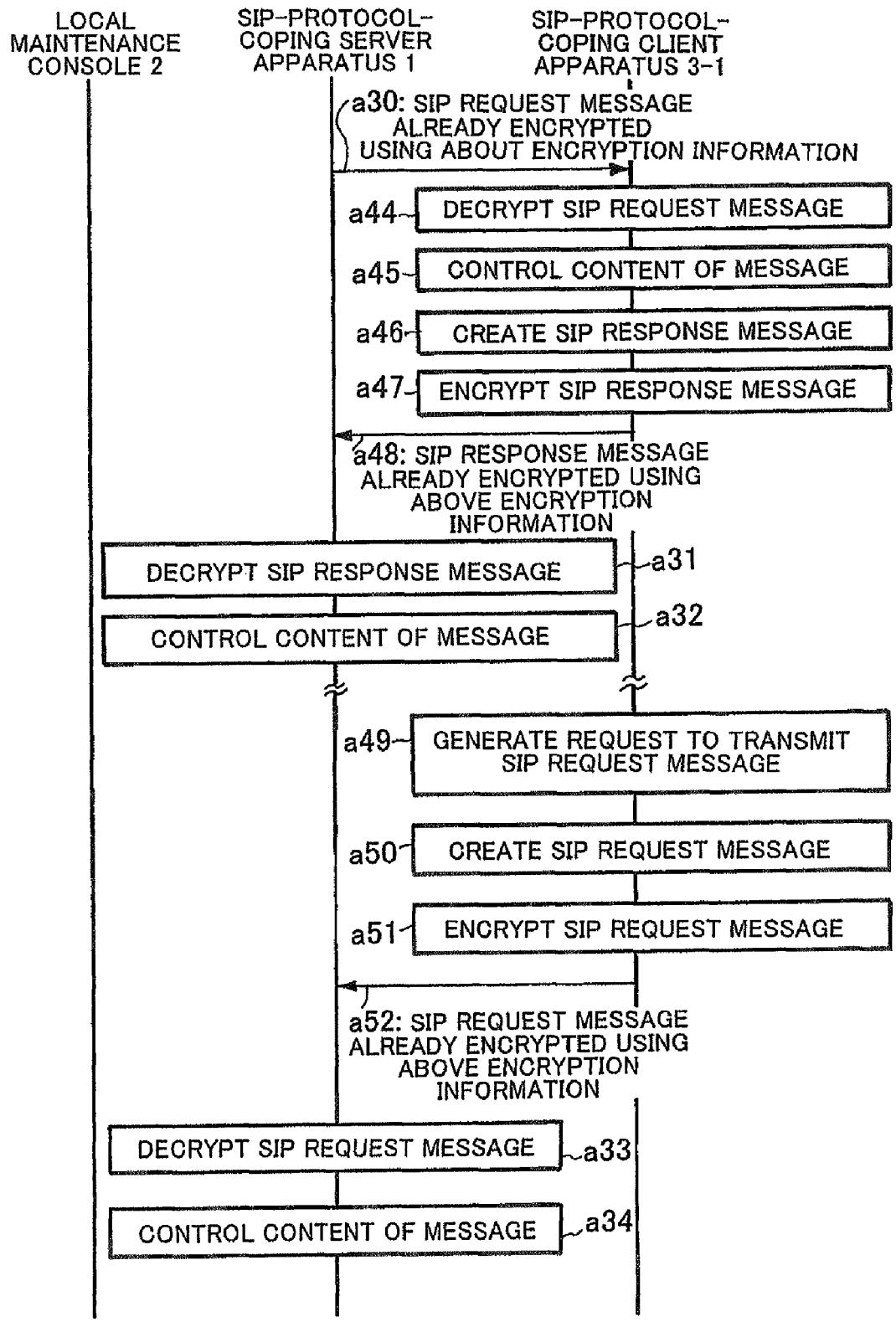
FIG. 3 is a sequence chart showing operation performed by the client server distributed system according to the first embodiment of the present invention.
Figure 4:
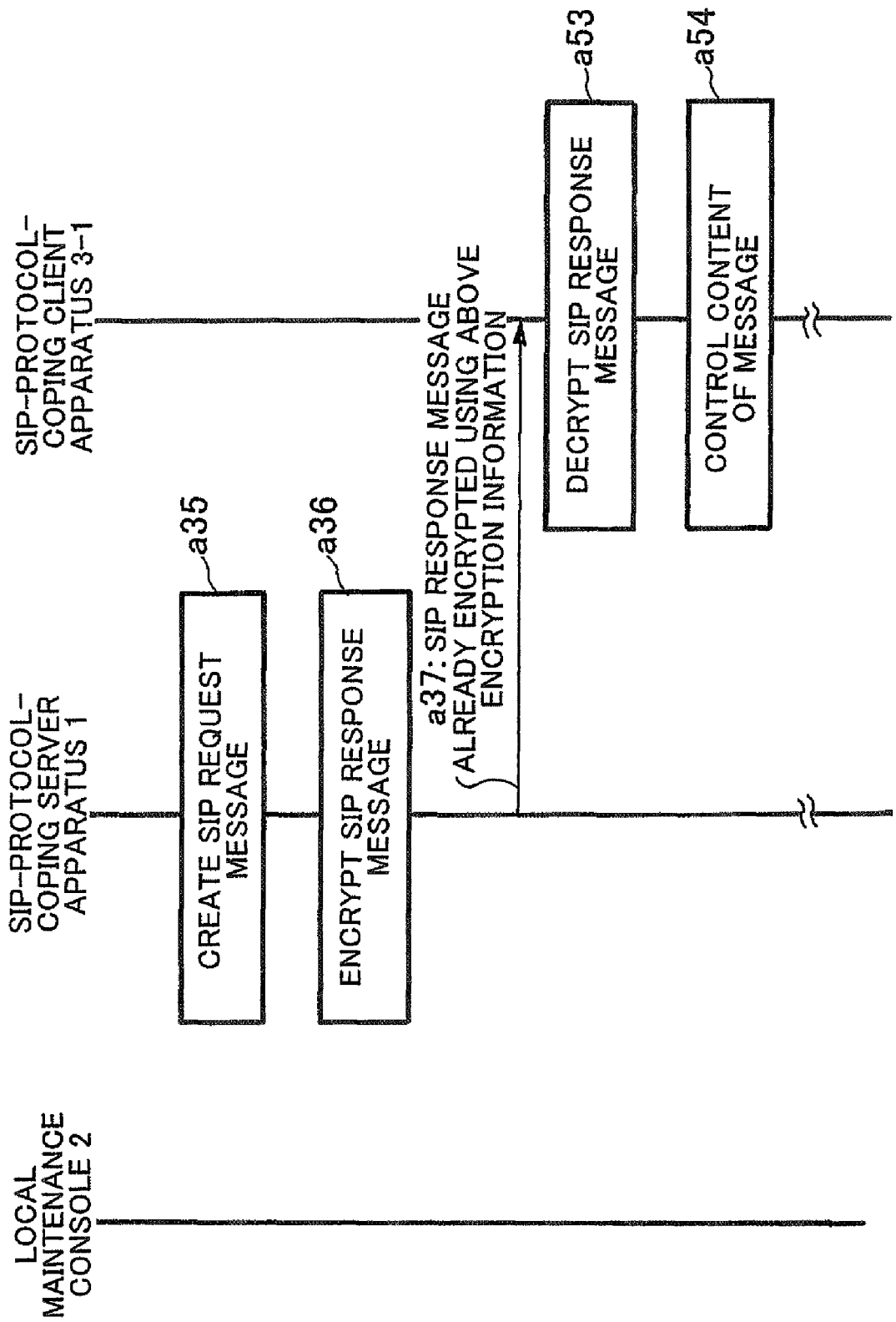
FIG. 4 is a sequence chart showing operation performed by the client server distributed system according to the first embodiment of the present invention.

FIGS. 2 to 4 are sequence charts showing operation performed by the client server distributed system according to the first embodiment of the present invention. Referring to FIGS. 1 to 4, the operation performed by the client server distributed system according to the first embodiment of the present invention will be described. It is to be noted that processings performed by the server apparatus 1 and those performed by the client apparatus 3-1 shown in FIGS. 2 to 4 are realized by causing CPUs of the server apparatus 1 and the client apparatus 3-1 to execute programs, respectively.

When presence or absence of encryption as well as, if the SIP message is encrypted, an encryption rule, and an encryption range during transmission or reception of the SIP message between the server apparatus 1 and the client apparatus 3-1 is input to the server apparatus 1 from the local maintenance console 2 connected to the server apparatus 1 in advance (at a11 shown in FIG. 2), the encryption information input interface unit 12 of the server apparatus 1 receives a setting request including the input information. If confirming normality of the setting request, the encryption information input interface unit 12 transmits the information to the encryption information setting unit 11. The encryption information setting unit 11 stores therein the information including an encryption key (hereinafter, items of information including the encryption key will be referred to as "encryption information") (at a21 in FIG. 2).

The encryption information setting unit 11 of the server apparatus 1 instructs the SIP message forming unit 14 to create an SIP request message including the encryption information (a22 in FIG. 2). The SIP message forming unit 14 creates the SIP request message based on the instruction, and transmits the created SIP request message to the SIP interface unit 33 of the client apparatus 3-1 via the SIP interface unit 13 (at a23 FIG. 2).

The SIP interface unit 33 of the client apparatus 3-1 receives the SIP request message including the encryption information, and transmits the received SIP request message to the SIP message analyzing unit 35. If the SIP message analyzing unit 35 can confirm the normality of the encryption information, the SIP message analyzing unit 35 transmits the encryption information to the encryption information setting unit 31. The encryption information setting unit 31 stores therein the encryption information, and sets the encryption information to the SIP message encryption/decryption unit 36 (at a41 in FIG. 2). After completing setting, the encryption information setting unit 31 instructs the SIP message forming unit 34 to create an SIP response message for notification of completion of the setting of the encryption information (at a42 in FIG. 2). The SIP message forming unit 34 creates the SIP response message based on the instruction, and transmits the created SIP response message to the SIP interface unit 13 of the server apparatus 1 via the SIP interface unit 33 (at a43 in FIG. 2).

Upon receiving the SIP response message for notification of the completion of the setting of the encryption information, the SIP interface unit 13 of the server apparatus 1 transmits the received SIP response message to the SIP message analyzing unit 15. The SIP message analyzing unit 15 transmits the notification of the completion of the setting of the encryption information on the client apparatus 3-1 side to the encryption information setting unit 11. The encryption information setting unit 11 acknowledges the completion of the setting of the encryption information and sets the encryption information to the SIP message encryption/decryption unit 16 (at a24 in FIG. 2). After completion of the setting, the server apparatus 1 transmits a notification of the completion of the setting to the local maintenance console 2 via the encryption information input interface unit 12 (at a25 in FIG. 2). The local maintenance console 2 displays the completion of the setting of the encryption information (at a13 in FIG. 2).

After the encryption information is set to the SIP message encryption/decryption unit 16, if a request to transmit an SIP request message to the client apparatus 3-1 is generated in the server apparatus 1 (at a27 in FIG. 2), then the SIP message forming unit 14 creates the SIP request message, and the SIP message encryption/decryption unit 16 encrypts the created SIP request message using the encryption information (at a28 and a29 in FIG. 2). The server apparatus 1 transmits the encrypted SIP request message to the SIP interface unit 33 of the client apparatus 3-1 via the SIP interface unit 13 (at a30 in FIG. 3).

After the encryption information is set to the SIP message encryption/decryption unit 36, if the SIP interface unit 33 receives the encrypted SIP request message from the server apparatus 1, the SIP interface unit 33 transfers the received SIP message to the SIP message encryption/decryption unit 36. The SIP message encryption/decryption unit 36 decrypts the SIP request message using the currently set encryption information (at a44 in FIG. 3).

The SIP message analyzing unit 35 analyzes the decrypted SIP request message, and the call controller 37 executes a call control according to a content of the message (a45 in FIG. 3). According to a result of the call control, the call controller 37 instructs the SIP message forming unit 34 to create an SIP response message (at a46 in FIG. 3). The SIP message forming unit 34 creates the SIP response message, and the SIP message encryption/decryption unit 36 encrypts the SIP response message created by the SIP message forming unit 34 using the currently set encryption information (at a47 in FIG. 3). The client apparatus 3-1 transmits the encrypted SIP response message to the SIP interface unit 13 of the server apparatus 1 via the SIP interface unit 33 (at a48 in FIG. 3).

Upon receiving the encrypted SIP response message, the SIP interface unit 13 of the server apparatus 1 transmits the received SIP response message to the SIP message encryption/decryption unit 16. The SIP message encryption/decryption unit 16 decrypts the SIP response message using the currently set encryption information (at a31 in FIG. 3), the SIP message analyzing unit 15 analyzes the decrypted SIP response message, and the call controller 17 executes a call control according to a content of the message (at a32 in FIG. 3).

Conversely, if a request to transmit an SIP request message to the server apparatus 1 is generated in the client apparatus 3-1 (at a49 in FIG. 3), then the SIP message forming unit 34 creates the SIP request message, and the SIP message encryption/decryption unit 36 encrypts the created SIP request message using the encryption information (at a50 and a51 in FIG. 3). The client apparatus 3-1 transmits the encrypted SIP request message to the SIP interface unit 13 of the server apparatus 1 via the SIP interface unit 33 (at a52 in FIG. 3).

If the SIP interface unit 13 receives the encrypted SIP request message from the client apparatus 3-1, the SIP interface unit 13 transfers the received SIP message to the SIP message encryption/decryption unit 16. The SIP message encryption/decryption unit 16 decrypts the SIP request message using the currently set encryption information (at a33 in FIG. 3).

The SIP message analyzing unit 15 analyzes the decrypted SIP request message, and the call controller 17 executes a call control according to a content of the message (a34 in FIG. 3). According to a result of the call control, the call controller 17 instructs the SIP message forming unit 14 to create an SIP response message (at a35 in FIG. 4). The SIP message forming unit 14 creates the SIP response message, and the SIP message encryption/decryption unit 16 encrypts the SIP response message created by the SIP message forming unit 14 using the currently set encryption information (at a36 in FIG. 4). The server apparatus 1 transmits the encrypted SIP response message to the SIP interface unit 33 of the client apparatus 3-1 via the SIP interface unit 13 (at a37 in FIG. 4).

Upon receiving the encrypted SIP response message, the SIP interface unit 33 of the client apparatus 3-1 transmits the received SIP response message to the SIP message encryption/decryption unit 36. The SIP message encryption/decryption unit 36 decrypts the SIP response message using the currently set encryption information (at a53 in FIG. 4). The SIP message analyzing unit 35 analyzes the decrypted SIP response message, and the call controller 37 executes a call control according to a content of the message (at a54 in FIG. 4).

In this manner, according to the first embodiment, the SIP message is encrypted according to the encryption information set arbitrarily by a maintenance person. It is, therefore, possible to strengthen security on the IP network and to distribute encryption information set by a system maintenance person and used to encrypt or decrypt the SIP message to the client apparatuses 3-1 to 3-3 via the maintenance interface of the server apparatus 1 (maintenance console 4). Furthermore, it is possible to integrally set encryption capability in view of the entire system at one location, to simplify maintenance operation, and to decrease the number of man-hours for maintenance.

Moreover, as a security method for the conventional SIP, SSL/TLS (Secure Socket Layer/Transport Layer Security) is generally used. According to the first embodiment, there is no need to distribute a certificate to the respective apparatuses, to provide a certificate management function, and to authenticate the certificate using an authentication server. Therefore, the encryption function can be realized through simpler procedures than those for the SSL/TLS. Besides, because of the use of UDP (User Datagram Protocol) as the layer 4 protocol, it is possible to ensure real time performance and, at the same time, to improve security. While operations performed by the client apparatuses 3-2 and 3-3 are not described herein, the same advantages as those when using the client apparatus 3-1 can be exhibited.

Second Embodiment

Figure 5:
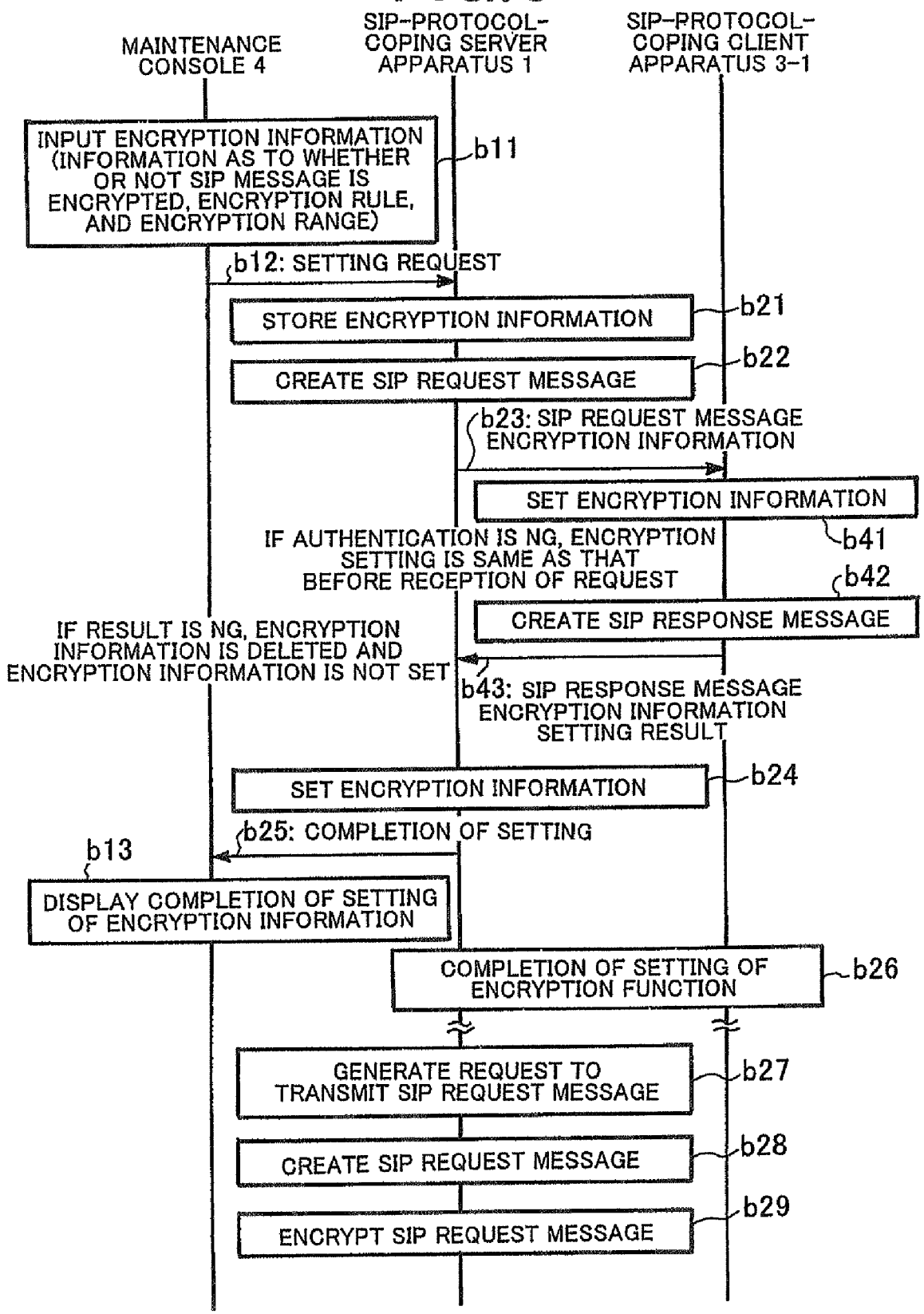
FIG. 5 is a sequence chart showing operation performed by a client server distributed system according to a second embodiment of the present invention.
Figure 6:
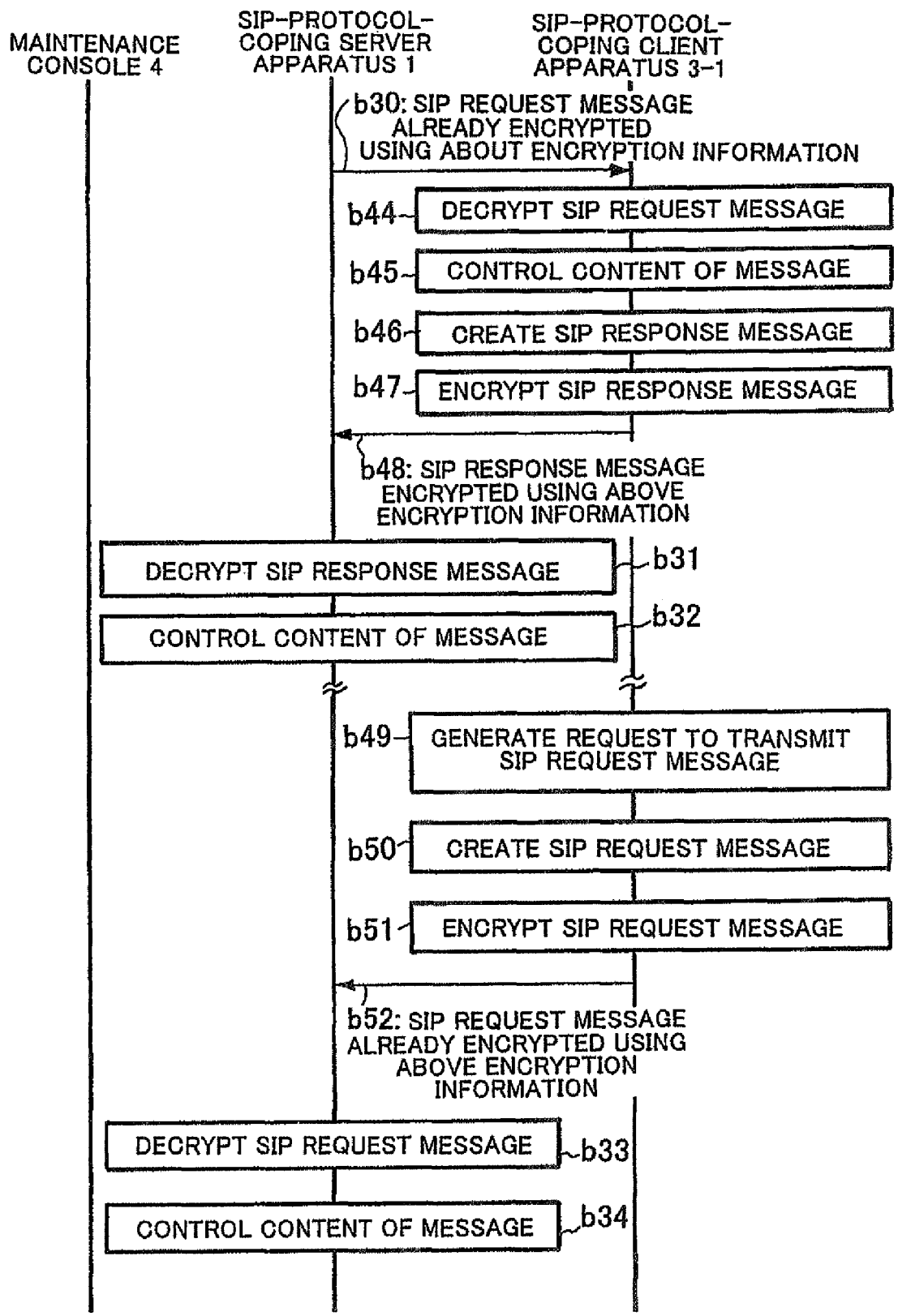
FIG. 6 is a sequence chart showing operation performed by the client server distributed system according to the second embodiment of the present invention.
Figure 7:
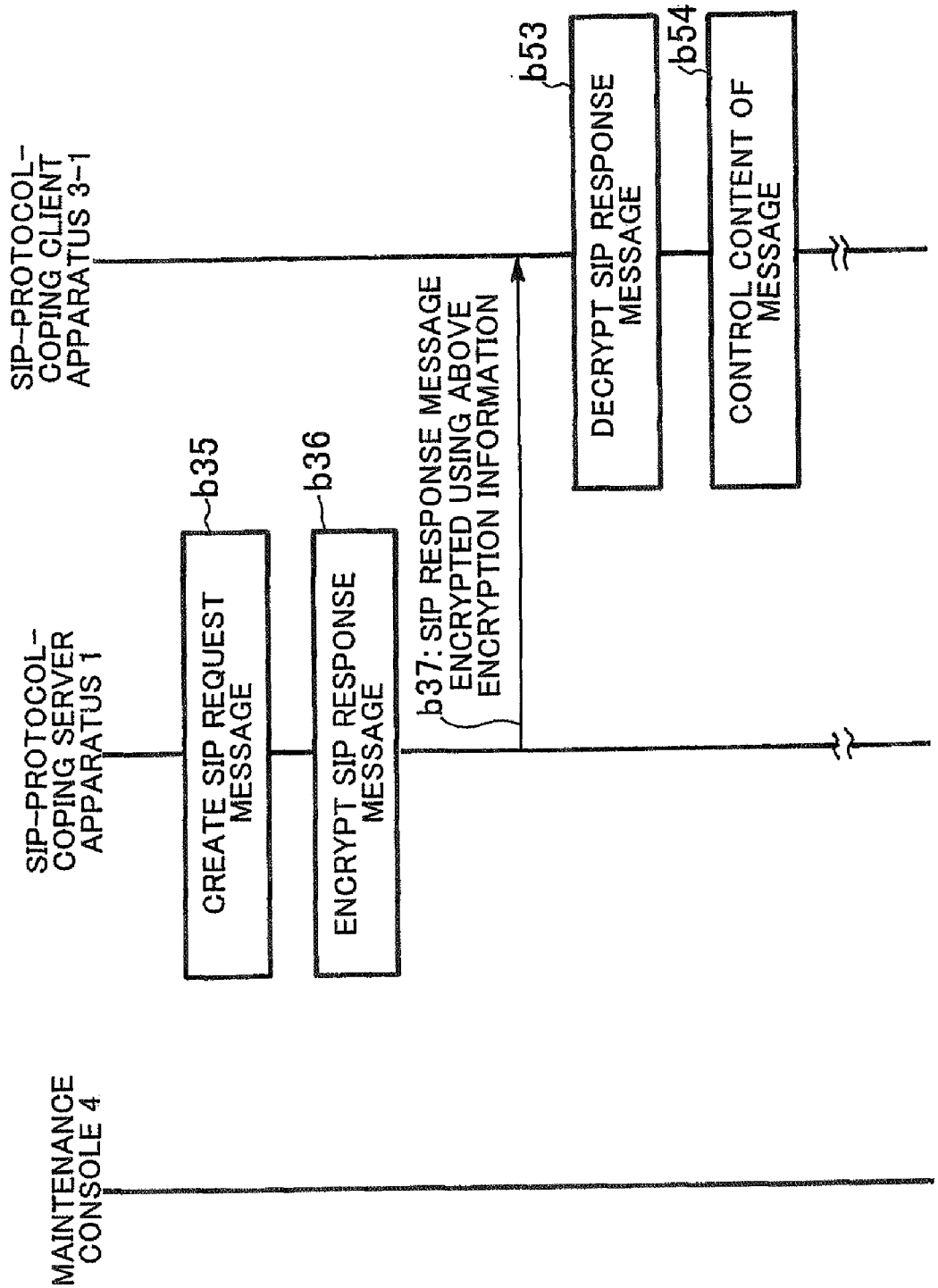
FIG. 7 is a sequence chart showing operation performed by the client server distributed system according to the second embodiment of the present invention.

FIGS. 5 to 7 are sequence charts showing operation performed by a client server distributed system according to a second embodiment of the present invention. The client server distributed system according to the second embodiment of the present invention is the same in configuration as the client server distributed system according to the first embodiment of the present invention show in FIG. 1. Therefore, the configuration will not be described herein. Referring to FIG. 1 and FIGS. 5 to 7, the operation performed by the client server distributed system according to the second embodiment of the present invention will be described. It is to be noted that processings performed by the server apparatus 1 and those performed by the client apparatus 3-1 shown in FIGS. 5 to 7 are realized by causing CPUs of the server apparatus 1 and the client apparatus 3-1 to execute programs, respectively.

When presence or absence of encryption as well as, if the SIP message is encrypted, an encryption rule, and an encryption range during transmission or reception of the SIP message between the server apparatus 1 and the client apparatus 3-1 is input to the server apparatus 1 from the maintenance console 4 connected to the server apparatus 1 via the LAN 100 in advance (at b11 shown in FIG. 5), the encryption information input interface unit 12 of the server apparatus 1 receives a setting request including the input information (at b21 in FIG. 5). If confirming normality of the setting request, the encryption information input interface unit 12 transmits the information to an encryption information setting unit 11. The encryption information setting unit 11 stores therein the information including an encryption key (hereinafter, items of information including the encryption key will be referred to as "encryption information") (at b21 in FIG. 5).

The encryption information setting unit 11 of the server apparatus 1 instructs the SIP message forming unit 14 to create an SIP request message including the encryption information (b22 in FIG. 5). The SIP message forming unit 14 creates the SIP request message based on the instruction, and transmits the created SIP request message to the SIP interface unit 33 of the client apparatus 3-1 via the SIP interface unit 13 (at b23 FIG. 5).

When the SIP interface unit 33 of the client apparatus 3-1 receives the SIP request message including the encryption information, the SIP interface unit 33 transmits the received SIP request message to the SIP message analyzing unit 35. If the SIP message analyzing unit 35 can confirm the normality of the encryption information, the SIP message analyzing unit 35 transmits the encryption information to the encryption information setting unit 31. The encryption information setting unit 31 stores therein the encryption information, and sets the encryption information to the SIP message encryption/decryption unit 36 (at b41 in FIG. 5). After completing setting, the encryption information setting unit 31 instructs the SIP message forming unit 34 to create an SIP response message for notification of completion of the setting of the encryption information (at b42 in FIG. 5). The SIP message forming unit 34 creates the SIP response message, and transmits the created SIP response message to the SIP interface unit 13 of the server apparatus 1 via the SIP interface unit 33 (at b43 in FIG. 5).

Upon receiving the SIP response message for notification of the completion of the setting of the encryption information, the SIP interface unit 13 of the server apparatus 1 transmits the received SIP response message to the SIP message analyzing unit 15. The SIP message analyzing unit 15 transmits the notification of the completion of the setting of the encryption information on the client apparatus 3-1 side to the encryption information setting unit 11. The encryption information setting unit 11 acknowledges the completion of the setting of the encryption information and sets the encryption information to the SIP message encryption/decryption unit 16 (at b24 in FIG. 5). After completion of the setting, the server apparatus 1 transmits a notification of the completion of the setting to the maintenance console 4 via the encryption information input interface unit 12 (at b25 in FIG. 5). The maintenance console 4 displays the completion of the setting of the encryption information (at b13 in FIG. 5).

In FIGS. 5 to 7, operation after the completion of the setting of the encryption information to each of the server apparatus 1 and the client apparatus 3-1, i.e., processing operations at b26 to b29 in FIG. 5, b30 to b34 and b44 to b52 in FIG. 6, and b35 to b37, b53, and b54 in FIG. 7 are the same as those according to the first embodiment of the present invention shown in FIGS. 2 to 4. Therefore, they will not be described herein.

Therefore, according to the second embodiment, the server apparatus 1 can make settings using both the local maintenance console 2 connected to the server apparatus 1 by a serial cable or the like via the encryption information input interface unit 12 and the maintenance console 4 connected to the server apparatus 1 via the LAN interface. It is therefore possible to ensure facilitating maintenance. While operations performed by client apparatuses 3-2 and 3-3 are not described herein, the same advantages as those when using the client apparatus 3-1 can be exhibited.

Third Embodiment

Figure 8:
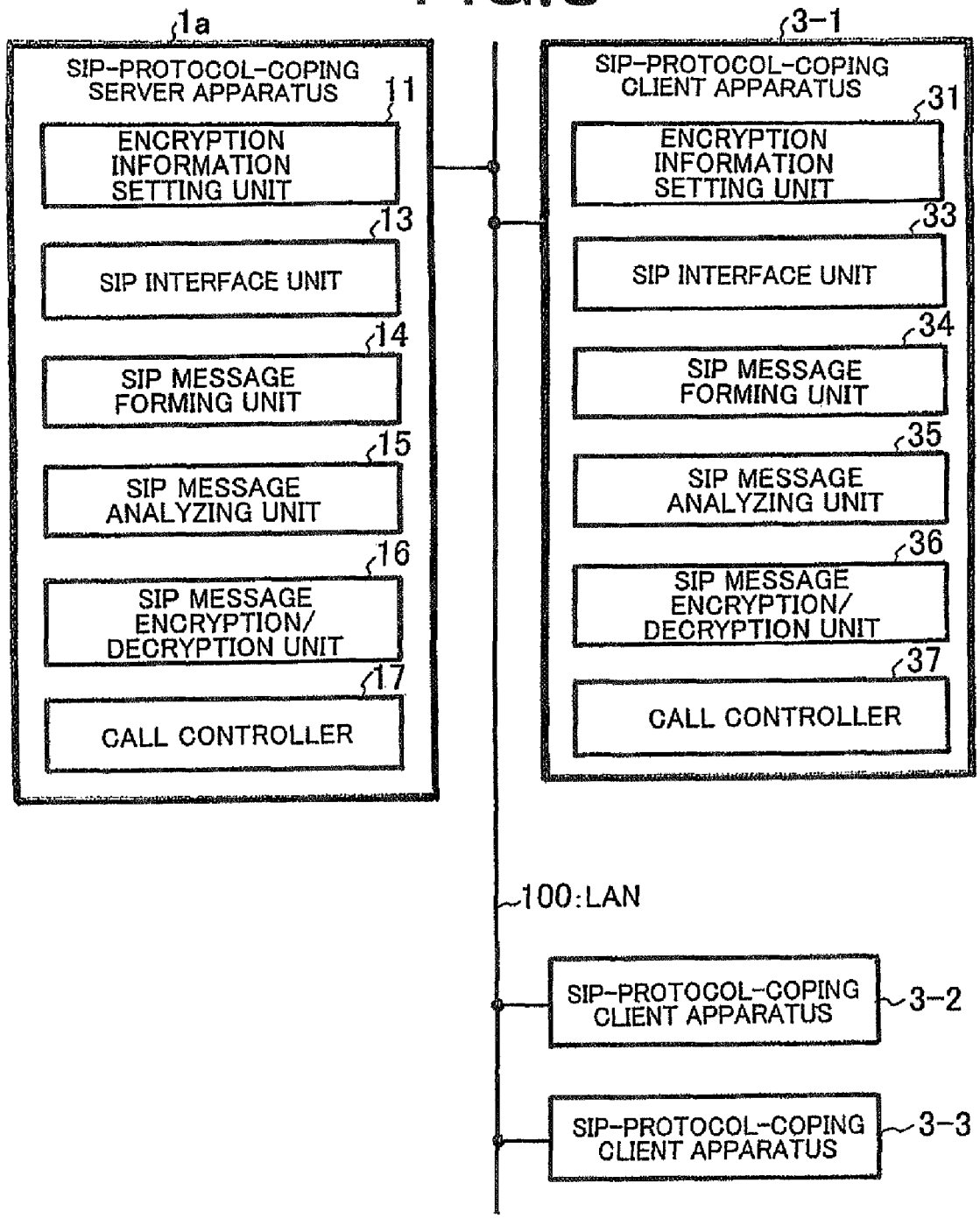
FIG. 8 is a block diagram showing a configuration of a client server distributed system according to a third embodiment of the present invention.

FIG. 8 is a block diagram showing a configuration of a client server distributed system according to a third embodiment of the present invention. In FIG. 8, the client server distributed system according to the third embodiment of the present invention is the same in configuration as the client server distributed system according to the first embodiment of the present invention shown in FIG. 1 except that a server apparatus 1a does not include the encryption information input interface unit 12, the local maintenance console 2 is not connected to the server apparatus 1a, and the maintenance console 4 is not connected to the LAN 100. In FIG. 8, the same constituent elements are denoted by the same reference symbols as those shown in FIG. 1.

It is assumed in the client server distributed system according to the third embodiment of the present invention that encryption information is already set to the SIP message encryption/decryption unit 16 of the server apparatus 1a, and that encryption information is already set to the SIP message encryption/decryption unit 36 of the client apparatus 3-1.

By configuring the client server distributed system as stated above, it is possible to encrypt an arbitrary range of an SIP message and to strengthen the security for SIP message control on the IP network during the communication between the server apparatus 1a and the client apparatus 3-1.

Figure 9:
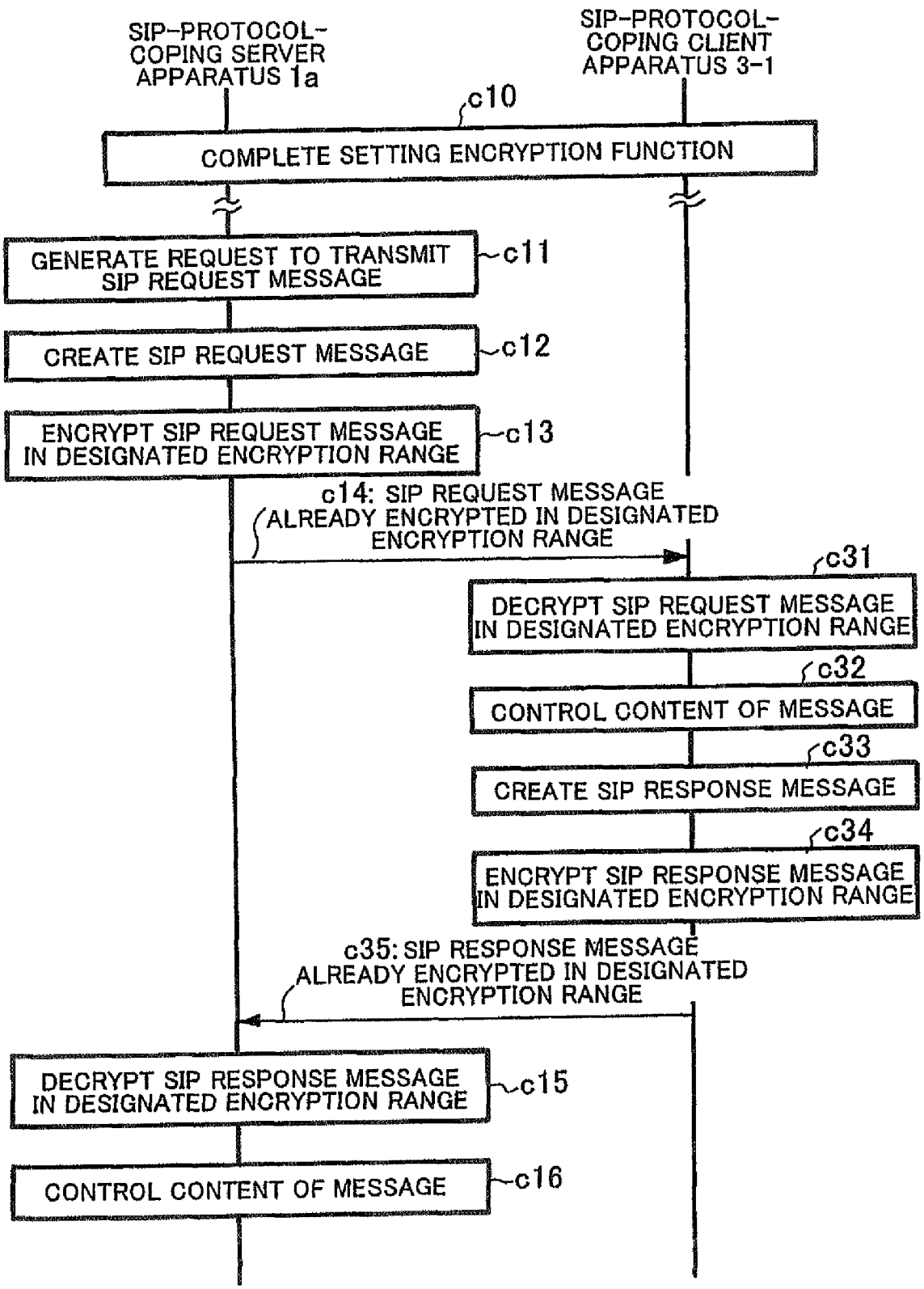
FIG. 9 is a sequence chart showing operation performed by the client server distributed system according to the third embodiment of the present invention.
Figure 10:
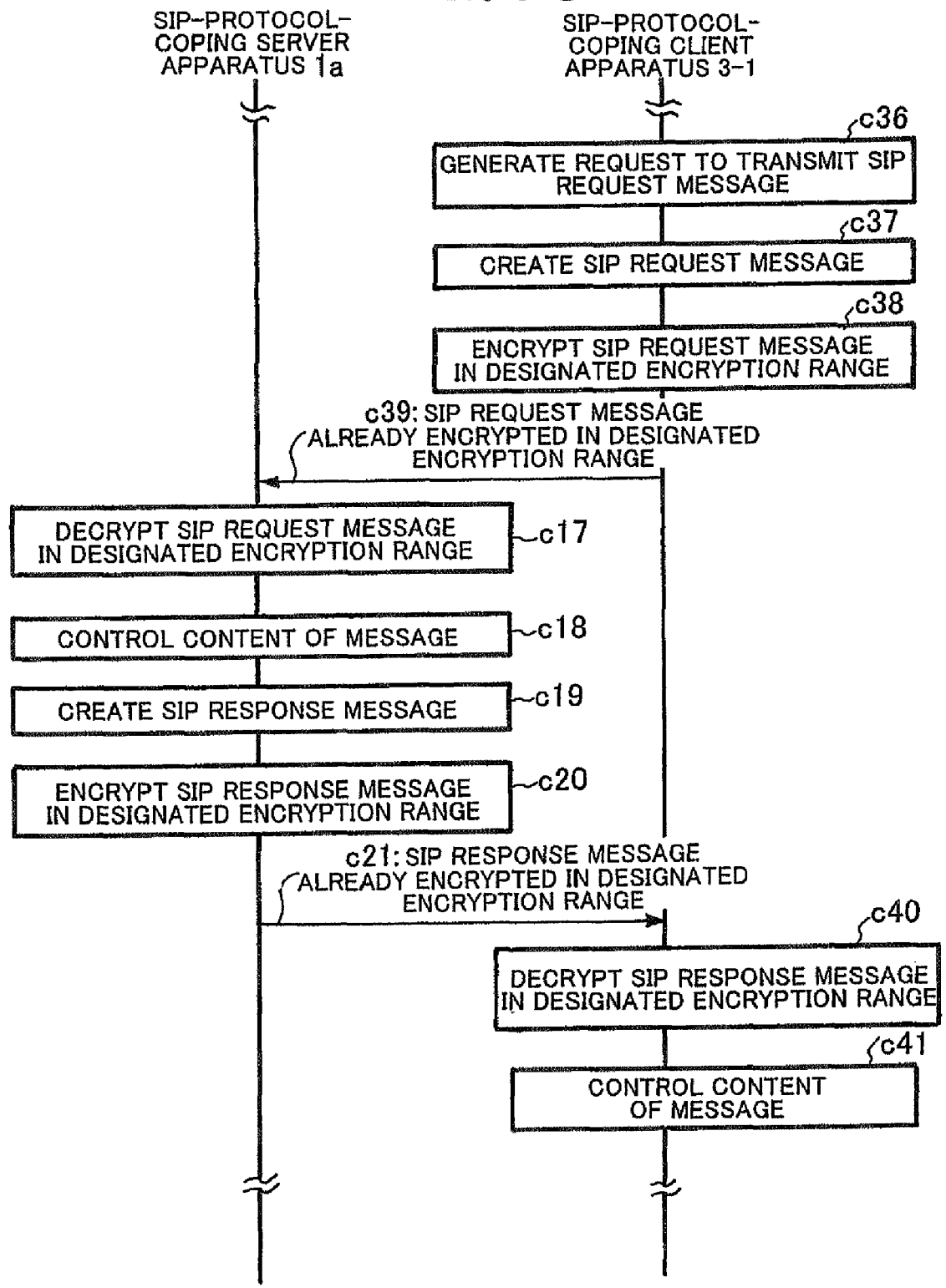
FIG. 10 is a sequence chart showing operation performed by the client server distributed system according to the third embodiment of the present invention.

FIGS. 9 and 10 are sequence charts showing operation performed by the client server distributed system according to the third embodiment of the present invention. Referring to FIGS. 8 to 10, the operation performed by the client server distributed system according to the third embodiment of the present invention will be described. It is to be noted that processings performed by the server apparatus 1a and those performed by the client apparatus 3-1 shown in FIGS. 9 and 10 are realized by causing CPUs of the server apparatus 1a and the client apparatus 3-1 to execute programs, respectively.

While the encryption information is set to each of the SIP message encryption/decryption unit 16 of the server apparatus 1a and the SIP message encryption/decryption unit 36 of the client apparatus 3-1 (at c10 in FIG. 9), if a request to transmit an SIP request message to the client apparatus 3-1 is generated in the server apparatus 1a (at c11 in FIG. 9), then the SIP message forming unit 14 creates the SIP request message, and the SIP message encryption/decryption unit 16 encrypts the created SIP request message using the encryption information according to designation of the encryption range (at c12 and c13 in FIG. 9). The server apparatus 1a transmits the encrypted SIP request message to the SIP interface unit 33 of the client apparatus 3-1 via the SIP interface unit 13 (at c14 in FIG. 9).

If the SIP interface unit 33 receives the SIP request message the set range of which is encrypted from the server apparatus 1a, the SIP interface unit 33 transfers the received SIP message to the SIP message encryption/decryption unit 36. The SIP message encryption/decryption unit 36 decrypts the SIP request message using the currently set encryption information according to the designation of the encryption range (at c31 in FIG. 9).

The SIP message analyzing unit 35 analyzes the decrypted SIP request message, and the call controller 37 executes a call control according to a content of the message (at c32 in FIG. 9). According to a result of the call control, the call controller 37 instructs the SIP message forming unit 34 to create an SIP response message (at c33 in FIG. 9). The SIP message forming unit 34 creates the SIP response message, and the SIP message encryption/decryption unit 36 encrypts the SIP response message created by the SIP message forming unit 34 using the currently set encryption information according to the designation of the encryption range (at c34 in FIG. 9). The client apparatus 3-1 transmits the encrypted SIP response message to the SIP interface unit 13 of the server apparatus 1a via the SIP interface unit 33 (at c35 in FIG. 9).

Upon receiving the encrypted SIP response message, the SIP interface unit 13 of the server apparatus 1a transmits the received SIP response message to the SIP message encryption/decryption unit 16. The SIP message encryption/decryption unit 16 decrypts the SIP response message using the currently set encryption information according to the designation of the encryption range (at c15 in FIG. 9), the SIP message analyzing unit 15 analyzes the decrypted SIP response message, and the call controller 17 executes a call control according to a content of the message (at c16 in FIG. 9).

Conversely, if a request to transmit an SIP request message to the server apparatus 1a is generated in the client apparatus 3-1 (at c36 in FIG. 10), then the SIP message forming unit 34 creates the SIP request message, and the SIP message encryption/decryption unit 36 encrypts the created SIP request message using the encryption information according to the designation of the encryption range (at c37 and c38 in FIG. 10). The client apparatus 3-1 transmits the encrypted SIP request message to the SIP interface unit 13 of the server apparatus 1a via the SIP interface unit 33 (at c39 in FIG. 10).

If the SIP interface unit 13 receives the encrypted SIP request message from the client apparatus 3-1, the SIP interface unit 13 transfers the received SIP message to the SIP message encryption/decryption unit 16. The SIP message encryption/decryption unit 16 decrypts the SIP request message using the currently set encryption information according to the designation of the encryption range (at c17 in FIG. 10).

The SIP message analyzing unit 15 analyzes the decrypted SIP request message, and the call controller 17 executes a call control according to a content of the message (c18 in FIG. 10). According to a result of the call control, the call controller 17 instructs the SIP message forming unit 14 to create an SIP response message (at c19 in FIG. 10). The SIP message forming unit 14 creates the SIP response message, and the SIP message encryption/decryption unit 16 encrypts the SIP response message created by the SIP message forming unit 14 using the currently set encryption information according to the designation of the encryption range (at c20 in FIG. 10).

The server apparatus 1a transmits the encrypted SIP response message to the SIP interface unit 33 of the client apparatus 3-1 via the SIP interface unit 13 (at c21 in FIG. 10).

Upon receiving the encrypted SIP response message, the SIP interface unit 33 of the client apparatus 3-1 transmits the received SIP response message to the SIP message encryption/decryption unit 36. The SIP message encryption/decryption unit 36 decrypts the SIP response message using the currently set encryption information according to the designation of the encryption range. The SIP message analyzing unit 35 analyzes the decrypted SIP response message (at c40 in FIG. 10), and the call controller 37 executes a call control according to a content of the message (at c41 in FIG. 10).

In the third embodiment, the SIP message is encrypted in the arbitrary range by the above-stated operation during the communication between the server apparatus 1a and the client apparatus 3-1. It is therefore possible to strengthen the security for the SIP message control on the IP network. An example of the encryption range to be set will be described.

Figure 11:
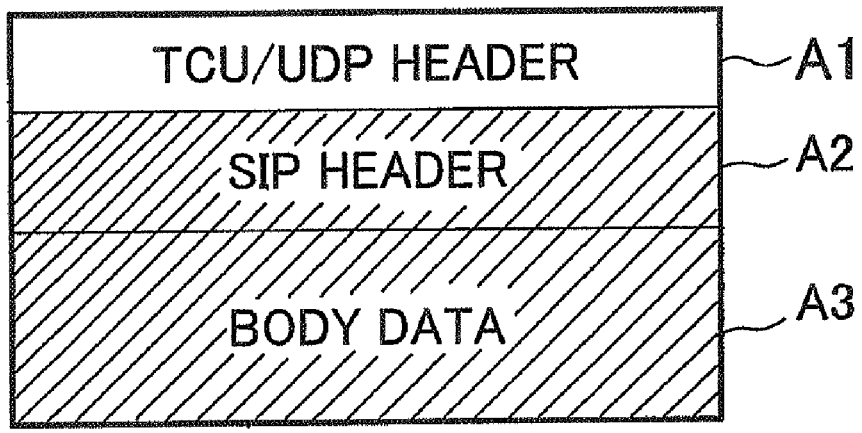
FIG. 11 is a diagram showing an example of an encryption range according to the third embodiment of the present invention.
Figure 12:
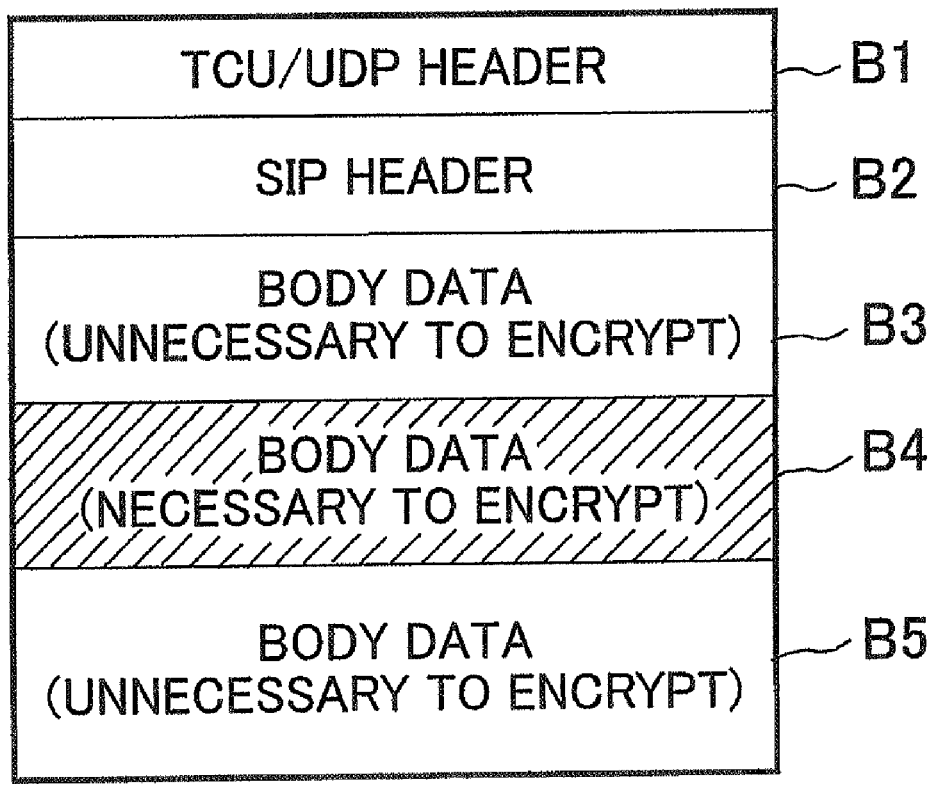
FIG. 12 is a diagram showing an example of an encryption range according to the third embodiment of the present invention.

FIGS. 11 and 12 show examples of the encryption range according to the third embodiment of the present invention. FIG. 11 shows an example of the encryption range if the entire SIP message is encrypted. In FIG. 11, a shaded part denotes an encrypted data range. In the example of the encryption range shown in FIG. 11, an SIP header A2 and SDP (Session Description Protocol) data A3 of the SIP message are all encrypted. Therefore, it is possible to strengthen security against wire tapping or data manipulation at the time of carrying the SIP message on the IP network.

FIG. 12 shows an example of the encryption range if an arbitrary part of the SIP message is encrypted. In FIG. 12, a shaded part denotes an encrypted data range. In the example of the encryption range shown in FIG. 12, only an arbitrary range (only SDP data B4) of the SIP message is encrypted. Therefore, it is possible to make such settings as to enable operation via a network apparatus such as the SIP-NAT without encrypting an SIP header B2 and SDP data B3 and B5 depending on a selection state of the encryption range. It is also possible to transmit or receive the SIP message after encrypting an important data part required to be encrypted. It is therefore possible to strengthen not only encryption security but also network function.

As stated above, according to the third embodiment, if the entire SIP message including the SIP header and the SDP data is to be encrypted, strong encryption security against the wire tapping or data manipulation during the communication on the IP network can be realized. If an arbitrary part of the SIP message is to be encrypted, it is possible to make such settings as to enable operation via the network apparatus such as the SIP-NAT without encrypting the SIP header and the SDP data depending on the selection state of the encryption range. It is also possible to transmit or receive the SIP message after encrypting an important data part required to be encrypted. It is therefore possible to strengthen not only encryption security but also network function.

Furthermore, the advantages deriving from the SIP message encryption function according to the third embodiment are similar to those according to the first and second embodiments of the present invention. While operations performed by the client apparatuses 3-2 and 3-3 are not described herein, the same advantages as those when using the client apparatus 3-1 can be exhibited.

Fourth Embodiment

Figure 13:
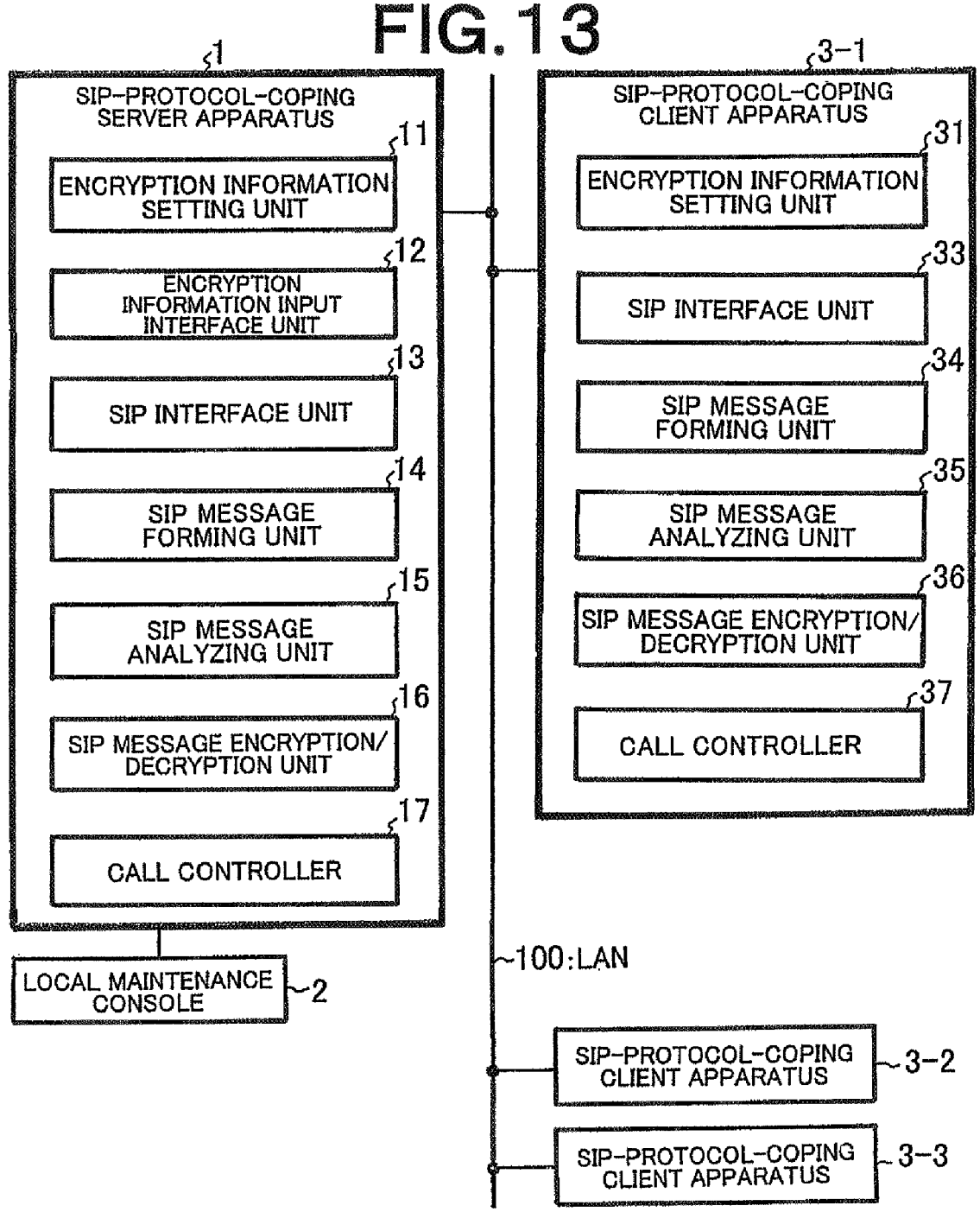
FIG. 13 is a block diagram showing a configuration of a client server distributed system according to a fourth embodiment of the present invention.

FIG. 13 is a block diagram showing a configuration of a client server distributed system according to a fourth embodiment of the present invention. In FIG. 13, the client server distributed system according to the fourth embodiment of the present invention is the same in configuration to the client server distributed system according to the first embodiment of the present invention shown in FIG. 1 except that the maintenance console 4 is not connected to the LAN 100. In FIG. 13, the same constituent elements are denoted by the same reference symbols as those shown in FIG. 1.

By configuring the client server distributed system as stated above, it is possible to encrypt an SIP message and to strengthen the security for SIP message control on the IP network during the communication between the server apparatus 1 and the client apparatus 3-1.

Figure 14:
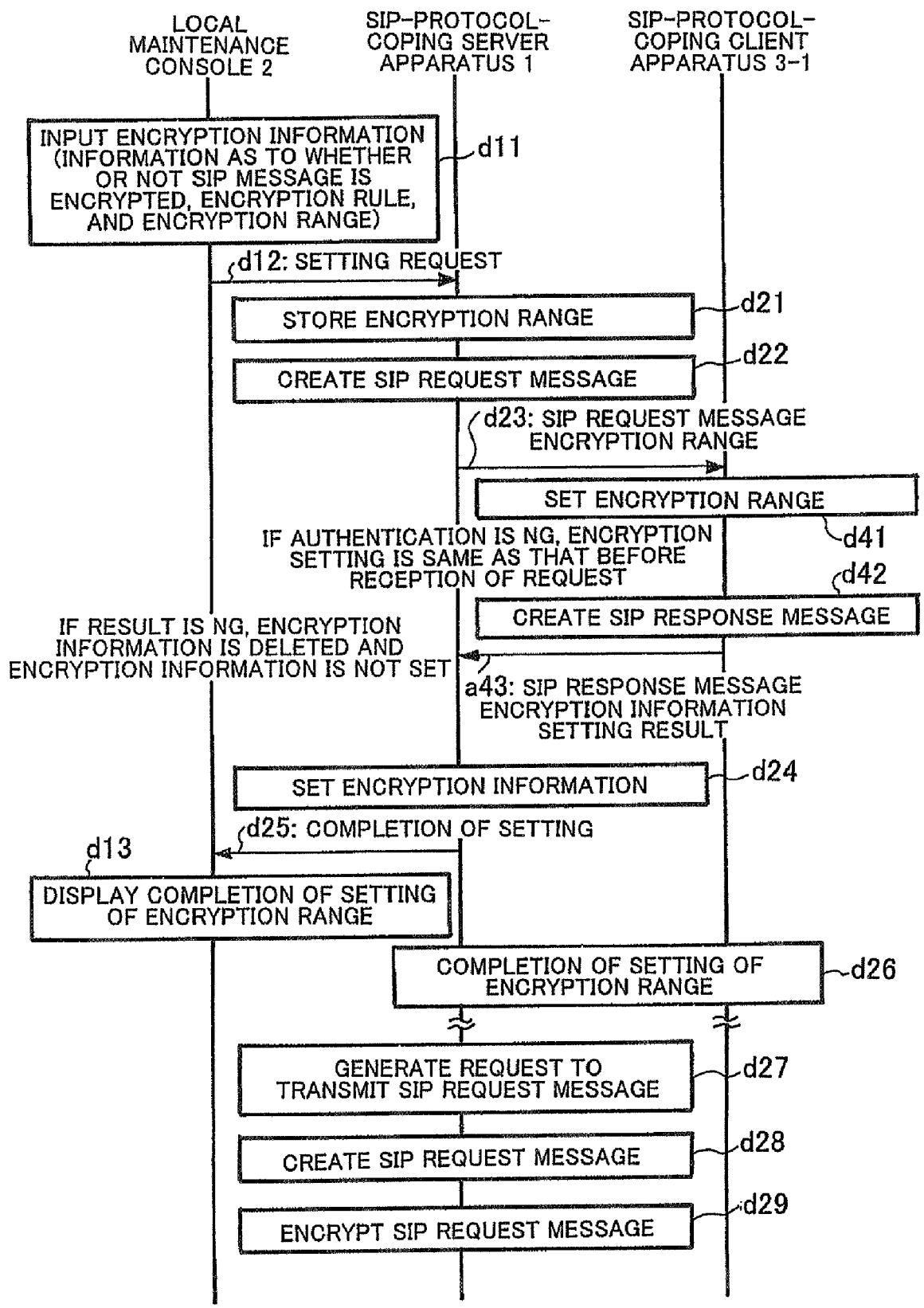
FIG. 14 is a sequence chart showing operation performed by the client server distributed system according to the fourth embodiment of the present invention.
Figure 15:
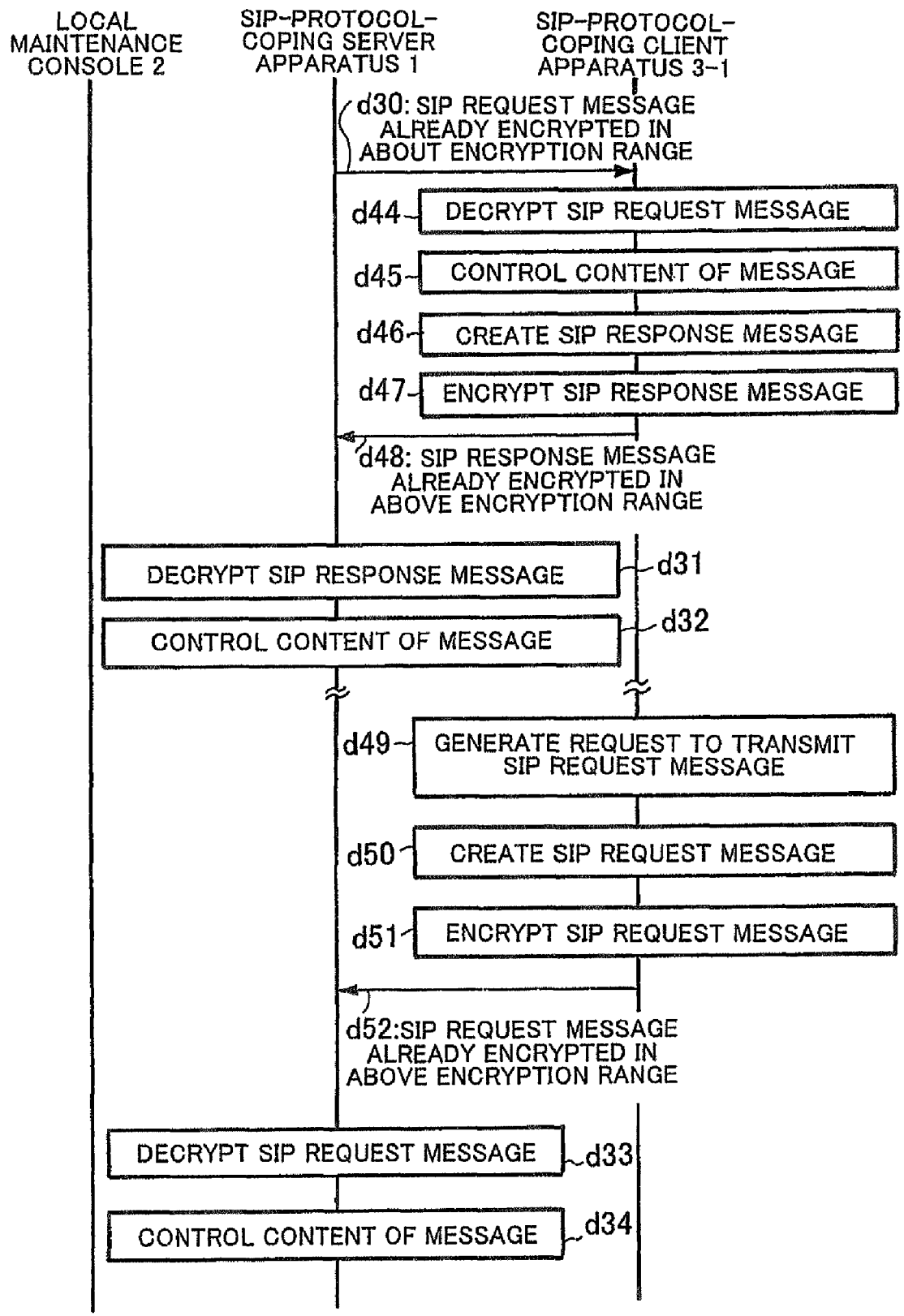
FIG. 15 is a sequence chart showing operation performed by the client server distributed system according to the fourth embodiment of the present invention.
Figure 16:
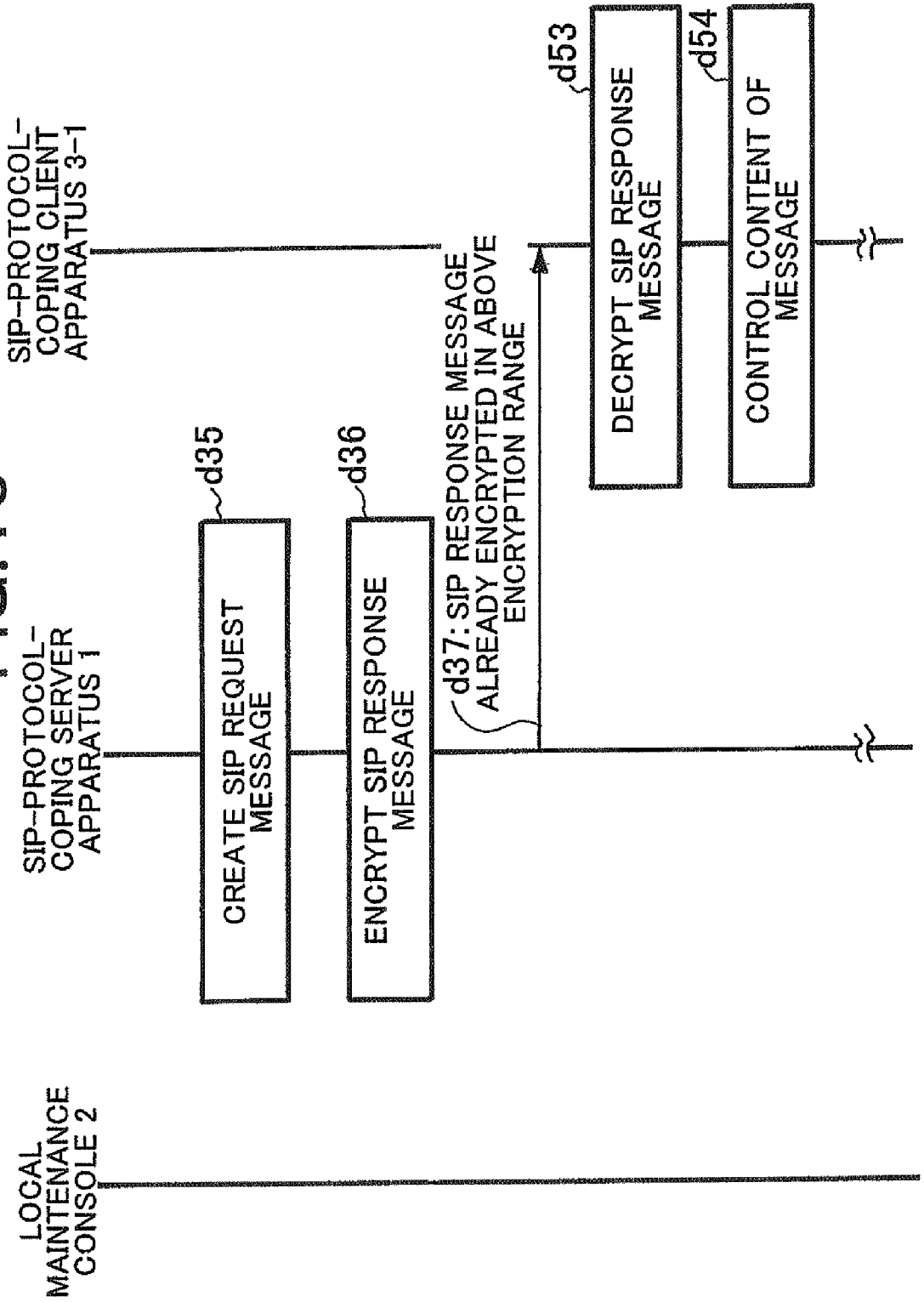
FIG. 16 is a sequence chart showing operation performed by the client server distributed system according to the fourth embodiment of the present invention.

FIGS. 14 to 16 are sequence charts showing operation performed by the client server distributed system according to the fourth embodiment of the present invention. Referring to FIGS. 13 to 16, the operation performed by the client server distributed system according to the fourth embodiment of the present invention will be described. It is to be noted that processings performed by the server apparatus 1 and those performed by the client apparatus 3-1 shown in FIGS. 14 to 16 are realized by causing CPUs of the server apparatus 1 and the client apparatus 3-1 to execute programs, respectively.

When information on an encryption range of an SIP message during transmission or reception of the SIP message between the server apparatus 1 and the client apparatus 3-1 is input to the server apparatus 1 from the local maintenance console 2 connected to the server apparatus 1 in advance (at d11 in FIG. 14), the encryption information input interface unit 12 of the server apparatus 1 receives a setting request including the input encryption range (at d12 in FIG. 14). If confirming normality of the setting request, the encryption information input interface unit 12 transmits the information on the encryption range to the encryption information setting unit 11. The encryption information setting unit 11 stores therein the information on the encryption range (at d21 in FIG. 14).

The encryption information setting unit 11 of the server apparatus 1 instructs the SIP message forming unit 14 to create an SIP request message including the encryption range (at d22 in FIG. 14). The SIP message forming unit 14 creates the SIP request message, and transmits the created SIP request message to the SIP interface unit 33 of the client apparatus 3-1 via the SIP interface unit 13 (at d23 FIG. 14).

The SIP interface unit 33 of the client apparatus 3-1 receives the SIP request message including the encryption range, and transmits the received SIP request message to the SIP message analyzing unit 35. If the SIP message analyzing unit 35 can confirm the normality of the encryption information, the SIP message analyzing unit 35 transmits the information on the encryption range to the encryption information setting unit 31. The encryption information setting unit 31 stores therein the information on the encryption range, and sets the encryption range to the SIP message encryption/decryption unit 36 (at d41 in FIG. 14). After completing setting, the encryption information setting unit 31 instructs the SIP message forming unit 34 to create an SIP response message for notification of completion of the setting of the encryption range (at d42 in FIG. 14). The SIP message forming unit 34 creates the SIP response message, and transmits the created SIP response message to the SIP interface unit 13 of the server apparatus 1 via the SIP interface unit 33 (at d43 in FIG. 14).

Upon receiving the SIP response message for notification of the completion of the setting of the encryption range, the SIP interface unit 13 of the server apparatus 1 transmits the received SIP response message to the SIP message analyzing unit 15. The SIP message analyzing unit 15 transmits the notification of the completion of the setting of the encryption range on the client apparatus 3-1 side to the encryption information setting unit 11. The encryption information setting unit 11 acknowledges the completion of the setting of the encryption range and sets the encryption range to the SIP message encryption/decryption unit 16 (at d24 in FIG. 14). After completion of the setting, the server apparatus 1 transmits a notification of the completion of the setting to the local maintenance console 2 via the encryption information input interface unit 12 (at d25 in FIG. 14). The local maintenance console 2 displays the completion of the setting of the encryption range (at d13 in FIG. 14).

After the encryption information is set to the SIP message encryption/decryption unit 16, if a request to transmit an SIP request message to the client apparatus 3-1 is generated in the server apparatus 1 (at d27 in FIG. 14), the SIP message forming unit 14 creates the SIP request message and transmits the created SIP request message to the SIP message encryption/decryption unit 16. The SIP message encryption/decryption unit 16 encrypts the SIP request message in the encryption range according to the currently set encryption range (at d28 and d29 in FIG. 14). The server apparatus 1 transmits the encrypted SIP request message to the SIP interface unit 33 of the client apparatus 3-1 via the SIP interface unit 13 (at d30 in FIG. 15).

After the encryption range is set to the SIP message encryption/decryption unit 36, if the SIP interface unit 33 receives the encrypted SIP request message from the server apparatus 1, the SIP interface unit 33 transfers the received SIP message to the SIP message encryption/decryption unit 36. The SIP message encryption/decryption unit 36 decrypts the SIP request message in the encryption range according to the current setting of the encryption range (at d44 in FIG. 15).

The SIP message analyzing unit 35 analyzes the decrypted SIP request message, and the call controller 37 executes a call control according to a content of the message (d45 in FIG. 15). According to a result of the call control, the call controller 37 instructs the SIP message forming unit 34 to create an SIP response message (at d46 in FIG. 15). The SIP message forming unit 34 creates the SIP response message, and the SIP message encryption/decryption unit 36 encrypts the created SIP response message in the encryption range according to the current setting of the encryption range (at d47 in FIG. 15). The client apparatus 3-1 transmits the encrypted SIP response message to the SIP interface unit 13 of the server apparatus 1 via the SIP interface unit 33 (at d48 in FIG. 15).

Upon receiving the encrypted SIP response message, the SIP interface unit 13 of the server apparatus 1 transmits the received SIP response message to the SIP message encryption/decryption unit 16. The SIP message encryption/decryption unit 16 decrypts the SIP response message in the encryption range according to the current setting of the encryption range (at d31 in FIG. 15), the SIP message analyzing unit 15 analyzes the decrypted SIP response message, and the call controller 17 executes a call control according to a content of the message (at d32 in FIG. 15).

Conversely, if a request to transmit an SIP request message to the server apparatus 1 is generated in the client apparatus 3-1 (at d49 in FIG. 15), then the SIP message forming unit 34 creates the SIP request message, and the SIP message encryption/decryption unit 36 encrypts the created SIP request message in the encryption range according to the current setting of the encryption range (at d50 and d51 in FIG. 15). The client apparatus 3-1 transmits the encrypted SIP request message to the SIP interface unit 13 of the server apparatus 1 via the SIP interface unit 33 (at d52 in FIG. 15).

If the SIP interface unit 13 receives the encrypted SIP request message from the client apparatus 3-1, the SIP interface unit 13 transfers the received SIP request message to the SIP message encryption/decryption unit 16. The SIP message encryption/decryption unit 16 decrypts the SIP request message in the encryption range according to the current setting of the encryption range (at d33 in FIG. 15).

The SIP message analyzing unit 15 analyzes the decrypted SIP request message, and the call controller 17 executes a call control according to a content of the message (at d34 in FIG. 15). According to a result of the call control, the call controller 17 instructs the SIP message forming unit 14 to create an SIP response message (at d35 in FIG. 16). The SIP message forming unit 14 creates the SIP response message, and the SIP message encryption/decryption unit 16 encrypts the created SIP response message in the encryption range according to the current setting of the encryption range (at d36 in FIG. 16). The server apparatus 1 transmits the encrypted SIP response message to the SIP interface unit 33 of the client apparatus 3-1 via the SIP interface unit 13 (at d37 in FIG. 16).

Upon receiving the encrypted SIP response message, the SIP interface unit 33 of the client apparatus 3-1 transmits the received SIP response message to the SIP message encryption/decryption unit 36. The SIP message encryption/decryption unit 36 decrypts the SIP response message in the encryption range according to the current setting of the encryption range (at d53 in FIG. 16). The SIP message analyzing unit 35 analyzes the decrypted SIP response message, and the call controller 37 executes a call control according to a content of the message (at d54 in FIG. 16).

In this manner, according to the fourth embodiment, in the system supporting both encryption of the SIP message in the entire encryption range and encryption of the SIP message in an arbitrary range, the local maintenance console 2 can arbitrarily select the encryption range. It is therefore possible to satisfy both strong encryption security and high network functionality in the system in which the network apparatus such as the SIP-NAT is present, and to select and realize an optimum security level for the current network configuration.

Moreover, according to the fourth embodiment, the server apparatus 1 sets the encryption information to the client apparatus 3-1 to 3-3, thereby making it possible to realize system integrity and realize facilitating management by maintenance personnel. Further, the advantages deriving from the SIP message encryption function using the set encryption range information according to the fourth embodiment are similar to those according to the first to third embodiments of the present invention. While operations performed by the client apparatuses 3-2 and 3-3 are not described herein, the same advantages as those when using the client apparatus 3-1 can be exhibited.

Fifth Embodiment

Figure 17:
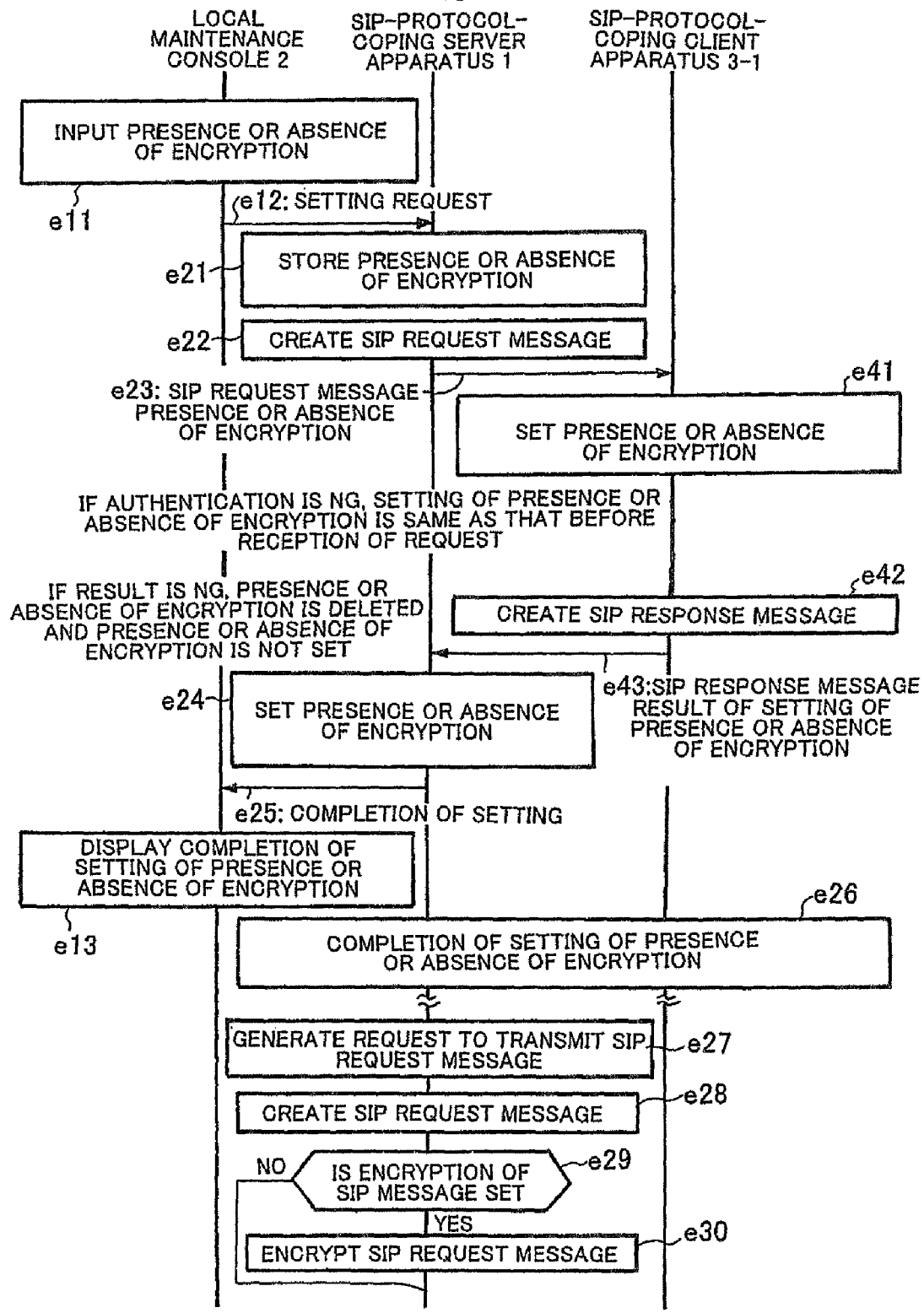
FIG. 17 is a sequence chart showing operation performed by a client server distributed system according to a fifth embodiment of the present invention.
Figure 18:
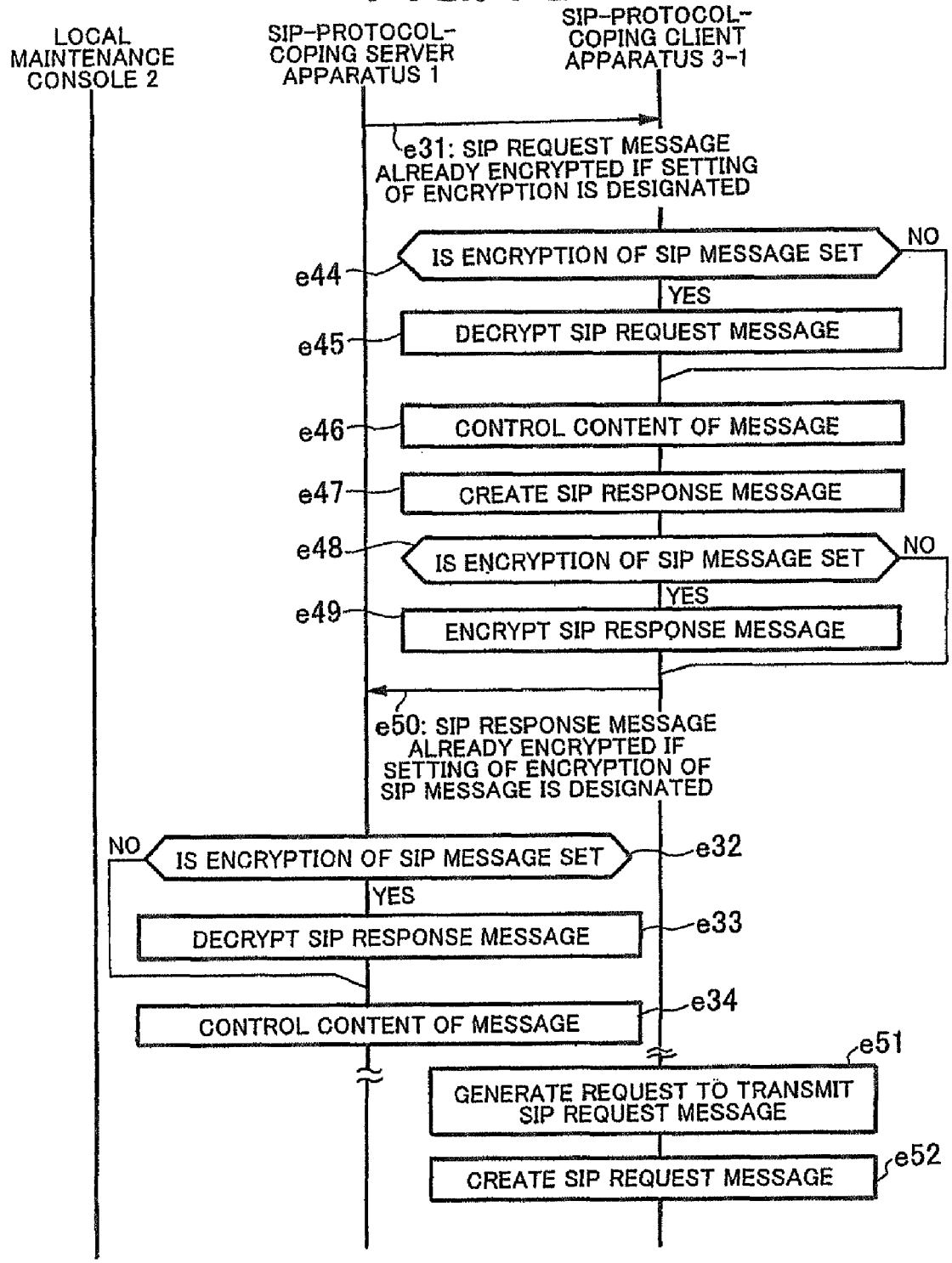
FIG. 18 is a sequence chart showing operation performed by the client server distributed system according to the fifth embodiment of the present invention.
Figure 19:
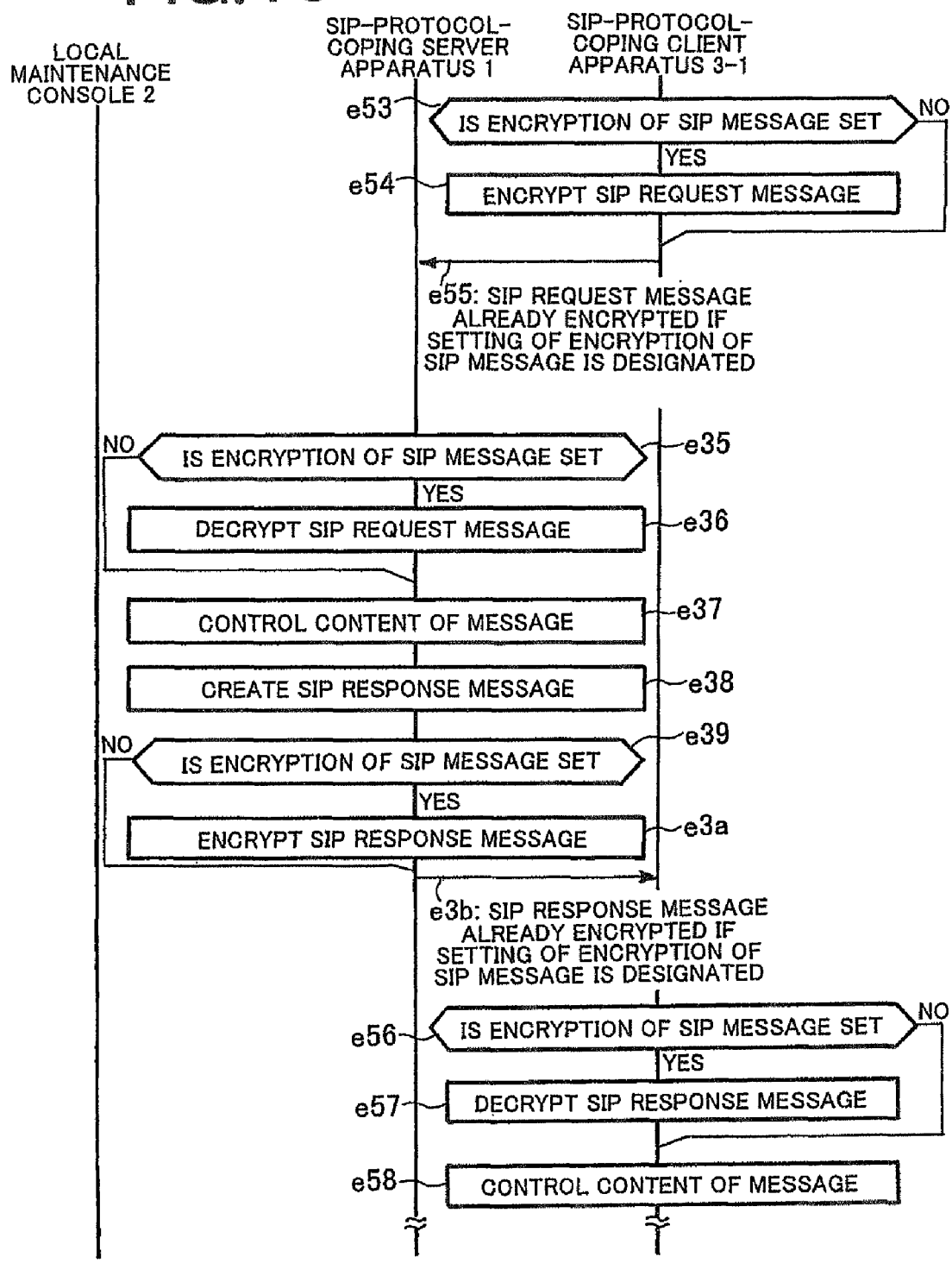
FIG. 19 is a sequence chart showing operation performed by the client server distributed system according to the fifth embodiment of the present invention.

FIGS. 17 to 19 are sequence charts showing operation performed by a client server distributed system according to a fifth embodiment of the present invention. The client server distributed system according to the fifth embodiment of the present invention is the same in configuration as the client server distributed system according to the fourth embodiment of the present invention show in FIG. 13. Therefore, the configuration will not be described herein. Referring to FIG. 13 and FIGS. 17 to 19, the operation performed by the client server distributed system according to the fifth embodiment of the present invention will be described. It is to be noted that processings performed by the server apparatus 1 and those performed by the client apparatus 3-1 shown in FIGS. 17 to 19 are realized by causing CPUs of the server apparatus 1 and the client apparatus 3-1 to execute programs, respectively.

When presence or absence of encryption during transmission or reception of the SIP message between the server apparatus 1 and the client apparatus 3-1 is input to the server apparatus 1 from the local maintenance console 2 connected to the server apparatus 1 in advance (at e11 shown in FIG. 17), the encryption information input interface unit 12 of the server apparatus 1 receives a setting request including the input information as to whether the SIP message is encrypted (at e12 in FIG. 17). If confirming normality of the setting request, the encryption information input interface unit 12 transmits the information to the encryption information setting unit 11. The encryption information setting unit 11 stores therein the information as to whether the SIP message is encrypted (at e21 in FIG. 17).

The encryption information setting unit 11 of the server apparatus 1 instructs the SIP message forming unit 14 to create an SIP request message including the information as to whether or not the SIP message is encrypted (e22 in FIG. 17). The SIP message forming unit 14 creates the SIP request message, and transmits the created SIP request message to the SIP interface unit 33 of the client apparatus 3-1 via the SIP interface unit 13 (at e23 in FIG. 17).

When the SIP interface unit 33 of the client apparatus 3-1 receives the SIP request message including the information as to whether or not the SIP message is encrypted, the SIP interface unit 33 transmits the received SIP request message to the SIP message analyzing unit 35. If the SIP message analyzing unit 35 can confirm the normality of the information as to whether or not the SIP message is encrypted, the SIP message analyzing unit 35 transmits the information as to whether or not the SIP message is encrypted, to the encryption information setting unit 31. The encryption information setting unit 31 stores therein the information as to whether or not the SIP message is encrypted, and sets the information as to whether or not the SIP message is encrypted, to the SIP message encryption/decryption unit 36 (at e41 in FIG. 17). After completing setting, the encryption information setting unit 31 instructs the SIP message forming unit 34 to create an SIP response message for notification of completion of the setting of the information as to whether or not the SIP message is encrypted, (at e42 in FIG. 17). The SIP message forming unit 34 creates the SIP response message, and transmits the created SIP response message to the SIP interface unit 13 of the server apparatus 1 via the SIP interface unit 33 (at e43 in FIG. 17).

Upon receiving the SIP response message for notification of the completion of the setting of the information as to whether or not the SIP message is encrypted, the SIP interface unit 13 of the server apparatus 1 transmits the received SIP response message to the SIP message analyzing unit 15. The SIP message analyzing unit 15 transmits the notification of the completion of the setting of the information as to whether or not the SIP message is encrypted on the client apparatus 3-1 side to the encryption information setting unit 11. The encryption information setting unit 11 acknowledges the completion of the setting of the information as to whether or not the SIP message is encrypted, and sets the information as to whether or not the SIP message is encrypted to the SIP message encryption/decryption unit 16 (at e24 in FIG. 17). After completion of the setting, the server apparatus 1 transmits a notification of the completion of the setting to the local maintenance console 2 via the encryption information input interface unit 12 (at e25 in FIG. 17). The local maintenance console 2 displays the completion of the setting of the information as to whether or not the SIP message is encrypted, (at e13 in FIG. 17).

After presence or absence of the encryption is set to the SIP message encryption/decryption unit 16, if a request to transmit an SIP request message to the client apparatus 3-1 is generated in the server apparatus 1 (at e27 in FIG. 17), the SIP message forming unit 14 creates the SIP request message and transmits the created SIP request message to the SIP message encryption/decryption unit 16 (at e28 in FIG. 17). According to the current setting of the information as to whether or not the SIP message is encrypted, if encryption of the SIP message is set (at e29 in FIG. 17), the SIP message encryption/decryption unit 16 encrypts the created SIP request message (at e30 in FIG. 17). The server apparatus 1 transmits the encrypted SIP request message to the SIP interface unit 33 of the client apparatus 3-1 via the SIP interface unit 13 (at e31 in FIG. 18).

After the information as to whether or not the SIP message is encrypted is set to the SIP message encryption/decryption unit 36, if the SIP interface unit 33 receives the encrypted SIP request message from the server apparatus 1, the SIP interface unit 33 transfers the received SIP request message to the SIP message encryption/decryption unit 36. According to the current setting of the information as to whether or not the SIP message is encrypted, if encryption of the SIP message is set (at e44 in FIG. 18), the SIP message encryption/decryption unit 36 decrypts the SIP request message (at e45 in FIG. 18).

The SIP message analyzing unit 35 analyzes the decrypted SIP request message, and the call controller 37 executes a call control according to a content of the message (at e46 in FIG. 18). According to a result of the call control, the call controller 37 instructs the SIP message forming unit 34 to create an SIP response message (at e47 in FIG. 18). The SIP message forming unit 34 creates the SIP response message and transmits the created SIP response message to the SIP message encryption/decryption unit 36. According to the current setting of the information as to whether or not the SIP message is encrypted, if encryption of the SIP message is set (at e48 in FIG. 18), the SIP message encryption/decryption unit 36 encrypts the SIP response message (at e49 in FIG. 18). The client apparatus 3-1 transmits the encrypted SIP response message to the SIP interface unit 13 of the server apparatus 1 via the SIP interface unit 33 (at e50 in FIG. 18).

Upon receiving the encrypted SIP response message, the SIP interface unit 13 of the server apparatus 1 transmits the received SIP response message to the SIP message encryption/decryption unit 16. According to the current setting of the information as to whether or not the SIP message is encrypted, if encryption of the SIP message is set (at e32 in FIG. 18), the SIP message encryption/decryption unit 16 decrypts the SIP response message (at e33 in FIG. 18). The SIP message analyzing unit 15 analyzes the decrypted SIP response message, and the call controller 17 executes a call control according to a content of the message (at e34 in FIG. 18).

Conversely, if a request to transmit an SIP request message to the server apparatus 1 is generated in the client apparatus 3-1 (at e51 in FIG. 18), the SIP message forming unit 34 creates the SIP request message and transmits the created SIP request message to the SIP message encryption/decryption unit 36. According to the current setting of the information as to whether or not the SIP message is encrypted, if encryption of the SIP message is set (at e52 in FIG. 18 or at e53 in FIG. 19), the SIP message encryption/decryption unit 36 encrypts the SIP request message (at e54 in FIG. 19). The client apparatus 3-1 transmits the encrypted SIP request message to the SIP interface unit 13 of the server apparatus 1 via the SIP interface unit 33 (at e55 in FIG. 19).

If the SIP interface unit 13 receives the encrypted SIP request message from the client apparatus 3-1, the SIP interface unit 13 transfers the received SIP request message to the SIP message encryption/decryption unit 16. According to the current setting of the information as to whether or not the SIP message is encrypted, if encryption of the SIP message is set (at e35 in FIG. 19), the SIP message encryption/decryption unit 16 decrypts the SIP request message (at e36 in FIG. 19).

The SIP message analyzing unit 15 analyzes the decrypted SIP request message, and the call controller 17 executes a call control according to a content of the message (at e37 in FIG. 19). According to a result of the call control, the call controller 17 instructs the SIP message forming unit 14 to create an SIP response message (at e38 in FIG. 19). The SIP message forming unit 14 creates the SIP response message and transmits the created SIP response message to the SIP message encryption/decryption unit 16. According to the current setting of the information as to whether or not the SIP message is encrypted, if encryption of the SIP message is set (at e39 in FIG. 19), the SIP message encryption/decryption unit 16 encrypts the SIP response message (at e3a in FIG. 19). The server apparatus 1 transmits the encrypted SIP response message to the SIP interface unit 33 of the client apparatus 3-1 via the SIP interface unit 13 (at e3b in FIG. 19).

Upon receiving the encrypted SIP response message, the SIP interface unit 33 of the client apparatus 3-1 transmits the received SIP response message to the SIP message encryption/decryption unit 36. According to the current setting of the information as to whether or not the SIP message is encrypted, if encryption of the SIP message is set (at e56 in FIG. 19), the SIP message encryption/decryption unit 36 decrypts the SIP response message (at e57 in FIG. 19). The SIP message analyzing unit 35 analyzes the decrypted SIP response message, and the call controller 37 executes a call control according to a content of the message (at e58 in FIG. 19).

In this manner, according to the fifth embodiment, a maintenance person can arbitrarily set whether or not the SIP message is encrypted via the server apparatus 1. Due to this, if the maintenance person sets the encryption of the SIP message, then it is possible to realize an encryption security function on the network and to make different settings of encryption or non-encryption according to network configurations. If, for example, an SIP message log is recorded for maintenance operation, the setting of non-encryption of the SIP message can be easily made, thereby making it possible to facilitate management by the maintenance personnel.

Moreover, according to the fifth embodiment, the server apparatus 1 sets the encryption information to each of the client apparatuses 3-1 to 3-3, thereby making it possible to realize system integrity. Besides, according to the fifth embodiment, the function of selecting encryption or non-encryption of the SIP message enables ensuring compatibility with the client apparatus 3-1 that does not include the encryption function.

Further, the advantages deriving from the SIP message encryption function using the set the information as to whether or not the SIP message is encrypted according to the fifth embodiment are similar to those according to the first and second embodiments of the present invention. While operations performed by the client apparatuses 3-2 and 3-3 are not described herein, the same advantages as those when using the client apparatus 3-1 can be exhibited.

Sixth Embodiment

Figure 20:
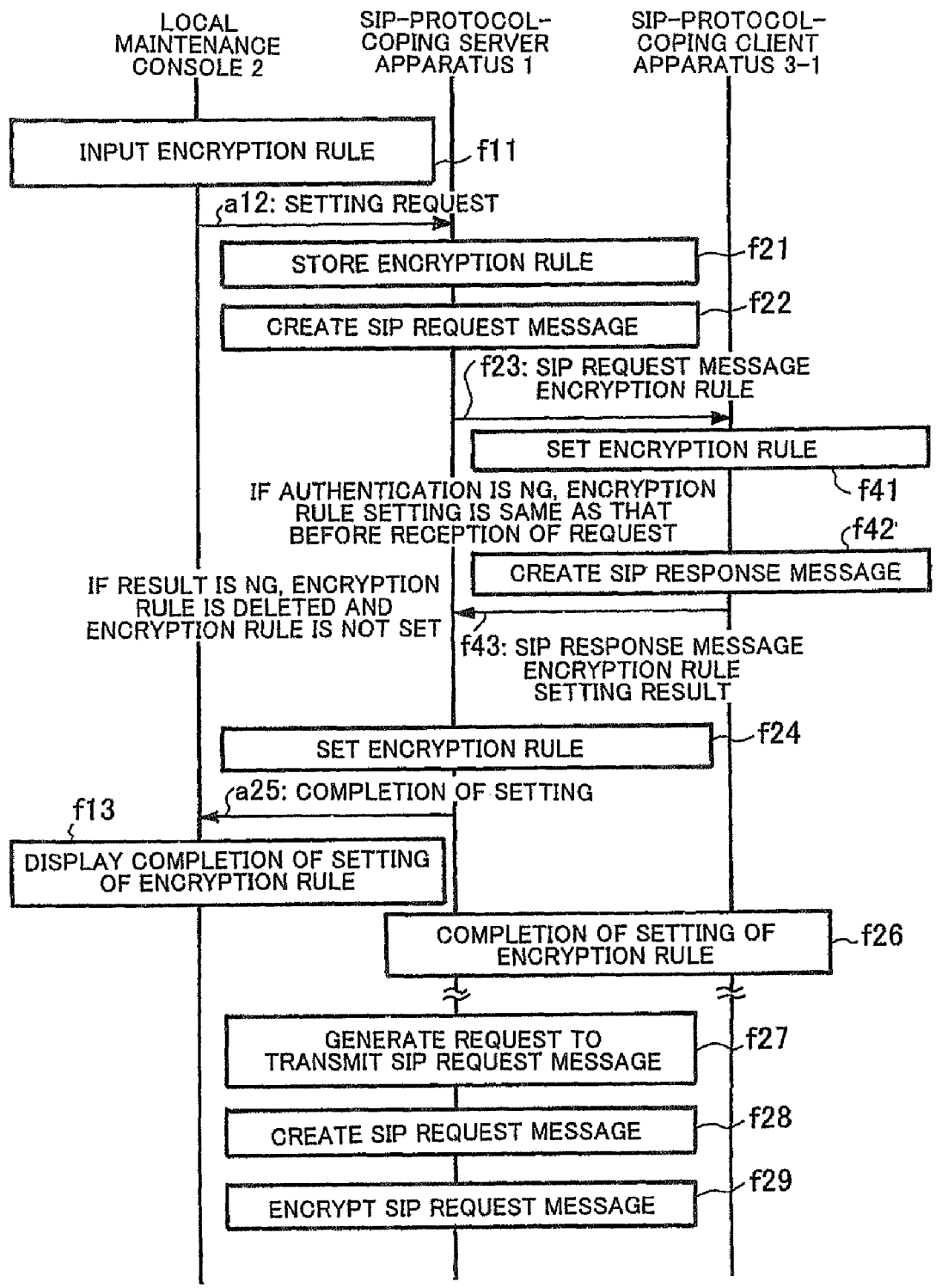
FIG. 20 is a sequence chart showing operation performed by a client server distributed system according to a sixth embodiment of the present invention.
Figure 21:
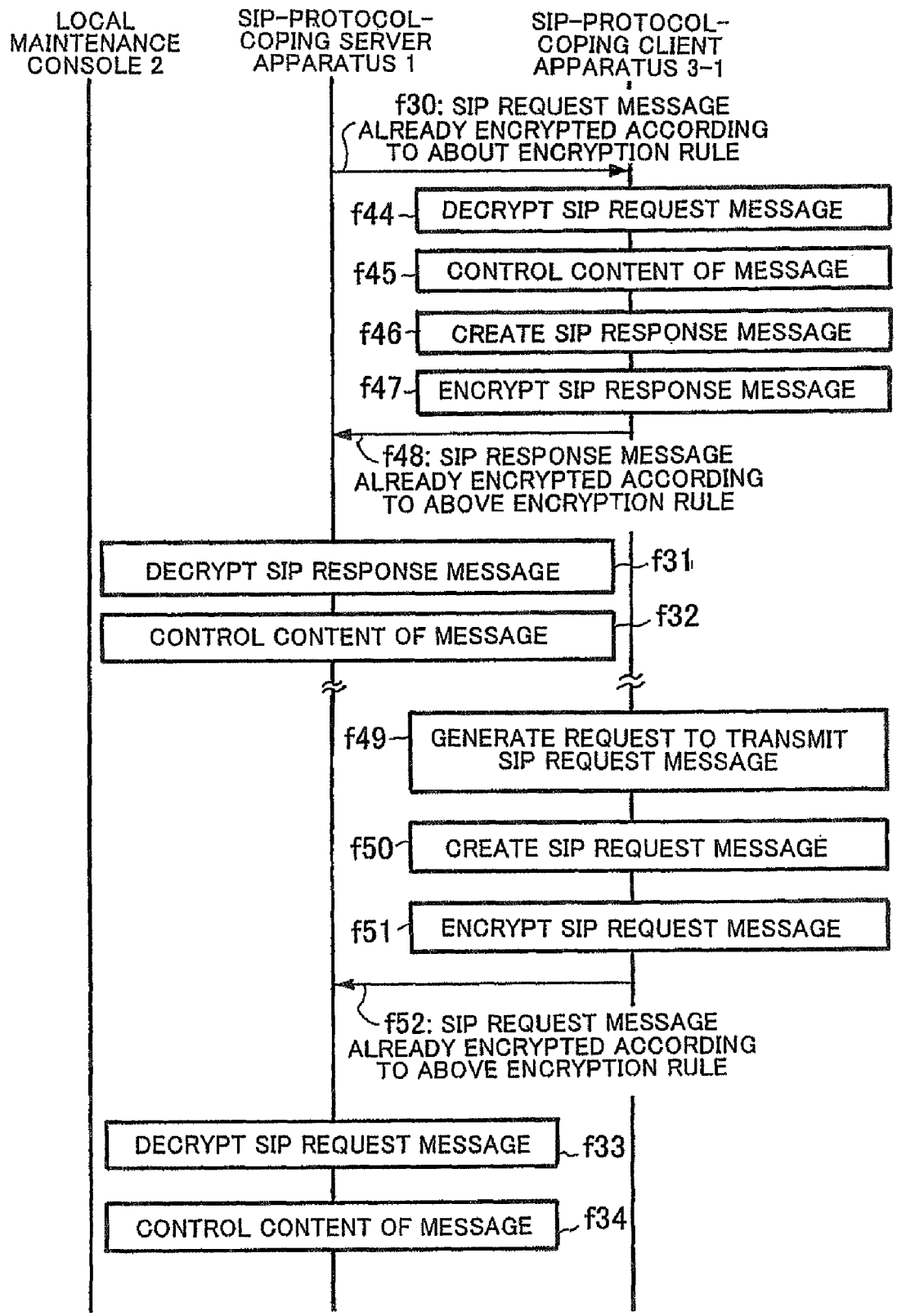
FIG. 21 is a sequence chart showing operation performed by the client server distributed system according to the sixth embodiment of the present invention.
Figure 22:
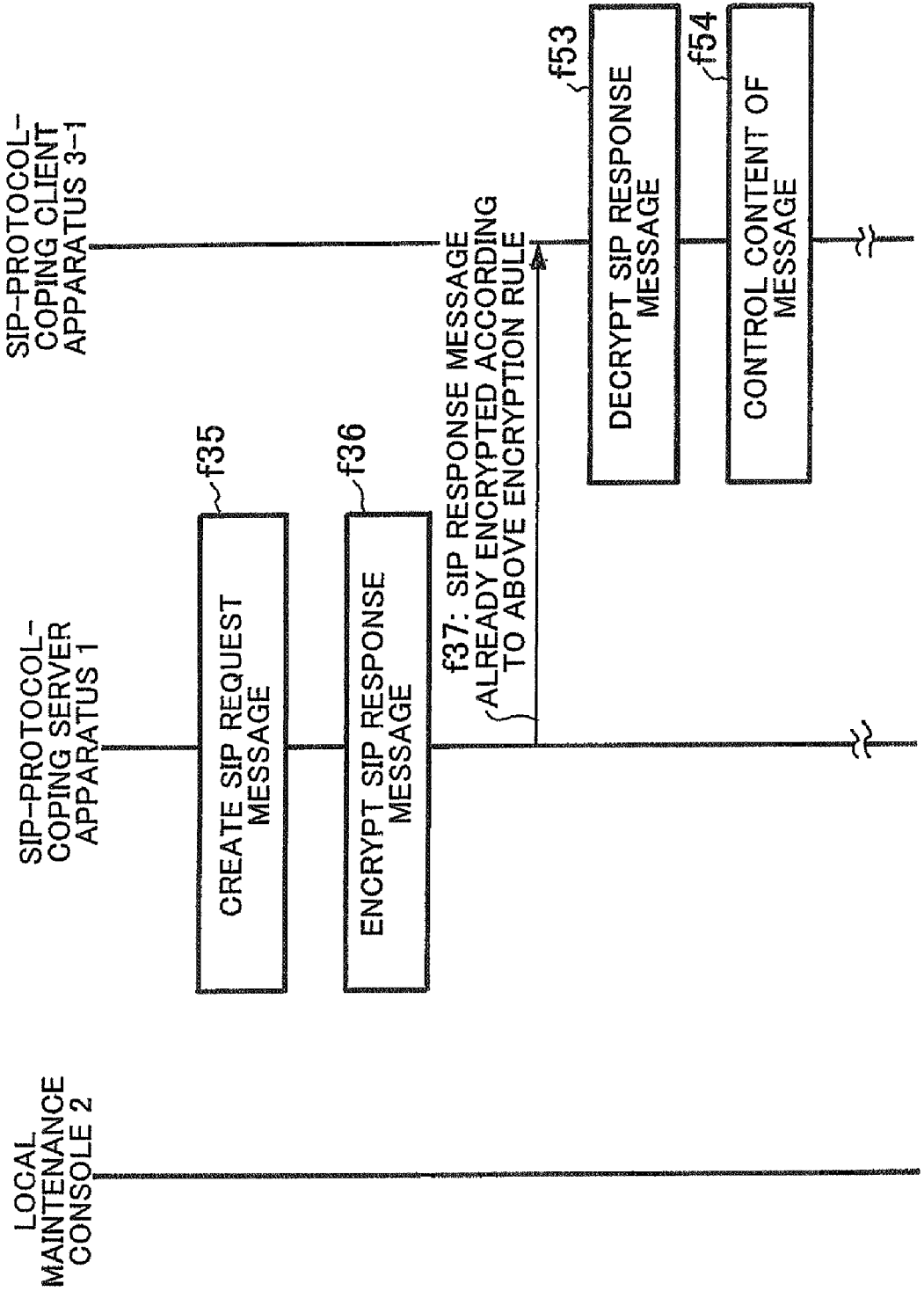
FIG. 22 is a sequence chart showing operation performed by the client server distributed system according to the sixth embodiment of the present invention.

FIGS. 20 to 22 are sequence charts showing operation performed by a client server distributed system according to a sixth embodiment of the present invention. The client server distributed system according to the sixth embodiment of the present invention is the same in configuration as the client server distributed system according to the fourth embodiment of the present invention show in FIG. 13. Therefore, the configuration will not be described herein. Referring to FIG. 13 and FIGS. 20 to 22, the operation performed by the client server distributed system according to the sixth embodiment of the present invention will be described. It is to be noted that processings performed by the server apparatus 1 and those performed by the client apparatus 3-1 shown in FIGS. 20 to 22 are realized by causing CPUs of the server apparatus 1 and the client apparatus 3-1 to execute programs, respectively.

When information on an encryption rule of an SIP message during transmission or reception of the SIP message between the server apparatus 1 and the client apparatus 3-1 is input to the server apparatus 1 from the local maintenance console 2 connected to the server apparatus 1 in advance (at f11 shown in FIG. 20), the encryption information input interface unit 12 of the server apparatus 1 receives a setting request including the input encryption rule (at f12 in FIG. 20). If confirming normality of the setting request, the encryption information input interface unit 12 transmits the encryption rule to the encryption information setting unit 11. The encryption information setting unit 11 stores therein the encryption rule (at f21 in FIG. 20).

The encryption information setting unit 11 of the server apparatus 1 instructs the SIP message forming unit 14 to create an SIP request message including the encryption rule (at f22 in FIG. 20). The SIP message forming unit 14 creates the SIP request message, and transmits the created SIP request message to the SIP interface unit 33 of the client apparatus 3-1 via the SIP interface unit 13 (at f23 in FIG. 20).

When the SIP interface unit 33 of the client apparatus 3-1 receives the SIP request message including the encryption rule, the SIP interface unit 33 transmits the received SIP request message to the SIP message analyzing unit 35. If the SIP message analyzing unit 35 can confirm the normality of the encryption rule, the SIP message analyzing unit 35 transmits the encryption rule to the encryption information setting unit 31. The encryption information setting unit 31 stores therein the encryption rule, and sets the encryption rule to the SIP message encryption/decryption unit 36 (at f41 in FIG. 20). After completing setting, the encryption information setting unit 31 instructs the SIP message forming unit 34 to create an SIP response message for notification of completion of the setting of the encryption rule (at f42 in FIG. 20). The SIP message forming unit 34 creates the SIP response message, and transmits the created SIP response message to the SIP interface unit 13 of the server apparatus 1 via the SIP interface unit 33 (at f43 in FIG. 20).

Upon receiving the SIP response message for notification of the completion of the setting of the encryption rule, the SIP interface unit 13 of the server apparatus 1 transmits the received SIP response message to the SIP message analyzing unit 15. The SIP message analyzing unit 15 transmits the notification of the completion of the setting of the encryption rule on the client apparatus 3-1 side to the encryption information setting unit 11. The encryption information setting unit 11 acknowledges the completion of the setting of the encryption rule and sets the encryption rule to the SIP message encryption/decryption unit 16 (at f24 in FIG. 20). After completion of the setting, the server apparatus 1 transmits a notification of the completion of the setting to the local maintenance console 2 via the encryption information input interface unit 12 (at f25 in FIG. 20). The local maintenance console 2 displays the completion of the setting of the encryption rule (at f13 in FIG. 20).

After the encryption rule is set to the SIP message encryption/decryption unit 16, if a request to transmit an SIP request message to the client apparatus 3-1 is generated in the server apparatus 1 (at f27 in FIG. 20), the SIP message forming unit 14 creates the SIP request message and transmits the created SIP request message to the SIP message encryption/decryption unit 16. According to the current setting of the encryption rule, the SIP message encryption/decryption unit 16 encrypts the created SIP request message (at f28 and f29 in FIG. 20). The server apparatus 1 transmits the encrypted SIP request message to the SIP interface unit 33 of the client apparatus 3-1 via the SIP interface unit 13 (at f30 in FIG. 21).

After the encryption rule is set to the SIP message encryption/decryption unit 36, if the SIP interface unit 33 receives the encrypted SIP request message from the server apparatus 1, the SIP interface unit 33 transfers the received SIP message to the SIP message encryption/decryption unit 36. According to the current setting of the encryption rule, the SIP message encryption/decryption unit 36 decrypts the SIP request message (at f44 in FIG. 21).

The SIP message analyzing unit 35 analyzes the decrypted SIP request message, and the call controller 37 executes a call control according to a content of the message (at f45 in FIG. 21). According to a result of the call control, the call controller 37 instructs the SIP message forming unit 34 to create an SIP response message (at f46 in FIG. 21). The SIP message forming unit 34 creates the SIP response message and transmits the created SIP response message to the SIP message encryption/decryption unit 36. According to the current setting of the encryption rule, the SIP message encryption/decryption unit 36 encrypts the SIP response message (at f47 in FIG. 21). The client apparatus 3-1 transmits the encrypted SIP response message to the SIP interface unit 13 of the server apparatus 1 via the SIP interface unit 33 (at f48 in FIG. 21).

Upon receiving the encrypted SIP response message, the SIP interface unit 13 of the server apparatus 1 transmits the received SIP response message to the SIP message encryption/decryption unit 16. According to the current setting of the encryption rule, the SIP message encryption/decryption unit 16 decrypts the SIP response message (at f31 in FIG. 21). The SIP message analyzing unit 15 analyzes the decrypted SIP response message, and the call controller 17 executes a call control according to a content of the message (at f32 in FIG. 21).

Conversely, if a request to transmit an SIP request message to the server apparatus 1 is generated in the client apparatus 3-1 (at f49 in FIG. 21), the SIP message forming unit 34 creates the SIP request message and transmits the created SIP request message to the SIP message encryption/decryption unit 36. According to the current setting of the encryption rule, the SIP message encryption/decryption unit 36 encrypts the SIP request message (at f50 and f51 in FIG. 21). The client apparatus 3-1 transmits the encrypted SIP request message to the SIP interface unit 13 of the server apparatus 1 via the SIP interface unit 33 (at f52 in FIG. 21).

If the SIP interface unit 13 receives the encrypted SIP request message from the client apparatus 3-1, the SIP interface unit 13 transfers the received SIP request message to the SIP message encryption/decryption unit 16. According to the current setting of the encryption rule, the SIP message encryption/decryption unit 16 decrypts the SIP request message (at f33 in FIG. 21).

The SIP message analyzing unit 15 analyzes the decrypted SIP request message, and the call controller 17 executes a call control according to a content of the message (at f34 in FIG. 21). According to a result of the call control, the call controller 17 instructs the SIP message forming unit 14 to create an SIP response message (at f35 in FIG. 22). The SIP message forming unit 14 creates the SIP response message and transmits the created SIP response message to the SIP message encryption/decryption unit 16. According to the current setting of the encryption rule, the SIP message encryption/decryption unit 16 encrypts the SIP response message (at f36 in FIG. 22). The server apparatus 1 transmits the encrypted SIP response message to the SIP interface unit 33 of the client apparatus 3-1 via the SIP interface unit 13 (at f37 in FIG. 21).

Upon receiving the encrypted SIP response message, the SIP interface unit 33 of the SIP protocol-compliant client apparatus 3-1 transmits the received SIP response message to the SIP message encryption/decryption unit 36. According to the current setting of the encryption rule, the SIP message encryption/decryption unit 36 decrypts the SIP response message (at f53 in FIG. 22). The SIP message analyzing unit 35 analyzes the decrypted SIP response message, and the call controller 37 executes a call control according to a content of the message (at f54 in FIG. 22).

In this manner, according to the sixth embodiment, by encrypting the SIP message, it is possible to realize an encryption security function on the network, to make different settings of encryption rules among network configurations, and to strengthen encryption security. Further, according to the sixth embodiment, by allowing the server apparatus 1 to set the encryption rule to the client apparatus 3-1, system integrity can be realized.

Moreover, according to the sixth embodiment, a new encryption rule can be used without adding or developing an interface for selecting the encryption rule if the encryption rule operable in the system is to be added in the future. Therefore, it is possible to minimize change in the maintenance interface and to facilitate development. Further, the advantages deriving from the SIP message encryption function using the set the encryption rule information according to the sixth embodiment are similar to those according to the first and second embodiments of the present invention. While operations performed by the client apparatuses 3-2 and 3-3 are not described herein, the same advantages as those when using the client apparatus 3-1 can be exhibited.

Seventh Embodiment

Figure 23:
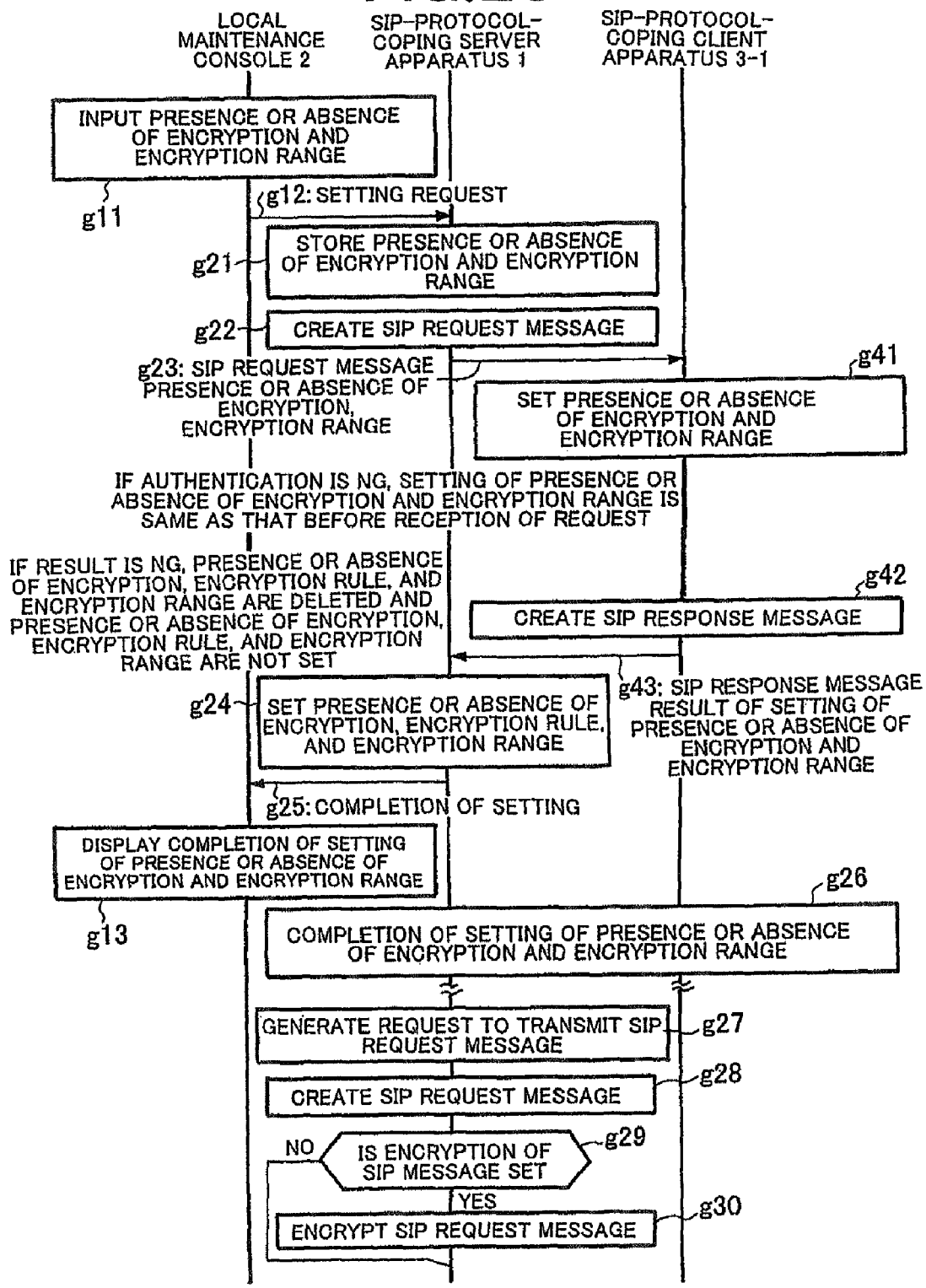
FIG. 23 is a sequence chart showing operation performed by a client server distributed system according to a seventh embodiment of the present invention.
Figure 24:
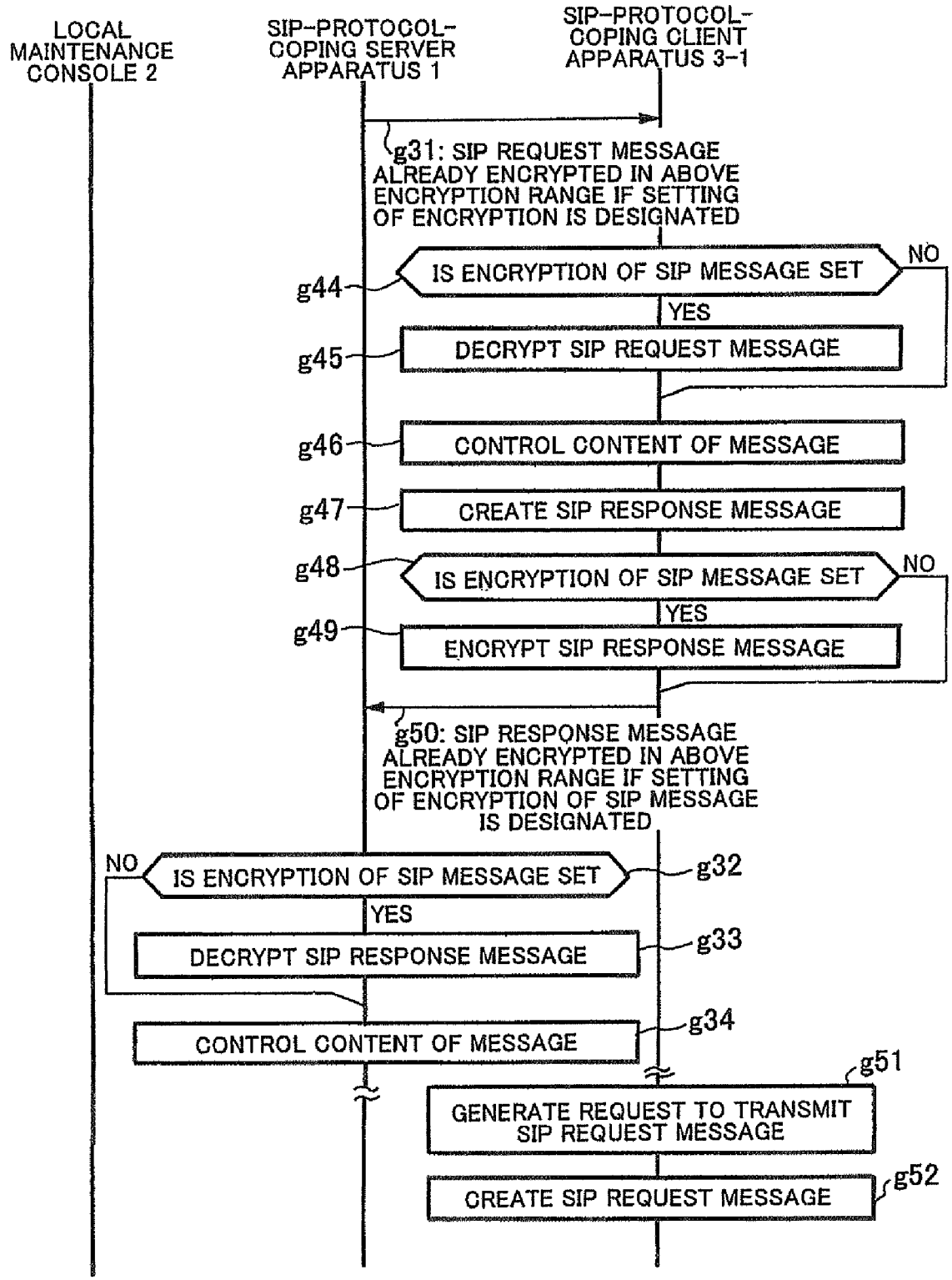
FIG. 24 is a sequence chart showing operation performed by the client server distributed system according to the seventh embodiment of the present invention.
Figure 25:
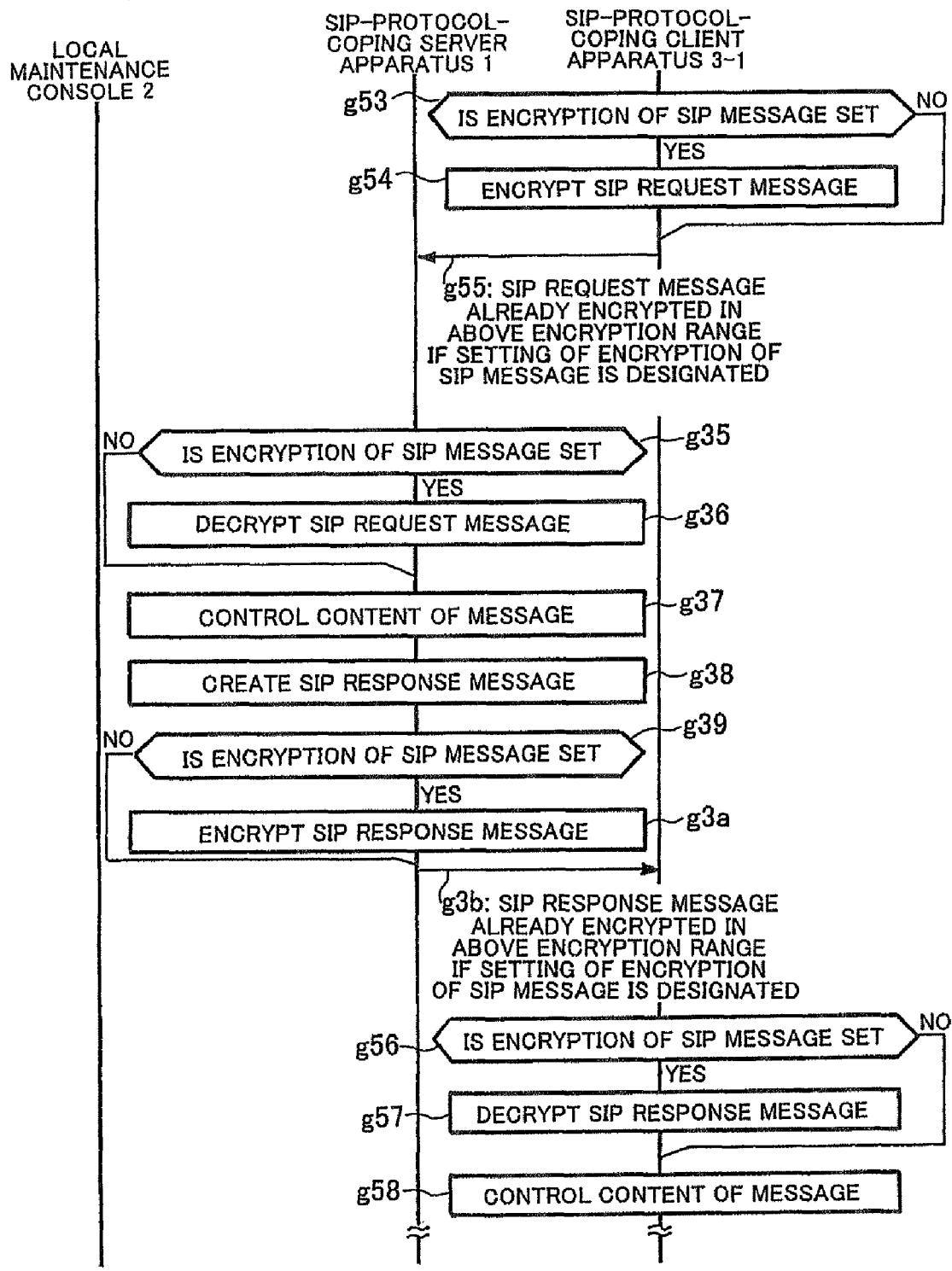
FIG. 25 is a sequence chart showing operation performed by the client server distributed system according to the seventh embodiment of the present invention.

FIGS. 23 to 25 are sequence charts showing operation performed by a client server distributed system according to a seventh embodiment of the present invention. The client server distributed system according to the seventh embodiment of the present invention is the same in configuration as the client server distributed system according to the fourth embodiment of the present invention show in FIG. 13. Therefore, the configuration will not be described herein. Referring to FIG. 13 and FIGS. 23 to 25, the operation performed by the client server distributed system according to the seventh embodiment of the present invention will be described. It is to be noted that processings performed by the server apparatus 1 and those performed by the client apparatus 3-1 shown in FIGS. 23 to 25 are realized by causing CPUs of the server apparatus 1 and the client apparatus 3-1 to execute programs, respectively.

When presence or absence of encryption and an encryption range of the SIP message during transmission or reception of the SIP message between the server apparatus 1 and the client apparatus 3-1 is input to the server apparatus 1 from the local maintenance console 2 connected to the server apparatus 1 in advance (at g11 in FIG. 23), the encryption information input interface unit 12 of the server apparatus 1 receives a setting request including the information as to whether the SIP message is encrypted and that on the encryption range (at g12 in FIG. 23). If confirming normality of the setting request, the encryption information input interface unit 12 transmits the information as to whether the SIP message is encrypted and that on the encryption range to the encryption information setting unit 11. The encryption information setting unit 11 stores therein the information as to whether the SIP message is encrypted and that on the encryption range (at g21 in FIG. 23).

The encryption information setting unit 11 of the server apparatus 1 instructs the SIP message forming unit 14 to create an SIP request message including the information as to whether the SIP message is encrypted and that on the encryption range (g22 in FIG. 23). The SIP message forming unit 14 creates the SIP request message, and transmits the created SIP request message to the SIP interface unit 33 of the client apparatus 3-1 via the SIP interface unit 13 (at g23 in FIG. 23).

When the SIP interface unit 33 of the client apparatus 3-1 receives the SIP request message including the information as to whether the SIP message is encrypted and that on the encryption range, the SIP interface unit 33 transmits the received SIP request message to the SIP message analyzing unit 35. If the SIP message analyzing unit 35 can confirm the normality of the information as to whether the SIP message is encrypted and that on the encryption range, the SIP message analyzing unit 35 transmits the information as to whether the SIP message is encrypted and that on the encryption range to the encryption information setting unit 31. The encryption information setting unit 31 stores therein the information as to whether the SIP message is encrypted and that on the encryption range, and sets the information as to whether the SIP message is encrypted and that on the encryption range to the SIP message encryption/decryption unit 36 (at g41 in FIG. 23). After completing setting, the encryption information setting unit 31 instructs the SIP message forming unit 34 to create an SIP response message for notification of completion of the setting of the information as to whether the SIP message is encrypted and that on the encryption range (at g42 in FIG. 23). The SIP message forming unit 34 creates the SIP response message, and transmits the created SIP response message to the SIP interface unit 13 of the server apparatus 1 via the SIP interface unit 33 (at g43 in FIG. 23).

Upon receiving the SIP response message for notification of the completion of the setting of the information as to whether the SIP message is encrypted and that on the encryption range, the SIP interface unit 13 of the server apparatus 1 transmits the received SIP response message to the SIP message analyzing unit 15. The SIP message analyzing unit 15 transmits the notification of the completion of the setting of the information as to whether the SIP message is encrypted and that on the encryption range on the SIP protocol-compliant client apparatus 3-1 side to the encryption information setting unit 11. The encryption information setting unit 11 acknowledges the completion of the setting of the information as to whether the SIP message is encrypted and that on the encryption range and sets the information as to whether the SIP message is encrypted and that on the encryption range to the SIP message encryption/decryption unit 16 (at g24 in FIG. 23). After completion of the setting, the server apparatus 1 transmits a notification of the completion of the setting to the local maintenance console 2 via the encryption information input interface unit 12 (at g25 in FIG. 23). The local maintenance console 2 displays the completion of the setting of the information as to whether the SIP message is encrypted and that on the encryption range (at g13 in FIG. 23).

After the information as to whether the SIP message is encrypted and the encryption range is set to the SIP message encryption/decryption unit 16, if a request to transmit an SIP request message to the client apparatus 3-1 is generated in the server apparatus 1 (at g27 in FIG. 23), the SIP message forming unit 14 creates the SIP request message and transmits the created SIP request message to the SIP message encryption/decryption unit 16. According to the current setting of the information as to whether the SIP message is encrypted and the encryption range, if encryption of the SIP message is set (at g28 and g29 in FIG. 23), the SIP message encryption/decryption unit 16 encrypts the created SIP request message in the encryption range (at g30 in FIG. 23). The server apparatus 1 transmits the encrypted SIP request message to the SIP interface unit 33 of the client apparatus 3-1 via the SIP interface unit 13 (at g31 in FIG. 24).

After the information as to whether or not the SIP message is encrypted is set to the SIP message encryption/decryption unit 36, if the SIP interface unit 33 receives the encrypted SIP request message from the server apparatus 1, the SIP interface unit 33 transfers the received SIP request message to the SIP message encryption/decryption unit 36. According to the current setting of the information as to whether the SIP message is encrypted and that on the encryption range, if encryption of the SIP message is set (at g44 in FIG. 24), the SIP message encryption/decryption unit 36 decrypts the SIP request message in the encryption range (at g45 in FIG. 24).

The SIP message analyzing unit 35 analyzes the decrypted SIP request message, and the call controller 37 executes a call control according to a content of the message (at g46 in FIG. 24). According to a result of the call control, the call controller 37 instructs the SIP message forming unit 34 to create an SIP response message (at g47 in FIG. 24). The SIP message forming unit 34 creates the SIP response message and transmits the created SIP response message to the SIP message encryption/decryption unit 36. According to the current setting of the information as to whether the SIP message is encrypted and that on the encryption range, if encryption of the SIP message is set (at g48 in FIG. 24), the SIP message encryption/decryption unit 36 encrypts the SIP response message in the encryption range (at g49 in FIG. 24). The client apparatus 3-1 transmits the encrypted SIP response message to the SIP interface unit 13 of the server apparatus 1 via the SIP interface unit 33 (at g50 in FIG. 24).

Upon receiving the encrypted SIP response message, the SIP interface unit 13 of the server apparatus 1 transmits the received SIP response message to the SIP message encryption/decryption unit 16. According to the current setting of the information as to whether the SIP message is encrypted and that on the encryption range, if encryption of the SIP message is set (at g32 in FIG. 24), the SIP message encryption/decryption unit 16 decrypts the SIP response message in the encryption range (at g33 in FIG. 24). The SIP message analyzing unit 15 analyzes the decrypted SIP response message, and the call controller 17 executes a call control according to a content of the message (at g34 in FIG. 24).

Conversely, if a request to transmit an SIP request message to the server apparatus 1 is generated in the client apparatus 3-1 (at g51 in FIG. 24), the SIP message forming unit 34 creates the SIP request message and transmits the created SIP request message to the SIP message encryption/decryption unit 36. According to the current setting of the information as to whether the SIP message is encrypted and the encryption range, if encryption of the SIP message is set (at g52 in FIG. 24 or at g53 in FIG. 25), the SIP message encryption/decryption unit 36 encrypts the SIP request message in the encryption range (at g54 in FIG. 25). The client apparatus 3-1 transmits the encrypted SIP request message to the SIP interface unit 13 of the server apparatus 1 via the SIP interface unit 33 (at g55 in FIG. 25).

If the SIP interface unit 13 receives the encrypted SIP request message from the client apparatus 3-1, the SIP interface unit 13 transfers the received SIP request message to the SIP message encryption/decryption unit 16. According to the current setting of the information as to whether the SIP message is encrypted and the encryption range, if encryption of the SIP message is set (at g35 in FIG. 25), the SIP message encryption/decryption unit 16 decrypts the SIP request message in the encryption range (at g36 in FIG. 25).

The SIP message analyzing unit 15 analyzes the decrypted SIP request message, and the call controller 17 executes a call control according to a content of the message (at g37 in FIG. 25). According to a result of the call control, the call controller 17 instructs the SIP message forming unit 14 to create an SIP response message (at g38 in FIG. 25). The SIP message forming unit 14 creates the SIP response message and transmits the created SIP response message to the SIP message encryption/decryption unit 16. According to the current setting of the information as to whether the SIP message is encrypted and the encryption range, if encryption of the SIP message is set (at g39 in FIG. 25), the SIP message encryption/decryption unit 16 encrypts the SIP response message in the encryption range (at g3a in FIG. 25). The server apparatus 1 transmits the encrypted SIP response message to the SIP interface unit 33 of the client apparatus 3-1 via the SIP interface unit 13 (at g3b in FIG. 25).

Upon receiving the encrypted SIP response message, the SIP interface unit 33 of the client apparatus 3-1 transmits the received SIP response message to the SIP message encryption/decryption unit 36. According to the current setting of the information as to whether the SIP message is encrypted and the encryption range, if encryption of the SIP message is set (at g56 in FIG. 25), the SIP message encryption/decryption unit 36 decrypts the SIP response message in the encryption range (at g57 in FIG. 25). The SIP message analyzing unit 35 analyzes the decrypted SIP response message, and the call controller 37 executes a call control according to a content of the message (at g58 in FIG. 25).

In this manner, according to the seventh embodiment, in the system supporting both encryption of the SIP message in the entire encryption range and encryption of the SIP message in an arbitrary range, the local maintenance console 2 can arbitrarily select the encryption range. It is therefore possible to satisfy both strong encryption security and high network functionality in the system in which the network apparatus such as the SIP-NAT is present, and to select and realize an optimum security level for the current network configuration.

Moreover, in the seventh embodiment, a maintenance person can arbitrarily set whether or not the SIP message is encrypted via the server apparatus 1. Due to this, if the maintenance person sets the encryption of the SIP message, then it is possible to realize an encryption security function on the network and to make a setting of need or no need to encrypt the SIP message according to the configuration of the network. If, for example, an SIP message log is recorded for maintenance operation, the setting of no need to encrypt the SIP message can be easily made, thereby making it possible to facilitate management by the maintenance personnel.

Furthermore, according to the seventh embodiment, the server apparatus 1 sets the encryption information to the client apparatus 3-1, thereby making it possible to realize system integrity and facilitation of management by the maintenance personnel. Besides, according to the seventh embodiment, the function of selecting need or no need to encrypt the SIP message enables ensuring compatibility with the client apparatus that does not include the encryption function.

The advantages deriving from the SIP message encryption function using the set the information as to whether or not the SIP message is encrypted, the encryption rule, and the encryption range and the encryption range according to the seventh embodiment are similar to those according to the first to fifth embodiments of the present invention. While operations performed by the client apparatuses 3-2 and 3-3 are not described herein, the same advantages as those when using the client apparatus 3-1 can be exhibited.

Eighth Embodiment

Figure 26:
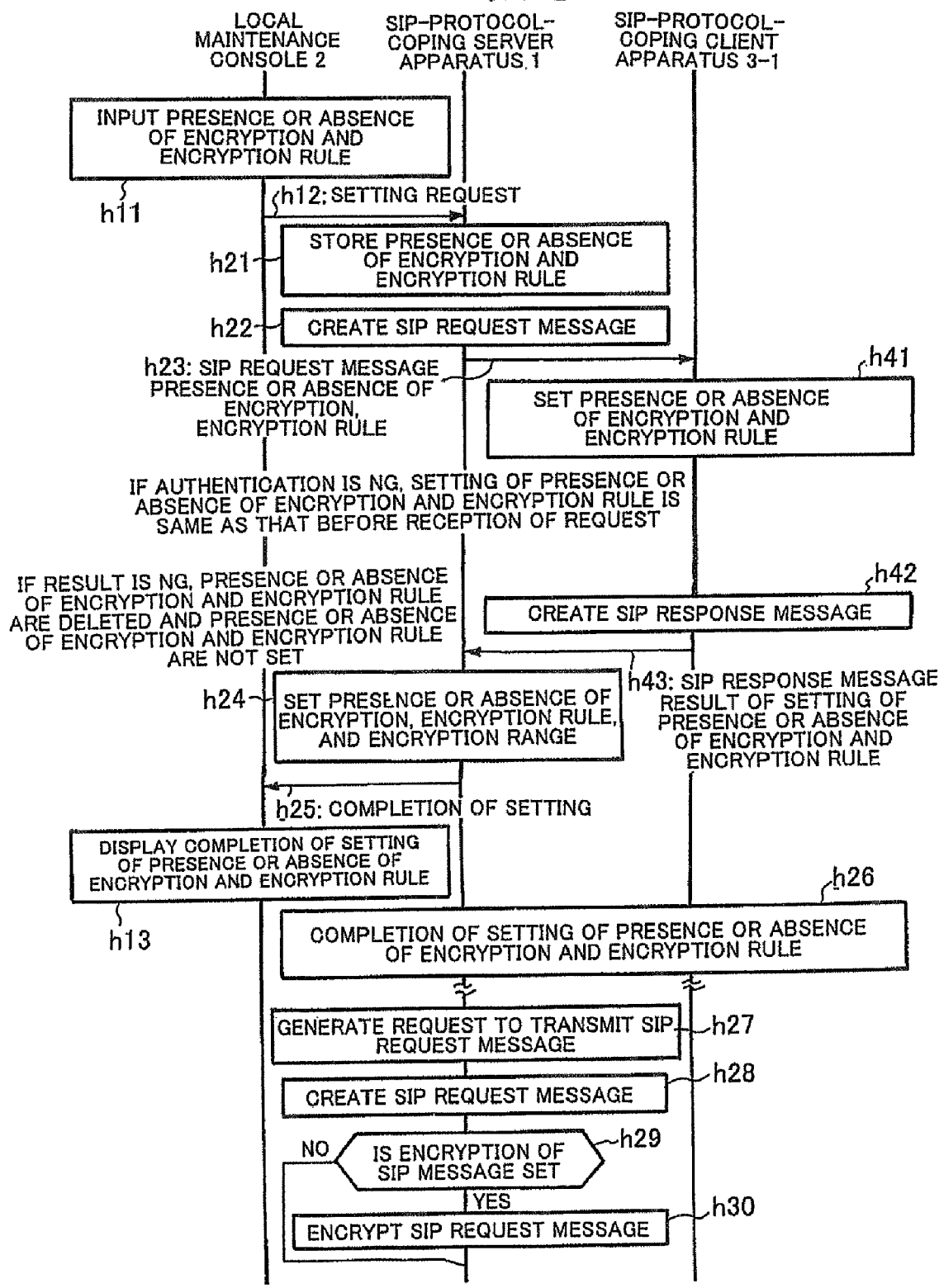
FIG. 26 is a sequence chart showing operation performed by a client server distributed system according to an eighth embodiment of the present invention.
Figure 27:
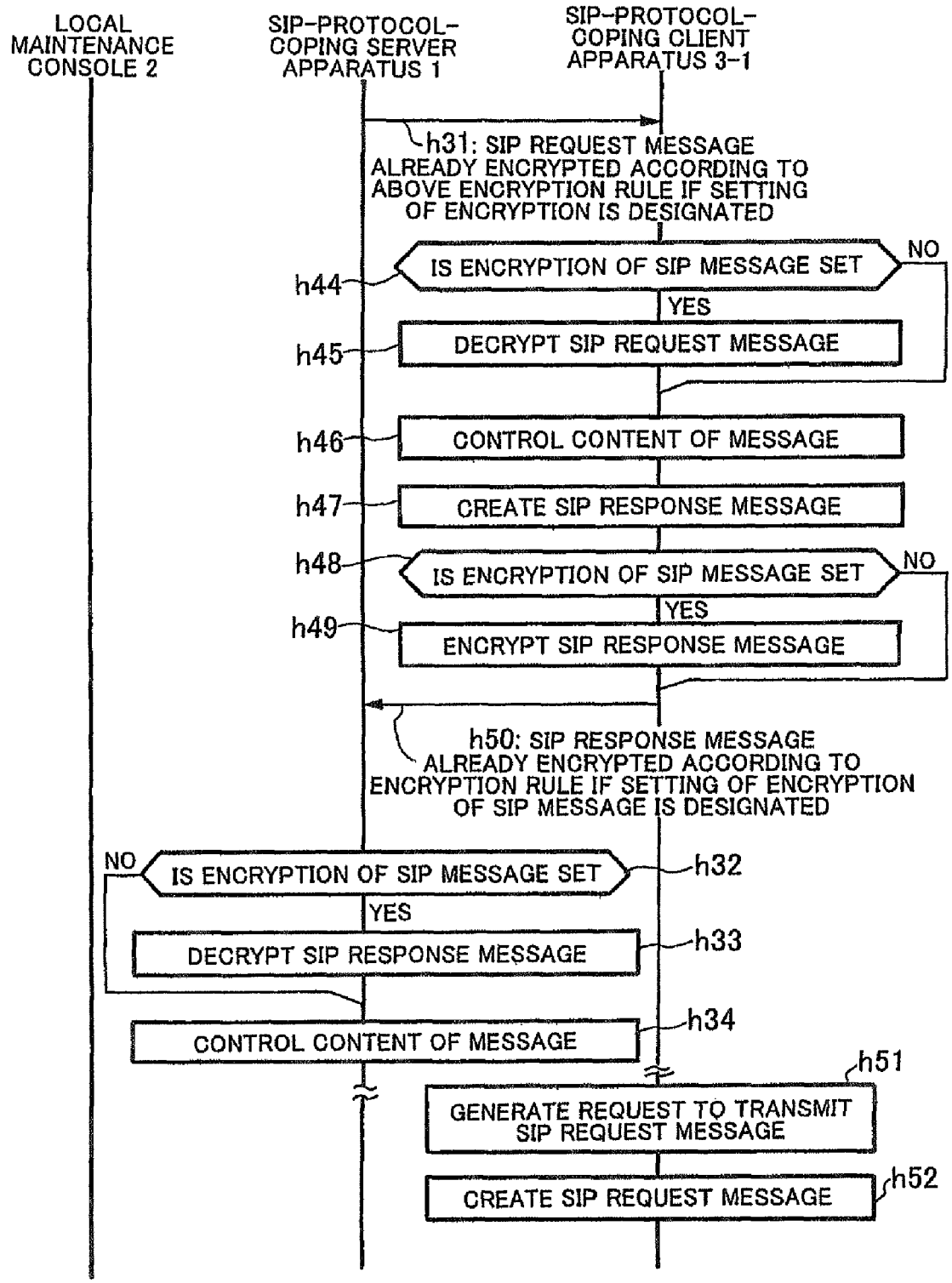
FIG. 27 is a sequence chart showing operation performed by the client server distributed system according to the eighth embodiment of the present invention.
Figure 28:
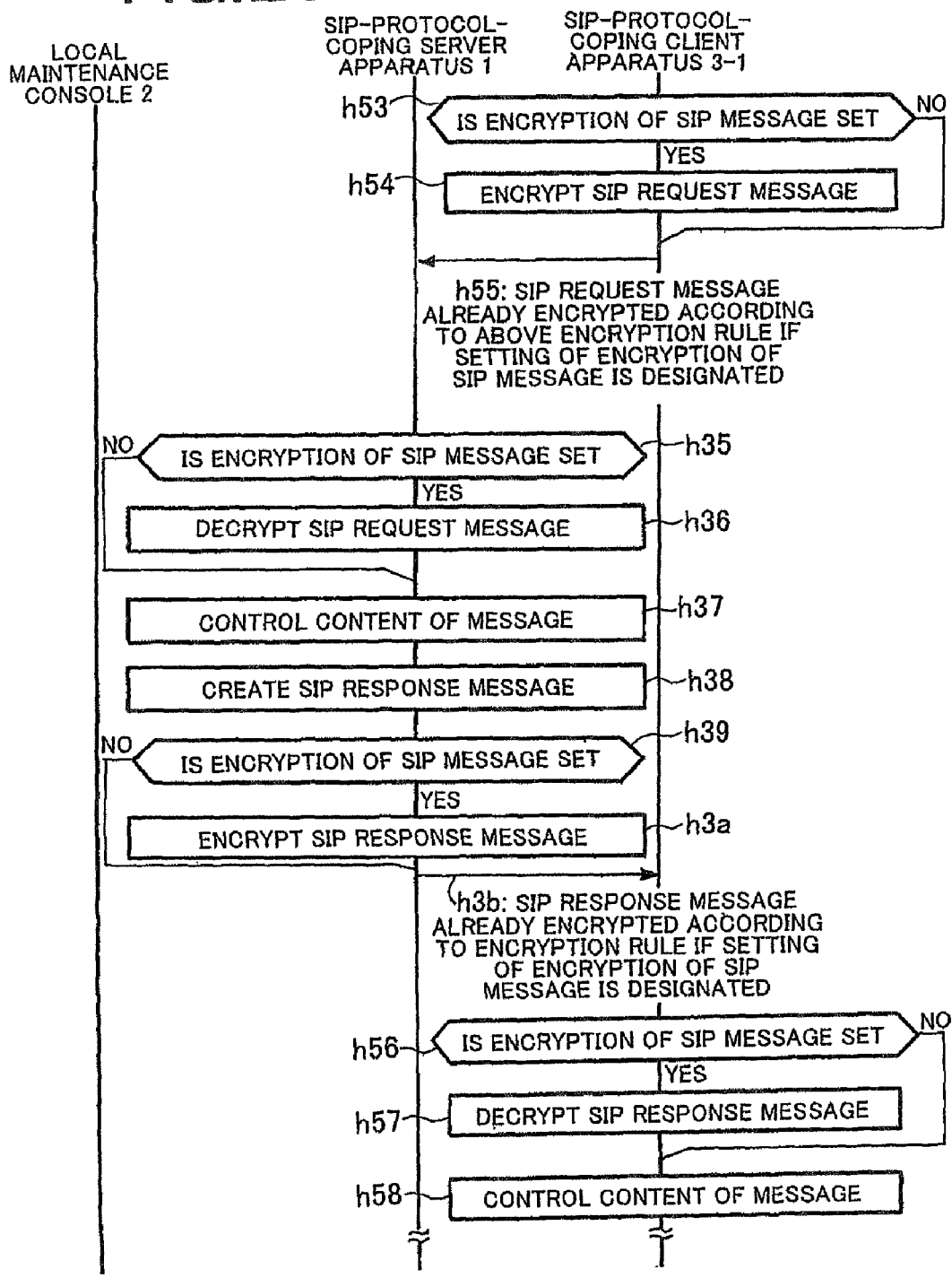
FIG. 28 is a sequence chart showing operation performed by the client server distributed system according to the eighth embodiment of the present invention.

FIGS. 26 to 28 are sequence charts showing operation performed by a client server distributed system according to an eighth embodiment of the present invention. The client server distributed system according to the eighth embodiment of the present invention is the same in configuration as the client server distributed system according to the fourth embodiment of the present invention shown in FIG. 13. Therefore, the configuration will not be described herein. Referring to FIG. 13 and FIGS. 26 to 28, the operation performed by the client server distributed system according to the eighth embodiment of the present invention will be described. It is to be noted that processings performed by the server apparatus 1 and those performed by the client apparatus 3-1 shown in FIGS. 26 to 28 are realized by causing CPUs of the server apparatus 1 and the client apparatus 3-1 to execute programs, respectively.

When the local maintenance console 2 connected to the server apparatus 1 inputs presence or absence of encryption and an encryption rule during transmission or reception of the SIP message between the server apparatus 1 and the client apparatus 3-1 in advance (at h11 shown in FIG. 26), the encryption information input interface unit 12 of the server apparatus 1 receives a setting request including the input information as to whether the SIP message is encrypted and the encryption rule (at h12 in FIG. 26). If confirming normality of the setting request, the encryption information input interface unit 12 transmits the information to the encryption information setting unit 11. The encryption information setting unit 11 stores therein the information as to whether the SIP message is encrypted and the encryption rule (at h21 in FIG. 26).

The encryption information setting unit 11 of the server apparatus 1 instructs the SIP message forming unit 14 to create an SIP request message including the information as to whether the SIP message is encrypted and the encryption rule (h22 in FIG. 26). The SIP message forming unit 14 creates the SIP request message and transmits the created SIP request message to the SIP interface unit 33 of the client apparatus 3-1 via the SIP interface unit 13 (at h23 FIG. 26).

When the SIP interface unit 33 of the client apparatus 3-1 receives the SIP request message including the information as to whether the SIP message is encrypted and the encryption rule, the SIP interface unit 33 transmits the received SIP request message to the SIP message analyzing unit 35. If the SIP message analyzing unit 35 can confirm the normality of the information as to whether the SIP message is encrypted and the encryption rule, the SIP message analyzing unit 35 transmits the information as to whether the SIP message is encrypted and the encryption rule to the encryption information setting unit 31. The encryption information setting unit 31 stores therein the information as to whether the SIP message is encrypted and the encryption rule, and sets the information as to whether the SIP message is encrypted and the encryption rule to the SIP message encryption/decryption unit 36 (at h41 in FIG. 26). After completing setting, the encryption information setting unit 31 instructs the SIP message forming unit 34 to create an SIP response message for notification of completion of the setting of the information as to whether the SIP message is encrypted and the encryption rule (at h42 in FIG. 26). The SIP message forming unit 34 creates the SIP response message, and transmits the created SIP response message to the SIP interface unit 13 of the server apparatus 1 via the SIP interface unit 33 (at h43 in FIG. 26).

Upon receiving the SIP response message for notification of the completion of the setting of the information as to whether the SIP message is encrypted and the encryption rule, the SIP interface unit 13 of the server apparatus 1 transmits the received SIP response message to the SIP message analyzing unit 15. The SIP message analyzing unit 15 transmits the notification of the completion of the setting of the information as to whether the SIP message is encrypted and the encryption rule on the client apparatus 3-1 side to the encryption information setting unit 11. The encryption information setting unit 11 acknowledges the completion of the setting of the information as to whether the SIP message is encrypted and the encryption rule and sets the information as to whether or not the SIP message is encrypted, the encryption rule to the SIP message encryption/decryption unit 16 (at h24 in FIG. 26). After completion of the setting, the server apparatus 1 transmits a notification of the completion of the setting to the local maintenance console 2 via the encryption information input interface unit 12 (at h25 in FIG. 26). The local maintenance console 2 displays the completion of the setting of the information as to whether the SIP message is encrypted and the encryption rule (at h13 in FIG. 26).

After the information as to whether the SIP message is encrypted and the encryption rule is set to the SIP message encryption/decryption unit 16, if a request to transmit an SIP request message to the client apparatus 3-1 is generated in the server apparatus 1 (at h27 in FIG. 26), the SIP message forming unit 14 creates the SIP request message and transmits the created SIP request message to the SIP message encryption/decryption unit 16. According to the current setting of the information as to whether the SIP message is encrypted and the encryption rule, if encryption of the SIP message is set (at h28 and h29 in FIG. 26), the SIP message encryption/decryption unit 16 encrypts the SIP request message according to the encryption rule (at h30 in FIG. 26). The server apparatus 1 transmits the encrypted SIP request message to the SIP interface unit 33 of the client apparatus 3-1 via the SIP interface unit 13 (at h31 in FIG. 27).

After the information as to whether the SIP message is encrypted and the encryption rule set to the SIP message encryption/decryption unit 36, if the SIP interface unit 33 receives the encrypted SIP request message from the server apparatus 1, the SIP interface unit 33 transfers the received SIP request message to the SIP message encryption/decryption unit 36. According to the current setting of the information as to whether the SIP message is encrypted and the encryption rule, if encryption of the SIP message is set (at h44 in FIG. 27), the SIP message encryption/decryption unit 36 decrypts the SIP request message (at h45 in FIG. 27).

The SIP message analyzing unit 35 analyzes the decrypted SIP request message, and the call controller 37 executes a call control according to a content of the message (at h46 in FIG. 27). According to a result of the call control, the call controller 37 instructs the SIP message forming unit 34 to create an SIP response message (at h47 in FIG. 27). The SIP message forming unit 34 creates the SIP response message and transmits the created SIP response message to the SIP message encryption/decryption unit 36. According to the current setting of the information as to whether the SIP message is encrypted and the encryption rule, if encryption of the SIP message is set (at h48 in FIG. 27), the SIP message encryption/decryption unit 36 encrypts the SIP response message according to the encryption rule (at h49 in FIG. 27). The client apparatus 3-1 transmits the encrypted SIP response message to the SIP interface unit 13 of the server apparatus 1 via the SIP interface unit 33 (at h50 in FIG. 27).

Upon receiving the encrypted SIP response message, the SIP interface unit 13 of the server apparatus 1 transmits the received SIP response message to the SIP message encryption/decryption unit 16. According to the current setting of the information as to whether the SIP message is encrypted and the encryption rule, if encryption of the SIP message is set (at h32 in FIG. 27), the SIP message encryption/decryption unit 16 decrypts the SIP response message (at h33 in FIG. 27). The SIP message analyzing unit 15 analyzes the decrypted SIP response message, and the call controller 17 executes a call control according to a content of the message (at h34 in FIG. 27).

Conversely, if a request to transmit an SIP request message to the server apparatus 1 is generated in the client apparatus 3-1 (at h51 in FIG. 27), the SIP message forming unit 34 creates the SIP request message and transmits the created SIP request message to the SIP message encryption/decryption unit 36. According to the current setting of the information as to whether the SIP message is encrypted and the encryption rule, if encryption of the SIP message is set (at h52 in FIG. 27 or at h53 in FIG. 28), the SIP message encryption/decryption unit 36 encrypts the SIP request message according to the encryption rule (at h54 in FIG. 28). The client apparatus 3-1 transmits the encrypted SIP request message to the SIP interface unit 13 of the server apparatus 1 via the SIP interface unit 33 (at h55 in FIG. 28).

If the SIP interface unit 13 receives the encrypted SIP request message from the client apparatus 3-1, the SIP interface unit 13 transfers the received SIP request message to the SIP message encryption/decryption unit 16. According to the current setting of the information as to whether the SIP message is encrypted and the encryption rule, if encryption of the SIP message is set (at h35 in FIG. 28), the SIP message encryption/decryption unit 16 decrypts the SIP request message according to the encryption rule (at h36 in FIG. 28).

The SIP message analyzing unit 15 analyzes the decrypted SIP request message, and the call controller 17 executes a call control according to a content of the message (at h37 in FIG. 28). According to a result of the call control, the call controller 17 instructs the SIP message forming unit 14 to create an SIP response message (at h38 in FIG. 28). The SIP message forming unit 14 creates the SIP response message and transmits the created SIP response message to the SIP message encryption/decryption unit 16. According to the current setting of the information as to whether the SIP message is encrypted and the encryption rule, if encryption of the SIP message is set (at h39 in FIG. 28), the SIP message encryption/decryption unit 16 encrypts the SIP response message according to the encryption rule (at h3a in FIG. 28). The server apparatus 1 transmits the encrypted SIP response message to the SIP interface unit 33 of the client apparatus 3-1 via the SIP interface unit 13 (at h3b in FIG. 28).

Upon receiving the encrypted SIP response message, the SIP interface unit 33 of the client apparatus 3-1 transmits the received SIP response message to the SIP message encryption/decryption unit 36. According to the current setting of the information as to whether the SIP message is encrypted and the encryption rule, if encryption of the SIP message is set (at h56 in FIG. 28), the SIP message encryption/decryption unit 36 decrypts the SIP response message according to the encryption rule (at h57 in FIG. 28). The SIP message analyzing unit 35 analyzes the decrypted SIP response message, and the call controller 37 executes a call control according to a content of the message (at h58 in FIG. 28).

In this manner, according to the eighth embodiment, a maintenance person can arbitrarily set whether or not the SIP message is encrypted via the server apparatus 1. Due to this, if the maintenance person sets the encryption of the SIP message, then it is possible to realize an encryption security function on the network and to make different settings of encryption or non-encryption according to network configurations. If, for example, an SIP message log is recorded for maintenance operation, the setting of non-encryption of the SIP message can be easily made, thereby making it possible to facilitate management by the maintenance personnel.

Moreover, according to the eighth embodiment, the function of selecting encryption or non-encryption of the SIP message enables ensuring compatibility with the client apparatus that does not include the encryption function. According to the eighth embodiment, by encrypting the SIP message, the encryption security function on the network can be realized, different settings can be made of the encryption rule according to the network configurations, and the encryption security can be strengthened.

Further, according to the eighth embodiment, a new encryption rule can be used without adding or developing an interface for selecting the encryption rule if the encryption rule operable in the system is to be added in the future. Therefore, it is possible to minimize change in the maintenance interface and to facilitate development.

Moreover, according to the eighth embodiment, the server apparatus 1 sets the encryption information to the client apparatus 3-1, thereby making it possible to realize system integrity. Further, the advantages deriving from the SIP message encryption function using the set the information as to whether or not the SIP message is encrypted and the encryption rule according to the eighth embodiment are similar to those according to the first, the second, the fifth, and the sixth embodiments of the present invention. While operations performed by the client apparatuses 3-2 and 3-3 are not described herein, the same advantages as those when using the client apparatus 3-1 can be exhibited.

Ninth Embodiment

Figure 29:
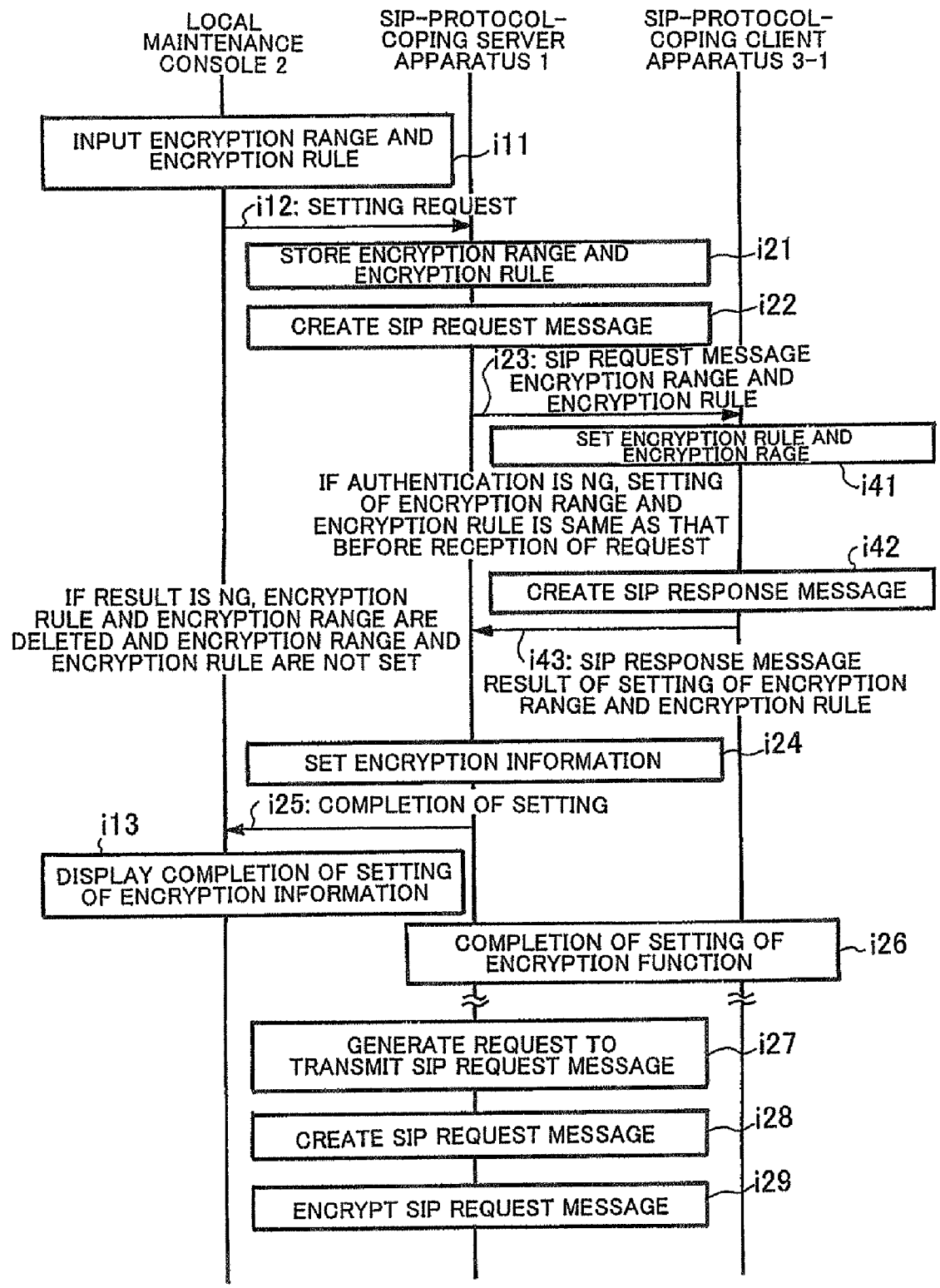
FIG. 29 is a sequence chart showing operation performed by a client server distributed system according to a ninth embodiment of the present invention.
Figure 30:
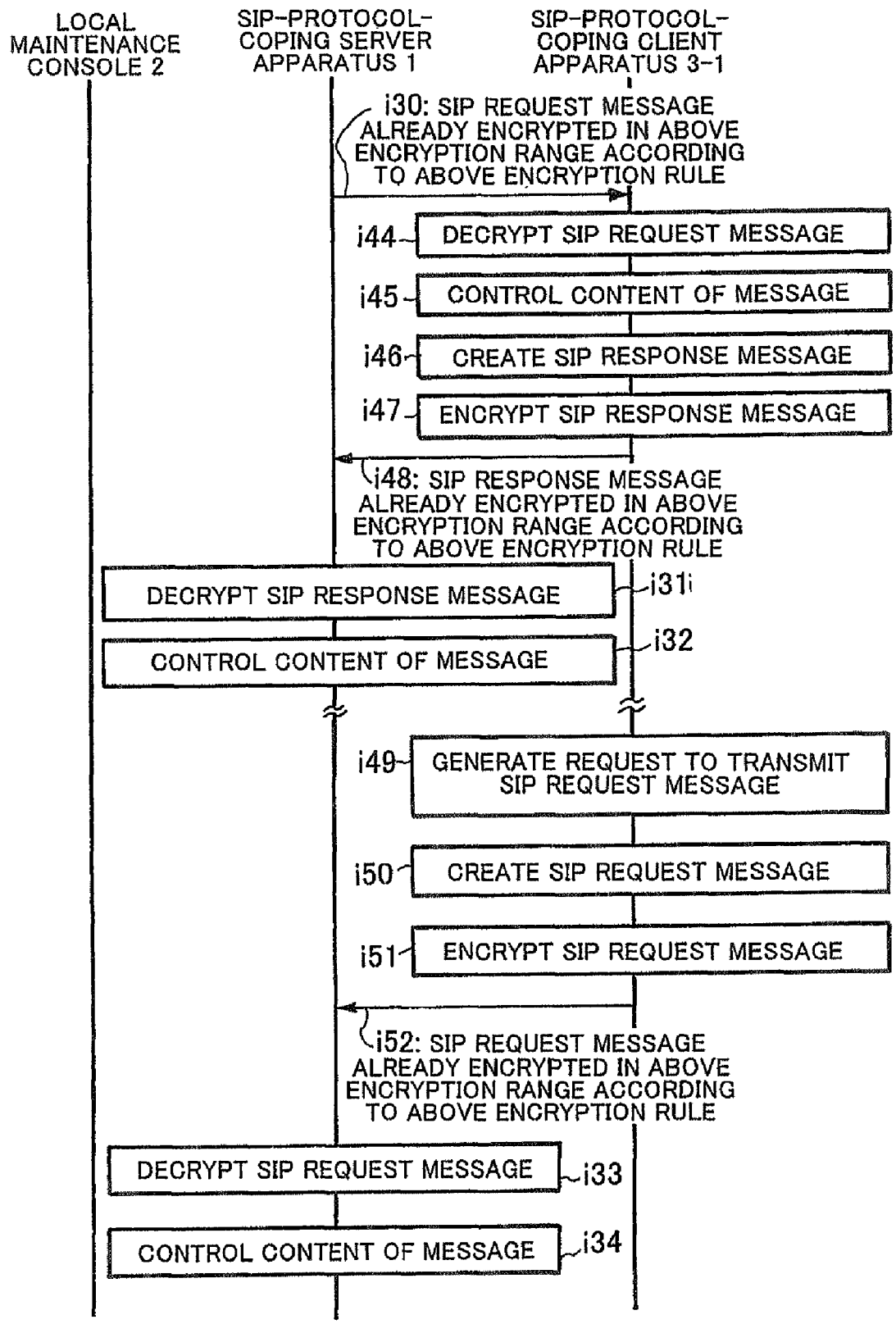
FIG. 30 is a sequence chart showing operation performed by the client server distributed system according to the ninth embodiment of the present invention.
Figure 31:
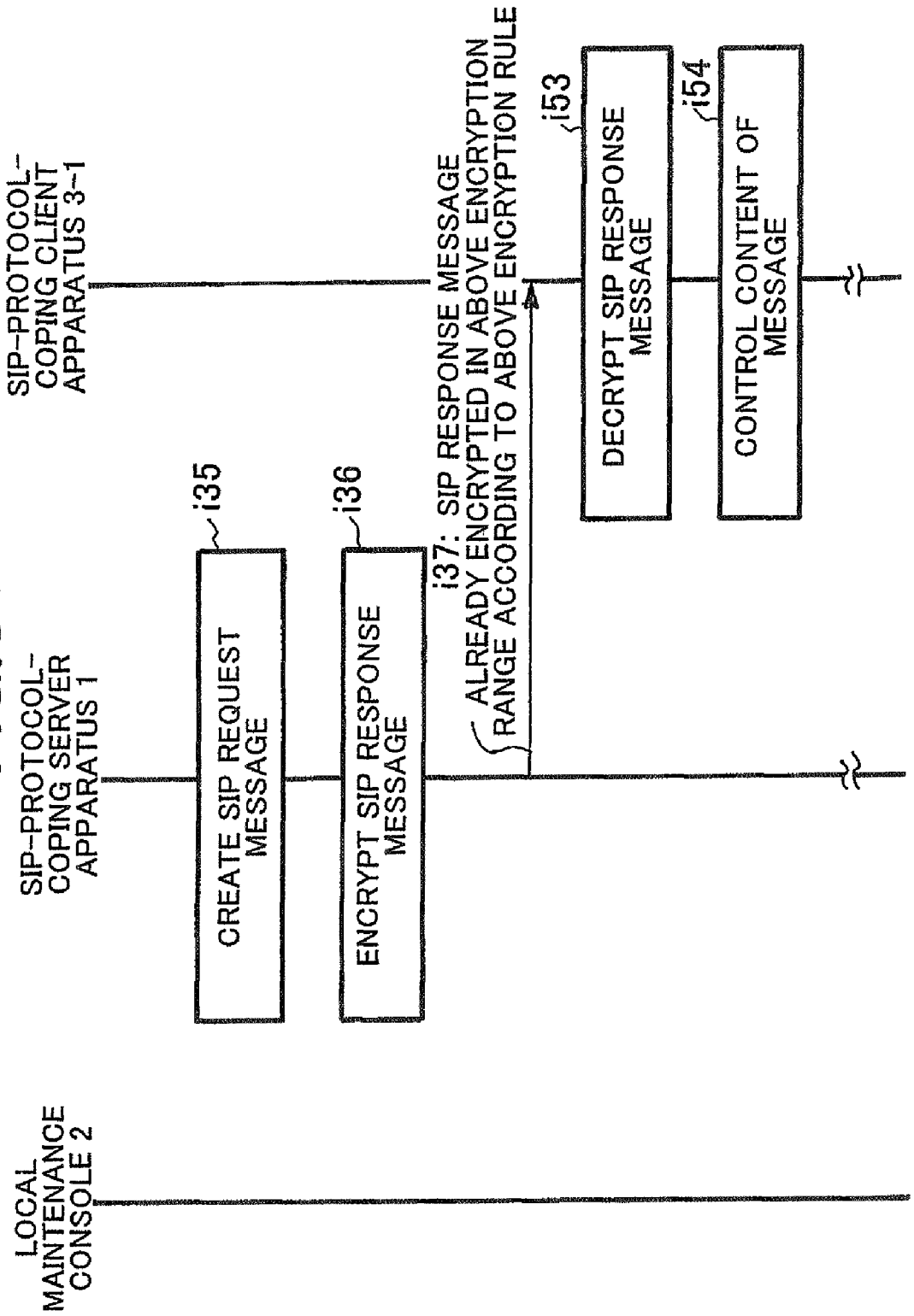
FIG. 31 is a sequence chart showing operation performed by the client server distributed system according to the ninth embodiment of the present invention.

FIGS. 29 to 31 are sequence charts showing operation performed by a client server distributed system according to a ninth embodiment of the present invention. The client server distributed system according to the ninth embodiment of the present invention is the same in configuration as the client server distributed system according to the fourth embodiment of the present invention show in FIG. 13. Therefore, the configuration will not be described herein. Referring to FIG. 13 and FIGS. 29 to 31, the operation performed by the client server distributed system according to the ninth embodiment of the present invention will be described. It is to be noted that processings performed by the server apparatus 1 and those performed by the client apparatus 3-1 shown in FIGS. 29 to 31 are realized by causing CPUs of the server apparatus 1 and the client apparatus 3-1 to execute programs, respectively.

When information on an encryption rule and an encryption range of an SIP message during transmission or reception of the SIP message between the server apparatus 1 and the client apparatus 3-1 is input to the server apparatus 1 from the local maintenance console 2 connected to the server apparatus 1 in advance (at i11 shown in FIG. 29), the encryption information input interface unit 12 of the server apparatus 1 receives a setting request including the encryption rule and the encryption range (at i12 in FIG. 29). If confirming normality of the setting request, the encryption information input interface unit 12 transmits the encryption rule and encryption rage to the encryption information setting unit 11. The encryption information setting unit 11 stores therein the encryption range and the encryption rule (at i21 in FIG. 29).

The encryption information setting unit 11 of the server apparatus 1 instructs the SIP message forming unit 14 to create an SIP request message including the encryption rule and the encryption range (at i22 in FIG. 29). The SIP message forming unit 14 creates the SIP request message and transmits the created SIP request message to the SIP interface unit 33 of the client apparatus 3-1 via the SIP interface unit 13 (at i23 FIG. 29).

When the SIP interface unit 33 of the client apparatus 3-1 receives the SIP request message including the encryption range and the encryption rule, the SIP interface unit 33 transmits the received SIP request message to the SIP message analyzing unit 35. If the SIP message analyzing unit 35 can confirm the normality of the encryption range and the encryption rule, the SIP message analyzing unit 35 transmits the encryption range and the encryption rule to the encryption information setting unit 31. The encryption information setting unit 31 stores therein the encryption range and the encryption rule, and sets the encryption range and the encryption rule to the SIP message encryption/decryption unit 36 (at i41 in FIG. 29). After completing setting, the encryption information setting unit 31 instructs the SIP message forming unit 34 to create an SIP response message for notification of completion of the setting of the encryption range and the encryption rule (at i42 in FIG. 29). The SIP message forming unit 34 creates the SIP response message, and transmits the created SIP response message to the SIP interface unit 13 of the server apparatus 1 via the SIP interface unit 33 (at i43 in FIG. 29).

Upon receiving the SIP response message for notification of the completion of the setting of the encryption range and the encryption rule, the SIP interface unit 13 of the server apparatus 1 transmits the received SIP response message to the SIP message analyzing unit 15. The SIP message analyzing unit 15 transmits the notification of the completion of the setting of the encryption range and the encryption rule on the client apparatus 3-1 side to the encryption information setting unit 11. The encryption information setting unit 11 acknowledges the completion of the setting of the encryption range and the encryption rule and sets the encryption range and the encryption rule to the SIP message encryption/decryption unit 16 (at i24 in FIG. 29). After completion of the setting, the server apparatus 1 transmits a notification of the completion of the setting to the local maintenance console 2 via the encryption information input interface unit 12 (at i25 in FIG. 29). The local maintenance console 2 displays the completion of the setting of the encryption range and the encryption rule (at i13 in FIG. 29).

After the encryption range and the encryption rule are set to the SIP message encryption/decryption unit 16, if a request to transmit an SIP request message to the client apparatus 3-1 is generated in the server apparatus 1 (at i27 in FIG. 29), the SIP message forming unit 14 creates the SIP request message and transmits the created SIP request message to the SIP message encryption/decryption unit 16 (at i28 in FIG. 29). According to the current setting of the encryption range and the encryption rule, the SIP message encryption/decryption unit 16 encrypts the created SIP request message in the encryption range according to the encryption rule (at i29 in FIG. 29). The server apparatus 1 transmits the encrypted SIP request message to the SIP interface unit 33 of the client apparatus 3-1 via the SIP interface unit 13 (at i30 in FIG. 30).

After the encryption range and the encryption rule are set to the SIP message encryption/decryption unit 36, if the SIP interface unit 33 receives the encrypted SIP request message from the server apparatus 1, the SIP interface unit 33 transfers the received SIP request message to the SIP message encryption/decryption unit 36. According to the current setting of the encryption range and the encryption rule, the SIP message encryption/decryption unit 36 decrypts the SIP request message in the encryption range according to the encryption rule (at i44 in FIG. 30).

The SIP message analyzing unit 35 analyzes the decrypted SIP request message, and the call controller 37 executes a call control according to a content of the message (at i45 in FIG. 30). According to a result of the call control, the call controller 37 instructs the SIP message forming unit 34 to create an SIP response message (at i46 in FIG. 30). The SIP message forming unit 34 creates the SIP response message and transmits the created SIP response message to the SIP message encryption/decryption unit 36. According to the current setting of the encryption range and the encryption rule, The SIP message encryption/decryption unit 36 encrypts the SIP response message in the encryption range according to the encryption rule (at i47 in FIG. 30). The client apparatus 3-1 transmits the encrypted SIP response message to the SIP interface unit 13 of the server apparatus 1 via the SIP interface unit 33 (at i48 in FIG. 30).

Upon receiving the encrypted SIP response message, the SIP interface unit 13 of the server apparatus 1 transmits the received SIP response message to the SIP message encryption/decryption unit 16. According to the current setting of the encryption range and the encryption rule, the SIP message encryption/decryption unit 16 decrypts the SIP response message in the encryption range according to the encryption rule (at i31 in FIG. 30). The SIP message analyzing unit 15 analyzes the decrypted SIP response message, and the call controller 17 executes a call control according to a content of the message (at i32 in FIG. 30).

Conversely, if a request to transmit an SIP request message to the server apparatus 1a is generated in the client apparatus 3-1 (at i49 in FIG. 30), the SIP message forming unit 34 creates the SIP request message and transmits the created SIP request message to the SIP message encryption/decryption unit 36. According to the current setting of the encryption range and the encryption rule, the SIP message encryption/decryption unit 36 encrypts the SIP request message (at i50 and i51 in FIG. 30). The client apparatus 3-1 transmits the encrypted SIP request message to the SIP interface unit 13 of the server apparatus 1 via the SIP interface unit 33 (at i52 in FIG. 30).

If the SIP interface unit 13 receives the encrypted SIP request message from the client apparatus 3-1, the SIP interface unit 13 transfers the received SIP request message to the SIP message encryption/decryption unit 16. According to the current setting of the encryption range and the encryption rule, the SIP message encryption/decryption unit 16 decrypts the SIP request message in the encryption range according to the encryption rule (at i33 in FIG. 30).

The SIP message analyzing unit 15 analyzes the decrypted SIP request message, and the call controller 17 executes a call control according to a content of the message (at i34 in FIG. 30). According to a result of the call control, the call controller 17 instructs the SIP message forming unit 14 to create an SIP response message (at i35 in FIG. 31). The SIP message forming unit 14 creates the SIP response message and transmits the created SIP response message to the SIP message encryption/decryption unit 16. According to the current setting of the encryption range and the encryption rule, the SIP message encryption/decryption unit 16 encrypts the SIP response message in the encryption range according to the encryption rule (at i36 in FIG. 31). The server apparatus 1 transmits the encrypted SIP response message to the SIP interface unit 33 of the client apparatus 3-1 via the SIP interface unit 13 (at i37 in FIG. 31).

Upon receiving the encrypted SIP response message, the SIP interface unit 33 of the client apparatus 3-1 transmits the received SIP response message to the SIP message encryption/decryption unit 36. According to the current setting of the encryption range and the encryption rule, the SIP message encryption/decryption unit 36 decrypts the SIP response message in the encryption range according to the encryption rule (at i53 in FIG. 31). The SIP message analyzing unit 35 analyzes the decrypted SIP response message, and the call controller 37 executes a call control according to a content of the message (at i54 in FIG. 31).

In this manner, according to the ninth embodiment, in the system supporting both encryption of the SIP message in the entire encryption range and encryption of the SIP message in an arbitrary range, the local maintenance console 2 can arbitrarily select the encryption range. It is therefore possible to satisfy both strong encryption security and high network functionality in the system in which the network apparatus such as the SIP-NAT is present, and to select and realize an optimum security level for the current network configuration.

Moreover, according to the ninth embodiment, by encrypting the SIP message, the encryption security function on the network can be realized, different settings can be made of the encryption rule and encryption range according to the network configurations, and the encryption security can be strengthened. Further, the server apparatus 1 sets the encryption rule and the encryption range to the client apparatus 3-1, thereby making it possible to realize system integrity and facilitate management by the maintenance personnel.

Furthermore, according to the ninth embodiment, a new encryption rule can be used without adding or developing an interface for selecting the encryption rule if the encryption rule operable in the system is to be added in the future. Therefore, it is possible to minimize change in the maintenance interface and to facilitate development. Further, the advantages deriving from the SIP message encryption function using the set information on the encryption rule and the encryption range according to the ninth embodiment are similar to those according to the first to fourth and sixth embodiments of the present invention. While operations performed by the client apparatuses 3-2 and 3-3 are not described herein, the same advantages as those when using the client apparatus 3-1 can be exhibited.

Tenth Embodiment

Figure 32:
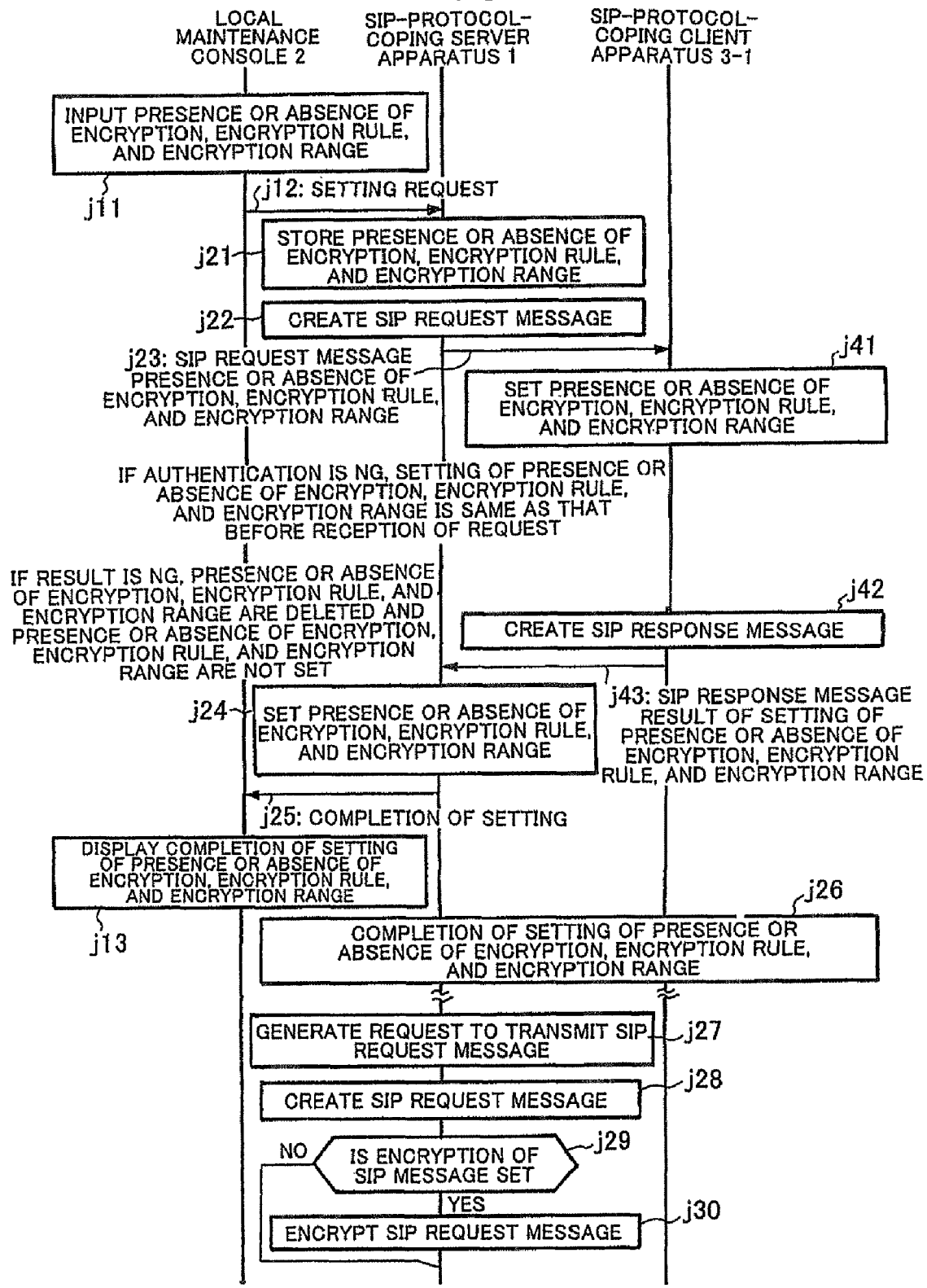
FIG. 32 is a sequence chart showing operation performed by a client server distributed system according to a tenth embodiment of the present invention.
Figure 33:
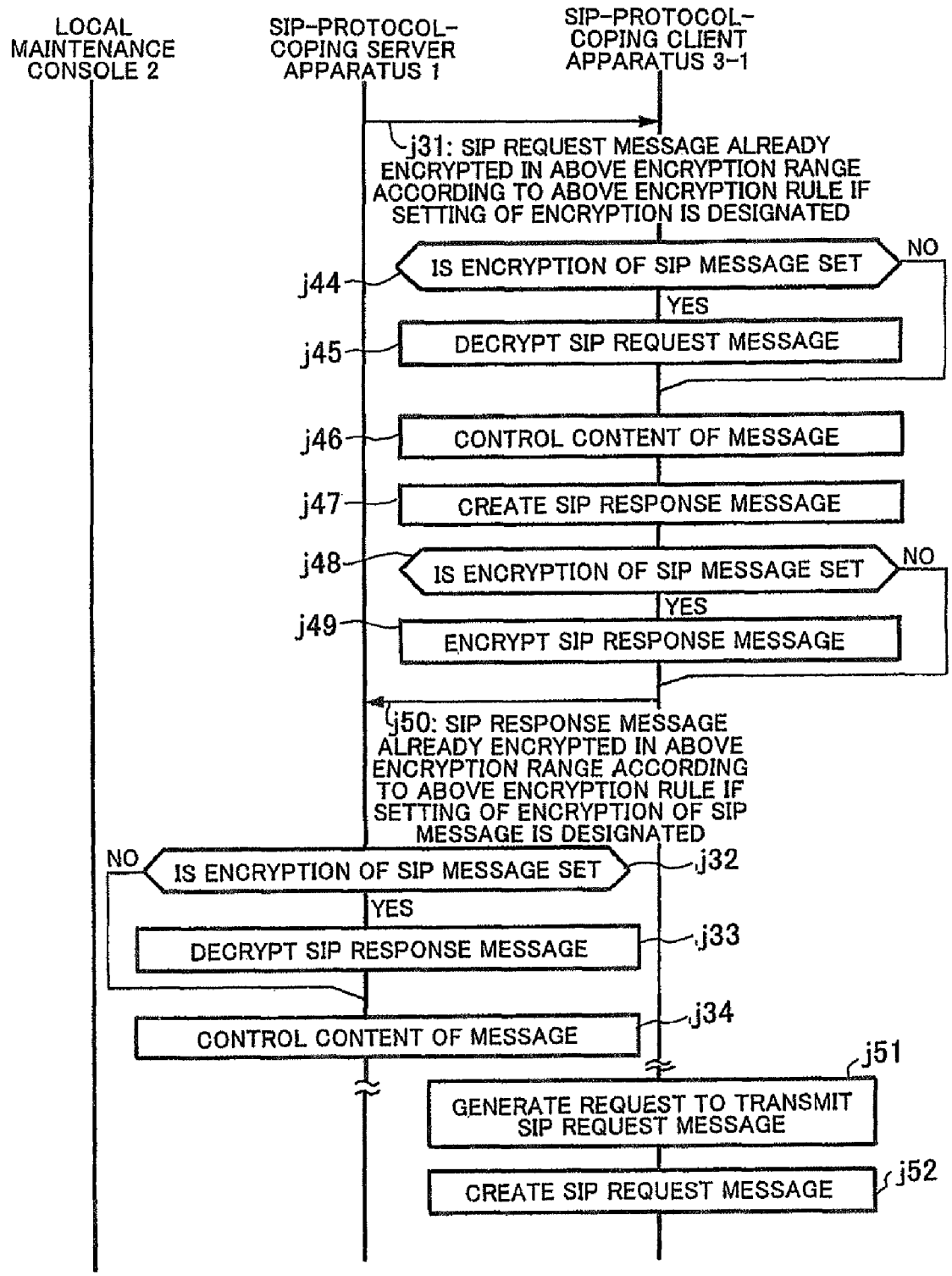
FIG. 33 is a sequence chart showing operation performed by the client server distributed system according to the tenth embodiment of the present invention.
Figure 34:
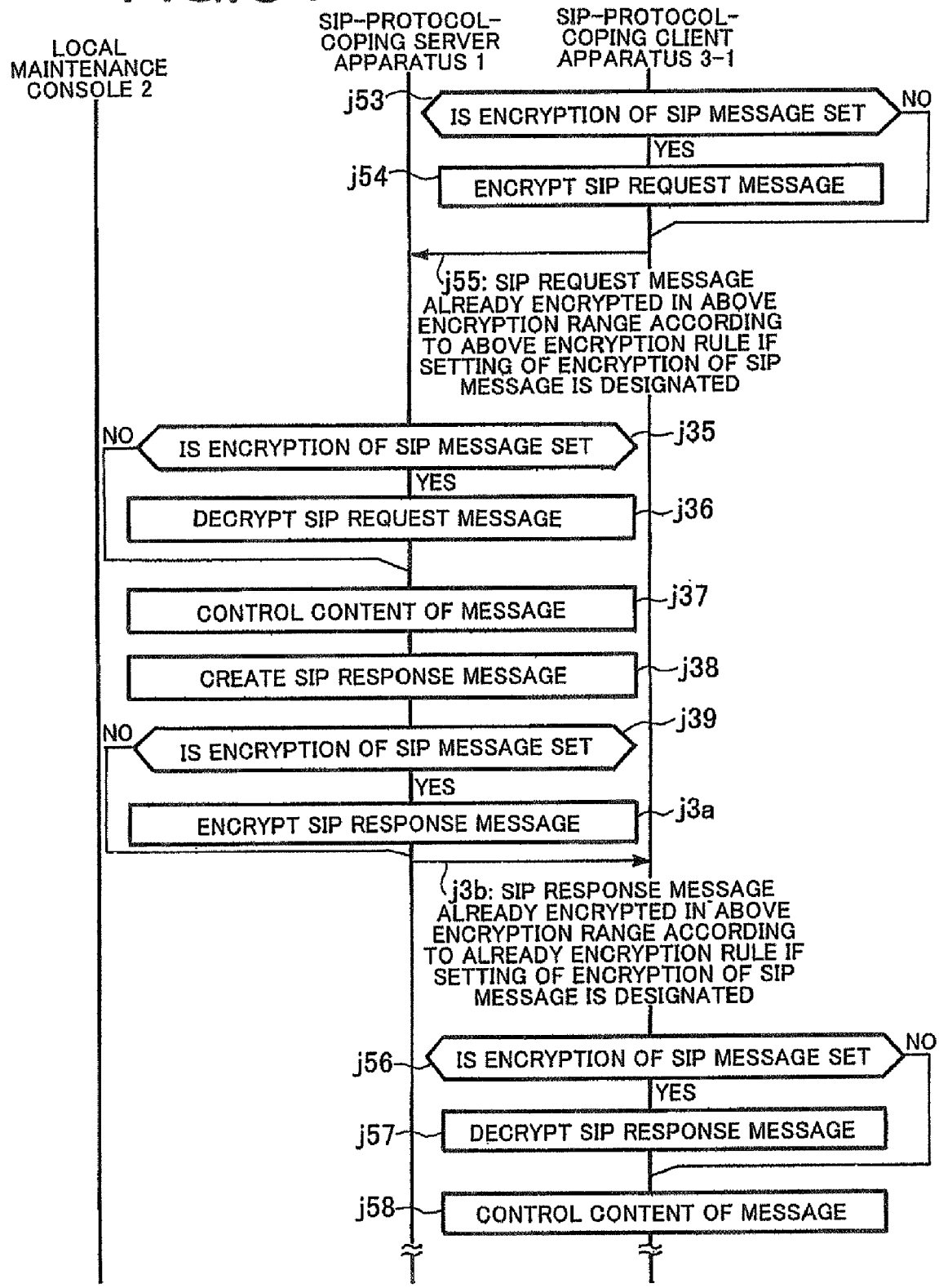
FIG. 34 is a sequence chart showing operation performed by the client server distributed system according to the tenth embodiment of the present invention.

FIGS. 32 to 34 are sequence charts showing operation performed by a client server distributed system according to a tenth embodiment of the present invention. The client server distributed system according to the tenth embodiment of the present invention is the same in configuration as the client server distributed system according to the fourth embodiment of the present invention show in FIG. 13. Therefore, the configuration will not be described herein. Referring to FIG. 13 and FIGS. 32 to 34, the operation performed by the client server distributed system according to the tenth embodiment of the present invention will be described. It is to be noted that processings performed by the server apparatus 1 and those performed by the client apparatus 3-1 shown in FIGS. 32 to 34 are realized by causing CPUs of the server apparatus 1 and the client apparatus 3-1 to execute programs, respectively.

When presence or absence of encryption, an encryption rule, and an encryption range during transmission or reception of the SIP message between the server apparatus 1 and the client apparatus 3-1 is input to the server apparatus 1 from the local maintenance console 2 connected to the server apparatus 1 in advance (at j11 shown in FIG. 32), the encryption information input interface unit 12 of the server apparatus 1 receives a setting request including the information as to whether or not the SIP message is encrypted, the encryption rule, and the encryption range (at j12 in FIG. 32). If confirming normality of the setting request, the encryption information input interface unit 12 transmits the information as to whether or not the SIP message is encrypted, the encryption rule, and the encryption range to the encryption information setting unit 11. The encryption information setting unit 11 stores therein the information as to whether or not the SIP message is encrypted, the encryption rule, and the encryption range (at j21 in FIG. 32).

The encryption information setting unit 11 of the server apparatus 1 instructs the SIP message forming unit 14 to create an SIP request message including the information as to whether or not the SIP message is encrypted, the encryption rule, and the encryption range (at j22 in FIG. 32). The SIP message forming unit 14 creates the SIP request message, and transmits the created SIP request message to the SIP interface unit 33 of the client apparatus 3-1 via the SIP interface unit 13 (at j23 FIG. 32).

When the SIP interface unit 33 of the client apparatus 3-1 receives the SIP request message including the information as to whether or not the SIP message is encrypted, the encryption rule, and the encryption range, the SIP interface unit 33 transmits the received SIP request message to the SIP message analyzing unit 35. If the SIP message analyzing unit 35 can confirm the normality of the information as to whether or not the SIP message is encrypted, the encryption rule, and the encryption range, the SIP message analyzing unit 35 transmits the information as to whether or not the SIP message is encrypted, the encryption rule, and the encryption range to the encryption information setting unit 31. The encryption information setting unit 31 stores therein the information as to whether or not the SIP message is encrypted, the encryption rule, and the encryption range, and sets the information as to whether or not the SIP message is encrypted, the encryption rule, and the encryption range to the SIP message encryption/decryption unit 36 (at j41 in FIG. 32). After completing setting, the encryption information setting unit 31 instructs the SIP message forming unit 34 to create an SIP response message for notification of completion of the setting of the information as to whether or not the SIP message is encrypted, the encryption rule, and the encryption range (at j42 in FIG. 32). The SIP message forming unit 34 creates the SIP response message, and transmits the created SIP response message to the SIP interface unit 13 of the server apparatus 1 via the SIP interface unit 33 (at j43 in FIG. 32).

Upon receiving the SIP response message for notification of the completion of the setting of the information as to whether or not the SIP message is encrypted, the encryption rule, and the encryption range, the SIP interface unit 13 of the server apparatus 1 transmits the received SIP response message to the SIP message analyzing unit 15. The SIP message analyzing unit 15 transmits the notification of the completion of the setting of the information as to whether or not the SIP message is encrypted, the encryption rule, and the encryption range on the client apparatus 3-1 side to the encryption information setting unit 11. The encryption information setting unit 11 acknowledges the completion of the setting of the information as to whether or not the SIP message is encrypted, the encryption rule, and the encryption range and sets the information as to whether or not the SIP message is encrypted, the encryption rule, and the encryption range to the SIP message encryption/decryption unit 16 (at j24 in FIG. 32). After completion of the setting, the server apparatus 1 transmits a notification of the completion of the setting to the local maintenance console 2 via the encryption information input interface unit 12 (at j25 in FIG. 32). The local maintenance console 2 displays the completion of the setting of the information as to whether or not the SIP message is encrypted, the encryption rule, and the encryption range (at j13 in FIG. 32).

After the information as to whether or not the SIP message is encrypted, the encryption rule, and the encryption range is set to the SIP message encryption/decryption unit 16, if a request to transmit an SIP request message to the client apparatus 3-1 is generated in the server apparatus 1 (at j27 in FIG. 32), the SIP message forming unit 14 creates the SIP request message and transmits the created SIP request message to the SIP message encryption/decryption unit 16 (at j28 in FIG. 32). According to the current setting of the information as to whether or not the SIP message is encrypted, the encryption rule, and the encryption range, if encryption of the SIP message is set (at j29 in FIG. 32), the SIP message encryption/decryption unit 16 encrypts the created SIP request message in the encryption range according to the encryption rule (at j30 in FIG. 32). The server apparatus 1 transmits the encrypted SIP request message to the SIP interface unit 33 of the client apparatus 3-1 via the SIP interface unit 13 (at j31 in FIG. 33).

After the information as to whether or not the SIP message is encrypted, the encryption rule, and the encryption range is set to the SIP message encryption/decryption unit 36, if the SIP interface unit 33 receives the encrypted SIP request message from the server apparatus 1, the SIP interface unit 33 transfers the received SIP request message to the SIP message encryption/decryption unit 36. According to the current setting of the information as to whether or not the SIP message is encrypted, the encryption rule, and the encryption range, if encryption of the SIP message is set (at j44 in FIG. 33), the SIP message encryption/decryption unit 36 decrypts the SIP request message in the encryption range according to the encryption rule (at j45 in FIG. 33).

The SIP message analyzing unit 35 analyzes the decrypted SIP request message, and the call controller 37 executes a call control according to a content of the message (at j46 in FIG. 33). According to a result of the call control, the call controller 37 instructs the SIP message forming unit 34 to create an SIP response message (at j47 in FIG. 33). The SIP message forming unit 34 creates the SIP response message and transmits the created SIP response message to the SIP message encryption/decryption unit 36. According to the current setting of the information as to whether or not the SIP message is encrypted, the encryption rule, and the encryption range, if encryption of the SIP message is set (at j48 in FIG. 33), the SIP message encryption/decryption unit 36 encrypts the SIP response message in the encryption range according to the encryption rule (at j49 in FIG. 33). The client apparatus 3-1 transmits the encrypted SIP response message to the SIP interface unit 13 of the server apparatus 1 via the SIP interface unit 33 (at j50 in FIG. 33).

Upon receiving the encrypted SIP response message, the SIP interface unit 13 of the server apparatus 1 transmits the received SIP response message to the SIP message encryption/decryption unit 16. According to the current setting of the information as to whether or not the SIP message is encrypted, the encryption rule, and the encryption range, if encryption of the SIP message is set (at j32 in FIG. 33), the SIP message encryption/decryption unit 16 decrypts the SIP response message in the encryption range according to the encryption rule (at j33 in FIG. 33). The SIP message analyzing unit 15 analyzes the decrypted SIP response message, and the call controller 17 executes a call control according to a content of the message (at j34 in FIG. 33).

Conversely, if a request to transmit an SIP request message to the server apparatus 1 is generated in the client apparatus 3-1 (at j51 in FIG. 33), the SIP message forming unit 34 creates the SIP request message and transmits the created SIP request message to the SIP message encryption/decryption unit 36. According to the current setting of the information as to whether or not the SIP message is encrypted, the encryption rule, and the encryption range, if encryption of the SIP message is set (at j52 in FIG. 33 or at j53 in FIG. 34), the SIP message encryption/decryption unit 36 encrypts the SIP request message in the encryption range according to the encryption rule (at j54 in FIG. 34). The client apparatus 3-1 transmits the encrypted SIP request message to the SIP interface unit 13 of the server apparatus 1 via the SIP interface unit 33 (at j55 in FIG. 34).

If the SIP interface unit 13 receives the encrypted SIP request message from the client apparatus 3-1, the SIP interface unit 13 transfers the received SIP request message to the SIP message encryption/decryption unit 16. According to the current setting of the information as to whether or not the SIP message is encrypted, the encryption rule, and the encryption range, if encryption of the SIP message is set (at j35 in FIG. 34), the SIP message encryption/decryption unit 16 decrypts the SIP request message in the encryption range according to the encryption rule (at j36 in FIG. 34).

The SIP message analyzing unit 15 analyzes the decrypted SIP request message, and the call controller 17 executes a call control according to a content of the message (at j37 in FIG. 34). According to a result of the call control, the call controller 17 instructs the SIP message forming unit 14 to create an SIP response message (at j38 in FIG. 34). The SIP message forming unit 14 creates the SIP response message and transmits the created SIP response message to the SIP message encryption/decryption unit 16. According to the current setting of the information as to whether or not the SIP message is encrypted, the encryption rule, and the encryption range, if encryption of the SIP message is set (at j39 in FIG. 34), the SIP message encryption/decryption unit 16 encrypts the SIP response message in the encryption range according to the encryption rule (at j3a in FIG. 34). The server apparatus 1 transmits the encrypted SIP response message to the SIP interface unit 33 of the client apparatus 3-1 via the SIP interface unit 13 (at j3b in FIG. 34).

Upon receiving the encrypted SIP response message, the SIP interface unit 33 of the client apparatus 3-1 transmits the received SIP response message to the SIP message encryption/decryption unit 36. According to the current setting of the information as to whether or not the SIP message is encrypted, the encryption rule, and the encryption range, if encryption of the SIP message is set (at j56 in FIG. 34), the SIP message encryption/decryption unit 36 decrypts the SIP response message in the encryption range according to the encryption rule (at j57 in FIG. 34). The SIP message analyzing unit 35 analyzes the decrypted SIP response message, and the call controller 37 executes a call control according to a content of the message (at j58 in FIG. 34).

In this manner, according to the tenth embodiment, a maintenance person can arbitrarily set whether or not the SIP message is encrypted via the server apparatus 1. Due to this, if the maintenance person sets the encryption of the SIP message, then it is possible to realize an encryption security function on the network and different settings can be made of the encryption rule according to the network configurations. In addition, if, for example, an SIP message log is recorded for maintenance operation, it is possible to easily set no encryption, thereby making it possible to facilitate management by the maintenance personnel.

Moreover, according to the tenth embodiment, the function of selecting encryption or non-encryption of the SIP message enables ensuring compatibility with the client apparatus 3-1 that does not include the encryption function. Further, according to the tenth embodiment, in the system supporting both encryption of the SIP message in the entire encryption range and encryption of the SIP message in an arbitrary range, the local maintenance console 2 can arbitrarily select the encryption range. It is therefore possible to satisfy both strong encryption security and high network functionality in the system in which the network apparatus such as the SIP-NAT is present, and to select and realize an optimum security level for the current network configuration.

Further, by encrypting the SIP message, according to the tenth embodiment, the encryption security function on the network can be realized, different settings can be made of the encryption rule according to the network configurations, and the encryption security can be strengthened.

According to the tenth embodiment, the server apparatus 1 sets the encryption information to the client apparatus 3-1, thereby making it possible to realize system integrity and facilitate management by the maintenance personnel. Furthermore, according to the tenth embodiment, a new encryption rule can be used without adding or developing an interface for selecting the encryption rule if the encryption rule operable in the system is to be added in the future. Therefore, it is possible to minimize change in the maintenance interface and to facilitate development.

The advantages deriving from the SIP message encryption function using the set the information as to whether or not the SIP message is encrypted, the encryption rule, and the encryption range according to the tenth embodiment are similar to those according to the first to ninth embodiments of the present invention. While operations performed by the client apparatuses 3-2 and 3-3 are not described herein, the same advantages as those when using the client apparatus 3-1 can be exhibited.

Eleventh Embodiment

Figure 35:
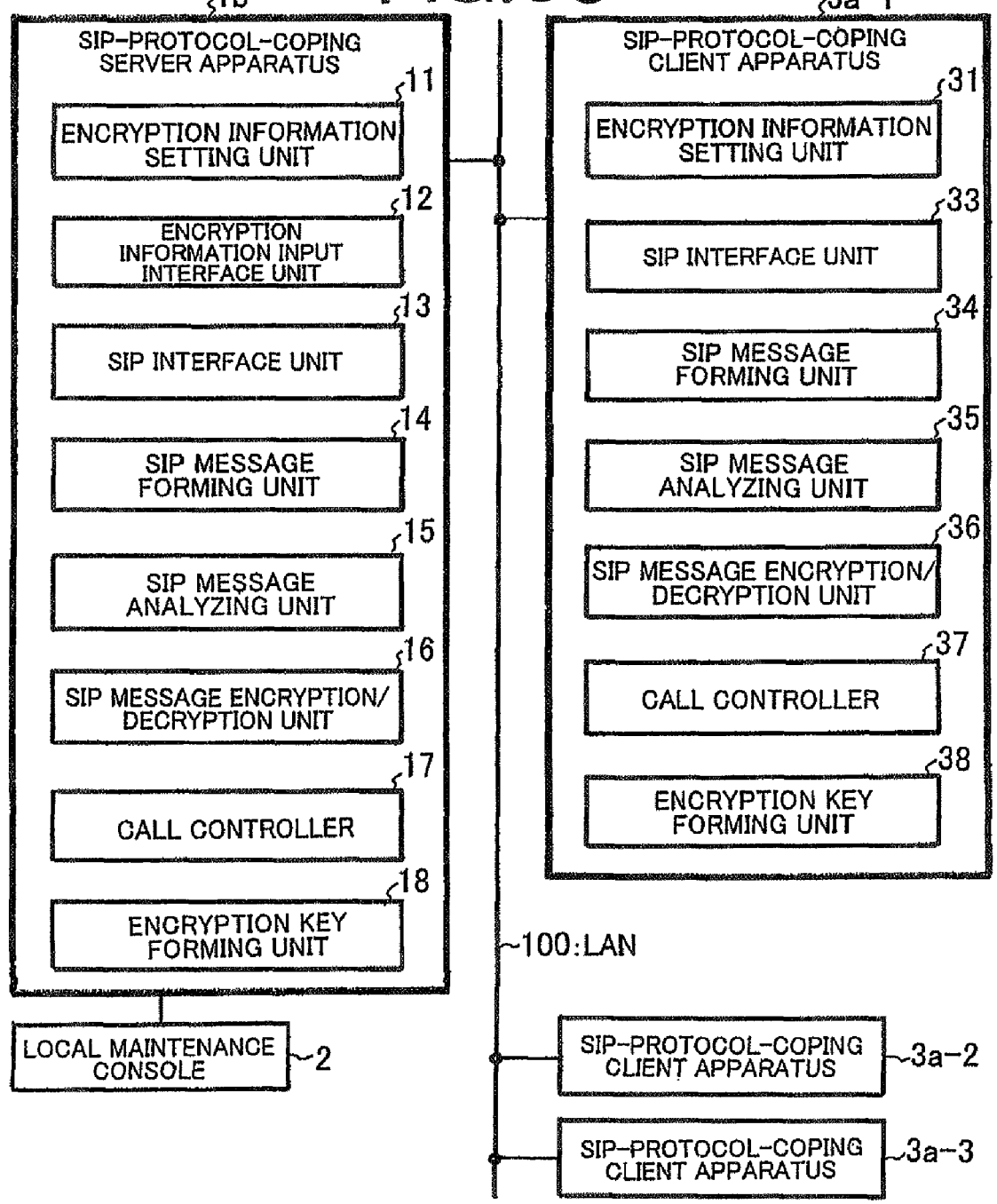
FIG. 35 is a block diagram showing a configuration of a client server distributed system according to an eleventh embodiment of the present invention.

FIG. 35 is a block diagram showing a configuration of a client server distributed system according to an eleventh embodiment of the present invention. In FIG. 35, the client server distributed system according to the eleventh embodiment of the present invention is the same in configuration as the client server distributed system according to the fourth embodiment of the present invention shown in FIG. 13 except for the following respects.

Encryption key forming units 18 and 38 are provided in a server apparatus 1b and each of client apparatuses 3a-1 to 3a-3, respectively (note that the encryption key forming units 38 of the client apparatuses 3a-2 and 3a-3 are not shown in FIG. 35). In FIG. 35, the same constituent elements are denoted by the same reference symbols as those shown in FIG. 13. Further, the same constituent elements operate similarly to those according to the fourth embodiment of the present invention.

According to the eleventh embodiment, by configuring the client server distributed system as stated above, it is possible to encrypt an SIP message and to strengthen the security for SIP message control on the IP network during the communication between the server apparatus 1b and each of the client apparatuses 3a-1 to 3a-3.

FIGS. 36 to 39 are sequence charts showing operation performed by the client server distributed system according to the eleventh embodiment of the present invention. Referring to FIGS. 35 to 39, the operation performed by the client server distributed system according to the eleventh embodiment of the present invention will be described. It is to be noted that processings performed by the server apparatus 1b and those performed by the client apparatus 3a-1 shown in FIGS. 36 to 39 are realized by causing CPUs of the server apparatus 1b and the client apparatus 3a-1 to execute programs, respectively.

Figure 36:
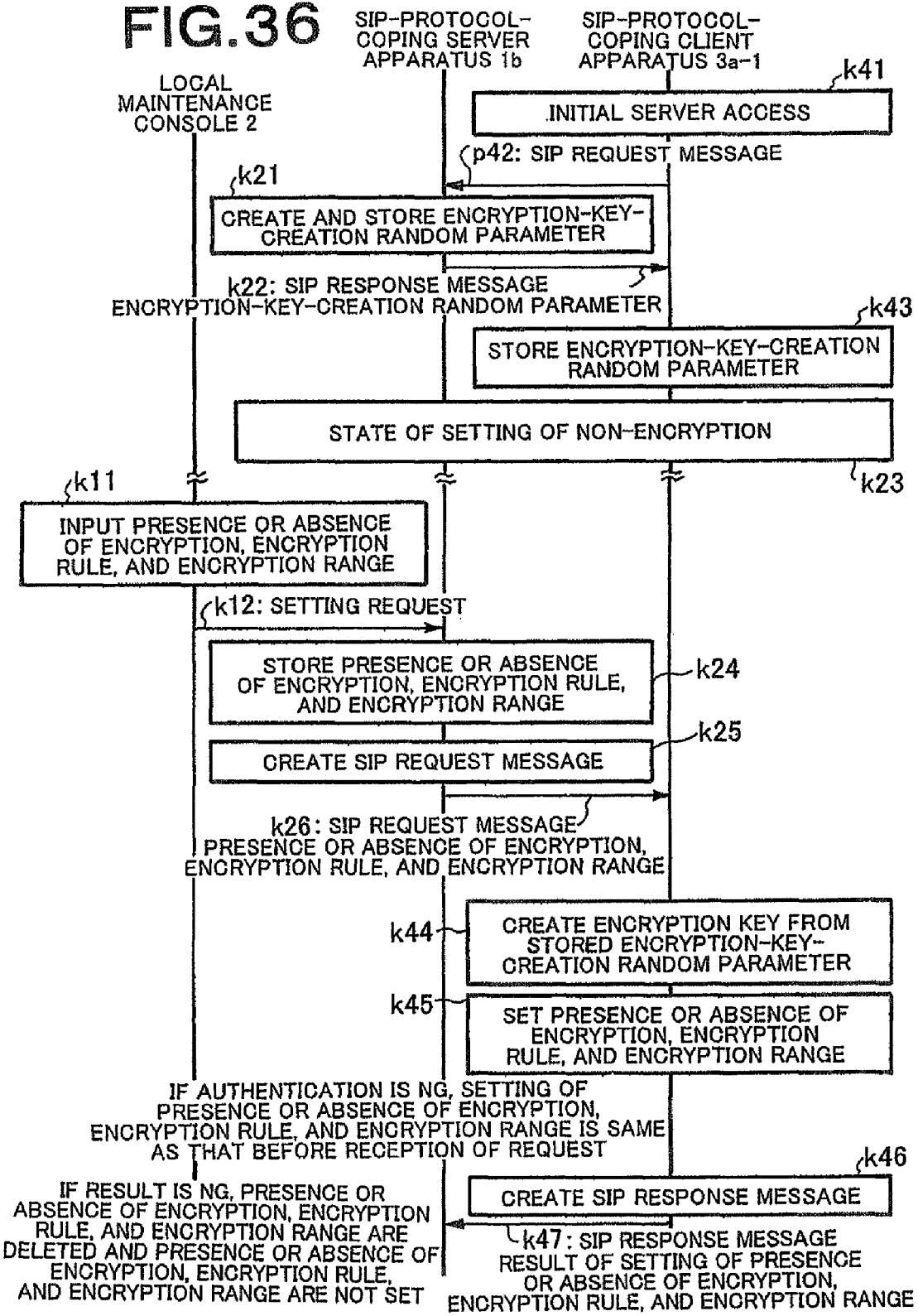
FIG. 36 is a sequence chart showing operation performed by the client server distributed system according to the eleventh embodiment of the present invention.

When an initial server access request to the server apparatus 1b is generated in the client apparatus 3a-1 (at k41 in FIG. 36), the SIP message forming unit 34 of the client apparatus 3a-1 creates an SIP request message and transmits the created SIP request message to the SIP interface unit 13 of the server apparatus 1b via the SIP interface unit 33 (at k42 in FIG. 36).

The SIP interface unit 13 of the server apparatus 1b receiving the SIP request message acknowledges the initial access from the client apparatus 3a-1, and transmits the SIP request message to the encryption information setting unit 11. The encryption information setting unit 11 creates and stores therein an encryption-key-creation random parameter used to encrypt an SIP message between the server apparatus 1b and the client apparatus 3a-1 (at k21 in FIG. 36). Further, the encryption information setting unit 11 instructs the SIP message forming unit 14 to create an SIP response message to which the encryption-key-creation random parameter is added. The SIP message forming unit 14 creates the SIP response message and transmits the created SIP response message to the SIP interface unit 33 of the client apparatus 3a-1 via the SIP interface unit 13 (at k22 in FIG. 36).

Upon receiving the SIP response message to which the encryption-key-creation random parameter is added, the SIP interface unit 33 of the client apparatus 3a-1 transmits the received encryption-key-creation random parameter to the encryption information setting unit 31. The encryption information setting unit 31 stores therein the encryption-key-creation random parameter (at k43 in FIG. 36).

In a state in which a setting of non-encryption is made between the server apparatus 1b and the client apparatus 3a-1 (at k23 in FIG. 36), when presence or absence of encryption, an encryption rule, and an encryption range of the SIP message during transmission or reception of the SIP message between the server apparatus 1b and the client apparatus 3a-1 is input from the local maintenance console 2 connected to the server apparatus 1b to the server apparatus 1b (at k11 in FIG. 36), the encryption information input interface unit 12 receives a setting request including the input information as to whether the SIP message is encrypted, the encryption rule, and the encryption range (at k12 in FIG. 36). If confirming normality of the setting request, the encryption information input interface unit 12 transmits the information as to whether the SIP message is encrypted, the encryption rule, and the encryption range to the encryption information setting unit 11. The encryption information setting unit 11 stores therein the information as to whether the SIP message is encrypted, the encryption rule, and the encryption range (at k24 in FIG. 36).

The encryption information setting unit 11 of the server apparatus 1*b* instructs the SIP message forming unit 14 to create an SIP request message including the information as to whether or not the SIP message is encrypted, the encryption rule, and the encryption range (at k25 in FIG. 36). The SIP message forming unit 14 creates the SIP request message, and transmits the created SIP request message to the SIP interface unit 33 of the client apparatus 3*a*-1 via the SIP interface unit 13 (at k26 FIG. 36).

When the SIP interface unit 33 of the client apparatus 3*a*-1 receives the SIP request message including the information as to whether or not the SIP message is encrypted, the encryption rule, and the encryption range, the SIP interface unit 33 transmits the received SIP request message to the SIP message analyzing unit 35. If the SIP message analyzing unit 35 can confirm the normality of the information as to whether or not the SIP message is encrypted, the encryption rule, and the encryption range, the SIP message analyzing unit 35 transmits the information as to whether or not the SIP message is encrypted, the encryption rule, and the encryption range to the encryption information setting unit 31. The encryption information setting unit 31 stores therein the information as to whether or not the SIP message is encrypted, the encryption rule, and the encryption range, and causes the encryption key forming unit 38 to generate an encryption key from the encryption-key-creation random parameter stored in the encryption information setting unit 31 (at k44 in FIG. 36). Further, the encryption information setting unit 31 sets the information as to whether or not the SIP message is encrypted, the encryption rule, and the encryption range, and the encryption key to the SIP message encryption/decryption unit 36 (at k45 in FIG. 36).

After completing setting, the encryption information setting unit 31 instructs the SIP message forming unit 34 to create an SIP response message for notification of completion of the setting of the information as to whether or not the SIP message is encrypted, the encryption rule, and the encryption range (at k46 in FIG. 36). The SIP message forming unit 34 creates the SIP response message, and transmits the created SIP response message to the SIP interface unit 13 of the server apparatus 1*b* via the SIP interface unit 33 (at k47 in FIG. 36).

Upon receiving the SIP response message for notification of the completion of the setting of the information as to whether or not the SIP message is encrypted, the encryption rule, and the encryption range, the SIP interface unit 13 of the server apparatus 1*b* transmits the received SIP response message to the SIP message analyzing unit 15. The SIP message analyzing unit 15 transmits the notification of the completion of the setting of the information as to whether or not the SIP message is encrypted, the encryption rule, and the encryption range on the SIP protocol-compliant client apparatus 3*a*-1 side to the encryption information setting unit 11. The encryption information setting unit 11 acknowledges the completion of the setting of the information as to whether or not the SIP message is encrypted, the encryption rule, and the encryption range, and causes the encryption key forming unit 18 to create an encryption key from the encryption-key-creation random parameter stored in the encryption information setting unit 11 (at k27 in FIG. 37). Further, the encryption information setting unit 11 sets the information as to whether or not the SIP message is encrypted, the encryption rule, and the encryption range, and the encryption key to the SIP message encryption/decryption unit 16 (at k28 in FIG. 37).

Figure 37:
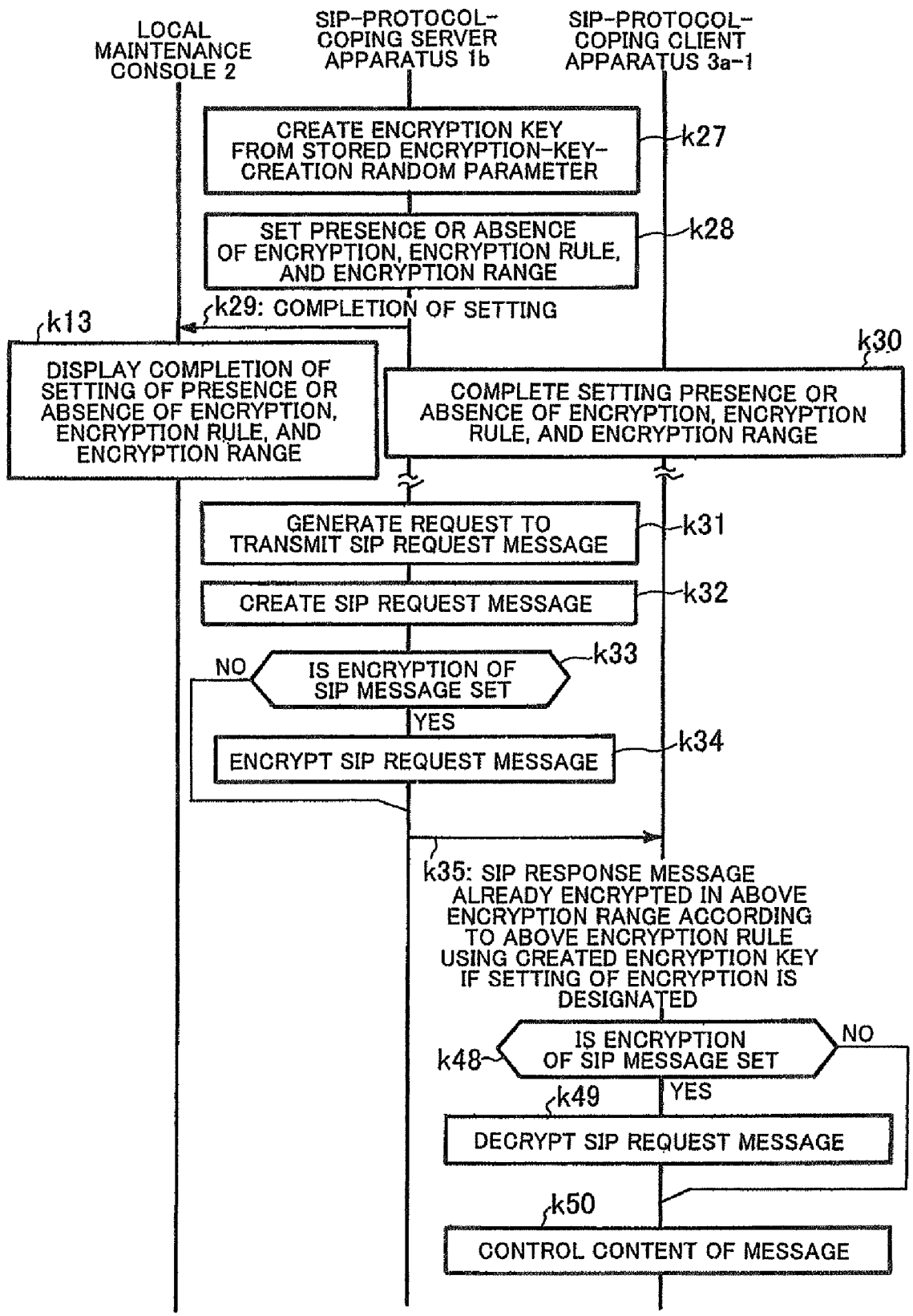
FIG. 37 is a sequence chart showing operation performed by the client server distributed system according to the eleventh embodiment of the present invention.
Figure 38:
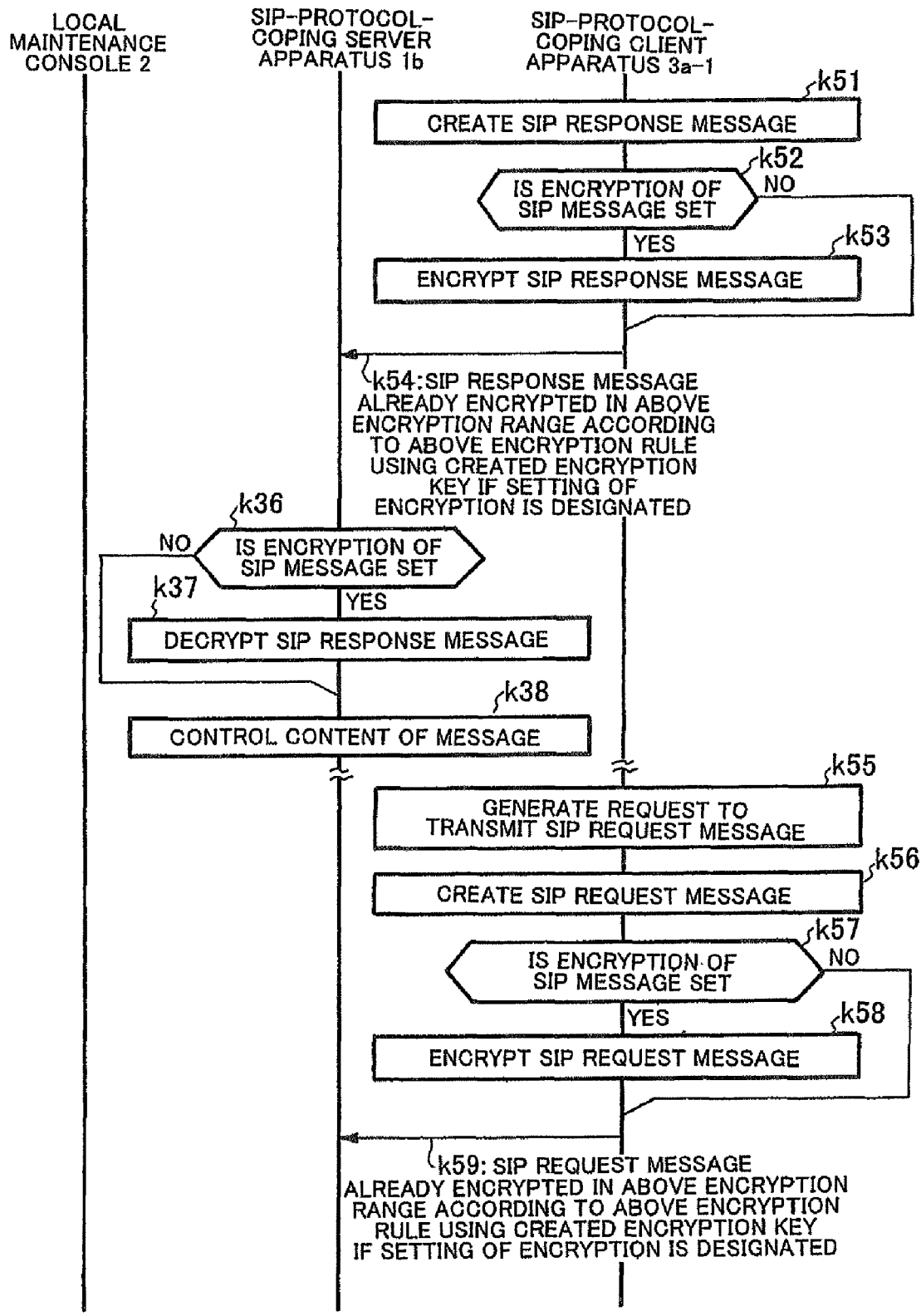
FIG. 38 is a sequence chart showing operation performed by the client server distributed system according to the eleventh embodiment of the present invention.

After completion of the setting, the encryption information setting unit 11 transmits a notification of the completion of the setting to the local maintenance console 2 via the encryption information input interface unit 12 (at k29 in FIG. 37). The local maintenance console 2 displays the completion of the setting of the information as to whether or not the SIP message is encrypted, the encryption rule, and the encryption range (at k13 in FIG. 37).

After the information as to whether or not the SIP message is encrypted, the encryption rule, and the encryption range, and the encryption key are set to the SIP message encryption/decryption unit 16, if a request to transmit an SIP request message to the client apparatus 3*a*-1 is generated in the server apparatus 1*b* (at k31 in FIG. 37), the SIP message forming unit 14 creates the SIP request message and transmits the created SIP request message to the SIP message encryption/decryption unit 16 (at k32 in FIG. 37).

According to the current setting of the information as to whether or not the SIP message is encrypted, the encryption rule, the encryption range, and the encryption key, if encryption of the SIP message is set (at k33 in FIG. 37), the SIP message encryption/decryption unit 16 encrypts the SIP request message in the encryption range according to the encryption rule and encryption key (at k34 in FIG. 37). The server apparatus 1*b* transmits the encrypted SIP request message to the SIP interface unit 33 of the client apparatus 3*a*-1 via the SIP interface unit 13 (at k35 in FIG. 37).

After the information as to whether or not the SIP message is encrypted, the encryption rule, and the encryption range is set to the SIP message encryption/decryption unit 36, if the SIP interface unit 33 receives the encrypted SIP request message from the server apparatus 1*b*, the SIP interface unit 33 transfers the received SIP request message to the SIP message encryption/decryption unit 36. According to the current setting of the information as to whether or not the SIP message is encrypted, the encryption rule, and the encryption range, if encryption of the SIP message is set (at k48 in FIG. 37), the SIP message encryption/decryption unit 36 decrypts the SIP request message in the encryption range according to the encryption rule (at k49 in FIG. 37).

The SIP message analyzing unit 35 analyzes the decrypted SIP request message, and the call controller 37 executes a call control according to a content of the message (at k50 in FIG. 37). According to a result of the call control, the call controller 37 instructs the SIP message forming unit 34 to create an SIP response message (at k51 in FIG. 38). The SIP message forming unit 34 creates the SIP response message and transmits the created SIP response message to the SIP message encryption/decryption unit 36. According to the current setting of the information as to whether or not the SIP message is encrypted, the encryption rule, and the encryption range, if encryption of the SIP message is set (at k52 in FIG. 38), the SIP message encryption/decryption unit 36 encrypts the SIP response message in the encryption range according to the encryption rule (at k53 in FIG. 38). The client apparatus 3*a*-1 transmits the encrypted SIP response message to the SIP interface unit 13 of the server apparatus 1*b* via the SIP interface unit 33 (at k54 in FIG. 38).

Upon receiving the encrypted SIP response message, the SIP interface unit 13 of the server apparatus 1*b* transmits the received SIP response message to the SIP message encryption/decryption unit 16. According to the current setting of the information as to whether or not the SIP message is encrypted, the encryption rule, and the encryption range, if encryption of the SIP message is set (at k36 in FIG. 38), the SIP message encryption/decryption unit 16 decrypts the SIP response message in the encryption range according to the encryption rule (at k37 in FIG. 38). The SIP message analyzing unit 15 analyzes the decrypted SIP response message, and the call controller 17 executes a call control according to a content of the message (at k38 in FIG. 38).

Conversely, if a request to transmit an SIP request message to the server apparatus 1b is generated in the client apparatus 3a-1 (at k55 in FIG. 38), the SIP message forming unit 34 creates the SIP request message and transmits the created SIP request message to the SIP message encryption/decryption unit 36. According to the current setting of the information as to whether or not the SIP message is encrypted, the encryption rule, and the encryption range, if encryption of the SIP message is set (at k56 and k57 in FIG. 38), the SIP message encryption/decryption unit 36 encrypts the SIP request message in the encryption range according to the encryption rule (at k58 in FIG. 38). The client apparatus 3a-1 transmits the encrypted SIP request message to the SIP interface unit 13 of the server apparatus 1b via the SIP interface unit 33 (at k59 in FIG. 38).

If the SIP interface unit 13 receives the encrypted SIP request message from the client apparatus 3a-1, the SIP interface unit 13 transfers the received SIP request message to the SIP message encryption/decryption unit 16. According to the current setting of the information as to whether or not the SIP message is encrypted, the encryption rule, and the encryption range, if encryption of the SIP message is set (at k39 in FIG. 39), the SIP message encryption/decryption unit 16 decrypts the SIP request message in the encryption range according to the encryption rule (at k3a in FIG. 39).

Figure 39:
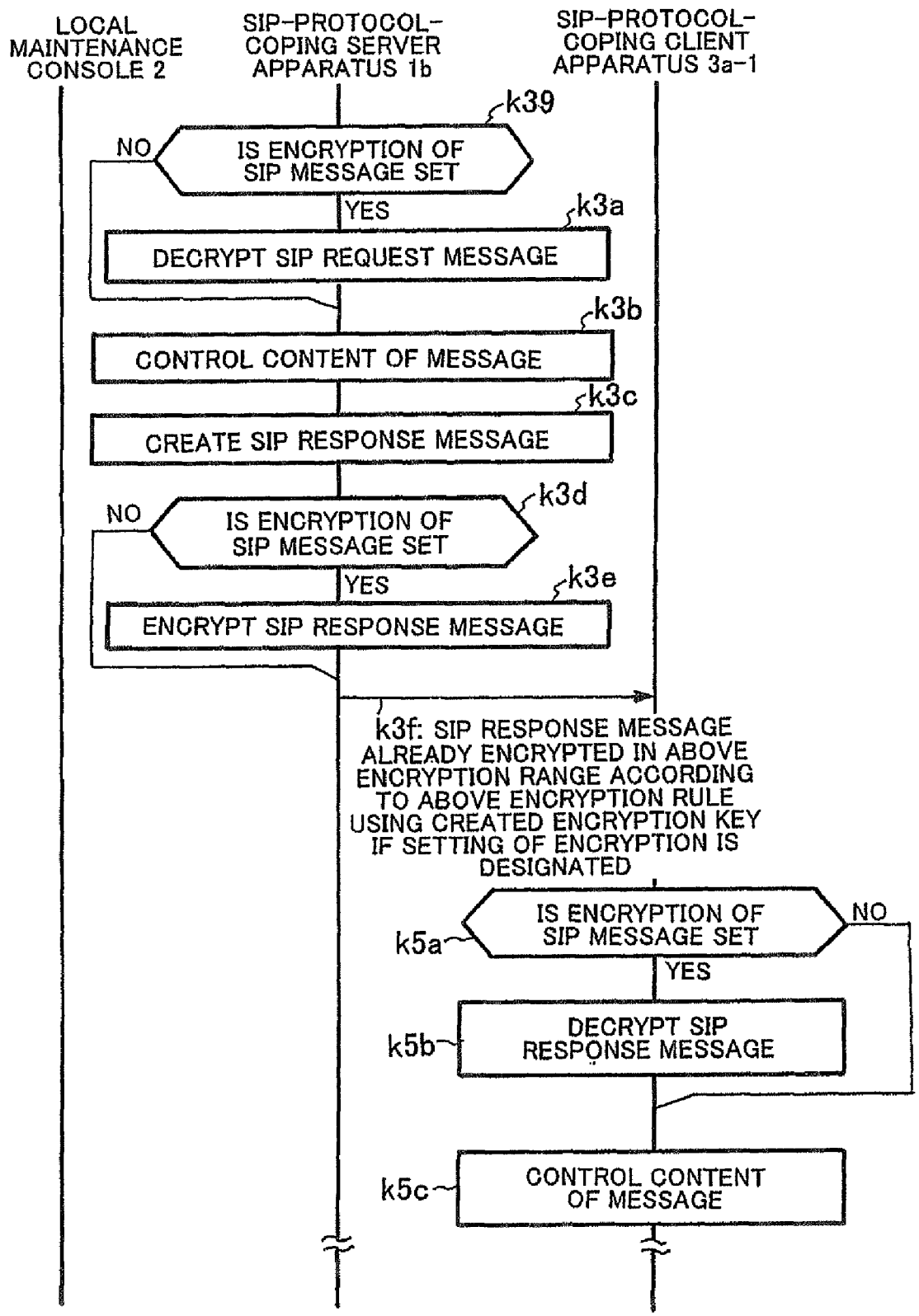
FIG. 39 is a sequence chart showing operation performed by the client server distributed system according to the eleventh embodiment of the present invention.

The SIP message analyzing unit 15 analyzes the decrypted SIP request message, and the call controller 17 executes a call control according to a content of the message (at k3b in FIG. 39). According to a result of the call control, the call controller 17 instructs the SIP message forming unit 14 to create an SIP response message (at k3c in FIG. 39). The SIP message forming unit 14 creates the SIP response message and transmits the created SIP response message to the SIP message encryption/decryption unit 16. According to the current setting of the information as to whether or not the SIP message is encrypted, the encryption rule, and the encryption range, if encryption of the SIP message is set (at k3d in FIG. 39), the SIP message encryption/decryption unit 16 encrypts the SIP response message in the encryption range according to the encryption rule (at k3e in FIG. 39). The server apparatus 1b transmits the encrypted SIP response message to the SIP interface unit 33 of the client apparatus 3a-1 via the SIP interface unit 13 (at k3f in FIG. 39).

Upon receiving the encrypted SIP response message, the SIP interface unit 33 of the client apparatus 3a-1 transmits the received SIP response message to the SIP message encryption/decryption unit 36. According to the current setting of the information as to whether or not the SIP message is encrypted, the encryption rule, and the encryption range, if encryption of the SIP message is set (at k5a in FIG. 39), the SIP message encryption/decryption unit 36 decrypts the SIP response message in the encryption range according to the encryption rule (at k5b in FIG. 39). The SIP message analyzing unit 35 analyzes the decrypted SIP response message, and the call controller 37 executes a call control according to a content of the message (at k5c in FIG. 39).

In this manner, according to the eleventh embodiment, the system of transmitting and receiving the SIP message without encryption includes the function of transmitting the encryption information other than the encryption key from the server apparatus to the client apparatus without encrypting the encryption information other than the encryption key, and of enabling creating the encryption keys of the server apparatus and the client apparatus synchronously with each other to start an encryption function. Therefore, common encryption information can be set between the server apparatus and the client apparatus, thereby making it possible to strengthen the encryption security function without encrypting the encryption information other than the encryption key after the setting of the encryption information.

Furthermore, according to the eleventh embodiment, the advantages deriving from the SIP message encryption function using the set encryption information are similar to those according to the first to tenth embodiments of the present invention. According to the eleventh embodiment, the encryption keys are created using the random parameter decided at the time of the initial access from the client apparatus to the server apparatus. Due to this, it is possible to eliminate regularity of the encryption keys to be generated and also strengthen the encryption security function.

Moreover, according to the eleventh embodiment, the advantages deriving from the SIP message encryption function using the set information are similar to those according to the first to tenth embodiments of the present invention. While operations performed by the client apparatuses 3a-2 and 3a-3 are not described herein, the same advantages as those when using the client apparatus 3a-1 can be exhibited.

Twelfth Embodiment

Figure 40:
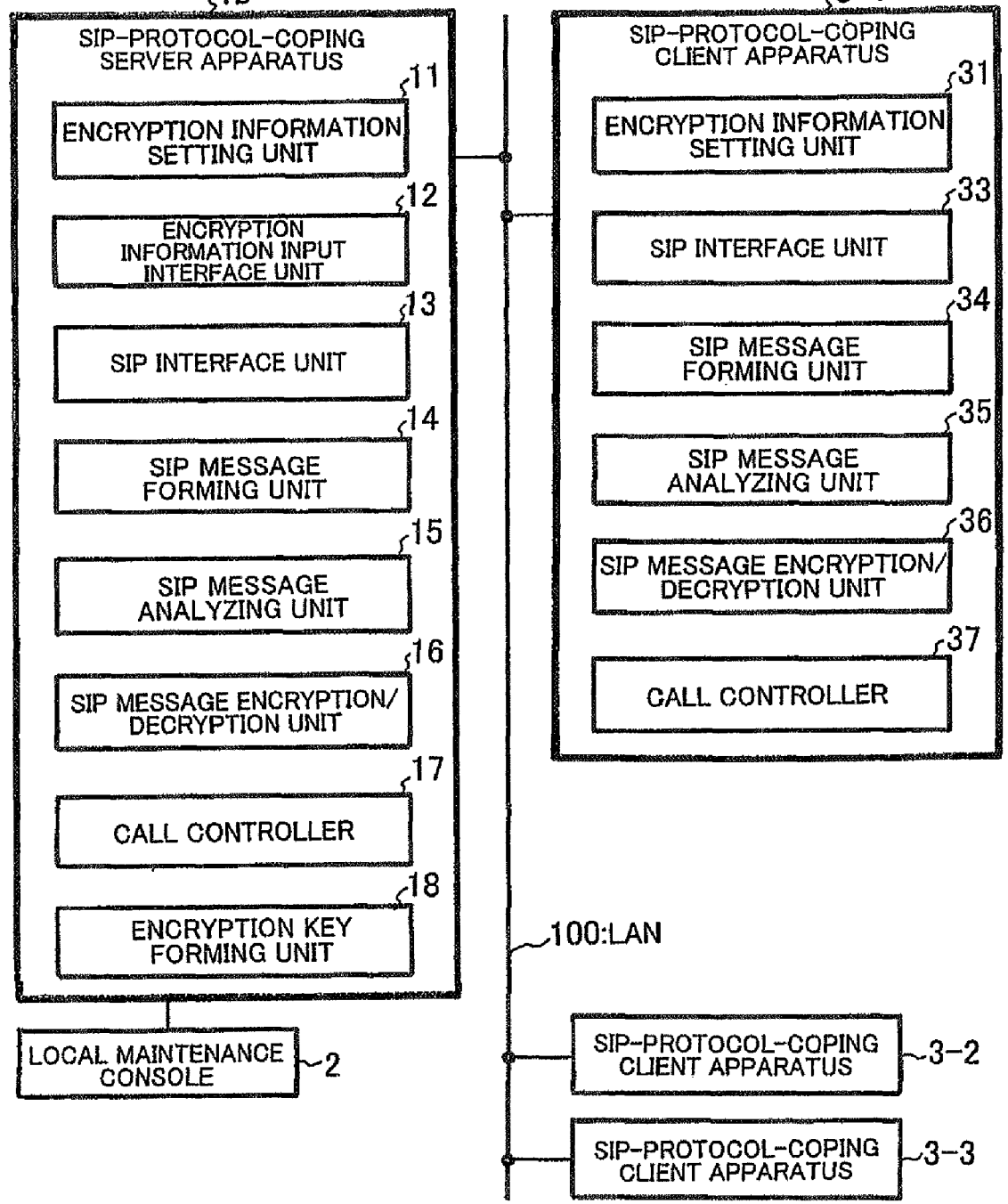
FIG. 40 is a block diagram showing a configuration of a client server distributed system according to a twelfth embodiment of the present invention.

FIG. 40 is a block diagram showing a configuration of a client server distributed system according to a twelfth embodiment of the present invention. In FIG. 40, the client server distributed system according to the twelfth embodiment of the present invention is the same in configuration as the client server distributed system according to the fourth embodiment of the present invention shown in FIG. 13 except that an encryption key forming unit 18 is provided in a server apparatus 1b. In FIG. 40, the same constituent elements are denoted by the same reference symbols as those shown in FIG. 13. Further, the same constituent elements operate similarly to those according to the fourth embodiment of the present invention.

It is to be noted that encryption information is already set to the server apparatus 1b and the client apparatuses 3-1 to 3-3, and that encryption and decryption processings are performed at the time of transmitting or receiving an SIP message in a state of a setting of encryption of the SIP message (hereinafter, also referred to as "old encryption information").

According to the twelfth embodiment, by configuring the client server distributed system as stated above, it is possible to encrypt the SIP message and to strengthen the security for SIP message control on the IP network during the communication between the server apparatus 1b and each of the client apparatuses 3-1 to 3-3.

FIGS. 41 to 44 are sequence charts showing operation performed by the client server distributed system according to the twelfth embodiment of the present invention. Referring to FIGS. 41 to 44, the operation performed by the client server distributed system according to the twelfth embodiment of the present invention will be described. It is to be noted that processings performed by the server apparatus 1b and those performed by the client apparatus 3-1 shown in FIGS. 41 to 44 are realized by causing CPUs of the server apparatus 1b and the client apparatus 3-1 to execute programs, respectively.

Figure 41:
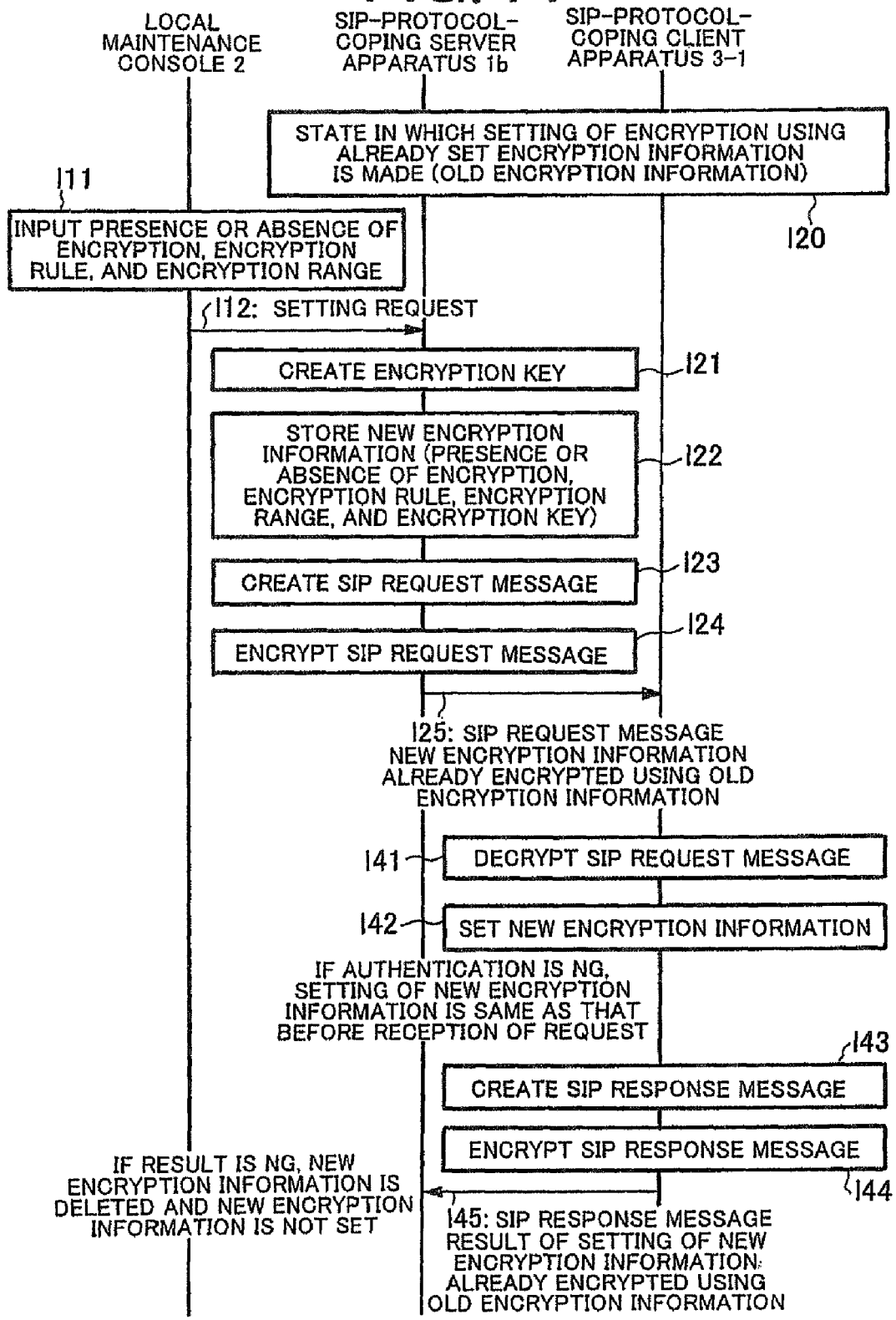
FIG. 41 is a sequence chart showing operation performed by the client server distributed system according to the twelfth embodiment of the present invention.

In a state in which a setting of encryption using already set encryption information is made between the server apparatus 1b and the client apparatus 3-1 (at l20 in FIG. 41), when presence or absence of encryption, an encryption rule, and an encryption range during transmission or reception of the SIP message between the server apparatus 1b and the client apparatus 3-1 is input from the local maintenance console 2 connected to the server apparatus 1b to the server apparatus 1b (at 111 in FIG. 41), the encryption information input interface unit 12 receives a setting request including the input information as to whether the SIP message is encrypted, the encryption rule, and the encryption range (at 112 in FIG. 41). If confirming normality of the setting request, the encryption information input interface unit 12 transmits the information as to whether the SIP message is encrypted, the encryption rule, and the encryption range to the encryption information setting unit 11.

The encryption information setting unit 11 instructs the encryption key forming unit 18 to create an encryption key used during transmission or reception of the SIP message to or from the client apparatus 3-1 (at 121 in FIG. 41). After the encryption key forming unit 18 creates the encryption key, the encryption information setting unit 11 stores therein the encryption key created by the encryption key forming unit 18 and the information as to whether the SIP message is encrypted, the encryption rule, and the encryption range (hereinafter, also referred to as "old encryption information") input from the local console 2 (at 122 in FIG. 41).

The encryption information setting unit 11 of the server apparatus 1b instructs the SIP message forming unit 14 to create an SIP request message including new information as to whether or not the SIP message is encrypted, the encryption rule, the encryption range, and the encryption key (hereinafter, "new encryption information") (at 123 in FIG. 41). The SIP message forming unit 14 creates the SIP request message, and transmits the created SIP request message to the SIP message encryption/decryption unit 16. The SIP message encryption/decryption unit 16 encrypts the SIP response message using the old encryption information (at 124 in FIG. 41). The encrypted SIP response message is transmitted to the SIP interface unit 33 of the client apparatus 3-1 via the SIP interface unit 13 (at 125 in FIG. 41).

When the SIP interface unit 33 of the client apparatus 3-1 receives the SIP request message, the SIP interface unit 33 transmits the received SIP request message to the SIP message encryption/decryption unit 36. The SIP message encryption/decryption unit 36 decrypts the SIP request message (at 141 in FIG. 41). The decrypted SIP request message is transmitted to the SIP message analyzing unit 35. If the SIP message analyzing unit 35 can confirm the normality of the new encryption information, the SIP message analyzing unit 35 transmits the new encryption information to the encryption information setting unit 31.

The encryption information setting unit 31 stores therein the new encryption information, and sets the new encryption information to the SIP message encryption/decryption unit 36 (at 142 in FIG. 41). After completing setting, the encryption information setting unit 31 instructs the SIP message forming unit 34 to create an SIP response message for notification of completion of the setting of the new encryption information (at 143 in FIG. 41). The SIP message forming unit 34 creates the SIP response message, and transmits the created SIP response message to the SIP message encryption/decryption unit 36. The SIP message encryption/decryption unit 36 encrypts the SIP response message using the old encryption information (at 144 in FIG. 41). The encrypted SIP response message is transmitted to the SIP interface unit 13 of the server apparatus 1b via the SIP interface unit 33 (at 145 in FIG. 41).

Figure 42:
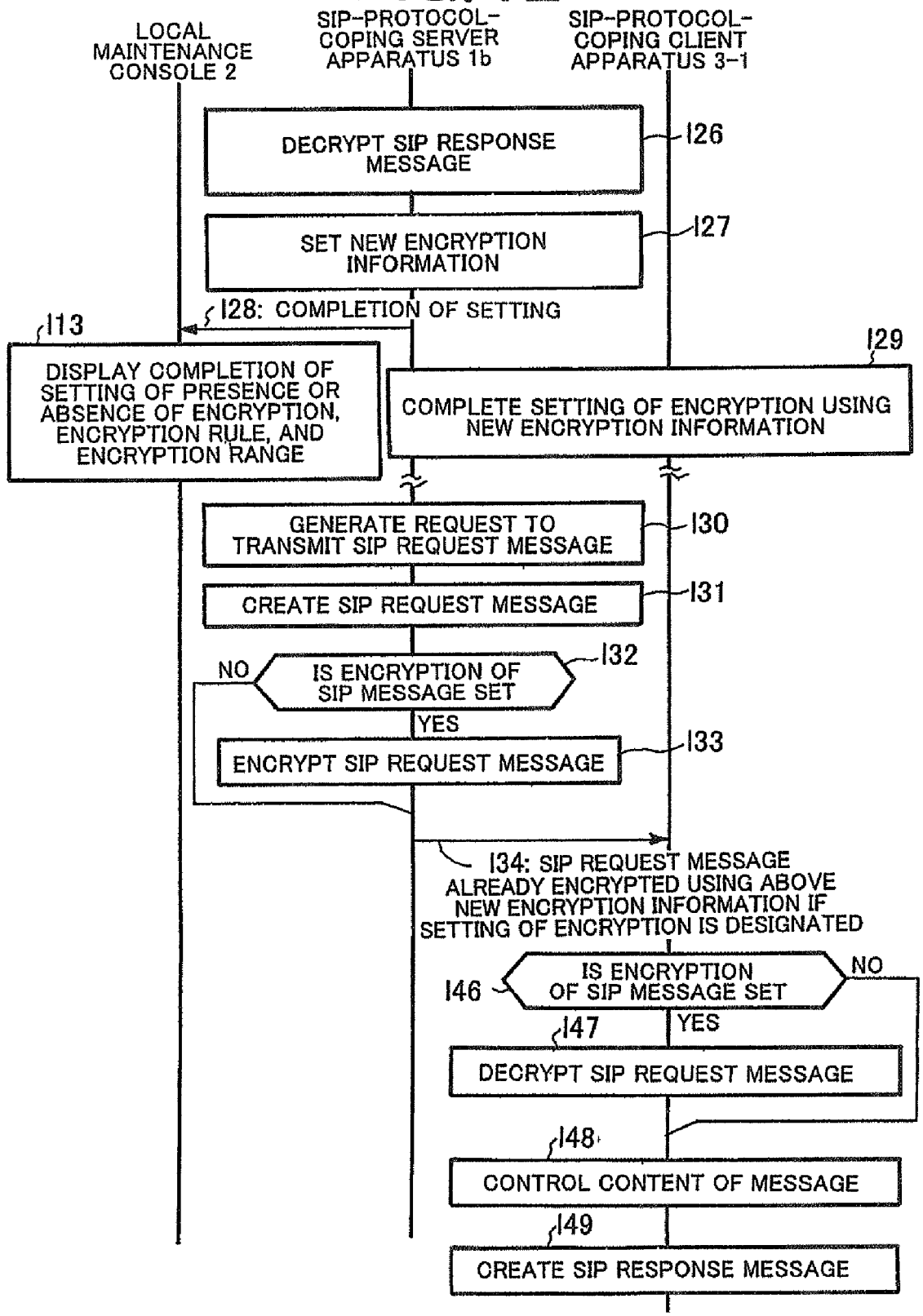
FIG. 42 is a sequence chart showing operation performed by the client server distributed system according to the twelfth embodiment of the present invention.
Figure 43:
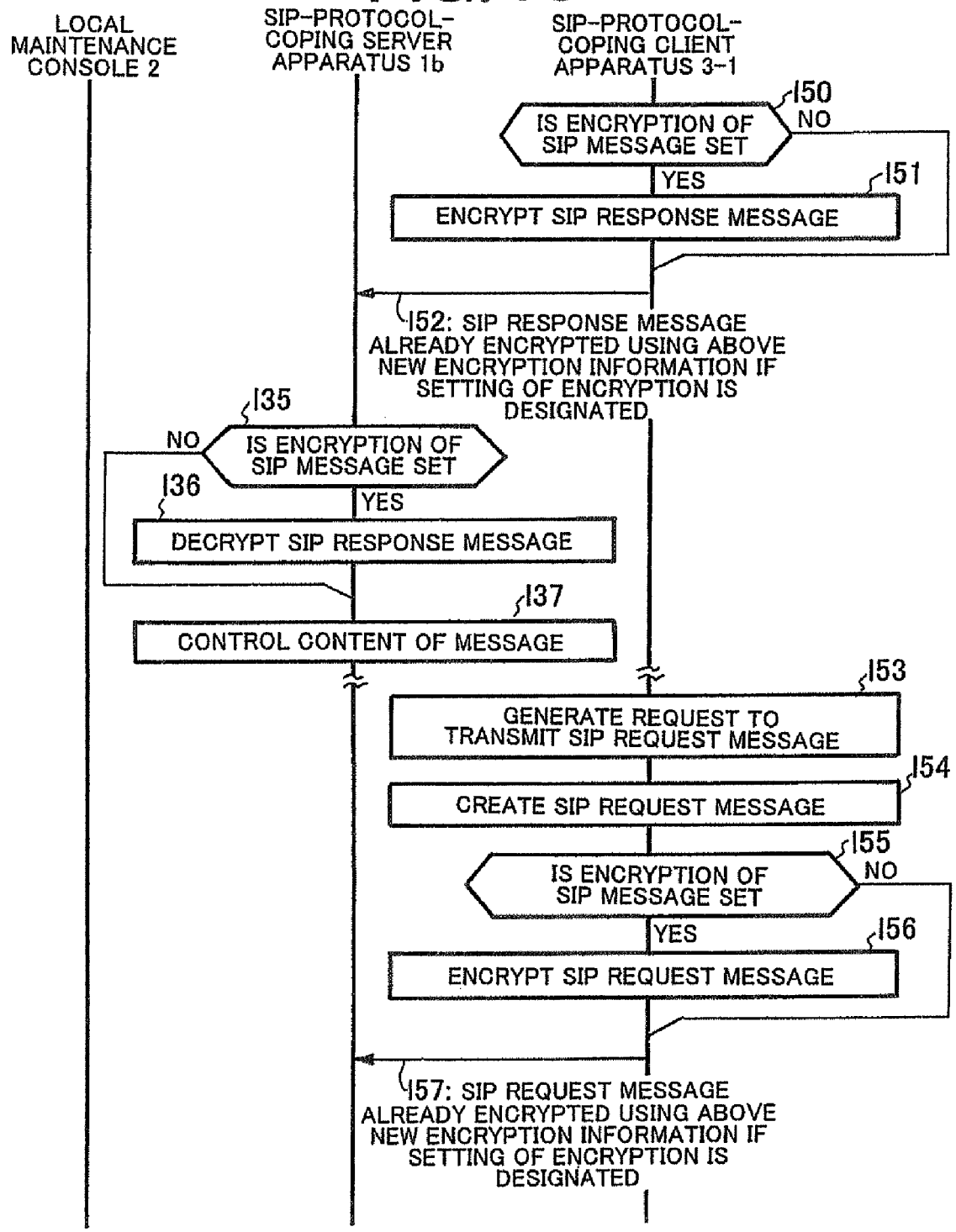
FIG. 43 is a sequence chart showing operation performed by the client server distributed system according to the twelfth embodiment of the present invention.

Upon receiving the SIP response message for notification of the completion of the setting of the new encryption information, the SIP interface unit 13 of the server apparatus 1b instructs the SIP message encryption/decryption unit 16 to decrypt the SIP response message (at 126 in FIG. 42). The SIP message encryption/decryption unit 16 decrypts the SIP response message and transmits the decrypted SIP response message to the SIP message analyzing unit 15. The SIP message analyzing unit 15 transmits the notification of the completion of the setting of the new encryption information on the client apparatus 3-1 side to the encryption information setting unit 11. The encryption information setting unit 11 acknowledges the completion of the setting of the new encryption information, and sets the new encryption information to the SIP message encryption/decryption unit 16 (at 127 in FIG. 42). After completion of the setting, a notification of the completion of the setting of the new encryption information is transmitted to the local maintenance console 2 via the encryption information input interface unit 12 (at 128 in FIG. 42). The local maintenance console 2 displays the completion of the setting of the information as to whether or not the SIP message is encrypted, the encryption rule, and the encryption range (or new encryption information) (at 113 in FIG. 42).

After the new encryption information is set to the SIP message encryption/decryption unit 16, if a request to transmit an SIP request message to the client apparatus 3-1 is generated in the server apparatus 1b (at 130 in FIG. 42), the SIP message forming unit 14 creates the SIP request message and transmits the created SIP request message to the SIP message encryption/decryption unit 16 (at 131 in FIG. 42). According to the setting of the new encryption information (information as to whether or not the SIP message is encrypted, the encryption rule, the encryption range, and the encryption key), if encryption of the SIP message is set (at 132 in FIG. 42), the SIP message encryption/decryption unit 16 encrypts the SIP request message in the encryption range using the encryption key according to the encryption rule (at 133 in FIG. 42). The server apparatus 1b transmits the encrypted SIP request message to the SIP interface unit 33 of the client apparatus 3-1 via the SIP interface unit 13 (at 134 in FIG. 42).

After the new encryption information is set to the SIP message encryption/decryption unit 36, if the SIP interface unit 33 receives the encrypted SIP request message from the server apparatus 1b, the SIP interface unit 33 transfers the received SIP request message to the SIP message encryption/decryption unit 36. According to the setting of the new encryption information (information as to whether or not the SIP message is encrypted, the encryption rule, the encryption range, and the encryption key), if encryption of the SIP message is set (at 146 in FIG. 42), the SIP message encryption/decryption unit 36 decrypts the SIP request message in the encryption range using the encryption key according to the encryption rule (at 147 in FIG. 42).

The SIP message analyzing unit 35 analyzes the decrypted SIP request message, and the call controller 37 executes a call control according to a content of the message (at 148 in FIG. 42). According to a result of the call control, the call controller 37 instructs the SIP message forming unit 34 to create an SIP response message (at 149 in FIG. 42). The SIP message forming unit 34 creates the SIP response message and transmits the created SIP response message to the SIP message encryption/decryption unit 36. According to the setting of the new encryption information, if encryption of the SIP message is set (at 150 in FIG. 43), the SIP message encryption/decryption unit 36 encrypts the SIP response message in the encryption range using the encryption key according to the encryption rule (at 151 in FIG. 43). The client apparatus 3-1 transmits the encrypted SIP response message to the SIP interface unit 13 of the server apparatus 1*b* via the SIP interface unit 33 (at 152 in FIG. 43).

Upon receiving the encrypted SIP response message, the SIP interface unit 13 of the server apparatus 1*b* transmits the received SIP response message to the SIP message encryption/decryption unit 16. According to the setting of the new encryption information, if encryption of the SIP message is set (at 135 in FIG. 43), the SIP message encryption/decryption unit 16 decrypts the SIP response message in the encryption range using the encryption key according to the encryption rule (at 136 in FIG. 43). The SIP message analyzing unit 15 analyzes the decrypted SIP response message, and the call controller 17 executes a call control according to a content of the message (at 137 in FIG. 43).

Conversely, if a request to transmit an SIP request message to the server apparatus 1*b* is generated in the client apparatus 3-1 (at 153 in FIG. 43), the SIP message forming unit 34 creates the SIP request message and transmits the created SIP request message to the SIP message encryption/decryption unit 36. According to the setting of the new encryption information, if encryption of the SIP message is set (at 154 and 155 in FIG. 43), the SIP message encryption/decryption unit 36 encrypts the SIP request message in the encryption range using the encryption key according to the encryption rule (at 156 in FIG. 43). The client apparatus 3-1 transmits the encrypted SIP request message to the SIP interface unit 13 of the server apparatus 1*b* via the SIP interface unit 33 (at 157 in FIG. 43).

If the SIP interface unit 13 receives the encrypted SIP request message from the client apparatus 3-1, the SIP interface unit 13 transfers the received SIP request message to the SIP message encryption/decryption unit 16. According to the setting of the new encryption information, if encryption of the SIP message is set (at 138 in FIG. 44), the SIP message encryption/decryption unit 16 decrypts the SIP request message in the encryption range using the encryption key according to the encryption rule (at 139 in FIG. 44).

Figure 44:
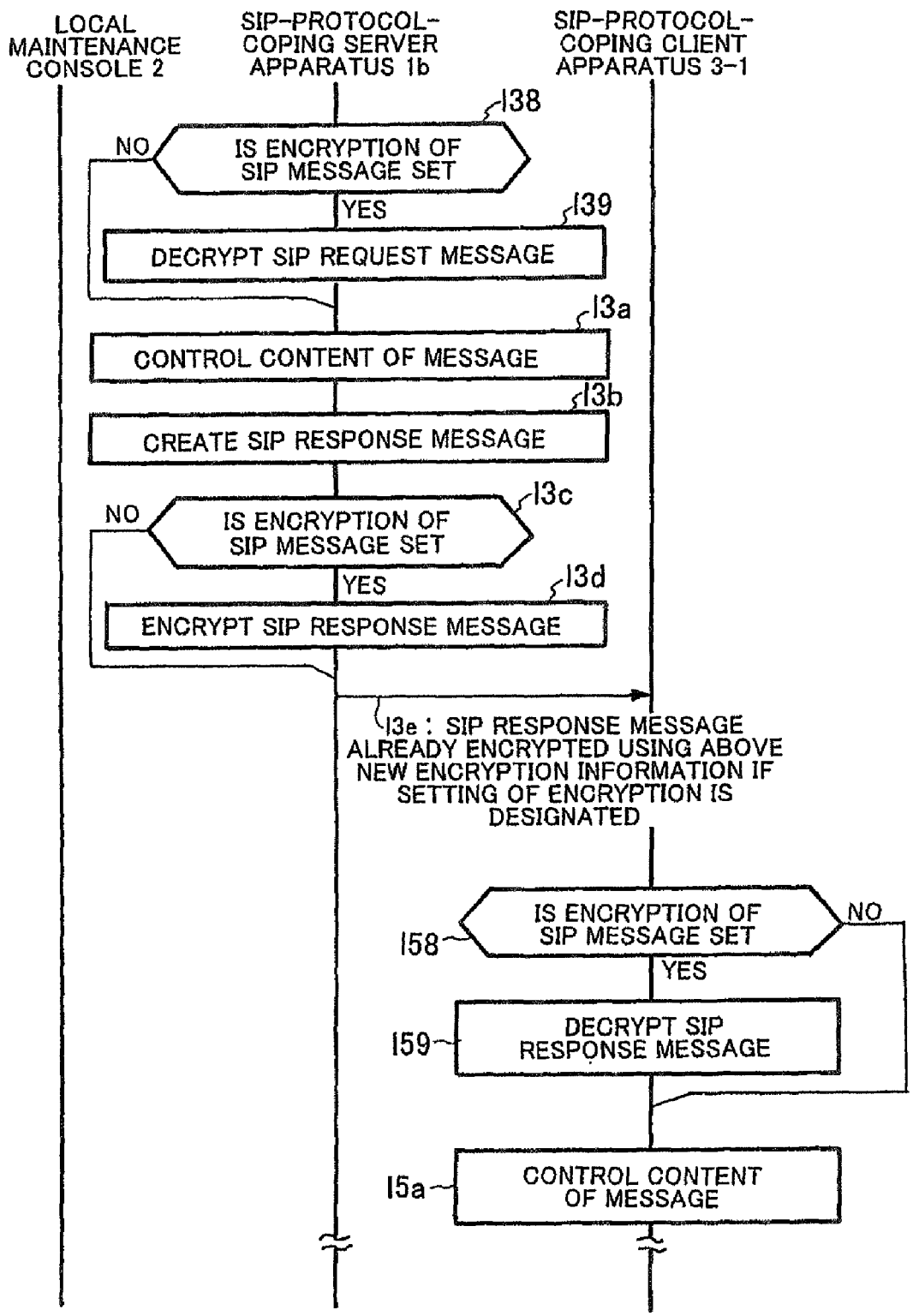
FIG. 44 is a sequence chart showing operation performed by the client server distributed system according to the twelfth embodiment of the present invention.

The SIP message analyzing unit 15 analyzes the decrypted SIP request message, and the call controller 17 executes a call control according to a content of the message (at 13*a* in FIG. 44). According to a result of the call control, the call controller 17 instructs the SIP message forming unit 14 to create an SIP response message (at 13*b* in FIG. 44). The SIP message forming unit 14 creates the SIP response message and transmits the created SIP response message to the SIP message encryption/decryption unit 16. According to the setting of the new encryption information, if encryption of the SIP message is set (at 13*c* in FIG. 44), the SIP message encryption/decryption unit 16 encrypts the SIP response message in the encryption range using the encryption key according to the encryption rule (at 13*d* in FIG. 44). The server apparatus 1*b* transmits the encrypted SIP response message to the SIP interface unit 33 of the client apparatus 3-1 via the SIP interface unit 13 (at 13*e* in FIG. 44).

Upon receiving the encrypted SIP response message, the SIP interface unit 33 of the client apparatus 3-1 transmits the received SIP response message to the SIP message encryption/decryption unit 36. According to the setting of the new encryption information, if encryption of the SIP message is set (at 158 in FIG. 44), the SIP message encryption/decryption unit 36 decrypts the SIP response message in the encryption range using the encryption key according to the encryption rule (at 159 in FIG. 44). The SIP message analyzing unit 35 analyzes the decrypted SIP response message, and the call controller 37 executes a call control according to a content of the message (at 15*a* in FIG. 44).

In this manner, according to the twelfth embodiment, in the system of transmitting and receiving the SIP message in the state of the setting of encryption, if encryption information is to be changed, the encryption information is transmitted after being encrypted using the encryption information already set between the client apparatus and the server apparatus. It is, therefore, possible to strengthen encryption security.

Furthermore, according to the twelfth embodiment, a maintenance person can arbitrarily set the encryption information other than the encryption key among the new set encryption information from the local maintenance console 2, and integrity can be ensured for system construction. Further, if the maintenance person is to log an SIP message communication state, the encryption information can be changed without encrypting it. It is, therefore, possible to ensure facilitating maintenance. Besides, according to the twelfth embodiment, the encryption information can be changed without using the same encryption key for long time at a timing arbitrarily set by the maintenance person. It is, therefore, possible to strengthen security against hacking of the encryption information.

Moreover, according to the twelfth embodiment, the server apparatus 1 creates the encryption key at random and distributes the created encryption key to the client apparatus 3-1. Due to this, the set encryption key is unknown to the third party including the maintenance person. It is, therefore, possible to prevent human error and leakage of the encryption key, and to thereby further strengthen the encryption security.

According to the twelfth embodiment, the advantages deriving from the SIP message encryption function after setting of the new encryption information are similar to those according to the first to tenth embodiments of the present invention. While operations performed by the client apparatuses 3-2 and 3-3 are not described herein, the same advantages as those when using the client apparatus 3-1 can be exhibited.

Thirteenth Embodiment

Figure 45:
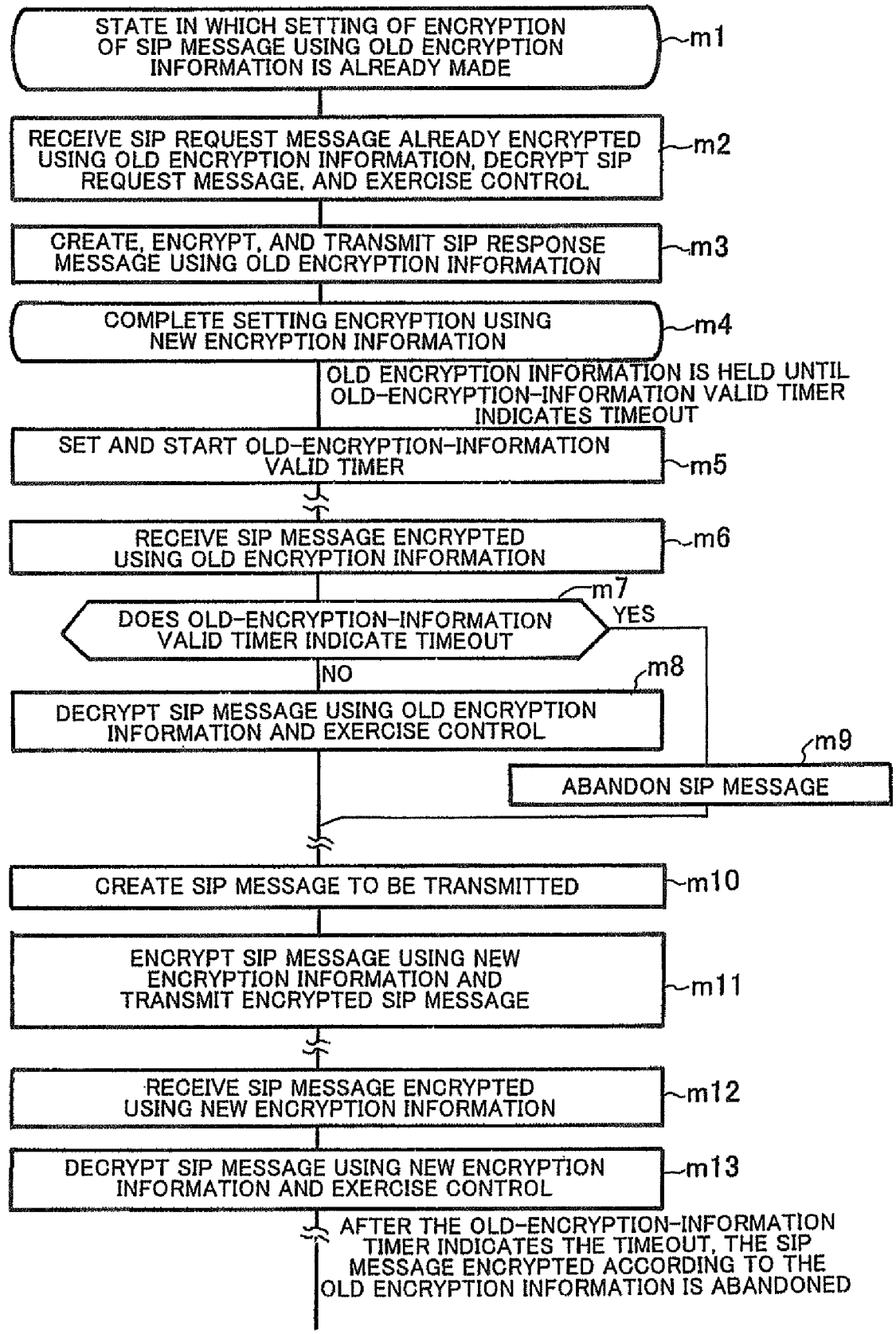
FIG. 45 is a flowchart showing operation performed by a client apparatus and a server apparatus according to a thirteenth embodiment of the present invention.

FIG. 45 is a flowchart showing operation performed by a server apparatus and a client apparatus according to a thirteenth embodiment of the present invention. A client server distributed system according to the thirteenth embodiment of the present invention is the same in configuration as the client server distributed system according to the twelfth embodiment of the present invention shown in FIG. 40. The configuration will not be, therefore, described herein. Referring to FIGS. 40 and 45, operation performed by the client server distributed system according to the thirteenth embodiment of the present invention will be described.

It is to be noted that processings performed by the server apparatus 1*b* and those performed by the client apparatus 3-1 shown in FIG. 45 are realized by causing CPUs of the server apparatus 1*b* and the client apparatus 3-1 to execute programs, respectively. Furthermore, the processings shown in FIG. 45 indicate the operation with reception of an encrypted SIP message in a state of setting of encryption information used as a trigger. Since the server apparatus 1*b* and the client apparatus 3-1 operate similarly, the operation performed by the server apparatus 1*b* will be described.

In the system in which a setting of encryption of an SIP message using old encryption information is already made (at m1 in FIG. 45), if the server apparatus 1*b* receives an SIP message encrypted according to the old encryption information from a counterpart apparatus, then the server apparatus 1*b* decrypts the received SIP message according to the old encryption information, and exercises control according to a content of the SIP message (at m2 in FIG. 45). If the server apparatus 1b is to transmit an SIP response message to the counterpart apparatus, then the server apparatus 1b creates the SIP response message, encrypts the SIP response message according to the old encryption information, and transmits the encrypted SIP response message to the counterpart apparatus (at m3 in FIG. 45).

When a setting of new encryption information is completed between the server apparatus 1b and the counterpart apparatus (at m4 in FIG. 45), the server apparatus 1b sets and starts an old-encryption-information valid timer so as to set time for which the server apparatus 1b can receive only the SIP message encrypted according to the old encryption information (at m5 in FIG. 45).

When receiving an SIP message encrypted according to the old encryption information (at m6 in FIG. 45), the server apparatus 1b checks whether the old-encryption-information valid timer does not indicate timeout (at m7 in FIG. 45). If the timer does not indicate the timeout, the server apparatus 1b decrypts the SIP message according to the old encryption information held in the server apparatus 1b and exercises control (at m8 in FIG. 45). If the timer indicates the timeout, the server apparatus 1b abandons the received SIP message without decrypting it (at m9 in FIG. 45).

As for transmission of an SIP message according to new encryption information, the server apparatus 1b creates an SIP message (at m10 in FIG. 45), encrypts the SIP message according to new encryption information, and transmits the encrypted SIP message to the counterpart apparatus (at m11 in FIG. 45). When receiving an SIP message encrypted according to the new encryption information from the counterpart apparatus (at m12 in FIG. 45), the server apparatus 1b decrypts the received SIP message according to the new encryption information and exercises control according to a content of the message (at m13 in FIG. 45). Likewise, as for transmission of an SIP message according to the new encryption information, the server apparatus 1b creates an SIP message, encrypts the SIP message according to the new encryption information, and transmits the encrypted SIP message to the counterpart apparatus.

In this manner, according to the thirteenth embodiment, the SIP message encrypted according to the old encryption information can be received and decrypted for a predetermined period of time after changing the old encryption information to the new encryption information. It is therefore possible to change the old encryption information to the new encryption information without hampering the validity of the SIP message transmitted or received during change of the old encryption information to the new encryption information, and to change the encryption information at arbitrary timing. Furthermore, according to the thirteenth embodiment, the advantages deriving from the SIP message encryption function using the set encryption information are similar to those according to the first to eleventh embodiments of the present invention.

Fourteenth Embodiment

Figure 46:
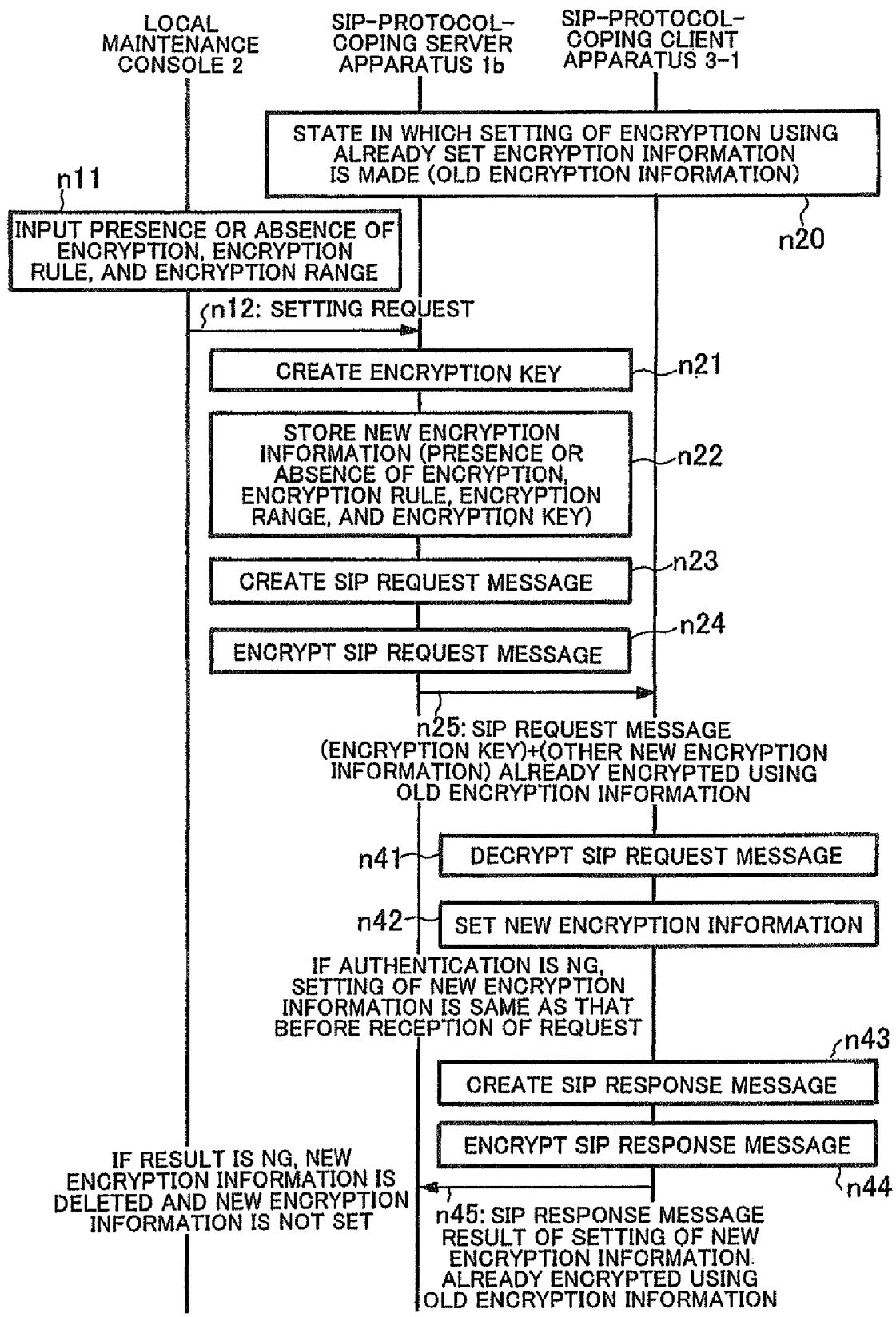
FIG. 46 is a sequence chart showing operation performed by a client server distributed system according to a fourteenth embodiment of the present invention.
Figure 47:
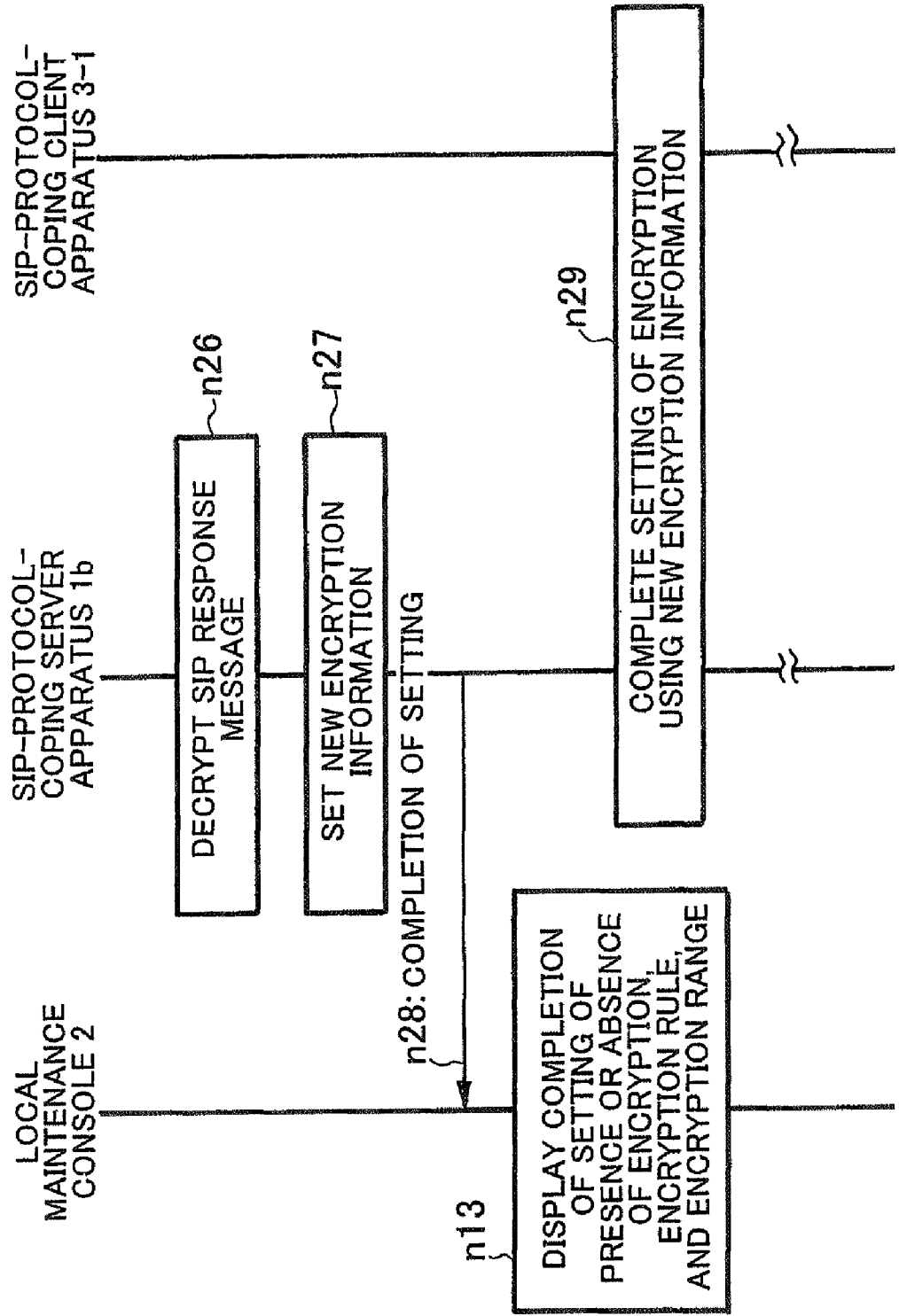
FIG. 47 is a sequence chart showing operation performed by the client server distributed system according to the fourteenth embodiment of the present invention.

FIGS. 46 and 47 are sequence charts showing operation performed by a client server distributed system according to a fourteenth embodiment of the present invention. The client server distributed system according to the fourteenth embodiment of the present invention is the same in configuration as the client server distributed system according to the twelfth embodiment of the present invention shown in FIG. 40. The configuration will not be, therefore, described herein. Referring to FIGS. 40, 46, and 47, the operation performed by the client server distributed system according to the fourteenth embodiment of the present invention will be described.

It is to be noted that processings performed by the server apparatus 1b and those performed by the client apparatus 3-1 shown in FIGS. 46 and 47 are realized by causing CPUs of the server apparatus 1b and the client apparatus 3-1 to execute programs, respectively. Furthermore, encryption information is already set to both the server apparatus 1b and the client apparatus 3-1, and encryption and decryption processings are performed at the time of transmitting or receiving an SIP message in a state of a setting of encryption of the SIP message. The set encryption information will be referred to as "old encryption information" hereinafter.

In the state in which the setting of encryption using the old encryption information is made between the server apparatus 1b and the client apparatus 3-1 (at n20 in FIG. 46), when presence or absence of encryption, an encryption rule, and an encryption range during transmission or reception of the SIP message between the server apparatus 1b and the client apparatus 3-1 is input from the local maintenance console 2 connected to the server apparatus 1b to the server apparatus 1b (at n11 in FIG. 46), the encryption information input interface unit 12 receives a setting request including the input information as to whether the SIP message is encrypted, the encryption rule, and the encryption range (at n12 in FIG. 46). If confirming normality of the setting request, the encryption information input interface unit 12 transmits the information as to whether the SIP message is encrypted, the encryption rule, and the encryption range to the encryption information setting unit 11.

The encryption information setting unit 11 instructs the encryption key forming unit 18 to create an encryption key used during transmission or reception of the SIP message to or from the client apparatus 3-1 (at n21 in FIG. 46). After the encryption key forming unit 18 creates the encryption key, the encryption information setting unit 11 stores therein the encryption key created by the encryption key forming unit 18 and the information as to whether the SIP message is encrypted, the encryption rule, and the encryption range input from the local console 2 (at n22 in FIG. 46). The encryption information setting unit 11 of the server apparatus 1b instructs the SIP message forming unit 14 to create an SIP request message including new information as to whether or not the SIP message is encrypted, the encryption rule, the encryption range, and the encryption key (hereinafter, "new encryption information") (at n23 in FIG. 46). In this case, it is assumed that the encryption key created by the encryption key forming unit 18 is encrypted according to the old encryption information. The SIP message forming unit 14 creates the SIP request message including the new encryption information, and transmits the created SIP request message to the SIP message encryption/decryption unit 16. The SIP message encryption/decryption unit 16 encrypts the SIP request message according to the old encryption information (at n24 in FIG. 46). The encrypted SIP request message is transmitted to the SIP interface unit 33 of the client apparatus 3-1 via the SIP interface unit 13 (at n25 FIG. 46).

When the SIP interface unit 33 of the client apparatus 3-1 receives the SIP request message, the SIP interface unit 33 transmits the received SIP request message to the SIP message encryption/decryption unit 36. The SIP message encryption/decryption unit 36 decrypts the SIP request message (at n41 in FIG. 46). The decrypted SIP request message is transmitted to the SIP message analyzing unit 35. If the SIP message analyzing unit 35 can confirm the normality of the new encryption information, the SIP message analyzing unit 35 transmits the new encryption information to the encryption information setting unit 31. The encryption information setting unit 31 stores therein the new encryption information, and sets the new encryption information to the SIP message encryption/decryption unit 36 (at n42 in FIG. 46).

After completing setting, the encryption information setting unit 31 instructs the SIP message forming unit 34 to create an SIP response message for notification of completion of the setting of the new encryption information (at n43 in FIG. 46). The SIP message forming unit 34 creates the SIP response message, and transmits the created SIP response message to the SIP message encryption/decryption unit 36. The SIP message encryption/decryption unit 36 encrypts the SIP response message using the old encryption information (at n44 in FIG. 46). The encrypted SIP response message is transmitted to the SIP interface unit 13 of the server apparatus 1b via the SIP interface unit 33 (at n45 in FIG. 46).

Upon receiving the SIP response message for notification of the completion of the setting of the new encryption information, the SIP interface unit 13 of the server apparatus 1b instructs the SIP message encryption/decryption unit 16 to decrypt the SIP response message (at n26 in FIG. 47). The SIP message encryption/decryption unit 16 decrypts the SIP response message and transmits the decrypted SIP response message to the SIP message analyzing unit 15. The SIP message analyzing unit 15 transmits the notification of the completion of the setting of the new encryption information on the client apparatus 3-1 side to the encryption information setting unit 11. The encryption information setting unit 11 acknowledges the completion of the setting of the new encryption information, and sets the new encryption information to the SIP message encryption/decryption unit 16 (at n27 in FIG. 47).

After completion of the setting, the encryption information setting unit 11 transmits a notification of the completion of the setting of the new encryption information to the local maintenance console 2 via the encryption information input interface unit 12 (at n28 in FIG. 47). The local maintenance console 2 displays the completion of the setting of the information as to whether or not the SIP message is encrypted, the encryption rule, and the encryption range (or new encryption information) (at n29 in FIG. 47).

In the fourteenth embodiment, the encryption and decryption operation performed by the server apparatus 1b and the client apparatus 3-1 after setting the new encryption information is similar to that according to the twelfth embodiment of the present invention above described. Therefore, it will not be described herein and shown in the drawings.

In this manner, according to the fourteenth embodiment, in the system of transmitting and receiving the SIP message in the state of the setting of encryption, if the server apparatus 1b distributes the encryption information to be used to the client apparatus 3-1, the communication on the IP network is always held in the state in which the encryption key is encrypted. It is, therefore, possible to prevent leakage of the encryption key and to strengthen the encryption security function at the time of encrypting the SIP message.

Furthermore, according to the fourteenth embodiment, the advantages deriving from the SIP message encryption function using the set encryption information are similar to those according to the twelfth embodiment of the present invention. While operations performed by the client apparatuses 3-2 and 3-3 are not described herein, the same advantages as those when using the client apparatus 3-1 can be exhibited.

Fifteenth Embodiment

Figure 48:
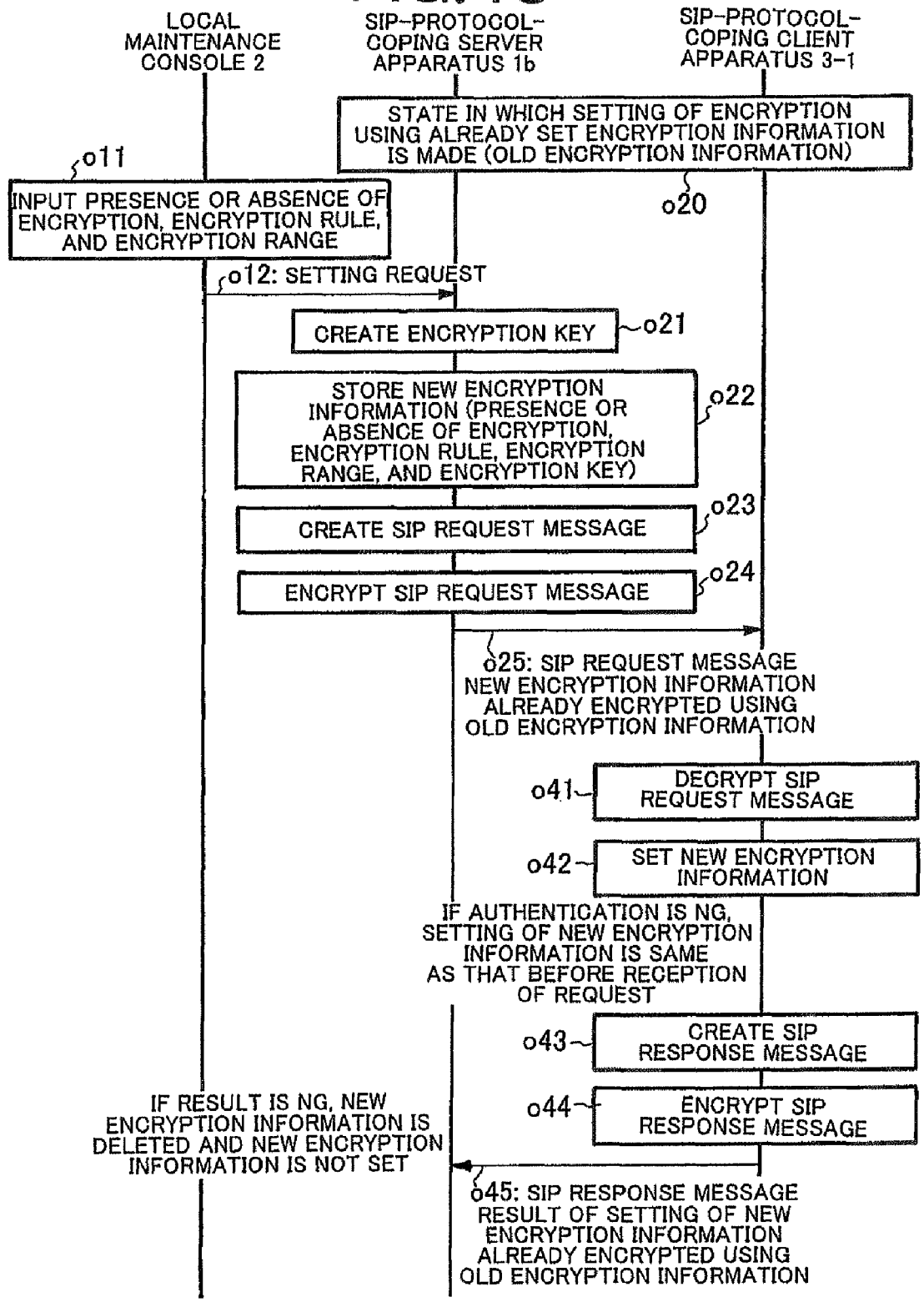
FIG. 48 is a sequence chart showing operation performed by a client server distributed system according to a fifteenth embodiment of the present invention.
Figure 49:
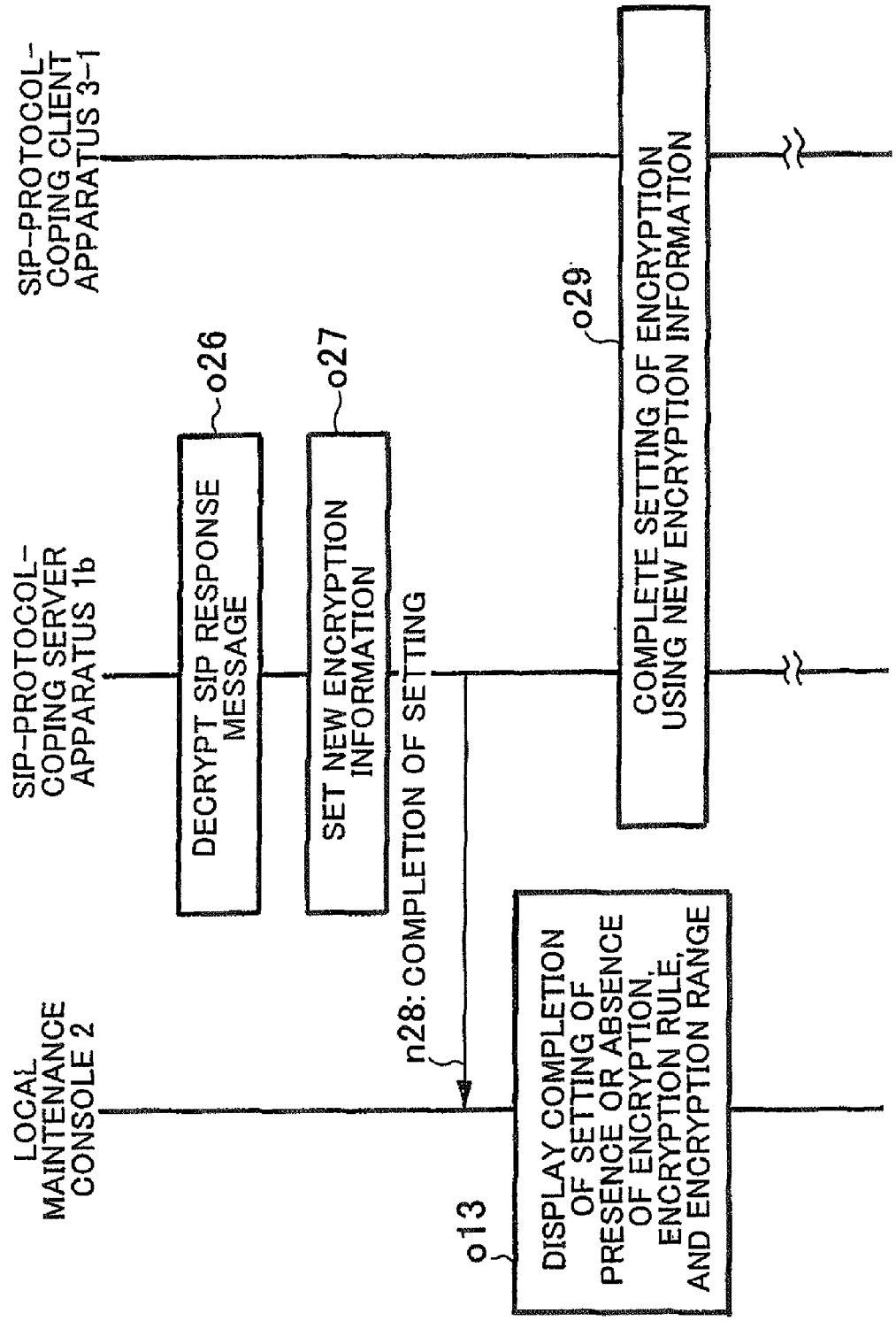
FIG. 49 is a sequence chart showing operation performed by the client server distributed system according to the fifteenth embodiment of the present invention.

FIGS. 48 and 49 are sequence charts showing operation performed by a client server distributed system according to a fifteenth embodiment of the present invention. The client server distributed system according to the fifteenth embodiment of the present invention is the same in configuration as the client server distributed system according to the twelfth embodiment of the present invention shown in FIG. 40. The configuration will not be, therefore, described herein. Referring to FIGS. 40, 48, and 49, the operation performed by the client server distributed system according to the fifteenth embodiment of the present invention will be described.

It is to be noted that processings performed by the server apparatus 1b and those performed by the client apparatus 3-1 shown in FIGS. 48 and 49 are realized by causing CPUs of the server apparatus 1b and the client apparatus 3-1 to execute programs, respectively. Furthermore, according to this embodiment encryption information is already set to both the server apparatus 1b and the client apparatus 3-1, and encryption and decryption processings are performed at the time of transmitting or receiving an SIP message in a state of a setting of encryption of the SIP message. The set encryption information will be referred to as "old encryption information" hereinafter.

In the state in which the setting of encryption using the old encryption information is made between the server apparatus 1b and the client apparatus 3-1 (at o20 in FIG. 48), when presence or absence of encryption, an encryption rule, and an encryption range during transmission or reception of the SIP message between the server apparatus 1b and the client apparatus 3-1 is input from the local maintenance console 2 connected to the server apparatus 1b to the server apparatus 1b (at o11 in FIG. 48), the encryption information input interface unit 12 receives a setting request including the input information as to whether the SIP message is encrypted, the encryption rule, and the encryption range (at o12 in FIG. 48). If confirming normality of the setting request, the encryption information input interface unit 12 transmits the information as to whether the SIP message is encrypted, the encryption rule, and the encryption range to the encryption information setting unit 11.

The encryption information setting unit 11 instructs the encryption key forming unit 18 to create an encryption key used during transmission or reception of the SIP message to or from the client apparatus 3-1 (at o21 in FIG. 48). After the encryption key forming unit 18 creates the encryption key, the encryption information setting unit 11 stores therein the encryption key created by the encryption key forming unit 18 and the information as to whether the SIP message is encrypted, the encryption rule, and the encryption range input from the local console 2 (at o22 in FIG. 48).

The encryption information setting unit 11 instructs the SIP message forming unit 14 to create an SIP request message including new information as to whether or not the SIP message is encrypted, the encryption rule, the encryption range, and the encryption key (hereinafter, "new encryption information") (at o23 in FIG. 48). The SIP message forming unit 14 creates the SIP request message and transmits the created SIP request message to the SIP message encryption/decryption unit 16. The SIP message encryption/decryption unit 16 encrypts the SIP request message according to the old encryption information (at o24 in FIG. 48). The encrypted SIP request message is transmitted to the SIP interface unit 33 of the client apparatus 3-1 via the SIP interface unit 13 (at o25 FIG. 48).

When the SIP interface unit 33 of the client apparatus 3-1 receives the SIP request message, the SIP interface unit 33 transmits the received SIP request message to the SIP message encryption/decryption unit 36. The SIP message encryption/decryption unit 36 decrypts the SIP request message (at o41 in FIG. 48). The decrypted SIP request message is transmitted to the SIP message analyzing unit 35. If the SIP message analyzing unit 35 can confirm the normality of the new encryption information, the SIP message analyzing unit 35 transmits the new encryption information to the encryption information setting unit 31. The encryption information setting unit 31 stores therein the new encryption information, and sets the new encryption information to the SIP message encryption/decryption unit 36 (at o42 in FIG. 48).

After completing setting, the encryption information setting unit 31 instructs the SIP message forming unit 34 to create an SIP response message for notification of completion of the setting of the new encryption information (at o43 in FIG. 48). The SIP message forming unit 34 creates the SIP response message, and transmits the created SIP response message to the SIP message encryption/decryption unit 36. The SIP message encryption/decryption unit 36 encrypts the SIP response message using the old encryption information (at o44 in FIG. 48). The encrypted SIP response message is transmitted to the SIP interface unit 13 of the server apparatus 1b via the SIP interface unit 33 (at o45 in FIG. 48).

Upon receiving the SIP response message for notification of the completion of the setting of the new encryption information, the SIP interface unit 13 of the server apparatus 1b instructs the SIP message encryption/decryption unit 16 to decrypt the SIP response message (at o26 in FIG. 49). The SIP message encryption/decryption unit 16 decrypts the SIP response message and transmits the decrypted SIP response message to the SIP message analyzing unit 15. The SIP message analyzing unit 15 transmits the notification of the completion of the setting of the new encryption information on the client apparatus 3-1 side to the encryption information setting unit 11. The encryption information setting unit 11 acknowledges the completion of the setting of the new encryption information, and sets the new encryption information to the SIP message encryption/decryption unit 16 (at o27 in FIG. 49).

After completion of the setting, the encryption information setting unit 11 transmits a notification of the completion of the setting of the new encryption information to the local maintenance console 2 via the encryption information input interface unit 12 (at o28 in FIG. 49). The local maintenance console 2 displays the completion of the setting of the information as to whether or not the SIP message is encrypted, the encryption rule, and the encryption range (or new encryption information) (at o13 in FIG. 49).

In the fifteenth embodiment, the encryption and decryption operation performed by the server apparatus 1b and the client apparatus 3-1 after setting the new encryption information is similar to that according to the twelfth embodiment of the present invention above described. Therefore, it will not be described herein and shown in the drawings.

In this manner, according to the fifteenth embodiment, in the system of transmitting and receiving the SIP message in the state of the setting of encryption, if the server apparatus 1b distributes the encryption information to be used to the client apparatus 3-1, the communication on the IP network is always held in the state in which the encryption key is encrypted. It is, therefore, possible to prevent leakage of the encryption key and to strengthen the encryption security function at the time of encrypting the SIP message. Besides, the other encryption information (information as to whether or not the SIP message is encrypted, the encryption rule, and the encryption range) is also distributed after being encrypted. It is therefore possible to make it difficult to even estimate the encryption key and to further strengthen the encryption security.

Furthermore, according to the fifteenth embodiment, the advantages deriving from the SIP message encryption function using the set encryption information are similar to those according to the eleventh and twelfth embodiments of the present invention. While operations performed by the client apparatuses 3-2 and 3-3 are not described herein, the same advantages as those when using the client apparatus 3-1 can be exhibited.

Sixteenth Embodiment

FIGS. 50 to 54 are sequence charts showing operation performed by a client server distributed system according to a sixteenth embodiment of the present invention. The client server distributed system according to the sixteenth embodiment of the present invention is the same in configuration as the client server distributed system according to the eleventh embodiment of the present invention shown in FIG. 35. The configuration will not be, therefore, described herein. Referring to FIGS. 35 and 50 to 54, the operation performed by the client server distributed system according to the sixteenth embodiment of the present invention will be described. It is to be noted that processings performed by the server apparatus 1b and those performed by the client apparatus 3a-1 shown in FIGS. 50 to 54 are realized by causing CPUs of the server apparatus 1b and the client apparatus 3a-1 to execute programs, respectively.

Figure 50:
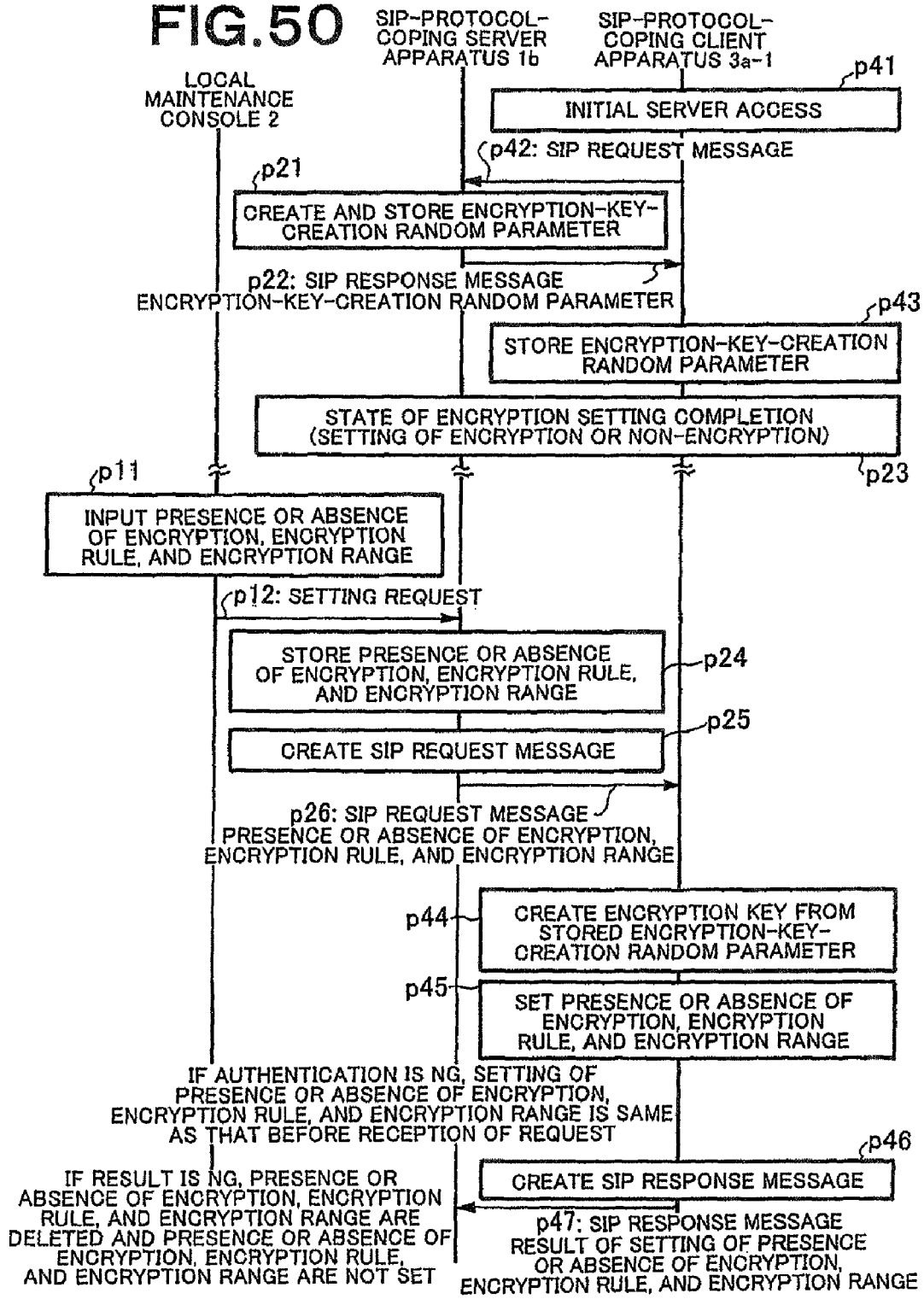
FIG. 50 is a sequence chart showing operation performed by a client server distributed system according to a sixteenth embodiment of the present invention.

When an initial server access request to the server apparatus 1b is generated in the client apparatus 3a-1 (at p41 in FIG. 50), the SIP message forming unit 34 of the client apparatus 3a-i creates an SIP request message and transmits the created SIP request message to the SIP interface unit 13 of the server apparatus 1b via the SIP interface unit 33 (at p42 in FIG. 50).

The SIP interface unit 13 of the server apparatus 1b receiving the SIP request message acknowledges the initial access from the client apparatus 3a-1, and transmits the SIP request message to the encryption information setting unit 11. The encryption information setting unit 11 creates and stores therein an encryption-key-creation random parameter used to encrypt an SIP message between the server apparatus 1b and the client apparatus 3a-1 (at p21 in FIG. 50). Further, the encryption information setting unit 11 instructs the SIP message forming unit 14 to create an SIP response message to which the encryption-key-creation random parameter is added. The SIP message forming unit 14 creates the SIP response message and transmits the created SIP response message to the SIP interface unit 33 of the client apparatus 3a-1 via the SIP interface unit 13 (at p22 in FIG. 50).

Upon receiving the SIP response message to which the encryption-key-creation random parameter is added, the SIP interface unit 33 of the client apparatus 3a-1 transmits the received encryption-key-creation random parameter to the encryption information setting unit 31. The encryption information setting unit 31 stores therein the encryption-key-creation random parameter (at p43 in FIG. 50). As a result, the state between the server apparatus 1b and the client apparatus 3a-1 turns into an encryption setting completion (setting of encryption or non-encryption) state (at p23 in FIG. 50).

When presence or absence of encryption, an encryption rule, and an encryption range during transmission or reception of the SIP message between the server apparatus 1b and the client apparatus 3a-1 is input from the local maintenance console 2 connected to the server apparatus 1b to the server apparatus 1b (at p11 in FIG. 50), the encryption information input interface unit 12 receives a setting request including the input information as to whether the SIP message is encrypted, the encryption rule, and the encryption range (at p12 in FIG.

50). If confirming normality of the setting request, the encryption information input interface unit 12 transmits the information as to whether the SIP message is encrypted, the encryption rule, and the encryption range to the encryption information setting unit 11. The encryption information setting unit 11 stores therein the information as to whether the SIP message is encrypted, the encryption rule, and the encryption range (at p24 in FIG. 50).

The encryption information setting unit 11 of the server apparatus 1b instructs the SIP message forming unit 14 to create an SIP request message including the information as to whether or not the SIP message is encrypted, the encryption rule, and the encryption range (at p25 in FIG. 50). The SIP message forming unit 14 creates the SIP request message, and transmits the created SIP request message to the SIP interface unit 33 of the client apparatus 3a-1 via the SIP interface unit 13 (at p26 in FIG. 50).

When the SIP interface unit 33 of the client apparatus 3a-1 receives the SIP request message including the information as to whether or not the SIP message is encrypted, the encryption rule, and the encryption range, the SIP interface unit 33 transmits the received SIP request message to the SIP message analyzing unit 35. If the SIP message analyzing unit 35 can confirm the normality of the information as to whether or not the SIP message is encrypted, the encryption rule, and the encryption range, the SIP message analyzing unit 35 transmits the information as to whether or not the SIP message is encrypted, the encryption rule, and the encryption range to the encryption information setting unit 31. The encryption information setting unit 31 stores therein the information as to whether or not the SIP message is encrypted, the encryption rule, and the encryption range, and causes the encryption key forming unit 38 to generate an encryption key from the encryption-key-creation random parameter stored in the encryption information setting unit 31 (at p44 in FIG. 50). Further, the encryption information setting unit 31 sets the information as to whether or not the SIP message is encrypted, the encryption rule, and the encryption range, and the encryption key to the SIP message encryption/decryption unit 36 (at p45 in FIG. 50).

Figure 60:
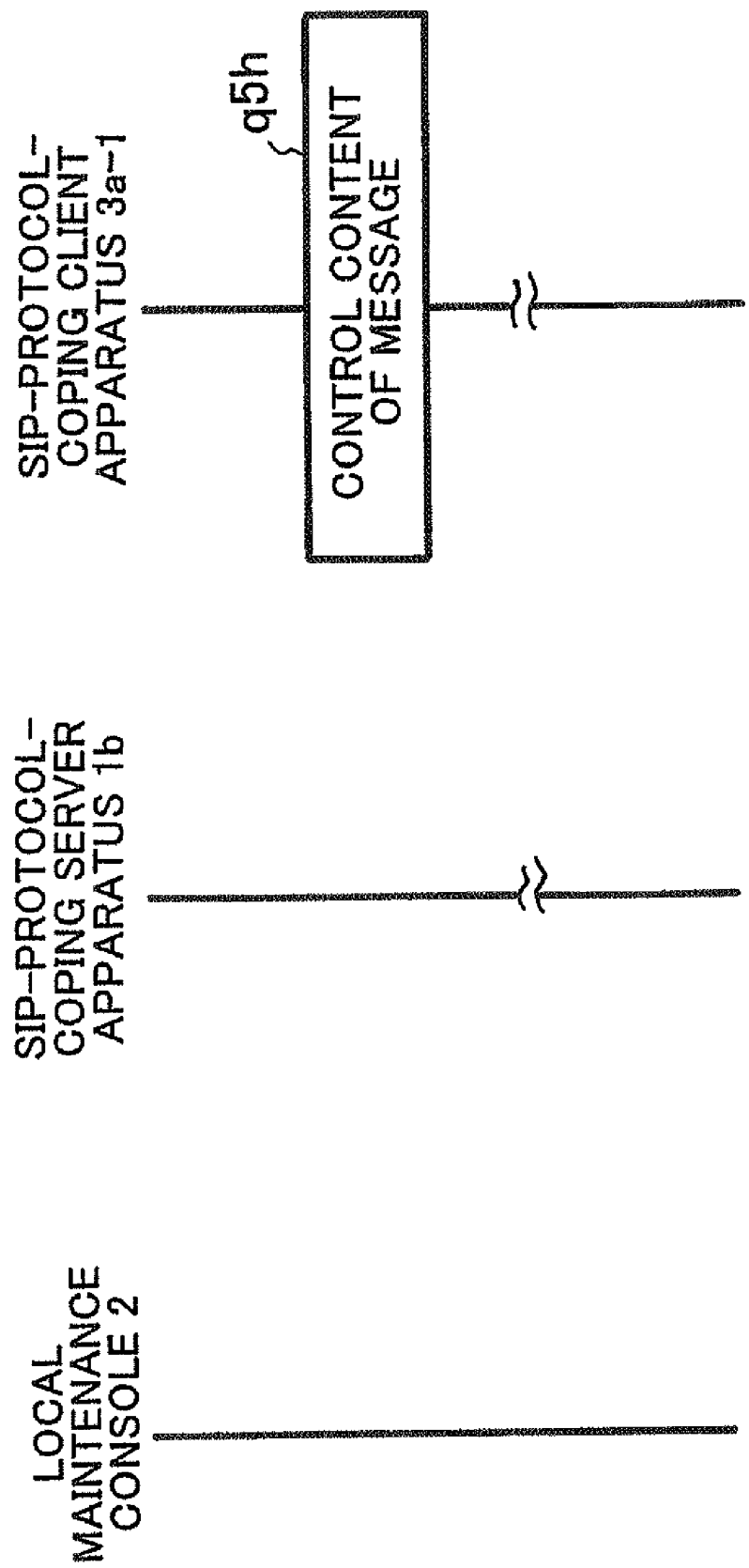
FIG. 60 is a sequence chart showing operation performed by the client server distributed system according to the seventeenth embodiment of the present invention.

After completing setting, the encryption information setting unit 31 instructs the SIP message forming unit 34 to create an SIP response message for notification of completion of the setting of the information as to whether or not the SIP message is encrypted, the encryption rule, and the encryption range (at p46 in FIG. 50). The SIP message forming unit 34 creates the SIP response message, and transmits the created SIP response message to the SIP interface unit 13 of the server apparatus 1b via the SIP interface unit 33 (at p47 in FIG. 60).

Upon receiving the SIP response message for notification of the completion of the setting of the information as to whether or not the SIP message is encrypted, the encryption rule, and the encryption range, the SIP interface unit 13 of the server apparatus 1b transmits the received SIP response message to the SIP message analyzing unit 15. The SIP message analyzing unit 15 transmits the notification of the completion of the setting of the information as to whether or not the SIP message is encrypted, the encryption rule, and the encryption range on the SIP protocol-compliant client apparatus 3a-1 side to the encryption information setting unit 11. The encryption information setting unit 11 acknowledges the completion of the setting of the information as to whether or not the SIP message is encrypted, the encryption rule, and the encryption range, and causes the encryption key forming unit 18 to create an encryption key from the encryption-key-creation random parameter stored in the encryption information setting unit 11 (at p27 in FIG. 51). Further, the encryption information setting unit 11 sets the information as to whether or not the SIP message is encrypted, the encryption rule, and the encryption range, and the encryption key to the SIP message encryption/decryption unit 16 (at p28 in FIG. 51). As a result, the state between the server apparatus 1b and the client apparatus 3a-1 turns into a state in which the setting of encryption using the set encryption information (old encryption information) is made (at p29 in FIG. 51).

After the information as to whether or not the SIP message is encrypted, the encryption rule, and the encryption range, and the encryption key is set to the SIP message encryption/decryption unit 16, the operation is performed according to the following flow while the set encryption information is assumed as the old encryption information.

Figure 51:
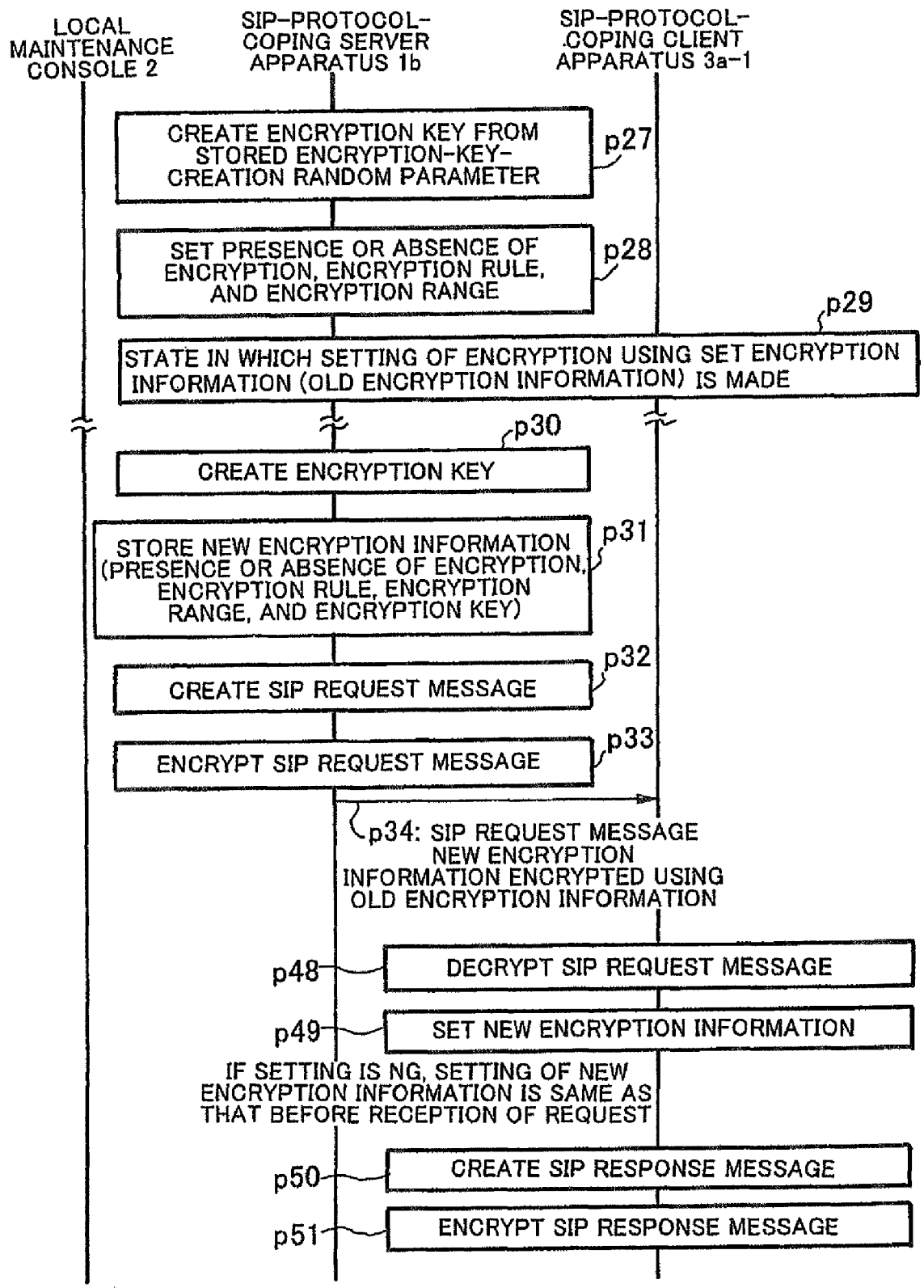
FIG. 51 is a sequence chart showing operation performed by the client server distributed system according to the sixteenth embodiment of the present invention.

The encryption information setting unit 11 instructs the encryption key forming unit 18 to create an encryption key used to transmit or receive an SIP message to or from the SIP-protocol-coping client apparatus 3a-1 (at p30 in FIG. 51). Further, the encryption information setting unit 11 stores therein the encryption key created by the encryption key forming unit 18 and the old encryption information, i.e., the information as to whether or not the SIP message is encrypted, the encryption rule, and the encryption range (at p31 in FIG. 51).

The encryption information setting unit 11 instructs the SIP message forming unit 14 to create an SIP request message including new information as to whether or not the SIP message is encrypted, the encryption rule, the encryption range, and the encryption key (hereinafter, "new encryption information") (at p32 in FIG. 51). The SIP message forming unit 14 creates the SIP request message and transmits the created SIP request message to the SIP message encryption/decryption unit 16. The SIP message encryption/decryption unit 16 encrypts the SIP response message according to the old encryption information (at p33 in FIG. 51). The encrypted SIP response message is transmitted to the SIP interface unit 33 of the client apparatus 3a-1 via the SIP interface unit 13 (at p34 in FIG. 51).

When the SIP interface unit 33 of the client apparatus 3a-1 receives the SIP request message, the SIP interface unit 33 transmits the received SIP request message to the SIP message encryption/decryption unit 36. The SIP message encryption/decryption unit 36 decrypts the SIP request message (at p48 in FIG. 51). The decrypted SIP request message is transmitted to the SIP message analyzing unit 35. If the SIP message analyzing unit 35 can confirm the normality of the new encryption information, the SIP message analyzing unit 35 transmits the new encryption information to the encryption information setting unit 31.

The encryption information setting unit 31 stores therein the new encryption information, and sets the new encryption information to the SIP message encryption/decryption unit 36 (at p49 in FIG. 51). After completing setting, the encryption information setting unit 31 instructs the SIP message forming unit 34 to create an SIP response message for notification of completion of the setting of the new encryption information (at p50 in FIG. 51). The SIP message forming unit 34 creates the SIP response message, and transmits the created SIP response message to the SIP message encryption/decryption unit 36. The SIP message encryption/decryption unit 36 encrypts the SIP response message using the old encryption information (at p51 in FIG. 51). The encrypted SIP response message is transmitted to the SIP interface unit 13 of the server apparatus 1b via the SIP interface unit 33 (at p52 in FIG. 52).

Figure 52:
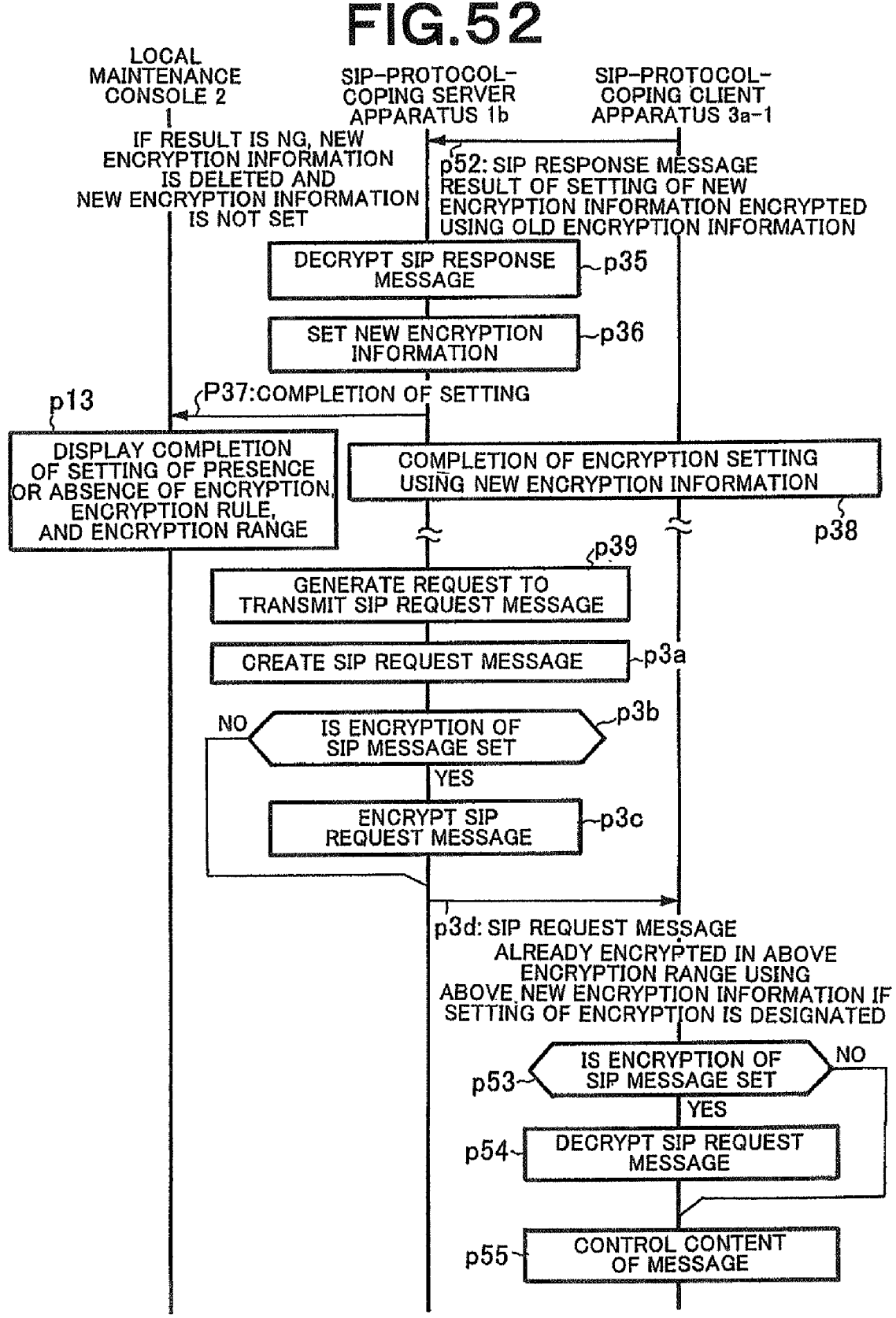
FIG. 52 is a sequence chart showing operation performed by the client server distributed system according to the sixteenth embodiment of the present invention.
Figure 53:
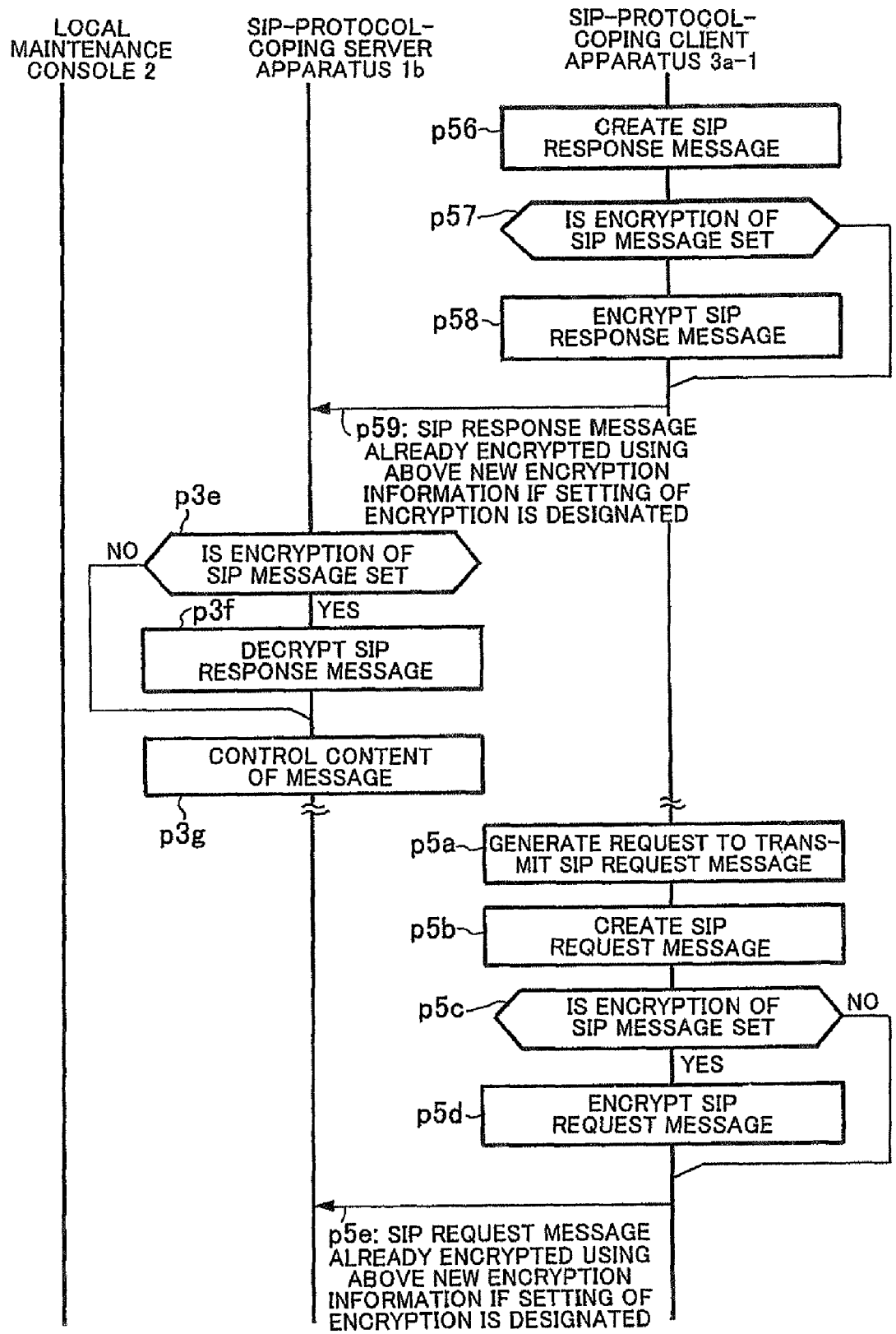
FIG. 53 is a sequence chart showing operation performed by the client server distributed system according to the sixteenth embodiment of the present invention.
Figure 54:
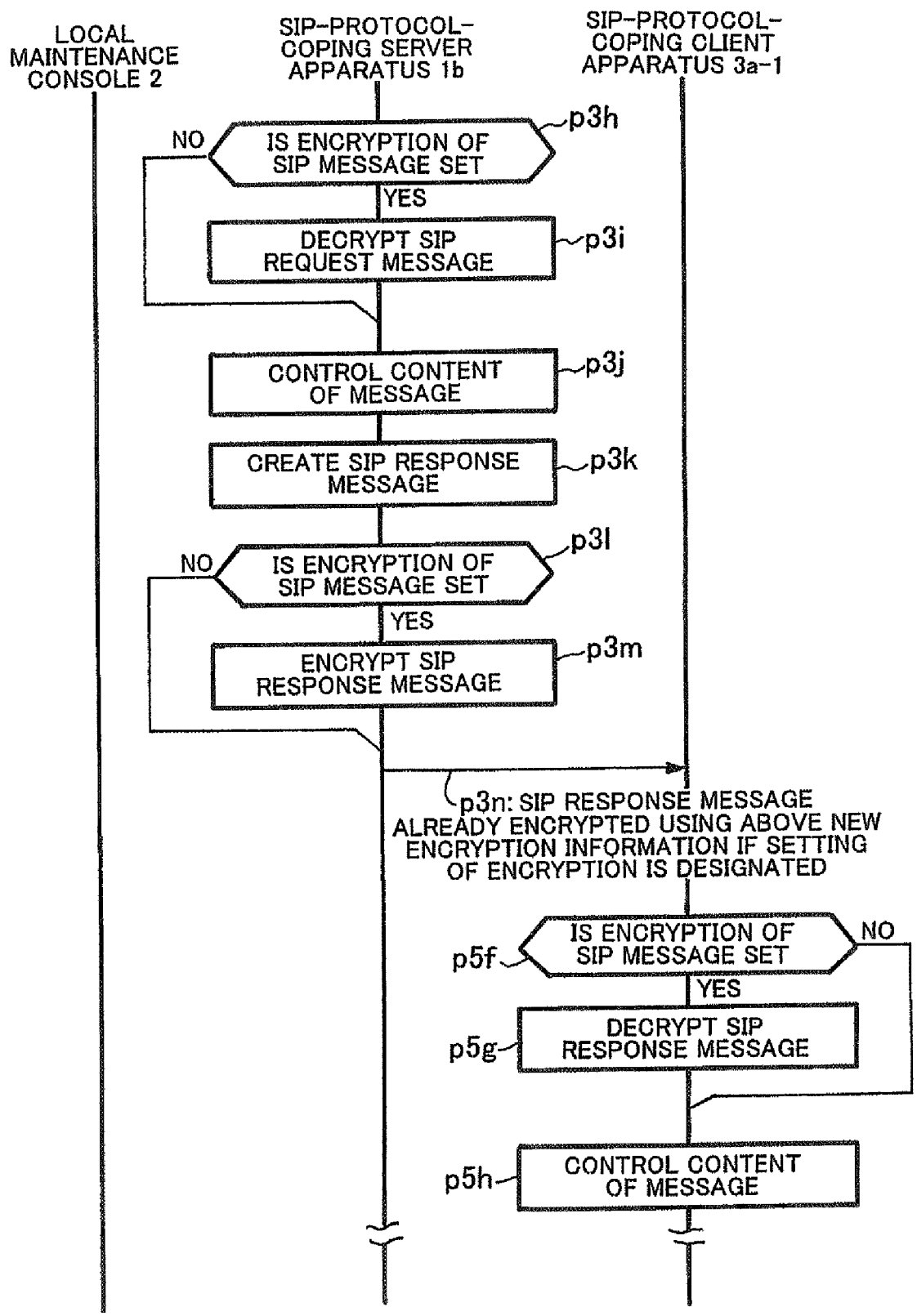
FIG. 54 is a sequence chart showing operation performed by the client server distributed system according to the sixteenth embodiment of the present invention.

Upon receiving the SIP response message for notification of the completion of the setting of the new encryption information, the SIP interface unit 13 of the server apparatus 1*b* instructs the SIP message encryption/decryption unit 16 to decrypt the SIP response message (at p35 in FIG. 52). The SIP message encryption/decryption unit 16 decrypts the SIP response message and transmits the decrypted SIP response message to the SIP message analyzing unit 15. The SIP message analyzing unit 15 transmits the notification of the completion of the setting of the new encryption information on the SIP protocol-compliant client apparatus 3*a*-1 side to the encryption information setting unit 11.

The encryption information setting unit 11 acknowledges the completion of the setting of the new encryption information, and sets the new encryption information to the SIP message encryption/decryption unit 16 (at p36 in FIG. 52). After completion of the setting, the encryption information setting unit 11 transmits a notification of the completion of the setting of the new encryption information to the local maintenance console 2 via the encryption information input interface unit 12 (at p37 in FIG. 52). The local maintenance console 2 displays the completion of the setting of the information as to whether or not the SIP message is encrypted, the encryption rule, and the encryption range (at p13 in FIG. 52).

The transmission or reception operation including encryption and decryption operation of the SIP message after setting the new encryption information to the SIP message encryption/decryption unit 16 (operation at p39 to p3*d* and p53 to p55 in FIG. 52, at p3*e* to p3*g* and p56 to p5*e* in FIG. 53, and at p3*h* to p3*n* and p5*f* to p5*h* in FIG. 54) is similar to that according to the eleventh embodiment of the present invention. Therefore, it will not be described herein.

In this manner, according to the sixteenth embodiment, two steps of the encryption information settings are made. Namely, when the state is changed from the state of the setting of non-encryption to that of the setting of encryption, the encryption information using the encryption key and created by the client apparatus 3*a*-1 and the server apparatus 1*b* synchronously with each other is set. Thereafter, the encryption information using the encryption key automatically created by the server apparatus 1*b* is set. By making such two-step settings, encryption and decryption are performed using the encryption key automatically created by the server apparatus 1*b* and unknown to the third party including the maintenance person during actual transmission and reception of the SIP message in the state of the setting of encryption of the SIP message. The encryption security function can be thereby strengthened. Furthermore, according to the sixteenth embodiment, the encryption key used to encrypt the SIP message during transmission or reception of the SIP message is always notified in the encrypted state. It is, therefore, possible to strengthen the security for the encryption function.

Moreover, according to the sixteenth embodiment, the advantages deriving from the SIP message encryption function using the set encryption information are similar to those according to the eleventh to fifteenth embodiments of the present invention above described. While operations performed by the client apparatuses 3*a*-2 and 3*a*-3 are not described herein, the same advantages as those when using the client apparatus 3*a*-1 can be exhibited.

Seventeenth Embodiment

FIGS. 55 to 60 are sequence charts showing operation performed by a client server distributed system according to a seventeenth embodiment of the present invention. The client server distributed system according to the seventeenth embodiment of the present invention is the same in configuration as the client server distributed system according to the eleventh embodiment of the present invention shown in FIG. 35. The configuration will not be, therefore, described herein. Referring to FIGS. 35 and 55 to 60, the operation performed by the client server distributed system according to the seventeenth embodiment of the present invention will be described. It is to be noted that processings performed by the server apparatus 1*b* and those performed by the client apparatus 3*a*-1 shown in FIGS. 55 to 60 are realized by causing CPUs of the server apparatus 1*b* and the client apparatus 3*a*-1 to execute programs, respectively.

Figure 55:
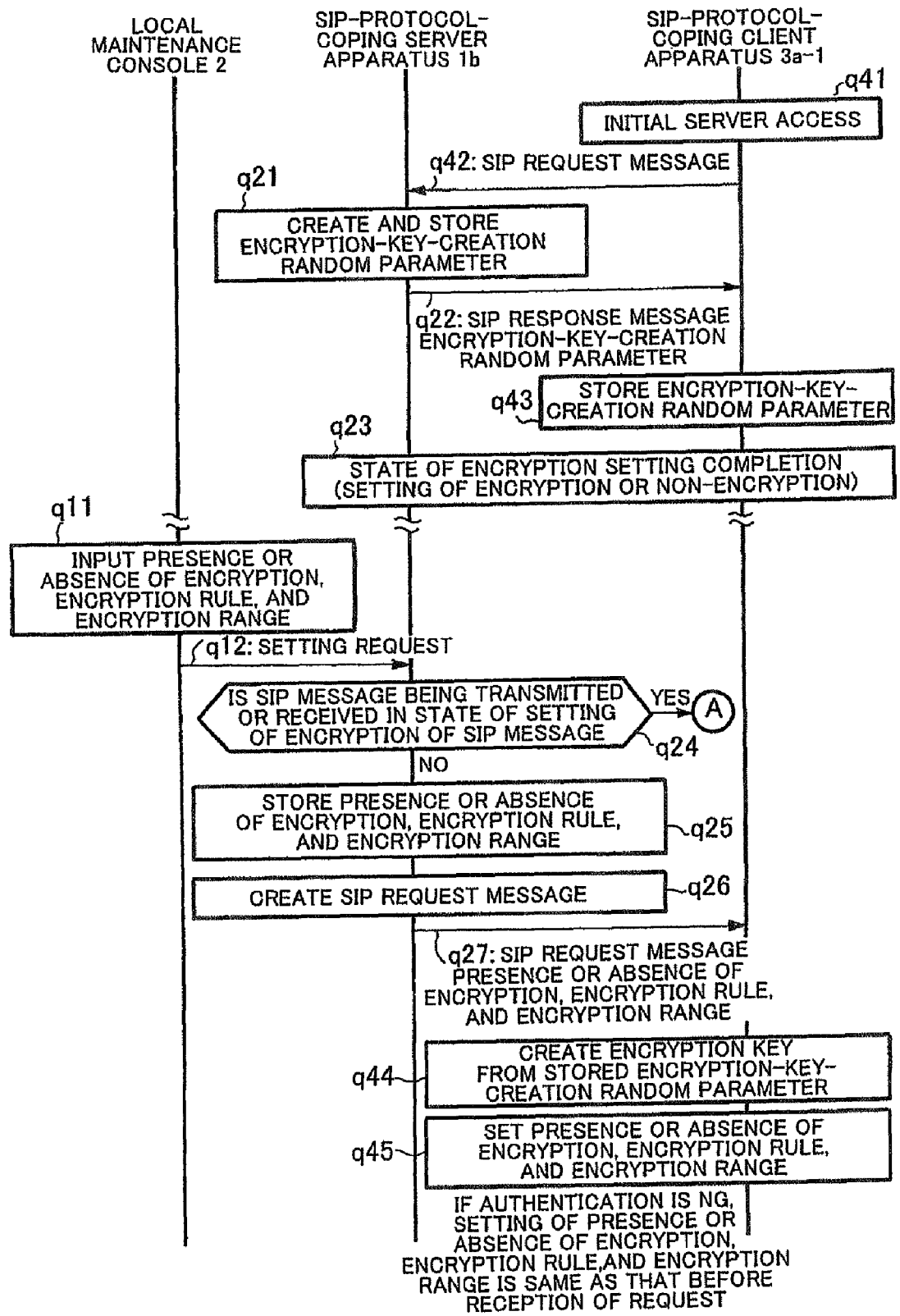
FIG. 55 is a sequence chart showing operation performed by a client server distributed system according to a seventeenth embodiment of the present invention.

When an initial server access request to the server apparatus 1*b* is generated in the client apparatus 3*a*-1 (at q41 in FIG. 55), the SIP message forming unit 34 of the client apparatus 3*a*-1 creates an SIP request message and transmits the created SIP request message to the SIP interface unit 13 of the server apparatus 1*b* via the SIP interface unit 33 (at q42 in FIG. 55).

The SIP interface unit 13 of the server apparatus 1*b* receiving the SIP request message acknowledges the initial access from the client apparatus 3*a*-1, and transmits the SIP request message to the encryption information setting unit 11. The encryption information setting unit 11 creates and stores therein an encryption-key-creation random parameter used to encrypt an SIP message between the server apparatus 1*b* and the client apparatus 3*a*-1 (at q21 in FIG. 55). Further, the encryption information setting unit 11 instructs the SIP message forming unit 14 to create an SIP response message to which the encryption-key-creation random parameter is added. The SIP message forming unit 14 creates the SIP response message and transmits the created SIP response message to the SIP interface unit 33 of the client apparatus 3*a*-1 via the SIP interface unit 13 (at q22 in FIG. 55).

Upon receiving the SIP response message to which the encryption-key-creation random parameter is added, the SIP interface unit 33 of the client apparatus 3*a*-1 transmits the received encryption-key-creation random parameter to the encryption information setting unit 31. The encryption information setting unit 31 stores therein the encryption-key-creation random parameter (at q43 in FIG. 55). As a result, the state between the server apparatus 1*b* and the client apparatus 3*a*-1 turns into an encryption setting completion (setting of encryption or non-encryption) state (at q23 in FIG. 55).

Thereafter, the setting of the encryption information between the server apparatus 1*a* and the client apparatus 3*a*-1 is executed. Since the operation for setting the encryption information is similar to that according to the eleventh embodiment of the present invention, it will not be described herein and it is assumed that the setting of the encryption information is completed.

When presence or absence of encryption, an encryption rule, and an encryption range during transmission or reception of the SIP message between the server apparatus 1*b* and the client apparatus 3*a*-1 is input from the local maintenance console 2 connected to the server apparatus 1*b* to the server apparatus 1*b* (at q11 in FIG. 55), the encryption information input interface unit 12 receives a setting request including the input information as to whether the SIP message is encrypted, the encryption rule, and the encryption range (at q12 in FIG. 55). If confirming normality of the setting request, the encryption information input interface unit 12 transmits the information as to whether the SIP message is encrypted, the encryption rule, and the encryption range to the encryption information setting unit 11.

The encryption information setting unit 11 checks whether or not the setting of encryption is made based on the current encryption information (at q24 in FIG. 55). If the setting is not made, the encryption information setting unit 11 executes a sequence for encrypting or decryption an SIP message using the encryption key created from the encryption-key-creation random parameter stored in the encryption information setting unit 11. Further, the encryption information setting unit 11 executes a sequence for setting encryption information (new encryption information) using the encryption key automatically created by the server apparatus 1b at random with the encryption information using the encryption key created from the encryption-key-creation random parameter stored in the encryption information setting unit 11 as the old encryption information.

The encryption information setting unit 11 stores therein the information as to whether the SIP message is encrypted, the encryption rule, and the encryption range (at q25 in FIG. 55). Further, the encryption information setting unit 11 instructs the SIP message forming unit 14 to create an SIP request message (at q26 in FIG. 55). The SIP message forming unit 14 creates the SIP request message, and transmits the created SIP request message to the SIP interface unit 33 of the client apparatus 3a-1 via the SIP interface unit 13 (at q27 in FIG. 55).

When the SIP interface unit 33 of the client apparatus 3a-1 receives the SIP request message including the information as to whether or not the SIP message is encrypted, the encryption rule, and the encryption range, the SIP interface unit 33 transmits the received SIP request message to the SIP message analyzing unit 35. If the SIP message analyzing unit 35 can confirm the normality of the information as to whether or not the SIP message is encrypted, the encryption rule, and the encryption range, the SIP message analyzing unit 35 transmits the information as to whether or not the SIP message is encrypted, the encryption rule, and the encryption range to the encryption information setting unit 31.

The encryption information setting unit 31 stores therein the information as to whether or not the SIP message is encrypted, the encryption rule, and the encryption range, and causes the encryption key forming unit 38 to generate an encryption key from the encryption-key-creation random parameter stored in the encryption information setting unit 31 (at q44 in FIG. 55). Further, the encryption information setting unit 31 sets the information as to whether or not the SIP message is encrypted, the encryption rule, and the encryption range, and the encryption key to the SIP message encryption/decryption unit 36 (at q45 in FIG. 55). After completing setting, the encryption information setting unit 31 instructs the SIP message forming unit 34 to create an SIP response message for notification of completion of the setting of the information as to whether or not the SIP message is encrypted, the encryption rule, and the encryption range (at q46 in FIG. 56). The SIP message forming unit 34 creates the SIP response message, and transmits the created SIP response message to the SIP interface unit 13 of the server apparatus 1b via the SIP interface unit 33 (at q47 in FIG. 56).

Upon receiving the SIP response message for notification of the completion of the setting of the information as to whether or not the SIP message is encrypted, the encryption rule, and the encryption range, the SIP interface unit 13 of the server apparatus 1b transmits the received SIP response message to the SIP message analyzing unit 15. The SIP message analyzing unit 15 transmits the notification of the completion of the setting of the information as to whether or not the SIP message is encrypted, the encryption rule, and the encryption range on the SIP protocol-compliant client apparatus 3a-1 side to the encryption information setting unit 11.

Figure 56:
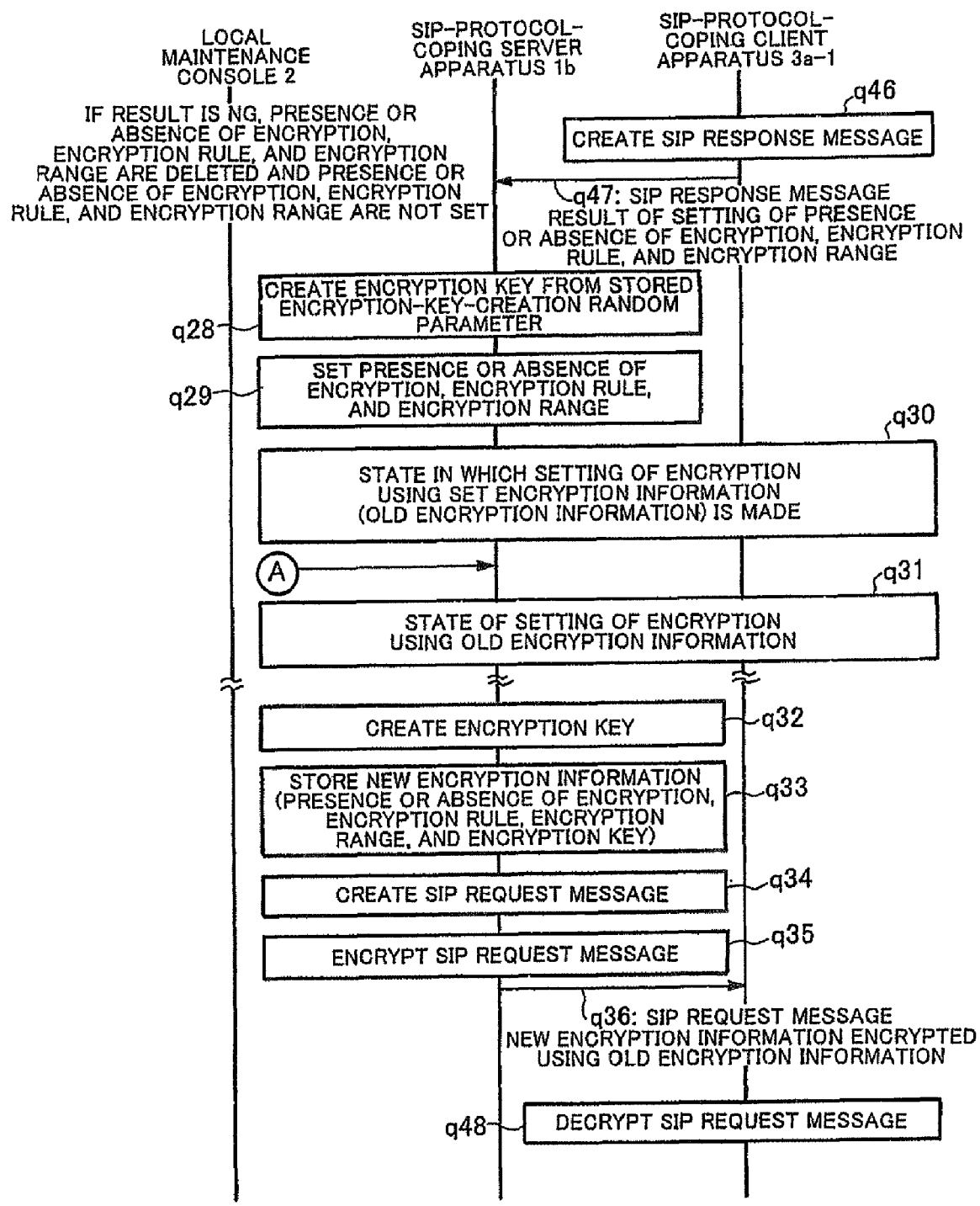
FIG. 56 is a sequence chart showing operation performed by the client server distributed system according to the seventeenth embodiment of the present invention.

The encryption information setting unit 11 acknowledges the completion of the setting of the information as to whether or not the SIP message is encrypted, the encryption rule, and the encryption range, and causes the encryption key forming unit 18 to create an encryption key from the encryption-key-creation random parameter stored in the encryption information setting unit 11 (at q28 in FIG. 56). Further, the encryption information setting unit 11 sets the information as to whether or not the SIP message is encrypted, the encryption rule, and the encryption range, and the encryption key to the SIP message encryption/decryption unit 16 (at q29 in FIG. 56). As a result, the state between the server apparatus 1b and the client apparatus 3a-1 turns into a state in which the setting of encryption using the set encryption information (old encryption information) is made (at q30 in FIG. 56).

After the information as to whether or not the SIP message is encrypted, the encryption rule, and the encryption range, and the encryption key is set to the SIP message encryption/decryption unit 16, the operation is performed according to the following flow while the set encryption information is assumed as the old encryption information.

In the state of setting of encryption using the old encryption information between the server apparatus 1a and the client apparatus 3a-1 (at q31 in FIG. 56), the encryption information setting unit 11 instructs the encryption key forming unit 18 to create an encryption key used to transmit or receive an SIP message to or from the SIP-protocol-coping client apparatus 3a-1 (at q32 in FIG. 56). Further, the encryption information setting unit 11 stores therein the encryption key created by the encryption key forming unit 18 and the old encryption information, i.e., the information as to whether or not the SIP message is encrypted, the encryption rule, and the encryption range (at q33 in FIG. 56).

The encryption information setting unit 11 instructs the SIP message forming unit 14 to create an SIP request message including new information as to whether or not the SIP message is encrypted, the encryption rule, the encryption range, and the encryption key (hereinafter, "new encryption information") (at q34 in FIG. 56). The SIP message forming unit 14 creates the SIP request message and transmits the created SIP request message to the SIP message encryption/decryption unit 16. The SIP message encryption/decryption unit 16 encrypts the SIP request message according to the old encryption information (at q35 in FIG. 56). The encrypted SIP request message is transmitted to the SIP interface unit 33 of the client apparatus 3a-1 via the SIP interface unit 13 (at q36 in FIG. 56).

When the SIP interface unit 33 of the client apparatus 3a-1 receives the SIP request message, the SIP interface unit 33 transmits the received SIP request message to the SIP message encryption/decryption unit 36. The SIP message encryption/decryption unit 36 decrypts the SIP request message (at q48 in FIG. 56). The decrypted SIP request message is transmitted to the SIP message analyzing unit 35. If the SIP message analyzing unit 35 can confirm the normality of the new encryption information, the SIP message analyzing unit 35 transmits the new encryption information to the encryption information setting unit 31.

Figure 57:
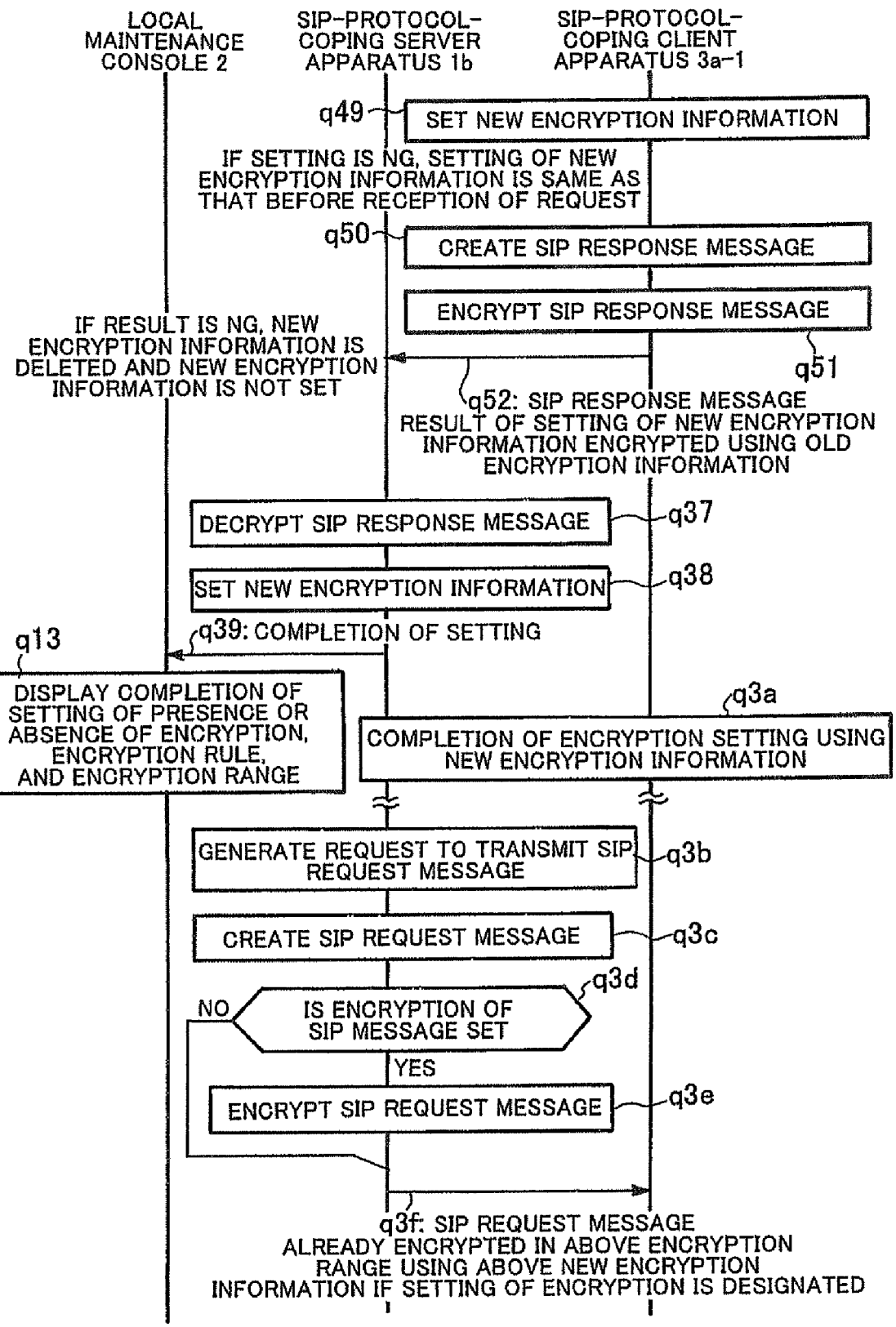
FIG. 57 is a sequence chart showing operation performed by the client server distributed system according to the seventeenth embodiment of the present invention.
Figure 58:
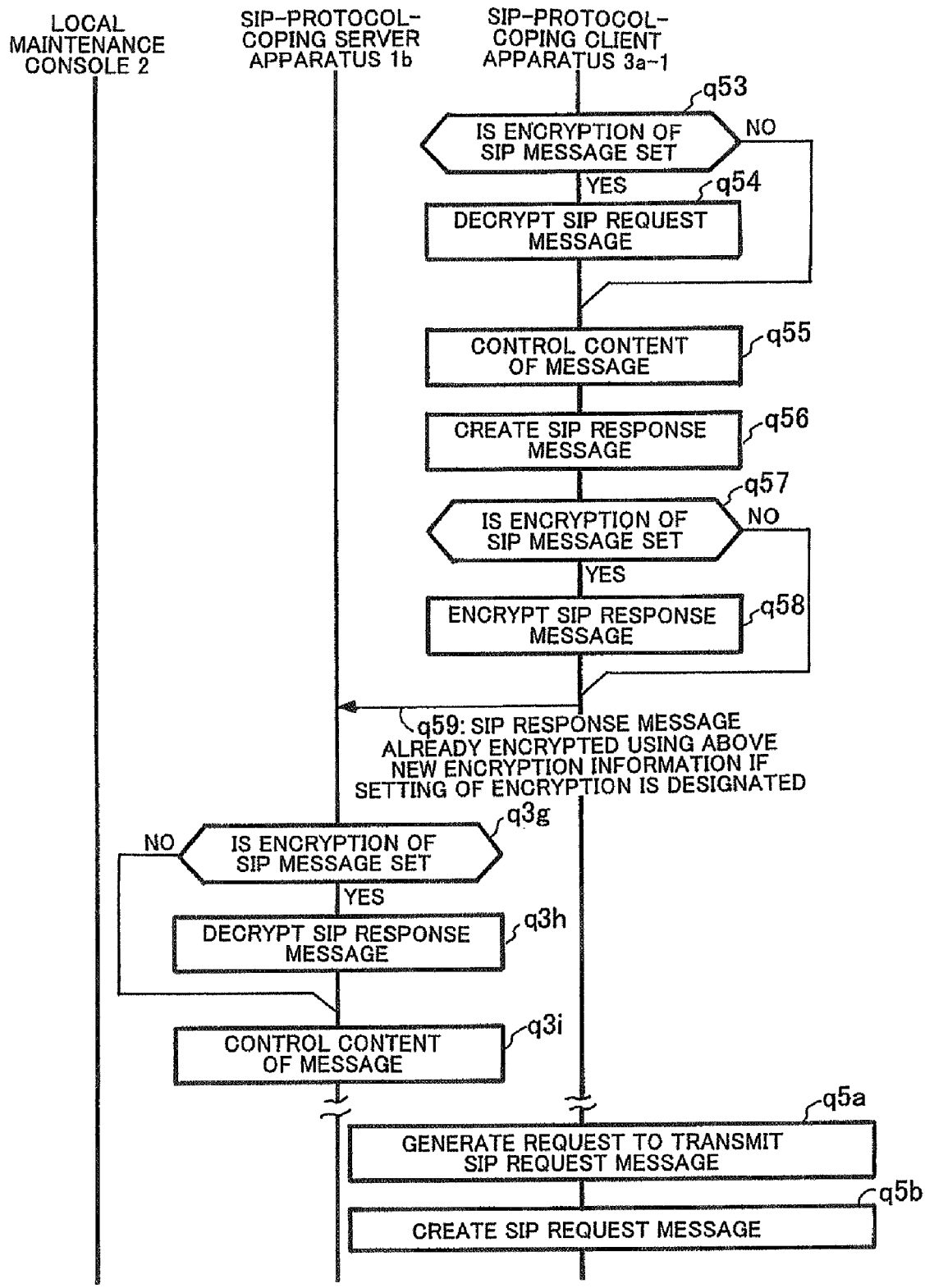
FIG. 58 is a sequence chart showing operation performed by the client server distributed system according to the seventeenth embodiment of the present invention.
Figure 59:
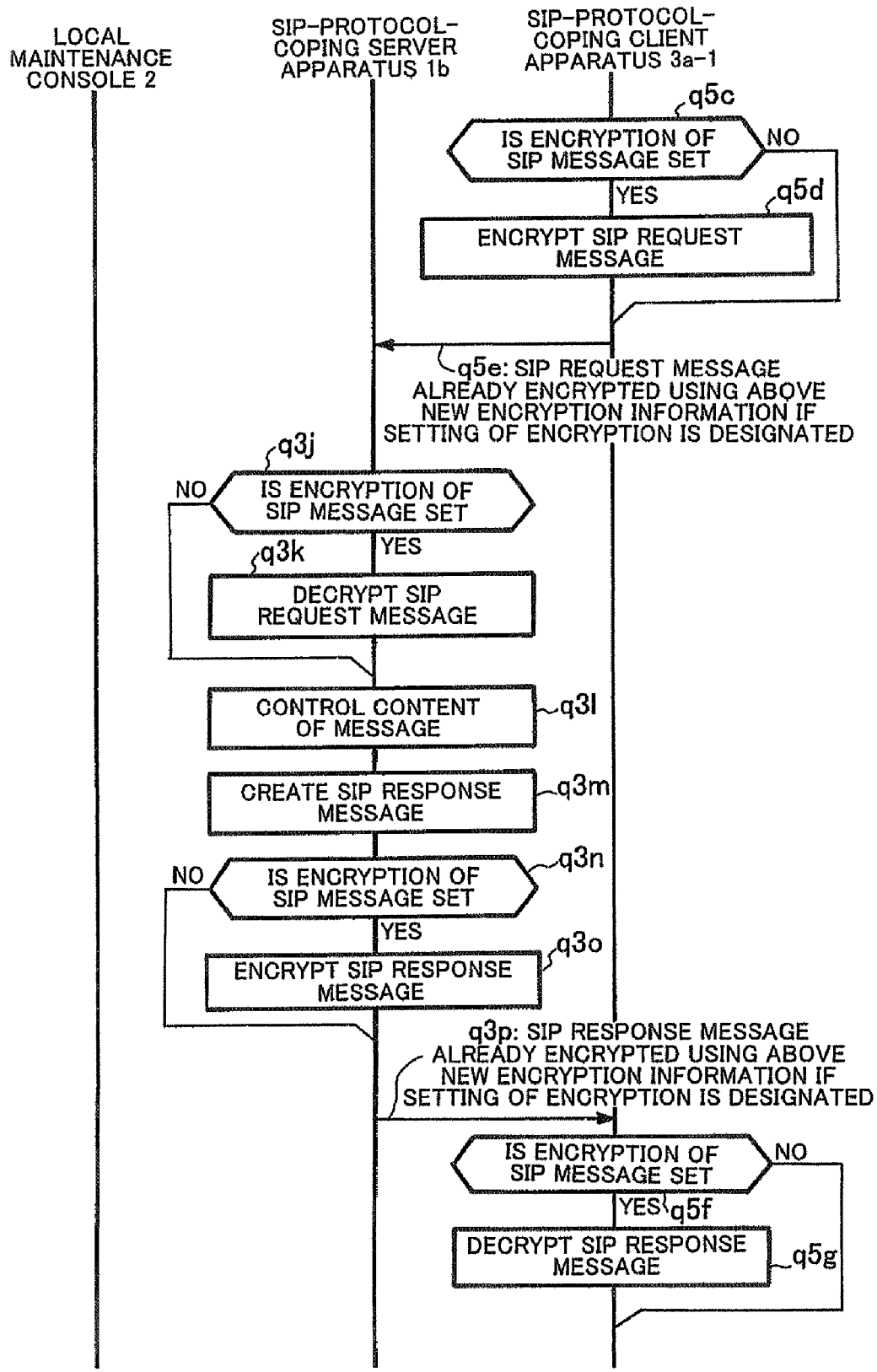
FIG. 59 is a sequence chart showing operation performed by the client server distributed system according to the seventeenth embodiment of the present invention.

The encryption information setting unit 31 stores therein the new encryption information, and sets the new encryption information to the SIP message encryption/decryption unit 36 (at q49 in FIG. 57). After completing setting, the encryption information setting unit 31 instructs the SIP message forming unit 34 to create an SIP response message for notification of completion of the setting of the new encryption information (at q50 in FIG. 57). The SIP message forming unit 34 creates the SIP response message, and transmits the created SIP response message to the SIP message encryption/decryption unit 36. The SIP message encryption/decryption unit 36 encrypts the SIP response message using the old encryption information (at q51 in FIG. 57). The encrypted SIP response message is transmitted to the SIP interface unit 13 of the server apparatus 1*b* via the SIP interface unit 33 (at q52 in FIG. 57).

Upon receiving the SIP response message for notification of the completion of the setting of the new encryption information, the SIP interface unit 13 of the server apparatus 1*b* instructs the SIP message encryption/decryption unit 16 to decrypt the SIP response message (at q37 in FIG. 57). The SIP message encryption/decryption unit 16 decrypts the SIP response message and transmits the decrypted SIP response message to the SIP message analyzing unit 15. The SIP message analyzing unit 15 transmits the notification of the completion of the setting of the new encryption information on the client apparatus 3*a*-1 side to the encryption information setting unit 11.

The encryption information setting unit 11 acknowledges the completion of the setting of the new encryption information, and sets the new encryption information to the SIP message encryption/decryption unit 16 (at q38 in FIG. 57). After completion of the setting, the encryption information setting unit 11 transmits a notification of the completion of the setting of the new encryption information to the local maintenance console 2 via the encryption information input interface unit 12 (at q39 in FIG. 57). The local maintenance console 2 displays the completion of the setting of the information as to whether or not the SIP message is encrypted, the encryption rule, and the encryption range (or new encryption information) (at q13 in FIG. 57).

When the presence or absence of encryption, the encryption rule, and the encryption range during transmission or reception of the SIP message between the server apparatus 1*b* and the SIP-protocol-coping client apparatus 3*a*-1 is input to the server apparatus 1*b* from the local maintenance console 2 connected to the server apparatus 1*b*, and if the current encryption information of encryption or non-encryption checked by the encryption information setting unit 11 is the setting of encryption (at q24 in FIG. 55), the encryption information setting unit 11 executes a sequence for setting encryption information (new encryption information) using the encryption key automatically created by the server apparatus 1*b* at random with the current encryption information assumed as the old encryption information.

The encryption information setting unit 11 instructs the encryption key forming unit 18 to create an encryption key used to transmit or receive an SIP message to or from the client apparatus 3*a*-1 (at q32 in FIG. 56). Further, the encryption information setting unit 11 stores therein the encryption key created by the encryption key forming unit 18 and the old encryption information, i.e., the information as to whether or not the SIP message is encrypted, the encryption rule, and the encryption range (at q33 in FIG. 56). The encryption information setting unit 11 instructs the SIP message forming unit 14 to create an SIP request message including the new encryption information (at q34 in FIG. 56). The SIP message forming unit 14 creates the SIP request message and transmits the created SIP request message to the SIP message encryption/decryption unit 16. The SIP message encryption/decryption unit 16 encrypts the SIP request message according to the old encryption information (at q35 in FIG. 56). The encrypted SIP request message is transmitted to the SIP interface unit 33 of the client apparatus 3*a*-1 via the SIP interface unit 13 (at q36 in FIG. 56).

When the SIP interface unit 33 of the client apparatus 3*a*-1 receives the SIP request message, the SIP interface unit 33 transmits the received SIP request message to the SIP message encryption/decryption unit 36. The SIP message encryption/decryption unit 36 decrypts the SIP request message (at q48 in FIG. 56). The decrypted SIP request message is transmitted to the SIP message analyzing unit 35. If the SIP message analyzing unit 35 can confirm the normality of the new encryption information, the SIP message analyzing unit 35 transmits the new encryption information to the encryption information setting unit 31.

The encryption information setting unit 31 stores therein the new encryption information, and sets the new encryption information to the SIP message encryption/decryption unit 36 (at q49 in FIG. 57). After completing setting, the encryption information setting unit 31 instructs the SIP message forming unit 34 to create an SIP response message for notification of completion of the setting of the new encryption information (at q50 in FIG. 57). The SIP message forming unit 34 creates the SIP response message, and transmits the created SIP response message to the SIP message encryption/decryption unit 36. The SIP message encryption/decryption unit 36 encrypts the SIP response message using the old encryption information (at q51 in FIG. 57). The encrypted SIP response message is transmitted to the SIP interface unit 13 of the server apparatus 1*b* via the SIP interface unit 33 (at q52 in FIG. 57).

Upon receiving the SIP response message for notification of the completion of the setting of the new encryption information, the SIP interface unit 13 of the server apparatus 1*b* instructs the SIP message encryption/decryption unit 16 to decrypt the SIP response message (at q37 in FIG. 57). The SIP message encryption/decryption unit 16 decrypts the SIP response message and transmits the decrypted SIP response message to the SIP message analyzing unit 15. The SIP message analyzing unit 15 transmits the notification of the completion of the setting of the new encryption information on the client apparatus 3*a*-1 side to the encryption information setting unit 11.

The encryption information setting unit 11 acknowledges the completion of the setting of the new encryption information, and sets the new encryption information to the SIP message encryption/decryption unit 16 (at q38 in FIG. 57). After completion of the setting, the encryption information setting unit 11 transmits a notification of the completion of the setting of the new encryption information to the local maintenance console 2 via the encryption information input interface unit 12 (at q39 in FIG. 57). The local maintenance console 2 displays the completion of the setting of the information as to whether or not the SIP message is encrypted, the encryption rule, and the encryption range (or new encryption information) (at q13 in FIG. 57).

The transmission or reception operation including encryption and decryption operation after setting the new encryption information to the SIP message encryption/decryption unit 16 (operation at q3*b* to q3*f* in FIG. 57, at q3*g* to q31 and q53 to a5*b* in FIG. 58, at q3*j* to q3*p* and q5*c* to q5*g* in FIG. 59, and at q5*h* in FIG. 60) is similar to that according to the eleventh embodiment of the present invention. Therefore, it will not be described herein.

In this manner, according to the seventeenth embodiment, a maintenance person can arbitrarily change the encryption information from the local maintenance console 2 via the server apparatus 1*b* to transmit or receive the SIP message using the new encryption information. It is, therefore, possible to strengthen the SIP message encryption security function.

Furthermore, according to the seventeenth embodiment, the maintenance person can arbitrarily set whether or not the SIP message is encrypted via the SIP-protocol-coping server apparatus. Due to this, if the maintenance person sets the encryption of the SIP message, then it is possible to realize an encryption security function on the network and to make different settings of encryption or non-encryption according to network configurations. If, for example, an SIP message log is recorded for maintenance operation, the setting of non-encryption of the SIP message can be easily made, thereby making it possible to facilitate management by the maintenance personnel.

Moreover, according to the sixteenth embodiment, optimum procedures for changing the encryption information including the method of creating the encryption key can be automatically selected according to a content of the change in the setting of encryption or non-encryption. Therefore, it is possible to ensure changing the encryption information. According to the seventeenth embodiment, the advantages deriving from the SIP message encryption during transmission and reception of the SIP message are similar to those according to the first to sixteenth embodiments of the present invention. While operations performed by the client apparatuses $3a$-2 and $3a$-3 are not described herein, the same advantages as those when using the client apparatus $3a$-1 can be exhibited.

Eighteenth Embodiment

Figure 61:
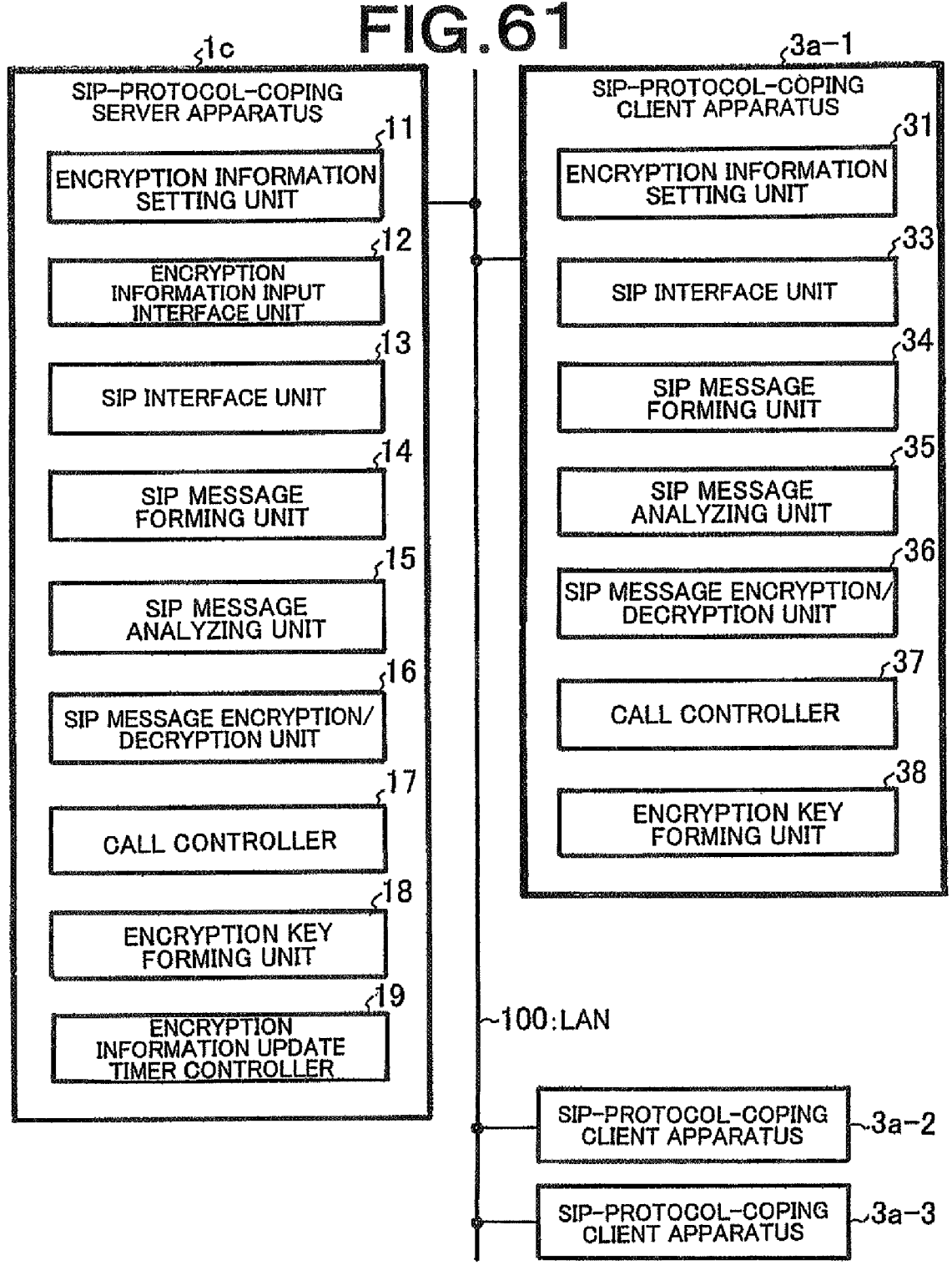
FIG. 61 is a block diagram showing a configuration of a client server distributed system according to an eighteenth embodiment of the present invention.

FIG. 61 is a block diagram showing a configuration of a client server distributed system according to an eighteenth embodiment of the present invention. In FIG. 61, the client server distributed system according to the eighteenth embodiment of the present invention is the same in configuration as the client server distributed system according to the eleventh embodiment of the present invention shown in FIG. 35 except that a server apparatus $1c$ includes an encryption information update timer controller 19. In FIG. 61, the same constituent elements are denoted by the same reference symbols as those shown in FIG. 35. Further, the same constituent elements operate similarly to those according to the eleventh embodiment of the present invention.

It is to be noted that in the eighteenth embodiment, encryption information is already set to the server apparatus $1c$ and the client apparatuses $3a$-1 to $3a$-3, and that encryption and decryption processings are performed at the time of transmitting or receiving an SIP message in a state of a setting of encryption of the SIP message. The set encryption information will be referred to as "old encryption information", hereinafter.

According to the eighteenth embodiment, by configuring the client server distributed system as stated above, it is possible to regularly update the encryption information used to encrypt the SIP message during the communication between the server apparatus $1c$ and each of the client apparatuses $3a$-1 to $3a$-3. Further, it is possible to strengthen the security for SIP message control on the IP network.

Figure 62:
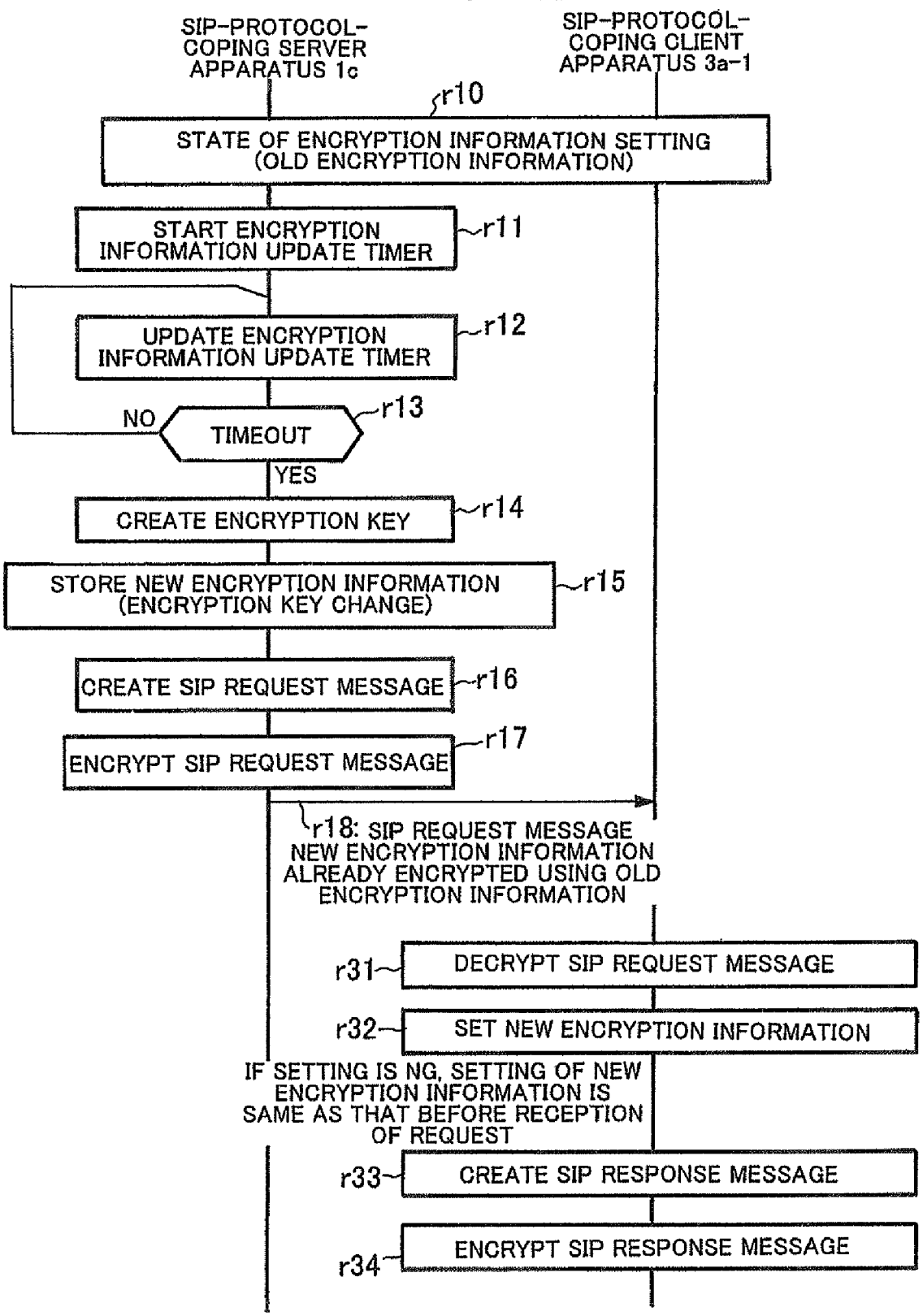
FIG. 62 is a sequence chart showing operation performed by the client server distributed system according to the eighteenth embodiment of the present invention.
Figure 63:
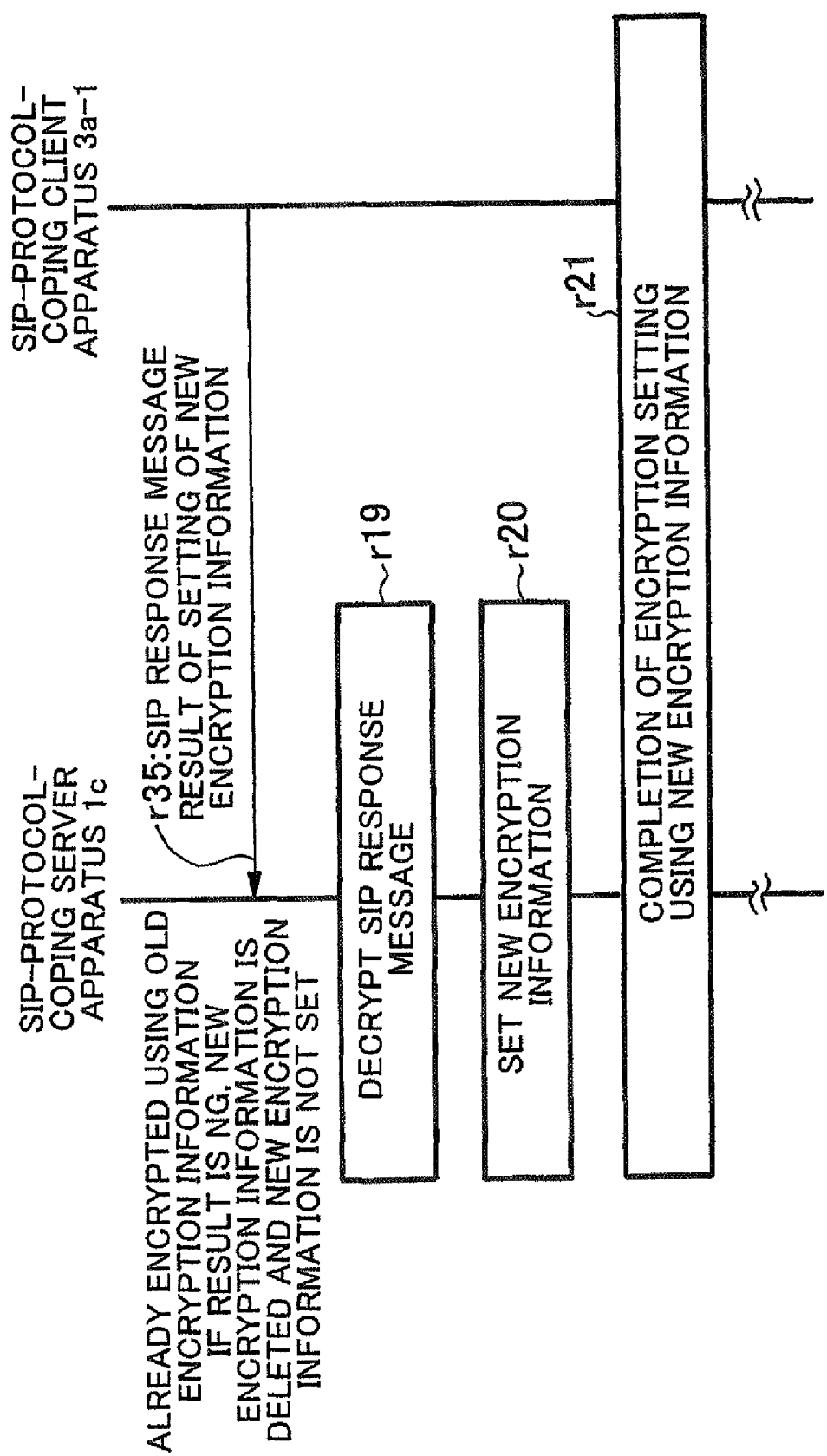
FIG. 63 is a sequence chart showing operation performed by the client server distributed system according to the eighteenth embodiment of the present invention.

FIGS. 62 and 63 are sequence charts showing operation performed by the client server distributed system according to the eighteenth embodiment of the present invention. Referring to FIGS. 61 and 63, the operation performed by the client server distributed system according to the eighteenth embodiment of the present invention will be described. It is to be noted that processings performed by the server apparatus $1c$ and those performed by the client apparatus $3a$-1 shown in FIGS. 62 and 63 are realized by causing CPUs of the server apparatus $1c$ and the client apparatus $3a$-1 to execute programs, respectively.

After setting the encryption information, the encryption information setting unit 11 of the server apparatus $1c$ instructs the encryption information update timer controller 19 to control an encryption information update timer, and causes the encryption information update timer controller 19 to start the encryption information update timer (at r10 and r11 in FIG. 62).

The encryption information update timer controller 19 regularly updates the encryption information update timer (at r12 in FIG. 62), and checks whether the encryption information update timer indicates timeout (at r13 in FIG. 62). If the timer indicates the timeout, the server apparatus $1c$ executes an encryption information update sequence. While the encryption information update sequence varies according to the currently set encryption presence or absence of encryption, the sequence when a setting of encryption is made will be described in the eighteenth embodiment.

The encryption information setting unit 11 instructs the encryption key forming unit 18 to create an encryption key used during transmission or reception of the SIP message to or from the client apparatus $3a$-1 (at r14 in FIG. 62). After the encryption key forming unit 18 creates the encryption key, the encryption information setting unit 11 stores therein the encryption key created by the encryption key forming unit 18 and the old encryption information, i.e., the information as to whether the SIP message is encrypted, the encryption rule, and the encryption range as new encryption information (at r15 in FIG. 62).

The encryption information setting unit 11 instructs the SIP message forming unit 14 to create an SIP request message including new information as to whether or not the SIP message is encrypted, the encryption rule, the encryption range, and the encryption key (hereinafter, "new encryption information") (at r16 in FIG. 62). The SIP message forming unit 14 creates the SIP request message, and transmits the created SIP request message to the SIP message encryption/decryption unit 16. The SIP message encryption/decryption unit 16 encrypts the SIP request message using the old encryption information (at r17 in FIG. 62). The encrypted SIP request message is transmitted to the SIP interface unit 33 of the client apparatus 3-1 via the SIP interface unit 13 (at r18 in FIG. 62).

When the SIP interface unit 33 of the client apparatus $3a$-1 receives the SIP request message, the SIP interface unit 33 transmits the received SIP request message to the SIP message encryption/decryption unit 36. The SIP message encryption/decryption unit 36 decrypts the SIP request message (at r31 in FIG. 62). The decrypted SIP request message is transmitted to the SIP message analyzing unit 35. If the SIP message analyzing unit 35 can confirm the normality of the new encryption information, the SIP message analyzing unit 35 transmits the new encryption information to the encryption information setting unit 31.

The encryption information setting unit 31 stores therein the new encryption information, and sets the new encryption information to the SIP message encryption/decryption unit 36 (at r32 in FIG. 62). After completing setting, the encryption information setting unit 31 instructs the SIP message forming unit 34 to create an SIP response message for notification of completion of the setting of the new encryption information (at r33 in FIG. 62). The SIP message forming unit 34 creates the SIP response message, and transmits the created SIP response message to the SIP message encryption/decryption unit 36. The SIP message encryption/decryption unit 36 encrypts the SIP response message using the old encryption information (at r34 in FIG. 62). The encrypted SIP response message is transmitted to the SIP interface unit 13 of the server apparatus $1c$ via the SIP interface unit 33 (at r35 in FIG. 63).

Upon receiving the SIP response message for notification of the completion of the setting of the new encryption information, the SIP interface unit 13 of the server apparatus $1c$ instructs the SIP message encryption/decryption unit 16 to decrypt the SIP response message (at r19 in FIG. 63). The SIP message encryption/decryption unit 16 decrypts the SIP response message and transmits the decrypted SIP response message to the SIP message analyzing unit 15. The SIP message analyzing unit 15 transmits the notification of the completion of the setting of the new encryption information on the client apparatus 3a-1 side to the encryption information setting unit 11. The encryption information setting unit 11 acknowledges the completion of the setting of the new encryption information, and sets the new encryption information to the SIP message encryption/decryption unit 16 (at r20 in FIG. 63).

After the new encryption information is set to the SIP message encryption/decryption unit 16, the SIP message encryption/decryption unit 16 instructs the encryption information update timer controller 19 to execute control over the encryption information update timer. The encryption information update timer controller 19 executes control over the encryption information update timer and restarts the control over the encryption information update timer (at r21 in FIG. 63 and r11 in FIG. 62). Subsequently, the operation returns to the initial processing operation according to the eighteenth embodiment, and the above-stated processing operation is repeatedly carried out.

In this manner, according to the eighteenth embodiment, the encryption information can be regularly changed and the SIP message can be transmitted or received using the new encryption information. It is therefore possible to strengthen the SIP message encryption security function. Moreover, according to the eighteenth embodiment, the advantages deriving from the SIP message encryption during transmission or reception are similar to those according to the first to sixteenth embodiments of the present invention. While operations performed by the client apparatuses 3a-2 and 3a-3 are not described herein, the same advantages as those when using the client apparatus 3a-1 can be exhibited.

Nineteenth Embodiment

Figure 64:
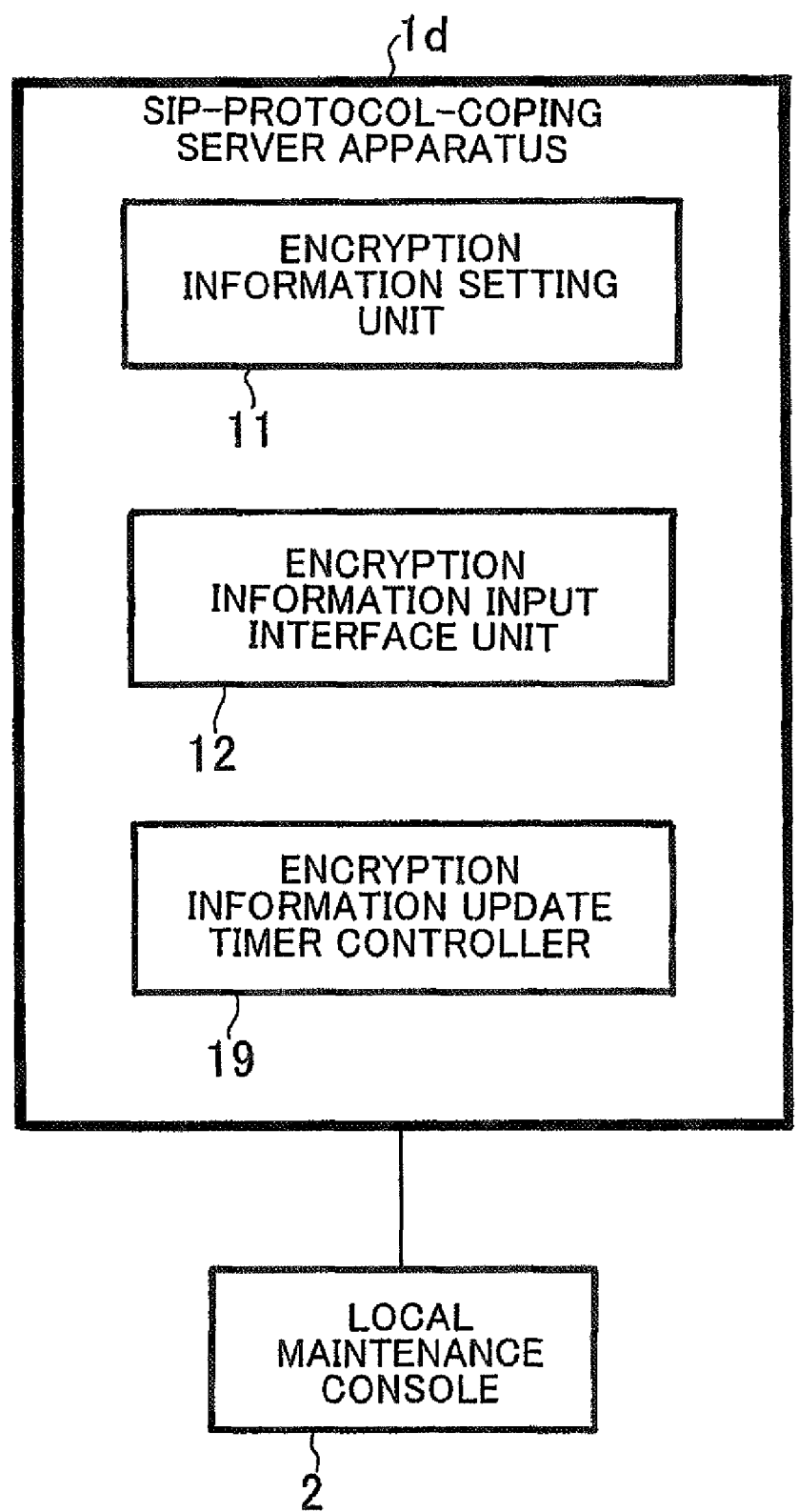
FIG. 64 is a block diagram showing a configuration of a server apparatus according to a nineteenth embodiment of the present invention.

FIG. 64 is a block diagram showing a configuration of a server apparatus according to a nineteenth embodiment of the present invention. In FIG. 64, a server apparatus 1d includes at least an encryption information setting unit 11, an encryption information input interface unit 12, and an encryption information update timer controller 19, and a local maintenance console 2 is connected to the server apparatus 1d by a serial cable or the like. The local maintenance console 2 may be disposed temporarily in a construction period or the like of the server apparatus 1d and may not be connected to the server apparatus 1d during operation of the system.

According to the nineteenth embodiment, by realizing the above-stated configuration, it is possible to make variable an encryption information regular update timer used to encrypt an SIP message during the communication between the server apparatus 1d and a client apparatus which is not shown. Further, it is possible to strengthen the security for SIP message control on the IP network.

Figure 65:
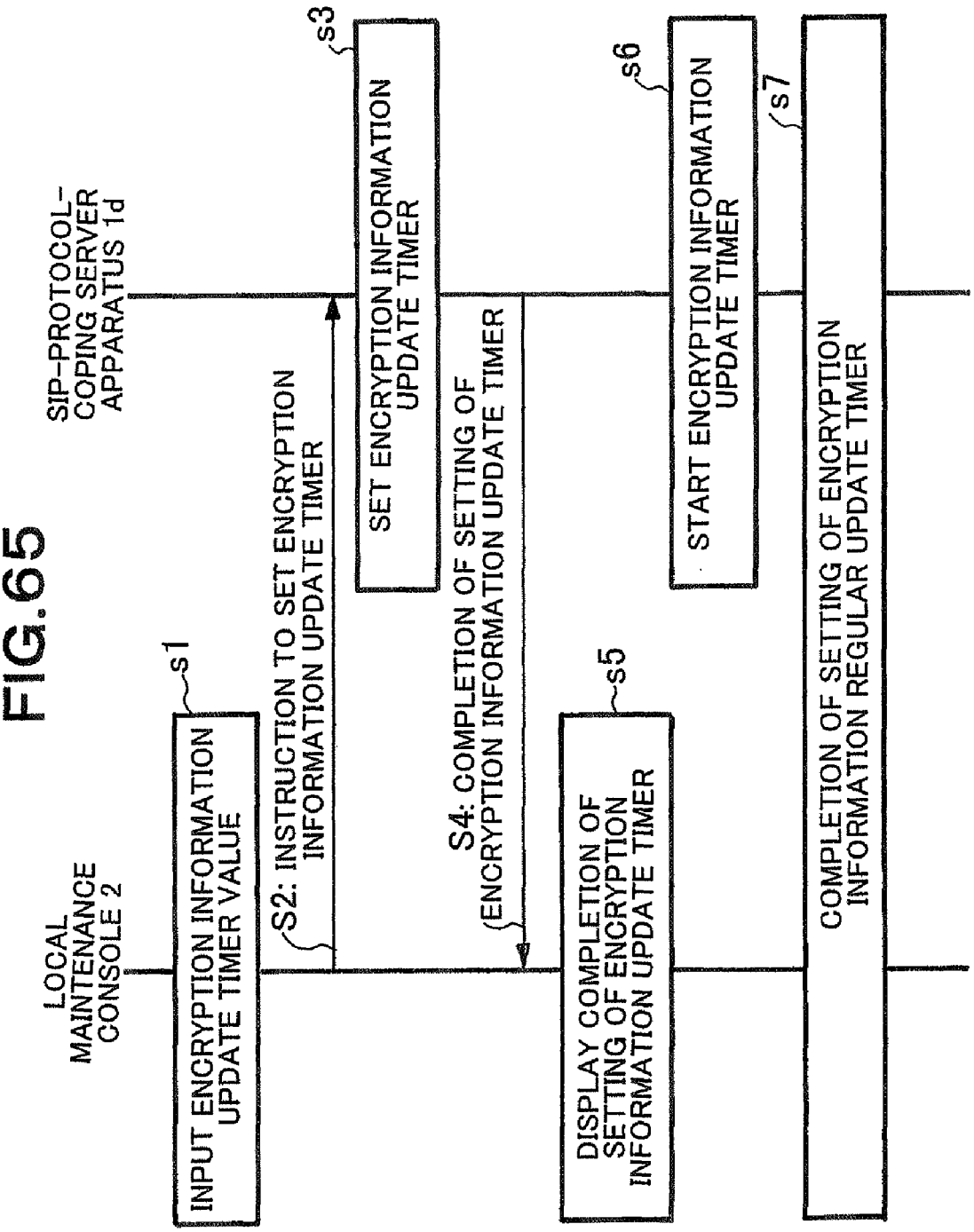
FIG. 65 is a sequence chart showing operation performed by the server apparatus according to the nineteenth embodiment of the present invention.

FIG. 65 is a sequence chart showing operation performed by the server apparatus 1d according to the nineteenth embodiment of the present invention. Referring to FIGS. 64 and 65, the operation performed by the server apparatus 1d according to the nineteenth embodiment of the present invention will be described. It is to be noted that processings performed by the server apparatus 1d shown in FIG. 65 are realized by causing a CPU of the server apparatus 1d to execute a programs.

When an encryption information update timer value is input to the server apparatus 1d from the local maintenance console 2 connected to the server apparatus 1d (at s1 in FIG. 65), the encryption information interface unit 12 receives a setting request including the encryption information update timer value (at s2 in FIG. 65). If the encryption information interface unit 12 can confirm normality of the setting request, the encryption information interface unit 12 transmits the encryption information update timer value to the encryption information setting unit 11.

The encryption information setting unit 11 stores therein the encryption information update timer value, notifies the encryption information update timer 19 of the encryption information update timer value, and instructs the encryption information update timer 19 to start operation (at s3 to s6 in FIG. 65). Since control operation performed by the encryption information update timer 19 is similar to that according to the eighteenth embodiment of the present invention, it will not be described herein.

In this manner, according to the nineteenth embodiment, an arbitrary regular update timer value can be set from the local maintenance console 2. It is therefore possible to change regular update intervals, to further strengthen encryption security if regular update is performed at shorter intervals, and to select an optimum regular update timer value in light of a loaded state of a network.

Twentieth Embodiment

Figure 66:
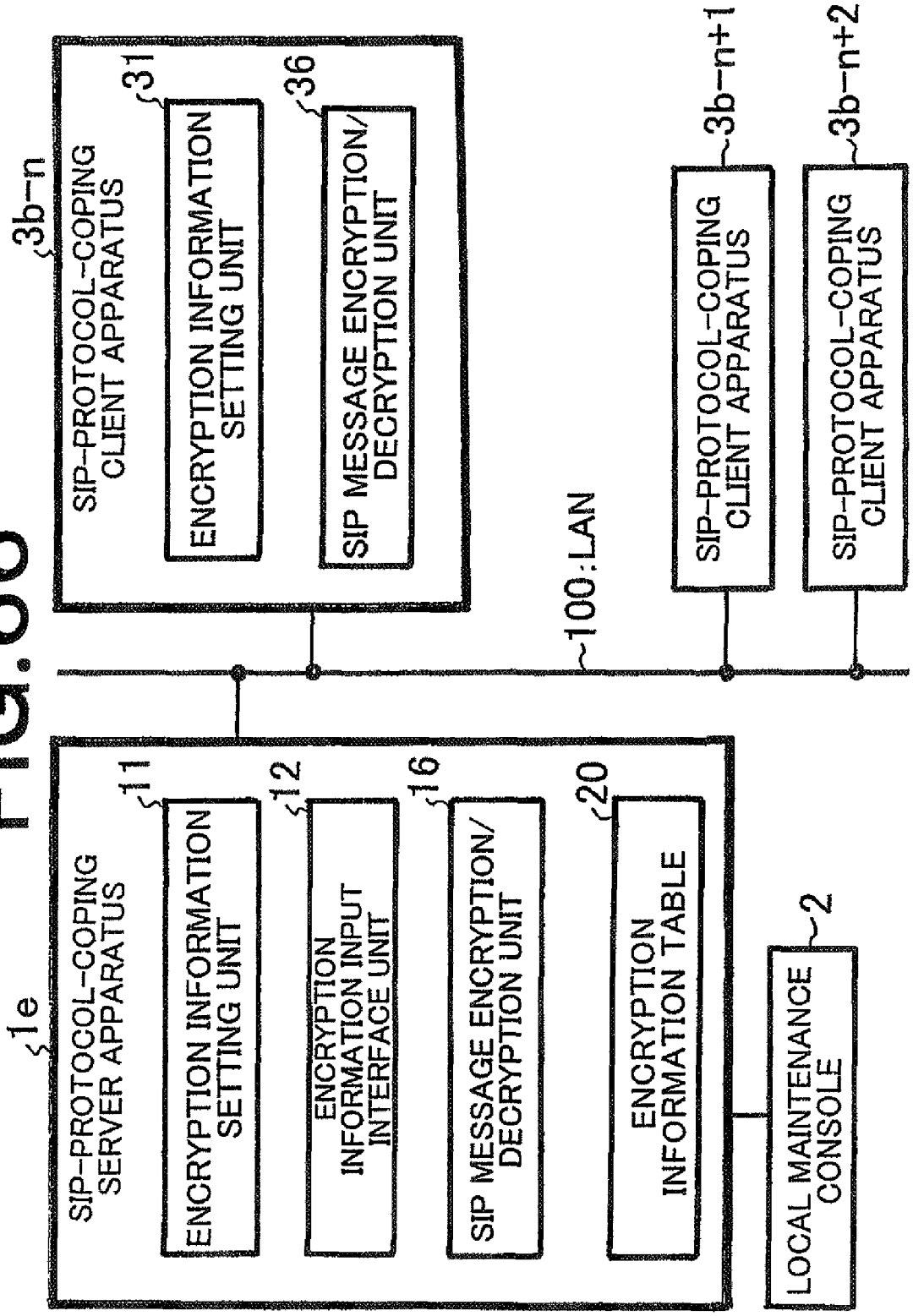
FIG. 66 is a block diagram showing a configuration of a client server distributed system according to a twentieth embodiment of the present invention.

FIG. 66 is a block diagram showing a configuration of a client server distributed system according to a twentieth embodiment of the present invention. In FIG. 66, the client server distributed system according to the twentieth embodiment of the present invention is configured so that a server apparatus 1e and client apparatuses 3b-n to 3b-n+2 are mutually connected by a LAN 100.

The server apparatus 1e is configured to include at least an encryption information setting unit 11, an encryption information input interface unit 12, an SIP interface unit 13, an SIP message encryption/decryption unit 16, and an encryption information table 20, and a local maintenance console 2 is connected to the server apparatus 1e by a serial cable or the like. The local maintenance console 2 may be disposed temporarily in a construction period or the like of the server apparatus 1e and may not be connected to the server apparatus 1e during operation of the system.

The client apparatus 3b-n is configured to include at least an encryption information setting unit 31, an SIP interface unit 33, and an SIP message encryption/decryption unit 36. Although not shown in FIG. 66, the client apparatuses 3b-n+1 and 3b-n+2 are similar in configuration to the client apparatus 3b-n.

According to the twentieth embodiment, by realizing the above-stated configuration, it is possible to set encryption information used to encrypt an SIP message for each of the client apparatuses 3b-n to 3b-n+2 and to strengthen security for SIP message control on the IP network during the communication between the server apparatus 1e and each of a plurality of client apparatuses 3b-n to 3b-n+2.

Figure 67:
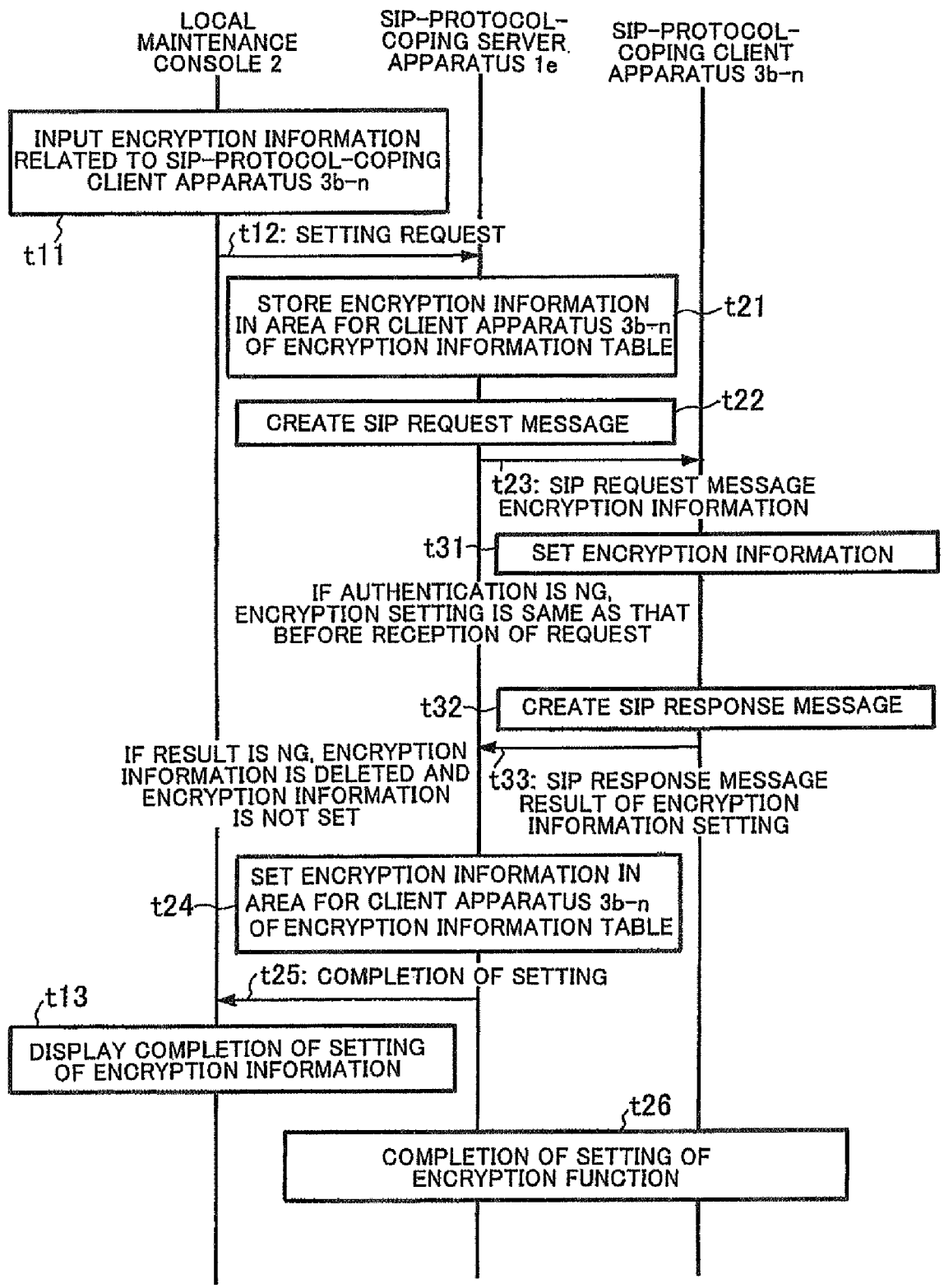
FIG. 67 is a sequence chart showing operation performed by the client server distributed system according to the twentieth embodiment of the present invention.

FIG. 67 is a sequence chart showing operation performed by the client server distributed system according to the twentieth embodiment of the present invention. FIG. 68 is a table showing an example of a configuration of the encryption information table 20 shown in FIG. 66. Referring to FIGS. 66 to 68, the operation performed by the client server distributed system according to the twentieth embodiment of the present invention will be described. It is to be noted that processings performed by the server apparatus 1e and the client apparatus 3b-n are realized by causing CPUs of the server apparatus 1e and the client apparatus 3b-n to execute programs, respectively. Furthermore, x client apparatuses (where x is a positive integer) can be registered in the server apparatus 1e.

Since encryption information setting operation between the server apparatus 1e and the client apparatus 3b-n is similar to that according to the twelfth embodiment of the present invention, it will not be described herein in detail.

When encryption information used to transmit or receive an SIP message to or from the client apparatus 3b-n is input to the server apparatus 1e from the local maintenance console 2 via the encryption information input interface unit 12 (at t11 in FIG. 67), the encryption information setting unit 11 stores the encryption information in an area for the client apparatus 3b-n of the encryption information table 20 if the encryption information is one that can be set to the server apparatus 1e (at t21 in FIG. 67). Furthermore, the encryption information setting unit 11 notifies the client apparatus 3b-n of the encryption information (at t22 and t23 in FIG. 67).

The client apparatus 3b-n stores the encryption information in the encryption information setting unit 31, sets the encryption information to the SIP message encryption/decryption unit 36 (at t31 in FIG. 67), and notifies the server apparatus 1e of completion of a setting of the encryption information (at t32 and t33 in FIG. 67).

Upon receiving the notification of the completion of the setting of the encryption information, the server apparatus 1e sets the encryption information to the SIP message encryption/decryption unit 16 (at t24 in FIG. 67), and confirms that the setting of the encryption information to the client apparatus 3b-n is completed (at t25 and t13 in FIG. 67).

Similarly to the above-stated setting operation, when encryption information on the client apparatuses 3b-n+1 and that on 3b-n+2 are input from the local maintenance console 2 to the server apparatus 1e, then the encryption information setting unit 11 stores the encryption information in areas for the SIP-protocol-coping client apparatuses 3b-n+1 and 3b-n+2 of the encryption information table 20, respectively, and executes an encryption information setting sequence similar to that stated above.

In this manner, according to the twentieth embodiment, the server apparatus 1e can set different encryption information according to the respective client apparatuses 3b-n to 3b-n+2, and different encryption rules, encryption ranges, and encryption keys can be used according to the respective client apparatuses 3b-n to 3b-n+2. It is therefore possible to make it difficult to estimate the encryption information on the other apparatus from encryption states of the respective client apparatuses 3b-n to 3b-n+2, and to further strengthen the encryption security function.

Moreover, according to the twentieth embodiment, there is no need to make encryption functions of the client apparatuses 3b-n to 3b-n+2 coincident in the system. As long as the encryption function held by the server apparatus 1e coincides with that held by each of the client apparatuses 3b-n to 3b-n+2, it is possible to realize the encryption function in the system. Advantages deriving from encryption of the SIP message during transmission or reception of the SIP message according to the twentieth embodiment are similar to those according to the first to nineteenth embodiments of the present invention.

Twenty First Embodiment

Figure 69:
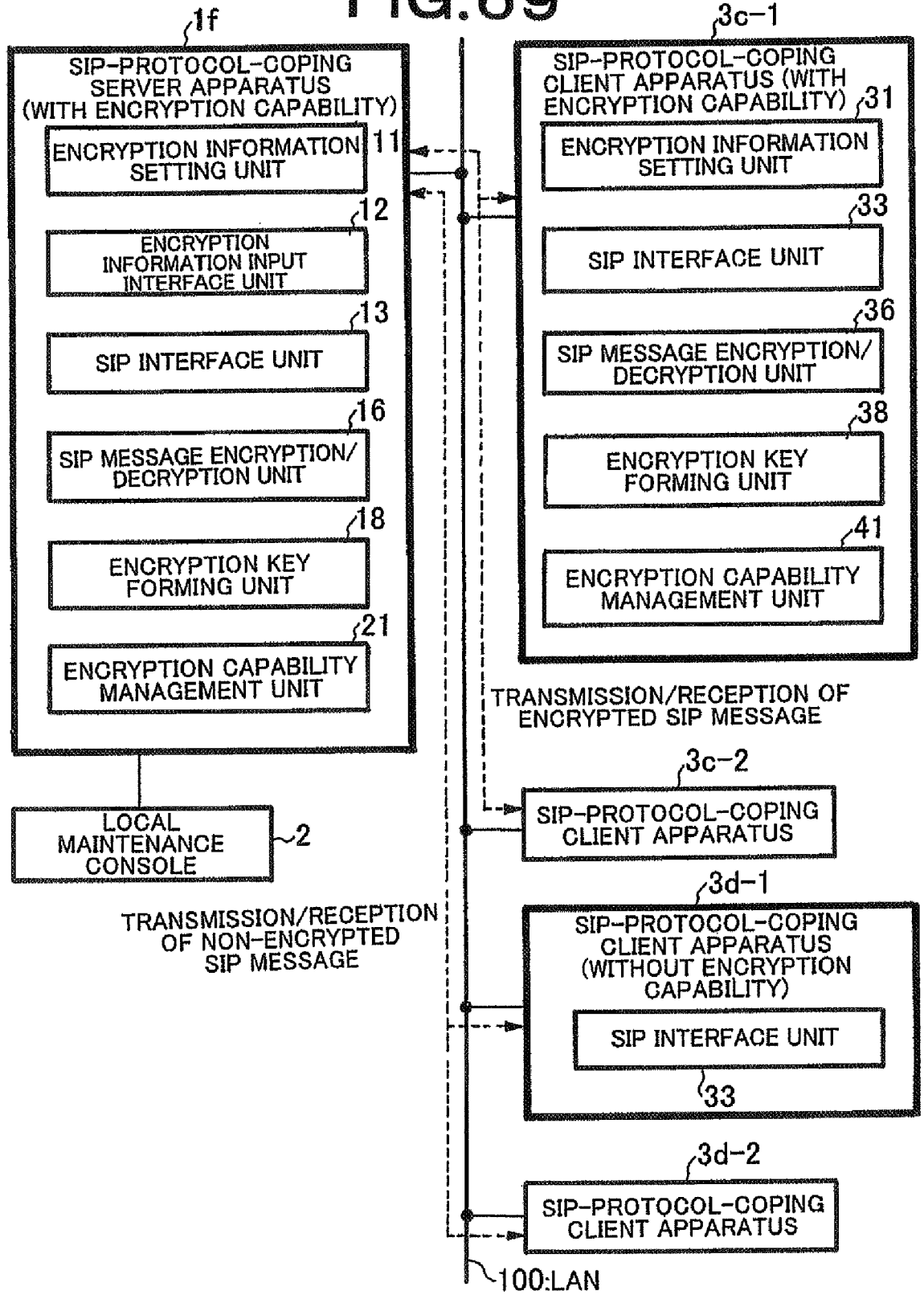
FIG. 69 is a block diagram showing a configuration of a client server distributed system according to a twenty first embodiment of the present invention.

FIG. 69 is a block diagram showing a configuration of a client server distributed system according to a twenty first embodiment of the present invention. In FIG. 69, the client server distributed system according to the twenty first embodiment of the present invention is configured so that a server apparatus 1f and client apparatuses 3c-1, 3c-2, 3d-1, and 3d-2 are mutually connected by a LAN 100.

The server apparatus 1f is configured to include at least an encryption information setting unit 11, an encryption information input interface unit 12, an SIP interface unit 13, an SIP message encryption/decryption unit 16, an encryption key forming unit 18, and an encryption capability management unit 21, and a local maintenance console 2 is connected to the server apparatus 1f by a serial cable or the like. The local maintenance console 2 may be disposed temporarily in a construction period or the like of the server apparatus 1f and may not be connected to the server apparatus 1f during operation of the system.

Each of the client apparatuses 3c-1 and 3c-2 is configured to include at least an encryption information setting unit 31, an SIP interface unit 33, an SIP message encryption/decryption unit 36, an encryption key forming unit 38, and an encryption capability management unit 41. Each of the client apparatuses 3d-1 and 3d-2 is configured to include at least an SIP interface unit 33.

According to the twenty first embodiment, by realizing the above-stated configuration, it is possible to set encryption information used to encrypt an SIP message for each of the client apparatuses 3c-1, 3c-2, 3d-1, and 3d-2 during the communication between the server apparatus 1f and each of a plurality of client apparatuses 3c-1, 3c-2, 3d-1, and 3d-2, and to ensure an optimum security state irrespectively of the difference in encryption capability among the client apparatuses.

Figure 70:
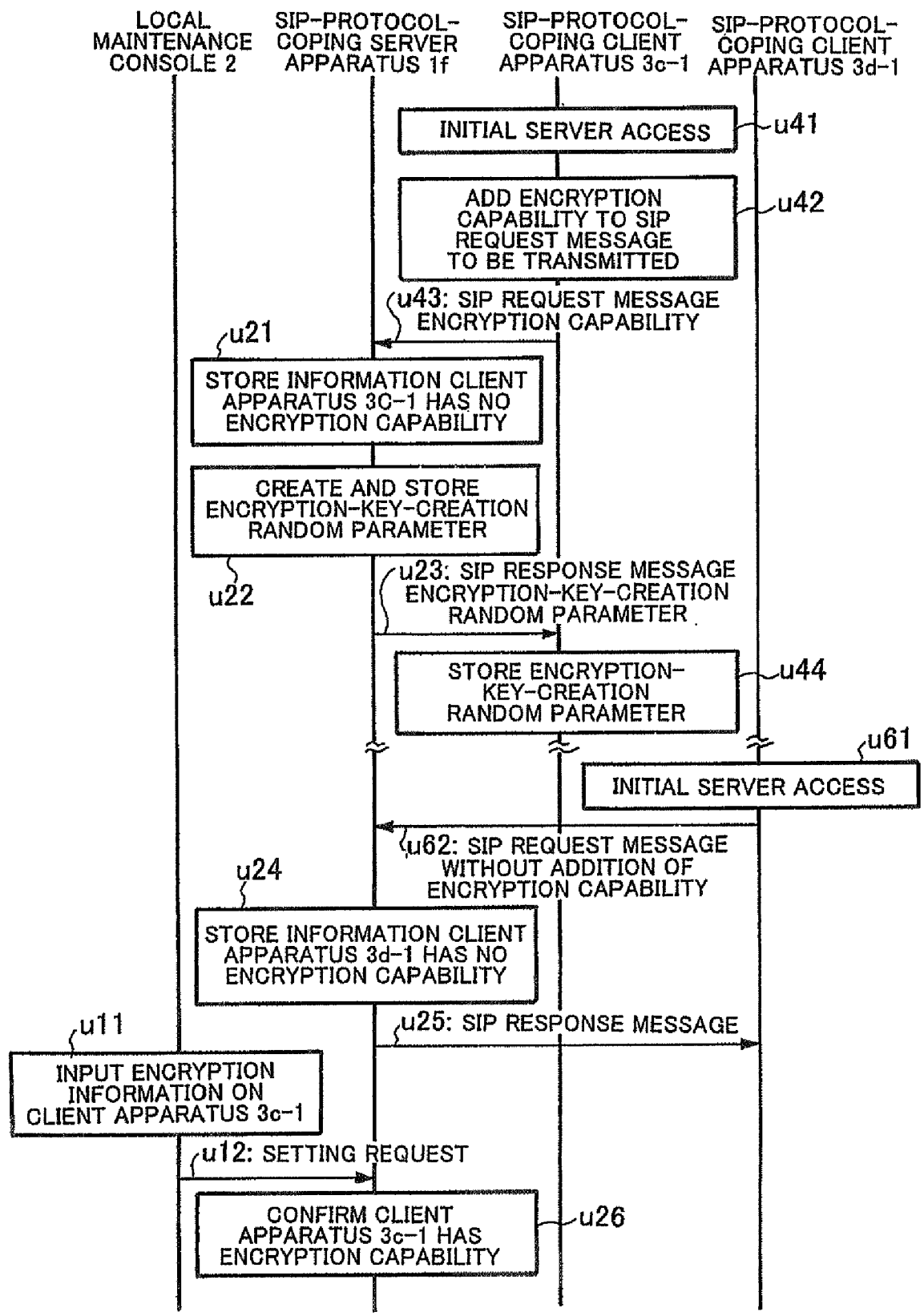
FIG. 70 is a sequence chart showing operation performed by the client server distributed system according to the twenty first embodiment of the present invention.
Figure 71:
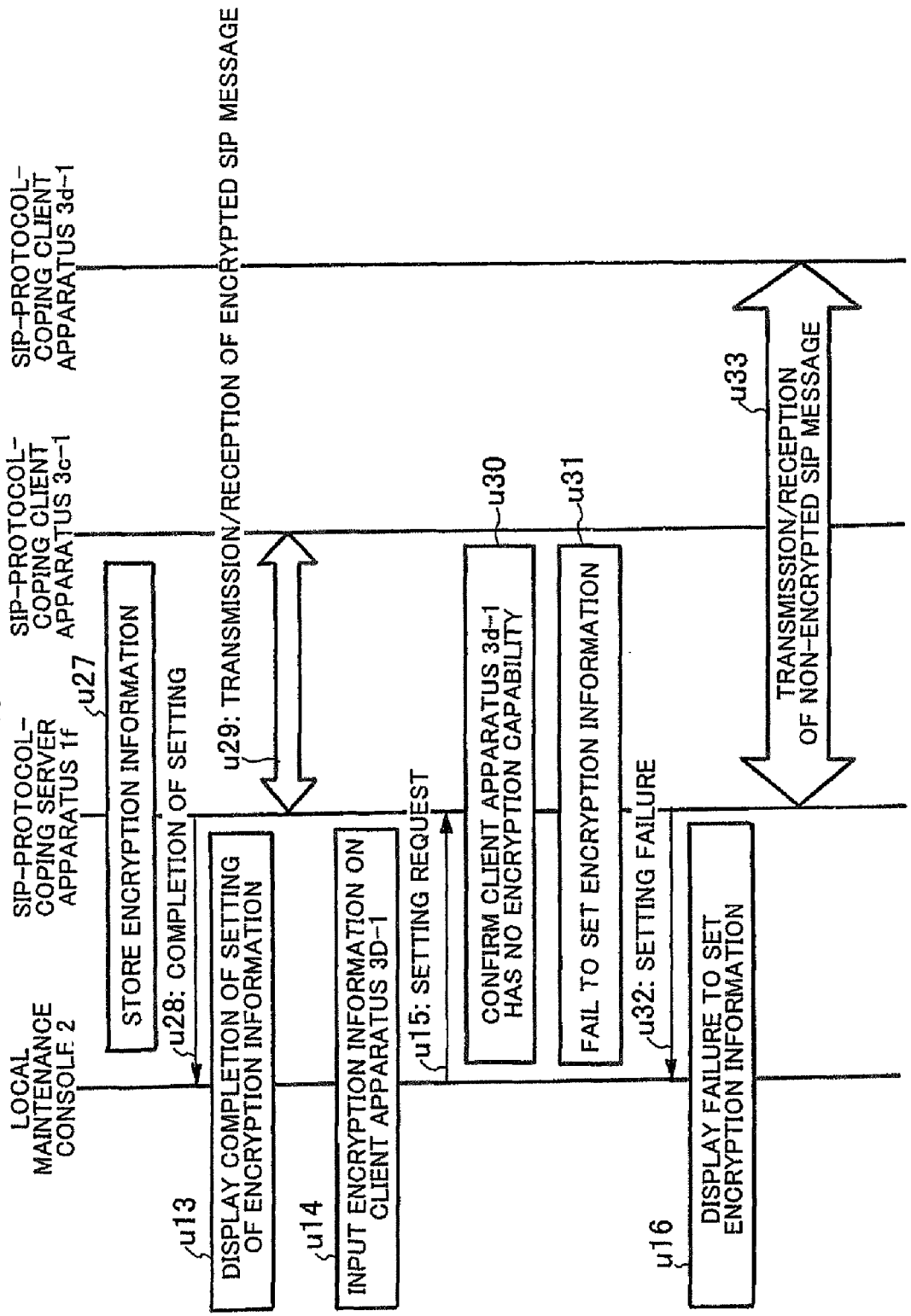
FIG. 71 is a sequence chart showing operation performed by the client server distributed system according to the twenty first embodiment of the present invention.

FIGS. 70 and 71 are sequence charts showing operation performed by the client server distributed system according to the twenty first embodiment of the present invention. Referring to FIGS. 69 to 71, the operation performed by the client server distributed system according to the twenty first embodiment of the present invention will be described. It is to be noted that processings performed by the server apparatus 1f and the client apparatuses 3c-1, 3c-2, 3d-1, and 3d-2 shown in FIGS. 70 and 71 are realized by causing CPUs of the server apparatus 1f and the client apparatus 3c-1, 3c-2, 3d-1, and 3d-2 to execute programs, respectively.

When an initial server access request to the server apparatus 1f is generated in the client apparatus 3c-1 (at u41 in FIG. 70), then the encryption capability management unit 41 adds encryption capability data held by the client apparatus 3c-1 to an SIP request message to be transmitted (at u42 in FIG. 70), and transmits the SIP request message to the SIP interface unit 13 of the server apparatus 1f via the SIP interface unit 33 (at u43 in FIG. 70).

The SIP interface unit 13 of the server apparatus 1f receiving the SIP request message acknowledges the initial access from the client apparatus 3c-1, and transmits the SIP request message to the encryption information setting unit 11. The encryption information setting unit 11 notifies the encryption capability management unit 21 of an encryption capability of the client apparatus 3c-1, and the encryption capability management unit 21 stores therein information that the client apparatus 3c-1 has encryption capability (at u21 in FIG. 70).

Further, the encryption information setting unit 11 creates and stores therein an encryption-key-creation random parameter used to encrypt an SIP message between the server apparatus 1f and the client apparatus 3c-1 (at u22 in FIG. 70). The encryption information setting unit 11 transmits an SIP response message to which the encryption-key-creation random parameter is added to the SIP interface unit 33 of the client apparatus 3*c*-1 via the SIP interface unit 13 (at u23 in FIG. 70).

Upon receiving the SIP response message to which the encryption-key-creation random parameter is added, the SIP interface unit 33 of the client apparatus 3*c*-1 transmits the received encryption-key-creation random parameter to the encryption information setting unit 31. The encryption information setting unit 31 stores therein the encryption-key-creation random parameter (at u44 in FIG. 70).

When an initial server access request to the server apparatus 1*f* is generated in the client apparatus 3*d*-1 (at u61 in FIG. 70), an SIP request message is transmitted to the SIP interface unit 13 of the server apparatus 1*f* via the SIP interface unit 33 without adding encryption capability data to the SIP request message (at u62 in FIG. 70).

Upon receiving the SIP request message, the SIP interface unit 13 of the server apparatus 1*f* acknowledges the initial access from the client apparatus 3*d*-1, and transmits the SIP request message to the encryption information setting unit 11. Sine the encryption capability data is not added to the SIP request message, the encryption information setting unit 11 notifies the encryption capability management unit 21 that the client apparatus 3*d*-1 has no encryption capability, and the encryption capability management unit 21 stores therein information that the client apparatus 3*d*-1 has no encryption capability (at u24 in FIG. 70). Further, the encryption information setting unit 11 transmits an SIP response message to which no encryption-key-creation random parameter is added to the SIP interface unit 33 of the client apparatus 3*d*-1 via the SIP interface unit 13 (at u25 in FIG. 70).

When encryption information on an SIP message during transmission or reception of the SIP message between the server apparatus 1*f* and the client apparatus 3*c*-1 is input to the server apparatus 1*f* from the local maintenance console 2 connected to the server apparatus 1*f* (at u11 in FIG. 70), the encryption information input interface unit 12 receives a setting request including the encryption information (at u12 in FIG. 70). If confirming normality of the setting request, the encryption information input interface unit 12 transmits the encryption information to the encryption information setting unit 11. The encryption information setting unit 11 instructs the encryption capability management unit 21 to confirm whether or not the client apparatus 3*c*-1 has an encryption capability. If confirming that the client apparatus 3*c*-1 has an encryption capability (at u26 in FIG. 70), the encryption information setting unit 11 stores therein the encryption information (at u27 in FIG. 71). The server apparatus 1*f* transmits an SIP request message including the encryption information to the SIP interface unit 33 of the client apparatus 3*c*-1 via the SIP interface unit 13.

The SIP interface unit 33 of the client apparatus 3*c*-1 receives the SIP request message including the encryption information, and transmits the encryption information to the encryption information setting unit 31 and set the encryption information to the encryption/decryption unit 36. The encryption information setting unit 31 stores therein the encryption information, creates an encryption key from the encryption-key-creation random parameter stored in the encryption information setting unit 31. After completing setting, the encryption information setting unit 31 transmits an SIP response message for notification of completion of the setting of the encryption information to the SIP interface unit 13 of the server apparatus 1*f* via the SIP interface unit 33.

Upon receiving the SIP response message for notification of the completion of the setting of the encryption information, the SIP interface unit 13 of the server apparatus 1*f* transmits the received SIP response message to the encryption information setting unit 11. The encryption information setting unit 11 acknowledges the completion of the setting of the encryption information on the client apparatus 3*c*-1 side, creates an encryption key from the encryption-key-creation random parameter stored in the encryption information setting unit 11, and sets the encryption information to the SIP message encryption/decryption unit 16. After completion of the setting, a notification of the completion of the setting of the encryption information is transmitted to the local maintenance console 2 via the encryption information input interface unit 12 (at u28 in FIG. 71). The local maintenance console 2 displays the completion of the setting of the encryption information (at u13 in FIG. 71). Subsequently, during transmission or reception of an SIP message, the SIP message is encrypted or decrypted using the set encryption information (at u29 in FIG. 71).

When encryption information on an SIP message during transmission or reception of the SIP message between the server apparatus 1*f* and the client apparatus 3*d*-1 is input to the server apparatus 1*f* from the local maintenance console 2 connected to the server apparatus 1*f* (at u14 in FIG. 71), the encryption information input interface unit 12 receives a setting request including the encryption information (at u15 in FIG. 71). If confirming normality of the setting request, the encryption information input interface unit 12 transmits the encryption information to the encryption information setting unit 11. The encryption information setting unit 11 instructs the encryption capability management unit 21 to confirm whether or not the client apparatus 3*d*-1 has an encryption capability (at u30 in FIG. 71). If confirming that the client apparatus 3*d*-1 does not have an encryption capability, the encryption information setting unit 11 acknowledges that the setting of the encryption information fails (at u31 in FIG. 71).

The encryption information setting unit 11 that has acknowledged that the setting of the encryption information to the client apparatus 3*d*-1 fails transmits a notification of a failure to set the encryption information to the local maintenance console 2 via the encryption information interface unit 12 (at u32 in FIG. 71). The local maintenance console 2 displays the failure to set the encryption information (at u16 in FIG. 71). Subsequently, during transmission or reception of an SIP message, the SIP message is transmitted or received without being encrypted (at u33 in FIG. 71).

In this manner, according to the twenty first embodiment, if the server apparatus 1*f* includes the SIP message encryption and decryption function, and a mixture of the client apparatuses 3*c*-1 and 3*c*-2 each including the SIP message encryption and decryption function and the client apparatuses 3*d*-1 and 3*d*-2 each of which does not include the SIP message encryption and decryption function is present in the system, it is possible to make the SIP message encryption and decryption functions of only the client apparatuses 3*c*-1 and 3*c*-2 valid. Due to this, the SIP message encryption and decryption function can be kept valid only between the apparatuses that can encrypt and decrypt the SIP message without need to make function levels held by the client apparatuses 3*c*-1, 3*c*-2, 3*d*-1, and 3*d*-2 uniform, and an encryption security function of the system can be strengthened.

Furthermore, according to the twenty first embodiment, advantages deriving from the SIP message encryption during transmission or reception of the SIP message are similar to those according to the first and second embodiments of the present invention. While operations performed by the client apparatuses 3*c*-2 and 3*d*-2 are not described herein, the same advantages as those when using the client apparatus 3*c*-1 and 3*d*-1 can be exhibited.

Twenty Second Embodiment

Figure 72:
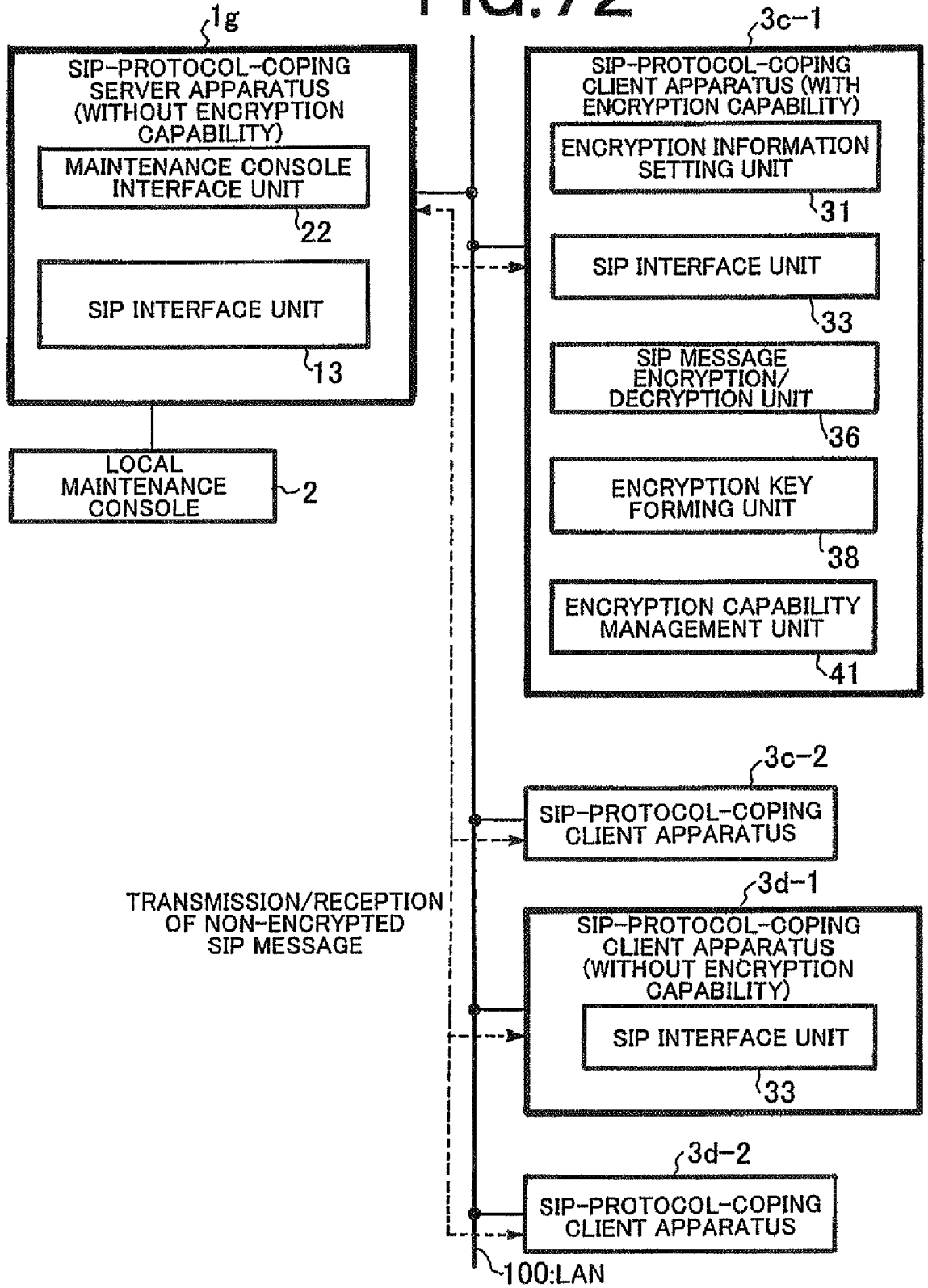
FIG. 72 is a block diagram showing a configuration of a client server distributed system according to a twenty second embodiment of the present invention.

FIG. 72 is a block diagram showing a configuration of a client server distributed system according to a twenty second embodiment of the present invention. In FIG. 72, the client server distributed system according to the twenty second embodiment of the present invention is configured so that a server apparatus 1g and client apparatuses 3c-1, 3c-2, 3d-1, and 3d-2 are mutually connected by a LAN 100.

The server apparatus 1g is configured to include at least a maintenance console interface unit 32 and an SIP interface unit 13, and a local maintenance console 2 is connected to the server apparatus 1f by a serial cable or the like. The local maintenance console 2 may be disposed temporarily in a construction period or the like of the server apparatus 1g and may not be connected to the server apparatus 1g during operation of the system.

Each of the client apparatuses 3c-1 and 3c-2 is configured to include at least an encryption information setting unit 31, an SIP interface unit 33, an SIP message encryption/decryption unit 36, an encryption key forming unit 38, and an encryption capability management unit 41. Each of the client apparatuses 3d-1 and 3d-2 is configured to include at least an SIP interface unit 33.

According to the twenty second embodiment, by realizing the above-stated configuration, it is possible to transmit an SIP message between the server apparatus 1g that does not include an encryption function and each of the client apparatuses that are a mixture of the client apparatuses 3c-1 and 3c-2 each including the encryption function and the client apparatuses 3d-1 and 3d-2 each of which does not include the encryption function.

Figure 73:
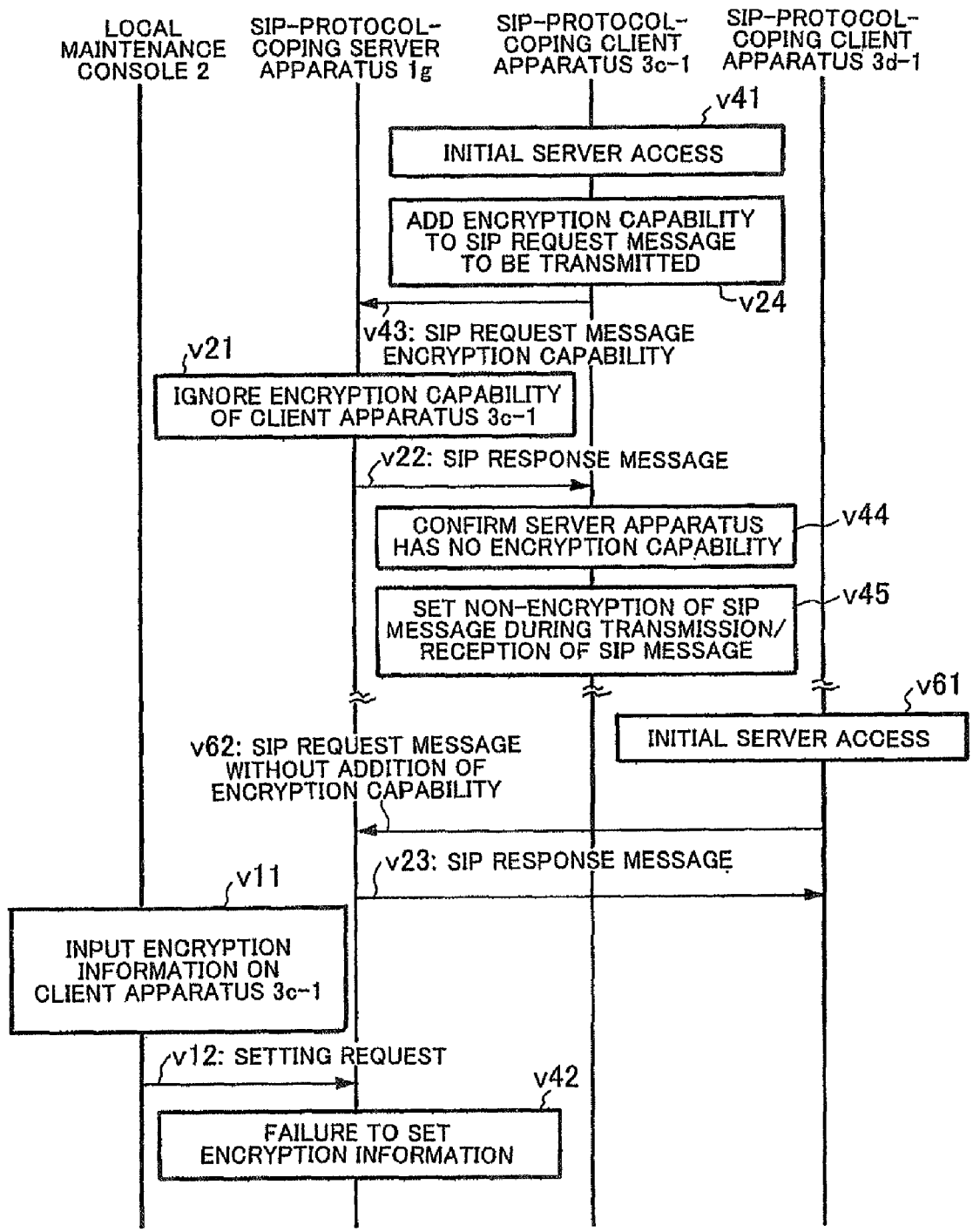
FIG. 73 is a sequence chart showing operation performed by the client server distributed system according to the twenty second embodiment of the present invention.
Figure 74:
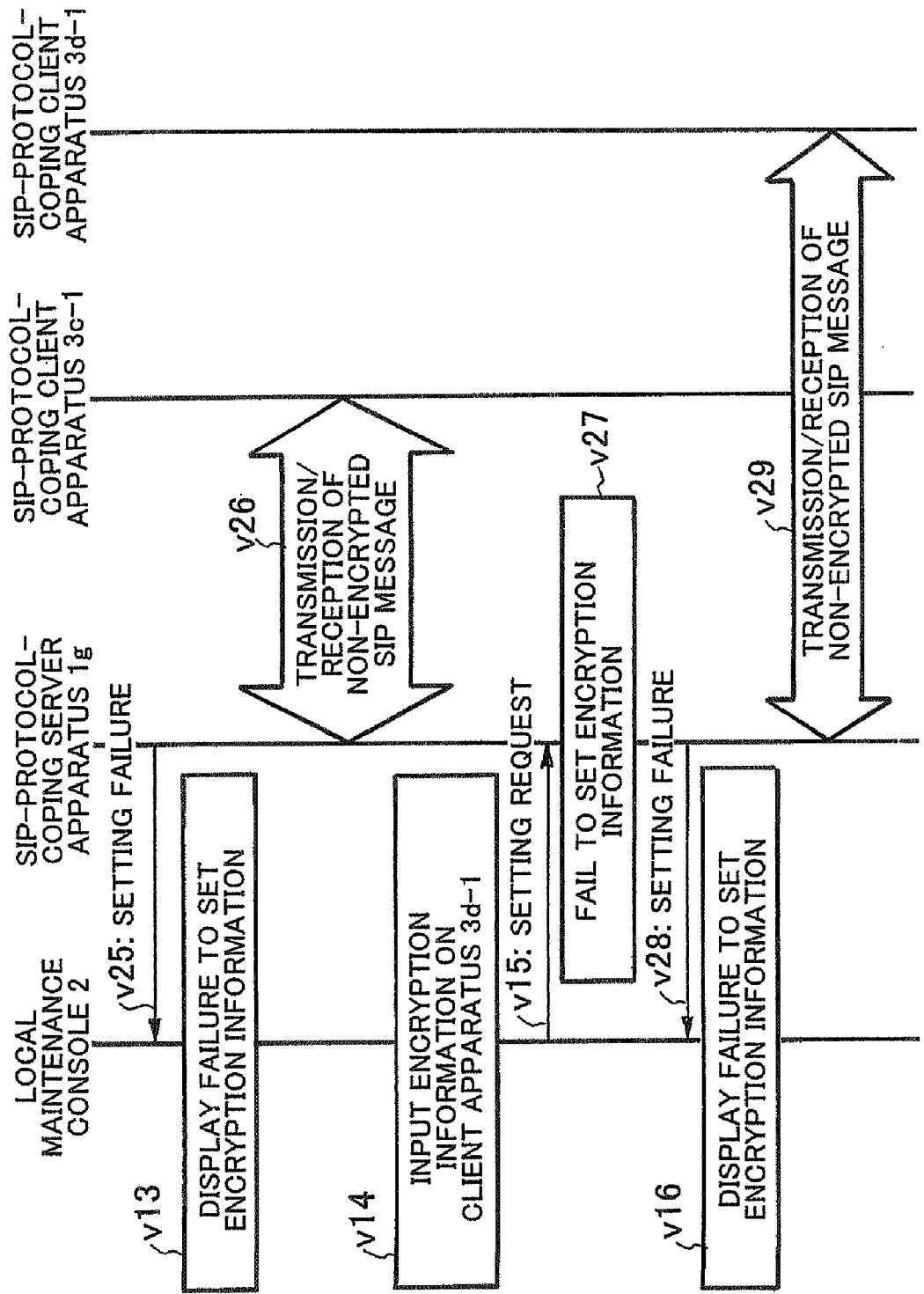
FIG. 74 is a sequence chart showing operation performed by the client server distributed system according to the twenty second embodiment of the present invention.

FIGS. 73 and 74 are sequence charts showing operation performed by the client server distributed system according to the twenty second embodiment of the present invention. Referring to FIGS. 72 to 74, the operation performed by the client server distributed system according to the twenty second embodiment of the present invention will be described. It is to be noted that processings performed by the server apparatus 1g and the client apparatuses 3c-1, 3c-2, 3d-1, and 3d-2 shown in FIGS. 73 and 74 are realized by causing CPUs of the server apparatus 1g and the client apparatus 3c-1, 3c-2, 3d-1, and 3d-2 to execute programs, respectively.

When an initial server access request to the server apparatus 1g is generated in the client apparatus 3c-1 (at v41 in FIG. 73), then the encryption capability management unit 41 adds encryption capability data held by the client apparatus 3c-1 to an SIP request message to be transmitted (at v42 in FIG. 73), and transmits the SIP request message to the SIP interface unit 13 of the server apparatus 1g via the SIP interface unit 33 (at v43 in FIG. 73).

Upon receiving the SIP request message, the SIP interface unit 13 of the server apparatus 1g ignores the encryption capability data added to the SIP request message (at v21 in FIG. 73), and transmits the SIP response message to the SIP interface unit 33 of the client apparatus 3c-1 via the SIP interface unit 13 (at v22 in FIG. 73).

Upon receiving the SIP response message to which an encryption-key-creation random parameter is not added, the SIP interface unit 33 of the client apparatus 3c-1 transmits information that the encryption-key-creation random parameter is not added to the received SIP response message to the encryption information setting unit 31. The encryption information setting unit 31 acknowledges that a setting of non-encryption of an SIP message during transmission or reception of the SIP message between the server apparatus 1g and the client apparatus 3c-1 (at v44 in FIG. 73), and stores therein the setting of non-encryption (at v45 in FIG. 73).

When an initial server access request to the server apparatus 1g is generated in the client apparatus 3d-1 (at v61 in FIG. 73), then an SIP request message is transmitted to the SIP interface unit 13 of the server apparatus 1g via the SIP interface unit 33 without adding encryption capability data to the SIP request message (at v62 in FIG. 73).

Upon receiving the SIP request message, the SIP interface unit 13 of the server apparatus 1g transmits the SIP response message to the SIP interface unit 33 of the client apparatus 3d-1 via the SIP interface unit 13 (at v23 in FIG. 73).

When encryption information on an SIP message during transmission or reception of the SIP message between the server apparatus 1g and the client apparatus 3c-1 is input to the server apparatus 1g from the local maintenance console 2 connected to the server apparatus 1g (at v11 in FIG. 73), the maintenance console interface unit 22 receives a setting request including the encryption information (at v12 in FIG. 73). Since a setting of encryption of the SIP message cannot be made, the maintenance console interface unit 22 transmits a notification of a failure to set the encryption information to the local maintenance console 2 via the encryption information interface unit 12 (at v24 in FIG. 73 and v26 in FIG. 74). The local maintenance console 2 displays the failure to set the encryption information (at v13 in FIG. 74). Subsequently, during transmission or reception of an SIP message between the server apparatus 1g and the client apparatus 3c-1, the SIP message is transmitted or received without being encrypted (at v25 in FIG. 74).

When encryption information on an SIP message during transmission or reception of the SIP message between the server apparatus 1g and the client apparatus 3d-1 is input to the server apparatus 1g from the local maintenance console 2 connected to the server apparatus 1g (at v14 in FIG. 74), the maintenance console interface unit 22 receives a setting request including the encryption information (at v15 in FIG. 74). Since a setting of encryption of the SIP message cannot be made, the maintenance console interface unit 22 transmits a notification of a failure to set the encryption information to the local maintenance console 2 via the encryption information interface unit 12 (at v27 and v28 in FIG. 74). The local maintenance console 2 displays the failure to set the encryption information (at v16 in FIG. 74). Subsequently, during transmission or reception of an SIP message between the server apparatus 1g and the client apparatus 3d-1, the SIP message is transmitted or received without being encrypted (at v29 in FIG. 74).

In this manner, according to the twenty second embodiment, if the client apparatus 3c-1 includes the SIP message encryption and decryption function and the server apparatus 1g that transmits or receives an SIP message in the system does not include the SIP message encryption and decryption function, the system can operate by invalidating the encryption and decryption function. Therefore, the SIP message can be transmitted or received without need to make function levels held by the client apparatus and the server apparatus uniform. According to the twenty second embodiment, advantages deriving from the SIP message encryption during transmission or reception of the SIP message are similar to those according to the first and second embodiments of the present invention. While operations performed by the client apparatuses 3c-2 and 3d-2 are not described herein, the same advantages as those when using the client apparatuses 3c-1 and 3d-1 can be exhibited.

Twenty Third Embodiment

Figure 75:
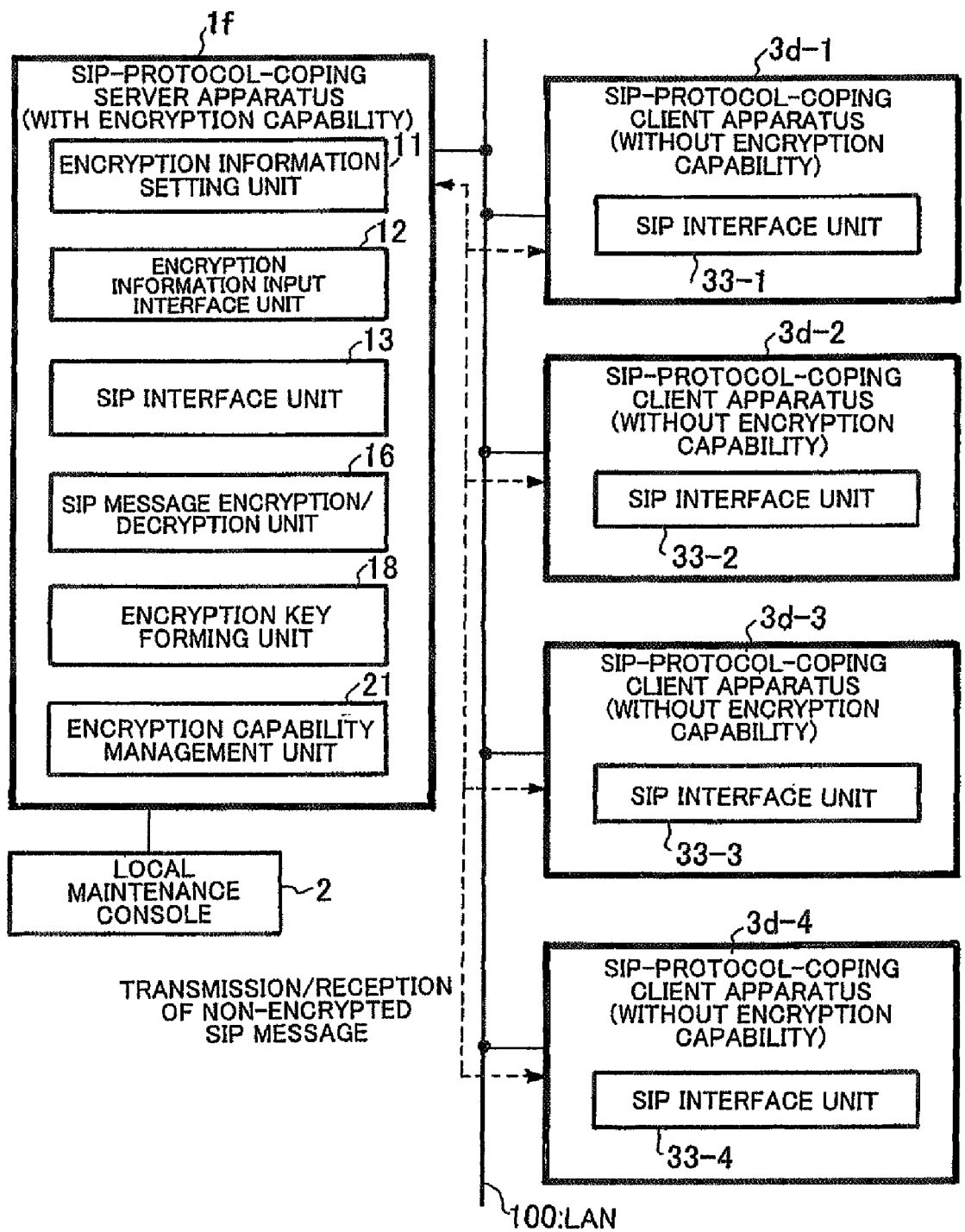
FIG. 75 is a block diagram showing a configuration of a client server distributed system according to a twenty third embodiment of the present invention.

FIG. 75 is a block diagram showing a configuration of a client server distributed system according to a twenty third embodiment of the present invention. In FIG. 75, the client server distributed system according to the twenty third embodiment of the present invention is configured so that a server apparatus 1*f* and client apparatuses 3*d*-1 to 3*d*-4 are mutually connected by a LAN 100.

The server apparatus 1*f* is configured to include at least an encryption information setting unit 11, an encryption information input interface unit 12, an SIP interface unit 13, an SIP message encryption/decryption unit 16, an encryption key forming unit 18, and an encryption capability management unit 21, and a local maintenance console 2 is connected to the server apparatus 1*f* by a serial cable or the like. The local maintenance console 2 may be disposed temporarily in a construction period or the like of the server apparatus 1*f* and may not be connected to the server apparatus 1*f* during operation of the system. The client apparatuses 3*d*-1 to 3*d*-4 are configured to include at least SIP interface units 33-1 to 33-4, respectively.

According to the twenty third embodiment, by realizing the above-stated configuration, it is possible to transmit or receive an SIP message without encrypting the SIP message even if the server apparatus 1*f* includes the SIP message encryption and decryption function during the communication between the server apparatus 1*f* and each of a plurality of client apparatuses 3*d*-1 to 3*d*-4 each of which does not include the SIP message encrypting and decryption function.

Figure 76:
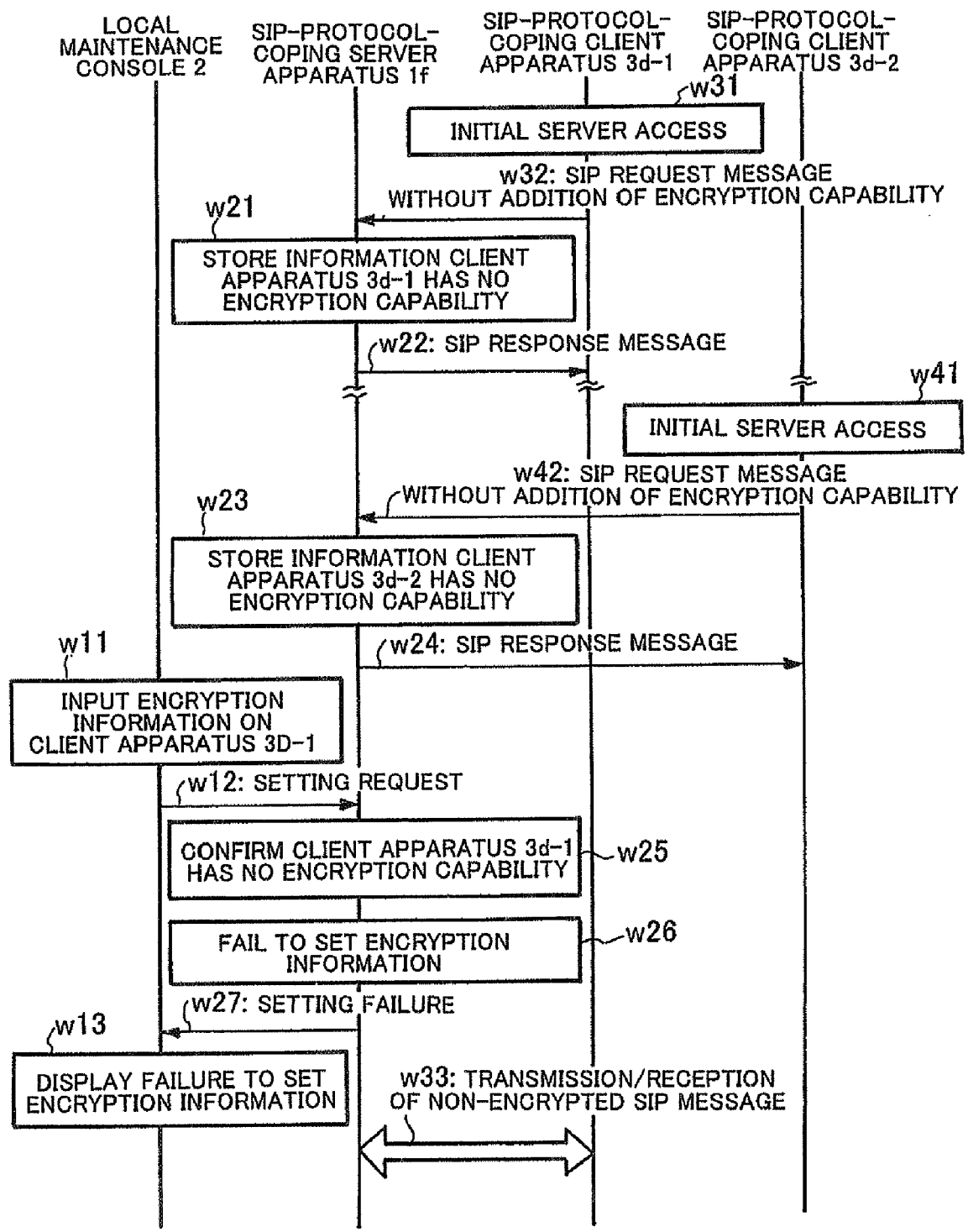
FIG. 76 is a sequence chart showing operation performed by the client server distributed system according to the twenty third embodiment of the present invention.
Figure 77:
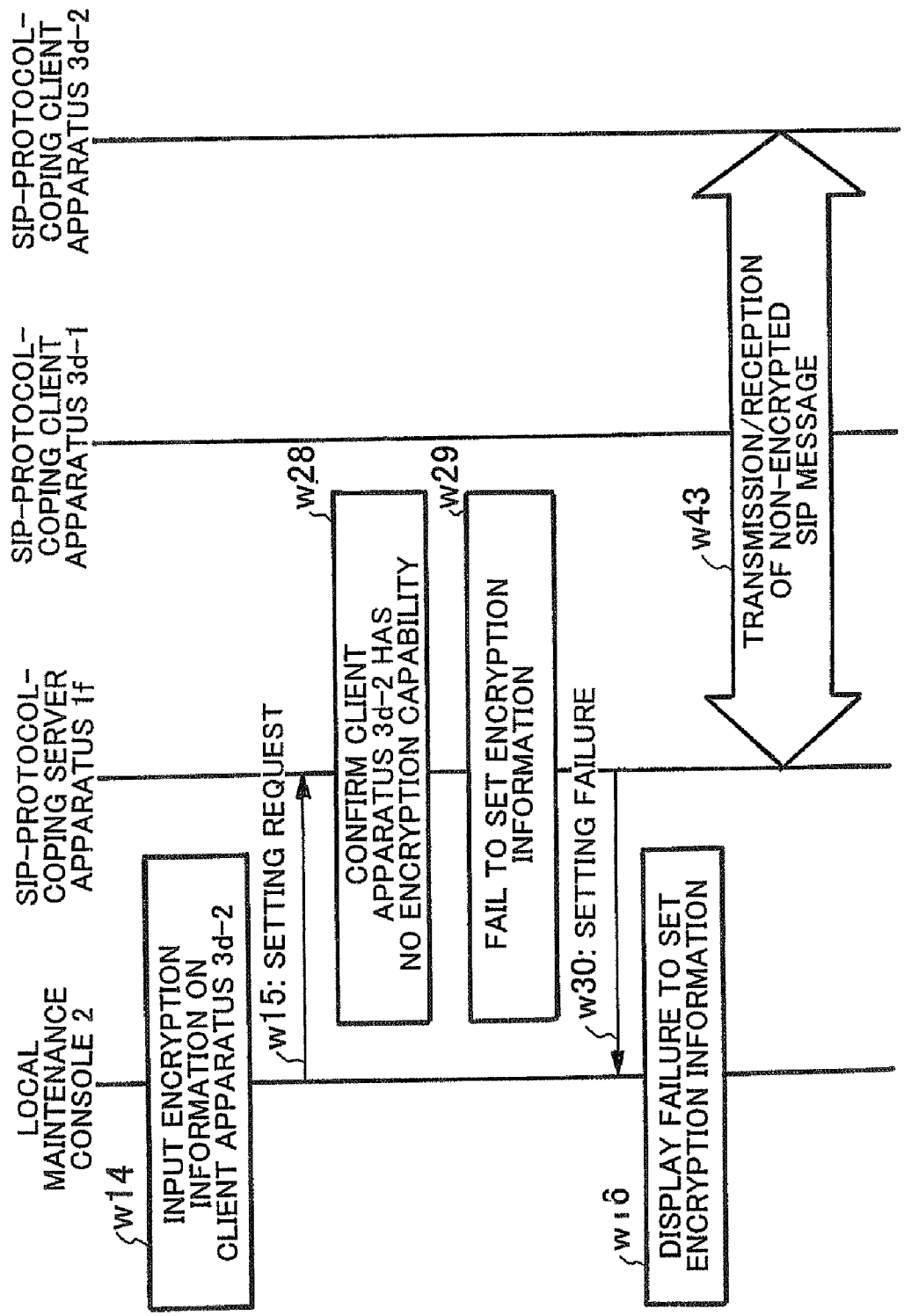
FIG. 77 is a sequence chart showing operation performed by the client server distributed system according to the twenty third embodiment of the present invention.

FIGS. 76 and 77 are sequence charts showing operation performed by the client server distributed system according to the twenty third embodiment of the present invention. Referring to FIGS. 75 to 77, the operation performed by the client server distributed system according to the twenty third embodiment of the present invention will be described. It is to be noted that processings performed by the server apparatus 1*f* and the client apparatuses 3*d*-1 to 3*d*-4 shown in FIGS. 76 and 77 are realized by causing CPUs of the server apparatus 1*e* and the client apparatus 3*d*-1 to 3*d*-4 to execute programs, respectively.

When an initial server access request to the server apparatus 1*f* is generated in the client apparatus 3*d*-1 (at w31 in FIG. 76), an SIP request message is transmitted to the SIP interface unit 13 of the server apparatus 1*f* via the SIP interface unit 33-1 without adding encryption capability data to the SIP request message (at w32 in FIG. 76).

Upon receiving the SIP request message, the SIP interface unit 13 of the server apparatus 1*f* acknowledges the initial access from the client apparatus 3*d*-1, and transmits the SIP request message to the encryption information setting unit 11. Since the encryption capability data is not added to the SIP request message, the encryption information setting unit 11 notifies the encryption capability management unit 21 that the client apparatus 3*d*-1 does not have an encryption capability. The encryption capability management unit 21 stores therein information that the client apparatus 3*d*-1 does not have an encryption capability (at w21 in FIG. 76). Further, the encryption information setting unit 11 transmits an SIP response message to the SIP interface unit 33-1 of the client apparatus 3*d*-1 via the SIP interface unit 13 without adding an encryption-key-creation random parameter to the SIP response message (at w22 in FIG. 76).

Likewise, when an initial server access request to the server apparatus 1*f* is generated in the client apparatus 3*d*-2 (at w41 in FIG. 76), an SIP request message is transmitted to the SIP interface unit 13 of the server apparatus 1*f* via the SIP interface unit 33-2 without adding encryption capability data to the SIP request message (at w42 in FIG. 76).

Upon receiving the SIP request message, the SIP interface unit 13 of the server apparatus 1*f* acknowledges the initial access from the client apparatus 3*d*-2, and transmits the SIP request message to the encryption information setting unit 11. Since the encryption capability data is not added to the SIP request message, the encryption information setting unit 11 notifies the encryption capability management unit 21 that the client apparatus 3*d*-2 does not have an encryption capability. The encryption capability management unit 21 stores therein information that the client apparatus 3*d*-2 does not have an encryption capability (at w23 in FIG. 76). Further, the encryption information setting unit 11 transmits an SIP response message to the SIP interface unit 33-2 of the client apparatus 3*d*-2 via the SIP interface unit 13 without adding an encryption-key-creation random parameter to the SIP response message (at w24 in FIG. 76).

When encryption information on an SIP message during transmission or reception of the SIP message between the server apparatus 1*f* and the client apparatus 3*d*-1 is input to the server apparatus 1*f* from the local maintenance console 2 connected to the server apparatus 1*f* (at w11 in FIG. 76), the encryption information input interface unit 12 receives a setting request including the encryption information (at w12 in FIG. 76). If confirming normality of the setting request, the encryption information input interface unit 12 transmits the encryption information to the encryption information setting unit 11. The encryption information setting unit 11 instructs the encryption capability management unit 21 to confirm whether or not the client apparatus 3*d*-1 has an encryption capability (at w25 in FIG. 76). If confirming that the client apparatus 3*d*-1 does not have an encryption capability, the encryption information setting unit 11 acknowledges that a setting of the encryption information to the client apparatus 3*d*-1 cannot be made (at w26 in FIG. 76).

The encryption information setting unit 11 that has acknowledges the setting of the encryption information to the client apparatus 3*d*-1 cannot be made transmits a notification of a failure to set the encryption information to the local maintenance console 2 via the encryption information input interface unit 12 (at w27 in FIG. 76). The local maintenance console 2 displays the failure to set the encryption information (at w13 in FIG. 76). Subsequently, during transmission or reception of an SIP message, the SIP message is transmitted or received without encrypting the SIP message (at w33 in FIG. 76).

When encryption information on an SIP message during transmission or reception of the SIP message between the server apparatus 1*f* and the client apparatus 3*d*-2 is input to the server apparatus 1*f* from the local maintenance console 2 connected to the server apparatus 1*f* (at w14 in FIG. 77), the encryption information input interface unit 12 receives a setting request including the encryption information (at w15 in FIG. 77). If confirming normality of the setting request, the encryption information input interface unit 12 transmits the encryption information to the encryption information setting unit 11. The encryption information setting unit 11 instructs the encryption capability management unit 21 to confirm whether or not the client apparatus 3*d*-2 has an encryption capability (at w28 in FIG. 77). If confirming that the client apparatus 3*d*-2 does not have an encryption capability, the encryption information setting unit 11 acknowledges that a setting of the encryption information to the client apparatus 3*d*-2 cannot be made (at w29 in FIG. 77).

The encryption information setting unit 11 that has acknowledges the setting of the encryption information to the client apparatus 3*d*-2 cannot be made transmits a notification of a failure to set the encryption information to the local maintenance console 2 via the encryption information input interface unit 12 (at w30 in FIG. 77). The local maintenance console 2 displays the failure to set the encryption information (at w16 in FIG. 77). Subsequently, during transmission or reception of an SIP message, the SIP message is transmitted or received without encrypting the SIP message (at w43 in FIG. 77).

In this manner, according to the twenty third embodiment, if the server apparatus 1f includes the SIP message encryption and decryption function, and only the client apparatuses 3d-1 to 3d-4 each of which does not include the SIP message encryption and decryption function are present in the system, an SIP message is transmitted or received between the server apparatus 1f and each of the client apparatuses 3d-1 to 3d-4 each of which does not include the SIP message encryption and decryption function. Due to this, the SIP message can be transmitted or received without need to make function levels held by the client apparatuses 3d-1 to 3d-4 uniform. While operations performed by the client apparatuses 3d-3 and 3d-4 are not described herein, the same advantages as those when using the client apparatuses 3d-1 and 3d-2 can be exhibited.

Twenty Fourth Embodiment

Figure 78:
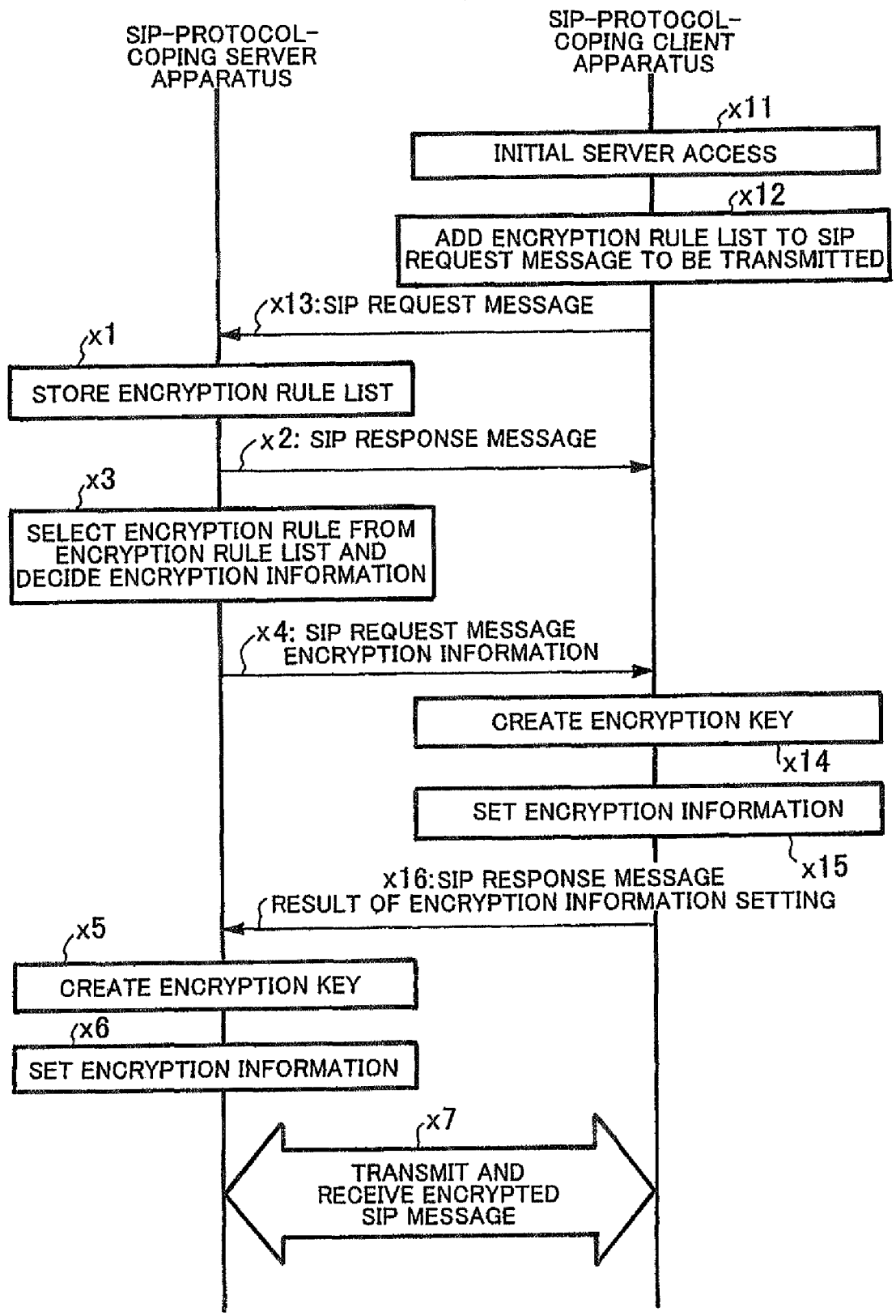
FIG. 78 is a sequence chart showing operation performed by a client server distributed system according to a twenty fourth embodiment of the present invention.

FIG. 78 is a sequence chart showing operation performed by a client server distributed system according to a twenty fourth embodiment of the present invention. Since the client server distributed system according to the twenty fourth embodiment of the present invention is the same in configuration as that according to the twenty first embodiment shown in FIG. 69, the configuration will not be described herein. Referring to FIGS. 69 and 78, the operation performed by the client server distributed system according to the twenty fourth embodiment of the present invention will be described. It is to be noted that processings performed by a server apparatus 1f and a client apparatus 3c-1 shown in FIG. 78 are realized by causing CPUs of the server apparatus 1f and the client apparatus 3c-1 to execute programs, respectively.

The encryption capability management unit 41 of the client apparatus 3c-1 recognizes one or a plurality of (two or more) encryption rules that are held by the client apparatus 3c-1 and according to which an encryption and decryption processing can be performed, and stores therein the encryption rule or rules as an encryption rule list.

By realizing the above-stated configuration, in the client server distributed system including the client apparatus 3c-1 that holds one or a plurality of encryption rules available as an encryption capability, an encrypted SIP message can be transmitted or received between the server apparatus 1f and the client apparatus 3c-1 by causing the server apparatus 1f to select one encryption rule to be used.

When an initial server access request to the server apparatus 1f is generated in the client apparatus 3c-1 (at x11 in FIG. 78), then the encryption capability management unit 41 of the client apparatus 3c-1 adds the encryption rule list held in the client apparatus 3c-1 to an SIP request message to be transmitted (at x12 in FIG. 78), and transmits the encryption list rule-added SIP request message to the SIP interface unit 13 of the server apparatus 1f via the SIP interface unit 33 (at x13 in FIG. 78).

Upon receiving the SIP request message, the SIP interface unit 13 of the server apparatus 1f reads the encryption rule list transmitted from the client apparatus 3c-1 and transmits the encryption rule list to the encryption information setting unit 11. The encryption information setting unit 11 notifies the encryption capability management unit 21 of the encryption rule list held by the client apparatus 3c-1. The encryption capability management unit 21 stores therein the encryption rule list (at x1 in FIG. 78). Further, the encryption information setting unit 11 transmits an SIP response message to the SIP interface unit 33 of the client apparatus 3c-1 via the SIP interface unit 13 (at x2 in FIG. 78).

At the time of deciding encryption information used to encrypt or decrypt an SIP message during transmission or reception of the SIP message between the server apparatus 1f and the client apparatus 3c-1, if setting of encryption of the SIP message is made, then the encryption capability management unit 21 of the server apparatus 1f selects one encryption rule to be used from the encryption rule list stored therein, decides the encryption information including the selected encryption rule, and transmits the encryption information to the encryption information setting unit 11 (at x3 in FIG. 78). The encryption information setting unit 11 stores therein the encryption information.

Since subsequent processings are similar to those in the encryption information setting sequence from the server apparatus 1 to the client apparatus 3-1 according to the first embodiment of the present invention, they will not be described herein.

In this manner, according to the twenty fourth embodiment, if each of the server apparatus 1f and the client apparatus 3c-1 includes an encryption and decryption function according to a plurality of encryption rules, encryption information can be automatically decided without causing the server apparatus 1f to transmit an instruction to set an encryption rule that cannot be used by the client apparatus 3c-1. Furthermore, according to the twenty fourth embodiment, advantages deriving from the SIP message encryption during transmission or reception of the SIP message are similar to those according to the first and second embodiments of the present invention. While operations performed by the client apparatuses 3c-2 are not described herein, the same advantages as those when using the client apparatus 3c-1 can be exhibited.

As stated so far, according to the present invention, in the SIP-protocol-coping client server distributed system, it is advantageously possible to strengthen security on the IP network by encrypting an SIP message according to encryption information arbitrarily set by a maintenance person. Furthermore, it is advantageously possible to distribute encryption information set by a system maintenance person and used to encrypt and decrypt the SIP message to client apparatuses via the maintenance console interface unit of the server apparatus. Moreover, it is advantageously possible to set encryption capability in view of the entire system integrally at one location, to simplify maintenance operation, and to decrease the number of man-hours for maintenance.

Moreover, as a security method for the conventional SIP, SSL/TLS is generally used. According to the present invention, there is no need to distribute a certificate to the respective apparatuses, to provide a certificate management function, and to authenticate the certificate using an authentication server. Therefore, the encryption function can be realized through simpler procedures than those for the SSL/TLS. Besides, because of the use of UDP as the layer 4 protocol, it is advantageously possible to ensure real time performance and, at the same time, to improve security.

According to the present invention, the server apparatus can make settings using both the local maintenance console connected to the server apparatus by a serial cable or the like and the maintenance console connected to the server apparatus via the LAN interface. It is therefore advantageously possible to ensure facilitating maintenance.

According to the present invention, if the entire SIP message including the SIP header and the SDP data is to be encrypted, strong encryption security against the wire tapping or data manipulation during the communication on the IP network can be realized. If an arbitrary part of the SIP message is to be encrypted, it is possible to make such settings as to enable operation via the network apparatus such as the SIP-NAT without encrypting the SIP header and the SDP data depending on the selection state of the encryption range. It is also advantageously possible to transmit or receive the SIP message after encrypting an important data part required to be encrypted. It is therefore advantageously possible to strengthen not only encryption security but also network function.

According to the present invention, a maintenance person can arbitrarily set whether or not the SIP message is encrypted via the server apparatus. Due to this, if the maintenance person sets the encryption of the SIP message, then it is possible to realize an encryption security function on the network and to make different settings of encryption or non-encryption according to network configurations. If, for example, an SIP message log is recorded for maintenance operation, the setting of encryption of the SIP message can be easily made, thereby making it advantageously possible to facilitate management by the maintenance personnel.

According to the present invention, the function of selecting encryption or non-encryption of the SIP message advantageously enables ensuring compatibility with the client apparatus that does not include the encryption function. Furthermore, according to the present invention, in the system supporting both encryption of the SIP message in the entire encryption range and encryption of the SIP message in an arbitrary range, the local maintenance console can arbitrarily select the encryption range. It is therefore advantageously possible to satisfy both strong encryption security and high network functionality in the system in which the network apparatus such as the SIP-NAT is present, and to select and realize an optimum security level for the current network configuration.

According to the present invention, by encrypting the SIP message, it is advantageously possible to realize an encryption security function on the network, to make different settings of, presence or absence of the encryption, encryption rules and encryption range according to network configurations, and to thereby further strengthen encryption security. Further, according to the present invention, by allowing the server apparatus to set the encryption rule to the client apparatus 3-1, system integrity can be realized.

According to the present invention, by allowing the server apparatus to set the encryption information to each of the client apparatuses, it is advantageously possible to realize system integrity and to facilitate maintenance by the maintenance personnel.

According to the present invention, a new encryption rule can be used without adding or developing an interface for selecting the encryption rule if the encryption rule operable in the system is to be added in the future. Therefore, it is advantageously possible to minimize change in the maintenance interface and to facilitate development.

According to the present invention, the system of transmitting and receiving the SIP message without encryption includes the function of transmitting the encryption information other than the encryption key from the server apparatus to the client apparatus without encrypting the encryption information other than the encryption key, and of enabling creating the encryption keys of the server apparatus and the client apparatus synchronously with each other to start an encryption function. Therefore, common encryption information can be set between the server apparatus and the client apparatus, thereby making it advantageously possible to strengthen the encryption security function after the setting of the encryption information.

According to the present invention, the encryption keys are created using the random parameter decided at the time of the initial access from the client apparatus to the server apparatus. Due to this, it is advantageously possible to eliminate regularity of the encryption keys to be generated and also strengthen the encryption security function.

According to the present invention, in the system of transmitting and receiving the SIP message in the state of the setting of encryption, if encryption information is to be changed, the encryption information is transmitted after being encrypted using the encryption information already set between the client apparatus and the server apparatus. It is, therefore, advantageously possible to strengthen encryption security.

According to the present invention, a maintenance person can arbitrarily set the encryption information other than the encryption key among the new encryption information to be set from the local maintenance console, and integrity can be ensured for system construction. Further, if the maintenance person is to log an SIP message communication state, the encryption information can be changed without encrypting it. It is, therefore, advantageously possible to ensure facilitating maintenance. Besides, according to the present invention, the encryption information can be changed without using the same encryption key for long time at a timing arbitrarily set by the maintenance person. It is, therefore, advantageously possible to strengthen security against hacking of the encryption information.

According to the present invention, the server apparatus creates the encryption key at random and distributes the created encryption key to each of the client apparatuses. Due to this, the set encryption key is unknown to the third party including the maintenance person. It is, therefore, advantageously possible to prevent human error and leakage of the encryption key, and to thereby further strengthen the encryption security.

According to the present invention, the SIP message encrypted according to the old encryption information can be received and decrypted for a predetermined period of time after changing the old encryption information to the new encryption information. It is therefore advantageously possible to change the old encryption information to the new encryption information without hampering the validity of the SIP message transmitted or received during change of the old encryption information to the new encryption information, and to change the encryption information at arbitrary timing.

According to the present invention, in the system of transmitting and receiving the SIP message in the state of the setting of encryption, if the server apparatus distributes the encryption key to be used to the client apparatus, the communication on the IP network is always held in the state in which the encryption key is encrypted. It is, therefore, advantageously possible to prevent leakage of the encryption key and to strengthen the encryption security function at the time of encrypting the SIP message.

According to the present invention, in the system of transmitting and receiving the SIP message in the state of the setting of encryption, if the server apparatus distributes the encryption information to be used to the client apparatus, the communication on the IP network is always held in the state in which the encryption key is encrypted. It is, therefore, advantageously possible to prevent leakage of the encryption key and to strengthen the encryption security function at the time of encrypting the SIP message. Besides, the other encryption information (information as to whether or not the SIP message is encrypted, the encryption rule, and the encryption range) is also distributed after being encrypted. It is therefore advantageously possible to make it difficult to even estimate the encryption key and to further strengthen the encryption security.

According to the present invention, when the state is changed from the state of the setting of non-encryption to that of the setting of encryption, the encryption information using the encryption key and created by the client apparatus and the server apparatus synchronously with each other is set. Thereafter, the encryption information using the encryption key automatically created by the server apparatus is set. By making such two-step settings, encryption and decryption are performed using the encryption key automatically created by the server apparatus and unknown to the third party including the maintenance person during actual transmission and reception of the SIP message in the state of the setting of encryption of the SIP message. The encryption security function can be thereby advantageously strengthened. Furthermore, according to the present invention, the encryption key used to encrypt the SIP message during transmission or reception of the SIP message is always notified in the encrypted state. It is, therefore, advantageously possible to strengthen the security for the encryption function.

According to the present invention, a maintenance person can arbitrarily change the encryption information from the local maintenance console via the server apparatus to transmit or receive the SIP message using the new encryption information. It is, therefore, advantageously possible to strengthen the SIP message encryption security function.

According to the present invention, the maintenance person can arbitrarily set whether or not the SIP message is encrypted via the server apparatus. Due to this, if the maintenance person sets the encryption of the SIP message, then it is advantageously possible to realize an encryption security function on the network and to make different settings of encryption or non-encryption according to network configurations. If, for example, an SIP message log is recorded for maintenance operation, the setting of non-encryption of the SIP message can be easily made, thereby making it advantageously possible to facilitate management by the maintenance personnel.

According to the present invention, optimum procedures for changing the encryption information including the method of creating the encryption key can be automatically selected according to a content of the change in the setting of encryption or non-encryption. Therefore, it is advantageously possible to ensure changing the encryption information.

According to the present invention, the encryption information can be regularly changed and the SIP message can be transmitted or received using the new encryption information. It is therefore advantageously possible to strengthen the SIP message encryption security function.

According to the present invention, an arbitrary regular update timer value can be set from the local maintenance console. It is therefore advantageously possible to change regular update intervals, to further strengthen encryption security if regular update is performed at shorter intervals, and to select an optimum regular update timer value in light of a loaded state of a network.

According to the present invention, the server apparatus can set different encryption information according to the respective client apparatuses, and different encryption rules, encryption ranges, and encryption keys can be used according to the respective client apparatuses. It is therefore advantageously possible to make it difficult to estimate the encryption information on the other apparatus from encryption states of the respective client apparatuses, and to further strengthen the encryption security function.

According to the present invention, there is no need to make encryption functions of the client apparatuses coincident in the system. As long as the encryption function held by the server apparatus coincides with that held by each of the client apparatuses, it is possible to realize the encryption function in the system.

According to the present invention, if the server apparatus includes the SIP message encryption and decryption function, and a mixture of the client apparatuses each including the SIP message encryption and decryption function and the client apparatuses each of which does not include the SIP message encryption and decryption function is present in the system, it is possible to make the SIP message encryption and decryption functions of only the client apparatuses valid. Due to this, the SIP message encryption and decryption function can be advantageously kept valid only between the apparatuses that can encrypt and decrypt the SIP message without need to make function levels held by the client apparatuses uniform, and an encryption security function of the system can be advantageously strengthened.

According to the present invention, if the client apparatus includes the SIP message encryption and decryption function and the server apparatus that transmits or receives an SIP message in the system does not include the SIP message encryption and decryption function, the system can operate by invalidating the encryption and decryption function. Therefore, the SIP message can be advantageously transmitted or received without need to make function levels held by the client apparatus and the server apparatus uniform.

Although the exemplary embodiments of the present invention have been described in detail, it should be understood that various changes, substitutions and alternatives can be made therein without departing from the spirit and scope of the invention as defined by the appended claims. Further, it is the inventor's intent to retain all equivalents of the claimed invention even if the claims are amended during prosecution.

What is claimed is:

1. A client server distributed system configured so that a client apparatus compliant with an SIP protocol and a server apparatus compliant with the SIP protocol are connected to a network, the SIP being an abbreviation of Session Initiation Protocol, the SIP protocol operating on a UDP protocol, the UDP being an abbreviation of User Datagram Protocol, wherein the server apparatus includes:

means for setting encryption information;

means for creating an SIP request message containing the encryption information and notifying the client apparatus of the SIP request message;

means for encrypting an SIP message to be transmitted to the client apparatus, the encrypting based on the encryption information and performed after the setting of the encryption information;

means for decrypting an encrypted SIP message received from the client apparatus using the encryption information; and means for exercising a control according to a content of the decrypted SIP message, the client apparatus includes:

means for setting the encryption information contained in the SIP request message received from the server apparatus;

means for encrypting an SIP message to be transmitted to the server apparatus, the encrypting based on the received encryption information and performed after the encryption information is set;

means for decrypting the SIP message received from the server apparatus using the encryption information; and means for exercising a control according to a content of the decrypted SIP message.

2. The client server distributed system according to claim 1, wherein the encryption information includes at least information as to whether the SIP message is encrypted, an encryption rule, an encryption range, and an encryption key, the information as to whether the SIP message is encrypted, the encryption rule, the encryption range of the SIP message being able to be input from the outside, the encryption key being unable to be input from the outside.

3. The client server distributed system according to claim 1, wherein the server apparatus encrypts and decrypts at least one of the SIP message in an entire range including an SIP header part of the SIP message and the SIP message in a range excluding an arbitrarily set range out of the SIP header part of the SIP message and data after the SIP header, the client apparatus encrypts and decrypts at least one of the SIP message in the entire range including the SIP header part of the SIP message and the SIP message in the range excluding the arbitrarily set range out of the SIP header part of the SIP message and the data after the SIP header.

4. The client server distributed system according to claim 1, wherein the server apparatus includes means for setting an encryption range of the SIP message input from the outside to the server apparatus;

means for creating an SIP request message containing the encryption range and notifying the client apparatus of the SIP request message; and means for deciding which is to be encrypted and decrypted, the SIP message in the entire range or the SIP message in the range excluding an arbitrarily set range out of the SIP header part of the SIP message and the data after the SIP header, based on the encryption range after setting of the encryption range, and the client apparatus includes means for setting the encryption range contained in the SIP request message to the client apparatus when receiving the SIP request message from the server apparatus; and means for deciding which is to be encrypted and decrypted, the SIP message in the entire range or the SIP message in the range excluding the arbitrarily set range out of the SIP header part of the SIP message and the data after the SIP header, based on the encryption range after setting of the encryption range.

5. The client server distributed system according to claim 1, wherein the server apparatus includes means for setting information as to whether or not the SIP message is encrypted to the server apparatus, the information as to whether or not the SIP message is encrypted being input from the outside;

means for creating an SIP request message containing the encryption information as to whether or not the SIP message is encrypted and notifying the client apparatus of the SIP request message;

means for encrypting the SIP message and for transmitting the encrypted SIP message to the client apparatus if a setting of encryption of the SIP message is made in transmission or reception of the SIP message; and means for decrypting the SIP message received from the client apparatus and encrypted if the setting of the encryption of the SIP message is made in transmission or reception of the SIP message, and the client apparatus includes means for setting the information as to whether or not the SIP message is encrypted contained in the SIP request message to the client apparatus when receiving the SIP request message from the server apparatus;

means for encrypting the SIP message and for transmitting the encrypted SIP message to the server apparatus if the setting of the encryption of the SIP message is made in transmission or reception of the SIP message; and means for decrypting the SIP message received from the server apparatus and encrypted if the setting of the encryption of the SIP message is made in transmission or reception of the SIP message.

6. The client server distributed system according to claim 1, wherein the server apparatus includes means for setting the encryption rule input from the outside and used to encrypt the SIP message to the server apparatus;

means for creating an SIP request message containing the encryption rule and notifying the client apparatus of the SIP request message;

means for encrypting the SIP message using the encryption rule and for transmitting the encrypted SIP message to the client apparatus if a setting of encryption of the SIP message is made in transmission or reception of the SIP message; and means for decrypting the SIP message received from the client apparatus and encrypted using the encryption rule, and the client apparatus includes means for setting the encryption rule contained in the SIP request message to the client apparatus when receiving the SIP request message from the server apparatus;

means for encrypting the SIP message using the encryption rule and for transmitting the encrypted SIP message to the server apparatus if the setting of the encryption of the SIP message is made in transmission or reception of the SIP message; and means for decrypting the SIP message received from the server apparatus and encrypted using the encryption rule if the setting of the encryption of the SIP message is made in transmission or reception of the SIP message.

7. The client server distributed system according to claim 1, wherein the server apparatus includes means for setting information as to whether or not the SIP message is encrypted and the encryption range of the SIP message to the server apparatus, the information as to whether or not the SIP message is encrypted and the encryption range being input from the outside;

means for creating an SIP request message containing the information as to whether or not the SIP message is encrypted and the encryption range and notifying the client apparatus of the SIP request message;

means for encrypting the SIP message in the encryption range and for transmitting the encrypted SIP message to the client apparatus if a setting of encryption of the SIP message is made in transmission or reception of the SIP message; and means for decrypting the SIP message received from the client apparatus and encrypted in the encryption range, and the client apparatus includes means for setting the information as to whether or not the SIP message is encrypted and the encryption range contained in the SIP request message to the client apparatus when receiving the SIP request message from the server apparatus;

means for encrypting the SIP message in the encryption range and for transmitting the encrypted SIP message to the server apparatus if the setting of the encryption of the SIP message is made in transmission or reception of the SIP message; and means for decrypting the SIP message received from the server apparatus and encrypted in the encryption range if the setting of the encryption of the SIP message is made in transmission or reception of the SIP message.

8. The client server distributed system according to claim 1, wherein the server apparatus includes means for setting information as to whether or not the SIP message is encrypted and the encryption rule used to encrypt the SIP message to the server apparatus, the information as to whether or not the SIP message is encrypted and the encryption rule being input from the outside;

means for creating an SIP request message containing the information as to whether or not the SIP message is encrypted and the encryption rule and notifying the client apparatus of the SIP request message;

means for encrypting the SIP message using the encryption rule and for transmitting the encrypted SIP message to the client apparatus if a setting of encryption of the SIP message is made in transmission or reception of the SIP message; and means for decrypting the SIP message received from the client apparatus and encrypted using the encryption rule if the setting of the encryption of the SIP message is made in transmission or reception of the SIP message, and the client apparatus includes means for setting the information as to whether or not the SIP message is encrypted and the encryption rule contained in the SIP request message to the client apparatus when receiving the SIP request message from the server apparatus;

means for encrypting the SIP message using the encryption rule and for transmitting the encrypted SIP message to the server apparatus if the setting of the encryption of the SIP message is made in transmission or reception of the SIP message; and means for decrypting the SIP message received from the server apparatus and encrypted using the encryption rule if the setting of the encryption of the SIP message is made in transmission or reception of the SIP message.

9. The client server distributed system according to claim 1, wherein the server apparatus includes means for setting the encryption rule used to encrypt the SIP message and the SIP message in the encryption range to the server apparatus, the encryption rule and the encryption range of the SIP message being input from the outside;

means for creating an SIP request message containing the encryption rule and the encryption range of the SIP message and notifying the client apparatus of the SIP request message;

means for encrypting the SIP message in the encryption range using the encryption rule and for transmitting the encrypted SIP message to the client apparatus; and means for decrypting the SIP message received from the client apparatus and encrypted in the encryption range using the encryption rule, and the client apparatus includes means for setting the encryption rule and the encryption range contained in the SIP request message to the client apparatus when receiving the SIP request message, from the server apparatus;

means for encrypting the SIP message in the encryption range using the encryption rule and for transmitting the encrypted SIP message to the server apparatus; and means for decrypting the SIP message received from the server apparatus and encrypted in the encryption range using the encryption rule.

10. The client server distributed system according to claim 1, wherein the server apparatus includes means for setting the information as to whether or not the SIP message is encrypted, the encryption rule used to encrypt the SIP message, and the encryption range of the SIP message to the server apparatus, the information as to whether or not the SIP message is encrypted, the encryption rule, and the encryption range being input from the outside;

means for creating an SIP request message containing the information as to whether or not the SIP message is encrypted, the encryption rule, and the encryption range of the SIP message and notifying the client apparatus of the SIP request message;

means for encrypting the SIP message in the encryption range using the encryption rule and for transmitting the encrypted SIP message to the client apparatus if a setting of encryption of the SIP message is made in transmission or reception of the SIP message; and means for decrypting the SIP message received from the client apparatus and encrypted in the encryption range using the encryption rule if the setting of the encryption of the SIP message is made in transmission or reception of the SIP message, and the client apparatus includes means for setting the information as to whether or not the SIP message is encrypted, the encryption rule and the encryption range contained in the SIP request message to the client apparatus when receiving the SIP request message from the server apparatus;

means for encrypting the SIP message in the encryption range using the encryption rule and for transmitting the encrypted SIP message to the server apparatus if the setting of the encryption of the SIP message is made in transmission or reception of the SIP message; and means for decrypting the SIP message received from the server apparatus and encrypted in the encryption range using the encryption rule if the setting of the encryption of the SIP message is made in transmission or reception of the SIP message.

11. The client server distributed system according to claim 1, wherein the server apparatus includes means for setting the information as to whether or not the SIP message is encrypted, the encryption rule used to encrypt the SIP message, and the encryption range of the SIP message to the server apparatus if a setting of non-encryption is made between the server apparatus and the client apparatus, the information as to whether or not the SIP message is encrypted, the encryption rule, and the encryption range being input from the outside;

means for creating an SIP request message containing the information as to whether or not the SIP message is encrypted, the encryption rule, and the encryption range of the SIP message and notifying the client apparatus of the SIP request message;

means for creating an encryption key used when the SIP message is encrypted;

means for encrypting the SIP message in the encryption range using the encryption rule and the encryption key and for transmitting the encrypted SIP message to the client apparatus if a setting of encryption of the SIP message is made in transmission or reception of the SIP message; and means for decrypting the SIP message received from the client apparatus and encrypted in the encryption range using the encryption rule and the encryption key if the setting of the encryption of the SIP message is made in transmission or reception of the SIP message, and the client apparatus includes means for setting the information as to whether or not the SIP message is encrypted, the encryption rule, and the encryption range contained in the SIP request message to the client apparatus when receiving the SIP request message from the server apparatus;

means for creating an encryption key used when the SIP message is encrypted;

means for encrypting the SIP message in the encryption range using the encryption rule and the encryption key and for transmitting the encrypted SIP message to the server apparatus if the setting of the encryption of the SIP message is made in transmission or reception of the SIP message; and means for decrypting the SIP message received from the server apparatus and encrypted in the encryption range using the encryption rule and the encryption key if the setting of the encryption of the SIP message is made in transmission or reception of the SIP message.

12. The client server distributed system according to claim 11, wherein the encryption key created by the server apparatus and the encryption key created by the client apparatus are synchronized with each other, and created from a random parameter uniquely decided when the client apparatus makes an initial access to the server apparatus, and if the encryption keys are used for certain data to encrypt and decrypt the certain data, respectively, identical data is eventually obtained.

13. The client server distributed system according to claim 1, wherein, in a state in which the encryption information is set to each of the client apparatus and the server apparatus, and in which the SIP message is to be encrypted and decrypted according to the encryption information, the server apparatus includes means for setting the encryption information to the server apparatus, the encryption information being used to transmit or receive the SIP message to or from the client apparatus and input from the outside;

means for randomly creating an encryption key used when the SIP message is encrypted;

means for creating an SIP request message containing new encryption information including the encryption key, and encrypting the SIP request message using the currently used encryption information, and for notifying the client apparatus of the SIP request message;

means for encrypting the SIP message using the new encryption rule and for transmitting the encrypted SIP message when transmitting the SIP message to the client apparatus in transmission or reception of the SIP message; and means for decrypting the SIP message received from the client apparatus and encrypted by the client apparatus, using the new encryption information, the server apparatus receiving and decrypting data encrypted according to previously used encryption information in a predetermined period after changing the encryption information, and the client apparatus includes means for decrypting the SIP request message and setting the new encryption information contained in the SIP request message to the client apparatus when receiving the SIP request message encrypted using the currently used encryption information from the server apparatus;

means for encrypting the SIP message using the new encryption information and for transmitting the encrypted SIP message to the server apparatus in transmission or reception of the SIP message; and means for decrypting the SIP message received from the server apparatus and encrypted using the new encryption information, using the new encryption information, the client apparatus receiving and decrypting the data encrypted according to the previously used encryption information in a predetermined period after changing the encryption information.

14. The client server distributed system according to claim 13, wherein when the server apparatus distributes the created encryption key, the encryption key is always encrypted in transmission or reception of the SIP message between the server apparatus and the client apparatus.

15. The client server distributed system according to claim 13, wherein when the server apparatus distributes the created encryption key, the new encryption information including the encryption information other than the encryption key is encrypted entirely in transmission or reception of the SIP message between the server apparatus and the client apparatus.

16. The client server distributed system according to claim 13, wherein if a state of a setting of non-encryption is to be changed to a state of the setting of the encryption in transmission or reception of the SIP message between the client apparatus and the server apparatus, after completing a setting of the encryption information using encryption keys created by the client apparatus and the server apparatus synchronously with each other, then the server apparatus automatically creates a new encryption key, encrypts and distributes the new encryption key, and completes the setting of the encryption of the SIP message during transmission or reception of the SIP message using the new encryption information.

17. The client server distributed system according to claim 1, wherein, in a state in which the encryption information is set to each of the client apparatus and the server apparatus, and in which the SIP message is to be encrypted and decrypted according to the set encryption information, the server apparatus includes means for setting the encryption information to the server apparatus, the encryption information being input from the outside;

means for deciding an encryption information changing procedure including a method of creating an encryption key, based on a setting of encryption or non-encryption of the new encryption information and a currently set state of encryption or non-encryption if new encryption information is input from the outside;

means for creating an SIP request message containing the new encryption information and notifying the client apparatus of the SIP request message; and means for updating the setting so as to encrypt and decrypt the SIP message using the new encryption information, the client apparatus includes means for setting the new encryption information contained in the SIP request message to the client apparatus when receiving the SIP request message from the server apparatus;

means for deciding any one of a method of creating the encryption key and a setting method based on the received new encryption information and the currently set state of the encryption or non-encryption; and means for updating the setting so as to encrypt and decrypt the SIP message using the new encryption information, and after completing updating the setting, the client apparatus and the server apparatus synchronously set a change of the encryption information, and the SIP message starts to be encrypted and decrypted using the new encryption information.

18. The client server distributed system according to claim 1, wherein, in a state in which the encryption information is set to each of the client apparatus and the server apparatus, and in which the SIP message is being encrypted and decrypted according to the set encryption information, the server apparatus includes a regular update timer function of counting an update cycle of the encryption information;

means for initially set the regular update timer function when the encryption information is set, and for automatically updating the encryption information if the regular update timer function indicates a timeout;

means for creating an SIP request message containing the updated encryption information, the update encryption information being new encryption information, and notifying the client apparatus of the SIP request message; and means for resetting the regular update timer function for the encryption information after update and notification of the new encryption information, the client apparatus includes means for setting the new encryption information that is contained in the SIP request message and updated to the client apparatus when receiving the SIP request message from the server apparatus, and after completing notification of the new encryption information, the client apparatus and the server apparatus synchronously set a change of the encryption information, and the SIP message starts to be encrypted and decrypted using the new encryption information.

19. The client server distributed system according to claim 18, wherein, in a state in which the encryption information is set to each of the client apparatus and server apparatus, in which the SIP message is encrypted and decrypted based on the set encryption information, and in which the encryption information is regularly updated, the server apparatus includes means for setting a regular update timer value for the encryption information, the regular update timer value being input from the outside.

20. The client server distributed system according to claim 1, wherein a plurality of client apparatuses is present in the client server distributed system, and the server apparatus includes means for setting the encryption information on the SIP message for each of the plurality of client apparatuses.

21. The client server distributed system according to claim 1, wherein the client apparatus includes a function of holding one or more encryption rules that can be used for a processing of encrypting and decrypting the SIP message; and a function of notifying the server apparatus of a list of encryption rules that can be used as encryption capability information in advance, and the server apparatus includes a function of selecting one of the encryption rules from the list of the encryption rules according to an instruction from the outside, and of deciding the encryption information.

22. A message encryption method used in a client server distributed system configured so that a client apparatus compliant with an Session Initiation Protocol (SIP) protocol and a server apparatus compliant with the SIP protocol are connected to a network, the SIP protocol operating on a User Datagram Protocol (UDP) protocol, the message encryption method comprising steps of:

causing the server apparatus to perform:

setting encryption information;

creating an SIP request message containing the encryption information and notifying the client apparatus of the SIP request message;

encrypting an SIP message to be transmitted to the client apparatus, the encrypting based on the encryption information and performed after the setting of the encryption information;

decrypting an encrypted SIP message received from the client apparatus using the encryption information; and exercising a control according to a content of the decrypted SIP message, and causing the client apparatus to perform:

setting the encryption information contained in the SIP request message received from the server apparatus;

encrypting an SIP message to be transmitted to the server apparatus, the encrypting based on the received encryption information and performed after the encryption information is set;

decrypting the SIP message received from the server apparatus using the encryption information; and exercising a control according to a content of the decrypted SIP message.

23. The message encryption method according to claim 22, wherein the encryption information includes at least information as to whether the SIP message is encrypted, an encryption rule, an encryption range, and an encryption key, the information as to whether the SIP message is encrypted, the encryption rule, the encryption range of the SIP message being able to be input from the outside, the encryption key being unable to be input from the outside.

24. The message encryption method according to claim 22, wherein the server apparatus encrypts and decrypts at least one of the SIP message in an entire range including an SIP header part of the SIP message and the SIP message in a range excluding an arbitrarily set range out of the SIP header part of the SIP message and data after the SIP header, the client apparatus encrypts and decrypts at least one of the SIP message in the entire range including the SIP header part of the SIP message and the SIP message in the range excluding the arbitrarily set range out of the SIP header part of the SIP message and the data after the SIP header.

25. The message encryption method according to claim 22, wherein the server apparatus performs a processing for setting an encryption range of the SIP message input from the outside to the server apparatus;

a processing for creating an SIP request message containing the encryption range and notifying the client apparatus of the SIP request message; and a processing for deciding which is to be encrypted and decrypted, the SIP message in the entire range or the SIP message in the range excluding an arbitrarily set range out of the SIP header part of the SIP message and the data after the SIP header, based on the encryption range after setting of the encryption range, and the client apparatus performs a processing for setting the encryption range contained in the SIP request message to the client apparatus when receiving the SIP request message from the server apparatus; and a processing for deciding which is to be encrypted and decrypted, the SIP message in the entire range or the SIP message in the range excluding the arbitrarily set range out of the SIP header part of the SIP message and the data after the SIP header, based on the encryption range after setting of the encryption range.

26. The message encryption method according to claim 22, wherein the server apparatus performs a processing for setting information as to whether or not the SIP message is encrypted to the server apparatus, the information as to whether or not the SIP message is encrypted being input from the outside;

a processing for creating an SIP request message containing the encryption information as to whether or not the SIP message is encrypted and notifying the client apparatus of the SIP request message;

a processing for encrypting the SIP message and for transmitting the encrypted SIP message to the client apparatus if a setting of encryption of the SIP message is made in transmission or reception of the SIP message; and a processing for decrypting the SIP message received from the client apparatus and encrypted if the setting of the encryption of the SIP message is made in transmission or reception of the SIP message, and the client apparatus performs a processing for setting the information as to whether or not the SIP message is encrypted contained in the SIP request message to the client apparatus when receiving from the server apparatus;

a processing for encrypting the SIP message and for transmitting the encrypted SIP message to the server apparatus if the setting of the encryption of the SIP message is made in transmission or reception of the SIP message; and a processing for decrypting the SIP message received from the server apparatus and encrypted if the setting of the encryption of the SIP message is made in transmission or reception of the SIP message.

27. The message encryption method according to claim 22, wherein the server apparatus performs a processing for setting the encryption rule input from the outside and used to encrypt the SIP message to the server apparatus;

a processing for creating an SIP request message containing the encryption rule and notifying the client apparatus of the SIP request message;

a processing for encrypting the SIP message using the encryption rule and for transmitting the encrypted SIP message to the client apparatus if a setting of encryption of the SIP message is made in transmission or reception of the SIP message; and a processing for decrypting the SIP message received from the client apparatus and encrypted using the encryption rule, and the client apparatus performs a processing for setting the encryption rule contained in the SIP request message to the client apparatus when receiving the SIP request message from the server apparatus;

a processing for encrypting the SIP message using the encryption rule and for transmitting the encrypted SIP message to the server apparatus if the setting of the encryption of the SIP message is made in transmission or reception of the SIP message; and a processing for decrypting the SIP message received from the server apparatus and encrypted using the encryption rule if the setting of the encryption of the SIP message is made in transmission or reception of the SIP message.

28. The message encryption method according to claim 22, wherein the server apparatus performs a processing for setting information as to whether or not the SIP message is encrypted and the encryption range of the SIP message to the server apparatus, the information as to whether or not the SIP message is encrypted and the encryption range being input from the outside;

a processing for creating an SIP request message containing the information as to whether or not the SIP message is encrypted and the encryption range and notifying the client apparatus of the SIP request message;

a processing for encrypting the SIP message in the encryption range and for transmitting the encrypted SIP message to the client apparatus if a setting of encryption of the SIP message is made in transmission or reception of the SIP message; and a processing for decrypting the SIP message received from the client apparatus and encrypted in the encryption range, and the client apparatus performs a processing for setting the information as to whether or not the SIP message is encrypted and the encryption range contained in the SIP request message to the client apparatus when receiving the SIP request message from the server apparatus;

a processing for encrypting the SIP message in the encryption range and for transmitting the encrypted SIP message to the server apparatus if the setting of the encryption of the SIP message is made in transmission or reception of the SIP message; and a processing for decrypting the SIP message received from the server apparatus and encrypted in the encryption range if the setting of the encryption of the SIP message is made in transmission or reception of the SIP message.

29. The message encryption method according to claim 22, wherein the server apparatus performs a processing for setting information as to whether or not the SIP message is encrypted and the encryption rule used to encrypt the SIP message to the server apparatus, the information as to whether or not the SIP message is encrypted and the encryption rule being input from the outside;

a processing for creating an SIP request message containing the information as to whether or not the SIP message is encrypted and the encryption rule and notifying the client apparatus of the SIP request message;

a processing for encrypting the SIP message using the encryption rule and for transmitting the encrypted SIP message to the client apparatus if a setting of encryption of the SIP message is made in transmission or reception of the SIP message; and a processing for decrypting the SIP message received from the client apparatus and encrypted using the encryption rule if the setting of the encryption of the SIP message is made in transmission or reception of the SIP message, and the client apparatus performs a processing for setting the information as to whether or not the SIP message is encrypted and the encryption rule contained in the SIP request message to the client apparatus when receiving the SIP request message from the server apparatus;

a processing for encrypting the SIP message using the encryption rule and for transmitting the encrypted SIP message to the server apparatus if the setting of the encryption of the SIP message is made in transmission or reception of the SIP message; and a processing for decrypting the SIP message received from the server apparatus and encrypted using the encryption rule if the setting of the encryption of the SIP message is made in transmission or reception of the SIP message.

30. The message encryption method according to claim 22, wherein the server apparatus performs a processing for setting the encryption rule used to encrypt the SIP message and the encryption range to the server apparatus, the encryption rule and the encryption range of the SIP message being input from the outside;

a processing for creating an SIP request message containing the encryption rule and the encryption range of the SIP message and notifying the client apparatus of the SIP request message;

a processing for encrypting the SIP message in the encryption range using the encryption rule and for transmitting the encrypted SIP message to the client apparatus; and a processing for decrypting the SIP message received from the client apparatus and encrypted in the encryption range using the encryption rule, and the client apparatus performs a processing for setting the encryption rule and the encryption range contained in the SIP request message to the client apparatus when receiving the SIP request message from the server apparatus;

a processing for encrypting the SIP message in the encryption range using the encryption rule and for transmitting the encrypted SIP message to the server apparatus; and a processing for decrypting the SIP message received from the server apparatus and encrypted in the encryption range using the encryption rule.

31. The message encryption method according to claim 22, wherein the server apparatus performs a processing for setting the information as to whether or not the SIP message is encrypted, the encryption rule used to encrypt the SIP message, and the encryption range of the SIP message to the server apparatus, the information as to whether or not the SIP message is encrypted, the encryption rule, and the encryption range of the SIP message being input from the outside;

a processing for creating an SIP request message containing the information as to whether or not the SIP message is encrypted, the encryption rule, and the encryption range of the SIP message and notifying the client apparatus of the SIP request message;

a processing for encrypting the SIP message in the encryption range using the encryption rule and for transmitting the encrypted SIP message to the client apparatus if a setting of encryption of the SIP message is made in transmission or reception of the SIP message; and a processing for decrypting the SIP message received from the client apparatus and encrypted in the encryption range using the encryption rule if the setting of the encryption of the SIP message is made in transmission or reception of the SIP message, and the client apparatus performs a processing for setting the information as to whether or not the SIP message is encrypted, the encryption rule, and the encryption range contained in the SIP request message to the client apparatus when receiving the SIP request message from the server apparatus;

a processing for encrypting the SIP message in the encryption range using the encryption rule and for transmitting the encrypted SIP message to the server apparatus if the setting of the encryption of the SIP message is made in transmission or reception of the SIP message; and a processing for decrypting the SIP message received from the server apparatus and encrypted in the encryption range using the encryption rule if the setting of the encryption of the SIP message is made in transmission or reception of the SIP message.

32. The message encryption method according to claim 22, wherein the server apparatus performs a processing for setting the information as to whether or not the SIP message is encrypted, the encryption rule used to encrypt the SIP message, and the encryption range of the SIP message to the server apparatus if a setting of non-encryption is made between the server apparatus and the client apparatus, the information as to whether or not the SIP message is encrypted, the encryption rule, and the encryption range being input from the outside;

a processing for creating an SIP request message containing the information as to whether or not the SIP message is encrypted, the encryption rule, and the encryption range of the SIP message and notifying the client apparatus of the SIP request message;

a processing for creating an encryption key used when the SIP message is encrypted;

a processing for encrypting the SIP message in the encryption range using the encryption rule and the encryption key and for transmitting the encrypted SIP message to the client apparatus if a setting of encryption of the SIP message is made in transmission or reception of the SIP message; and a processing for decrypting the SIP message received from the client apparatus and encrypted in the encryption range using the encryption rule and the encryption key if the setting of the encryption of the SIP message is made in transmission or reception of the SIP message, and
the client apparatus performs
a processing for setting the information as to whether or not the SIP message is encrypted, the encryption rule, and the encryption range contained in the SIP request message to the client apparatus when receiving the SIP request message from the server apparatus;
a processing for creating an encryption key used when the SIP message is encrypted;
a processing for encrypting the SIP message in the encryption range using the encryption rule and the encryption key and for transmitting the encrypted SIP message to the server apparatus if the setting of the encryption of the SIP message is made in transmission or reception of the SIP message; and
a processing for decrypting the SIP message received from the server apparatus and encrypted in the encryption range using the encryption rule and the encryption key if the setting of the encryption of the SIP message is made in transmission or reception of the SIP message.

33. The message encryption method according to claim 32, wherein the encryption key created by the server apparatus and the encryption key created by the client apparatus are synchronized with each other, and created from a random parameter uniquely decided when the client apparatus makes an initial access to the server apparatus, and
if the encryption keys are used for certain data to encrypt and decrypt the certain data, respectively, identical data is eventually obtained.

34. The message encryption method according to claim 22, wherein, in a state in which the encryption information is set to each of the client apparatus and the server apparatus, and in which the SIP message is to be encrypted and decrypted according to the encryption information,
the server apparatus performs
a processing for setting the encryption information to the server apparatus, the encryption information being used to transmit or receive the SIP message to or from the client apparatus and input from the outside;
a processing for randomly creating an encryption key used when the SIP message is encrypted;
a processing for creating an SIP request message containing new encryption information including the encryption key, and encrypting the SIP request message using the currently used encryption information, and for notifying the client apparatus of the SIP request message;
a processing for encrypting the SIP message using the new encryption information and for transmitting the encrypted SIP message when transmitting the SIP message to the client apparatus in transmission or reception of the SIP message; and
a processing for decrypting the SIP message received from the client apparatus and encrypted by the client apparatus, using the new encryption information, the server apparatus receiving and decrypting data encrypted according to previously used encryption information in a predetermined period after changing the encryption information, and
the client apparatus performs
a processing for decrypting the SIP request message and setting the new encryption information contained in the SIP request message to the client apparatus when receiving the SIP request message, encrypted using the currently used encryption information from the server apparatus;
a processing for encrypting the SIP message using the new encryption information and for transmitting the encrypted SIP message to the server apparatus in transmission or reception of the SIP message; and
a processing for decrypting the SIP message received from the server apparatus and encrypted using the new encryption information, using the new encryption information, the client apparatus receiving and decrypting the data encrypted according to the previously used encryption information in a predetermined period after changing the encryption information.

35. The message encryption method according to claim 34, wherein when the server apparatus distributes the created encryption key, the encryption key is always encrypted in transmission or reception of the SIP message between the server apparatus and the client apparatus.

36. The message encryption method according to claim 34, wherein when the server apparatus distributes the created encryption key, the new encryption information including the encryption information other than the encryption key is encrypted entirely in transmission or reception of the SIP message between the server apparatus and the client apparatus.

37. The message encryption method according to claims 34, wherein if a state of a setting of non-encryption is to be changed to a state of the setting of the encryption in transmission or reception of the SIP message between the client apparatus and the server apparatus, after completing a setting of the encryption information using the encryption keys created by the client apparatus and the server apparatus synchronously with each other, then the server apparatus automatically creates a new encryption key, encrypts and distributes the new encryption key, and completes the setting of the encryption of the SIP message during transmission or reception of the SIP message using the new encryption information.

38. The message encryption method according to claim 22, wherein, in a state in which the encryption information is set to each of the client apparatus and the server apparatus, and in which the SIP message is to be encrypted and decrypted according to the encryption information,
the server apparatus performs
a processing for setting the encryption information to the server apparatus, the encryption information being input from the outside;
a processing for deciding an encryption information changing procedure including a method of creating an encryption key, based on a setting of encryption or non-encryption of the new encryption information and a currently set state of encryption or non-encryption if new encryption information is input from the outside;
a processing for creating an SIP request message containing the new encryption information and notifying the client apparatus of the SIP request message ; and
a processing for updating the setting so as to encrypt and decrypt the SIP message using the new encryption information,
the client apparatus performs
a processing for setting the new encryption information contained in the SIP request message to the client apparatus when receiving the SIP request message, from the server apparatus;

a processing for deciding any one of a method of creating the encryption key and a setting method based on the received new encryption information and the currently set state of the encryption or non-encryption; and a processing for updating the setting so as to encrypt and decrypt the SIP message using the new encryption information, and after completing updating the setting, the client apparatus and the server apparatus synchronously set a change of the encryption information, and the SIP message starts to be encrypted and decrypted using the new encryption information.

39. The message encryption method according to claim 22, wherein, in a state in which the encryption information is set to each of the client apparatus and the server apparatus, and in which the SIP message is being encrypted and decrypted according to the encryption information, the server apparatus performs a regular update timer function of counting an update cycle of the encryption information;

a processing for initially set the regular update timer function when the encryption information is set, and for automatically updating the encryption information if the regular update timer function indicates a timeout;

a processing for creating an SIP request message containing the updated encryption information, the updated encryption information being new encryption information, and notifying the client apparatus of the SIP request message; and a processing for resetting the regular update timer function for the encryption information after update and notification of the new encryption information, the client apparatus performs a processing for setting the new encryption information that is contained in the SIP request message and updated to the client apparatus when receiving the SIP request message from the server apparatus, and after completing notification of the new encryption information, the client apparatus and the server apparatus synchronously set a change of the encryption information, and the SIP message starts to be encrypted and decrypted using the new encryption information.

40. The message encryption method according to claim 39, wherein, in a state in which the encryption information is set to each of the client apparatus and the server apparatus, in which the SIP message is encrypted and decrypted based on the set encryption information, and in which the encryption information is regularly updated, the server apparatus performs a processing for setting a regular update timer value for the encryption information, the regular update timer value being input from the outside.

41. The message encryption method according to claim 22, wherein a plurality of client apparatuses is present in the client server distributed system, and the server apparatus performs a processing for setting the encryption information on the SIP message for each of the plurality of client apparatuses.

42. The message encryption method according to claim 22, wherein the client apparatus holds one or more encryption rules that can be used for a processing of encrypting and decrypting the SIP message, notifies the server apparatus of a list of encryption rules that can be used as encryption capability information in advance, and the server apparatus selects one of the encryption rules from the list of the encryption rules according to an instruction from the outside, and decides the encryption information.

43. A computer program product executed by a server apparatus in a client server distributed system configured so that a client apparatus compliant with an Session Initiation Protocol (SIP) protocol and a server apparatus compliant with the SIP protocol are connected to a network, the SIP protocol operating on a User Datagram Protocol (UDP) protocol, the computer program product causing a central processing unit of the server apparatus to perform:

setting encryption information;

creating an SIP request message containing the encryption information and notifying the client apparatus of the SIP request message;

encrypting an SIP message to be transmitted to the client apparatus, the encrypting based on the encryption information and performed after the setting of the encryption information;

decrypting an encrypted SIP message received from the client apparatus using the encryption information; and exercising a control according to a content of the decrypted SIP message.

\* \* \* \* \*

UNITED STATES PATENT AND TRADEMARK OFFICE
CERTIFICATE OF CORRECTION

PATENT NO.      : 8,166,293 B2
APPLICATION NO. : 11/828956
DATED           : April 24, 2012
INVENTOR(S)     : Mao Masuhiro and Yasuhiro Watanabe It is certified that error appears in the above-identified patent and that said Letters Patent is hereby corrected as shown below:

In the Specification

Column 54, Line 31: Delete "3a-i" and insert -- 3a-1 --

Column 62, Line 51: Delete "q31" and insert -- q3i --

In the Claims

Column 94, Line 59: In Claim 38, delete "message ;" and insert -- message; --

Signed and Sealed this
Seventh Day of October, 2014

Michelle K. Lee
*Deputy Director of the United States Patent and Trademark Office*